US010838586B2

(12) United States Patent
Ko et al.

(10) Patent No.: US 10,838,586 B2
(45) Date of Patent: Nov. 17, 2020

(54) CONTEXT-SPECIFIC USER INTERFACES

(71) Applicant: Apple Inc., Cupertino, CA (US)

(72) Inventors: Heena Ko, Cupertino, CA (US); Giovanni M. Agnoli, San Mateo, CA (US); Kevin Will Chen, Sunnyvale, CA (US); Joshua R. Ford, Cupertino, CA (US); Christopher Patrick Foss, San Francisco, CA (US); Aurelio Guzman, San Jose, CA (US); Stephen O. Lemay, Palo Alto, CA (US); Matthew J. Sundstrom, Campbell, CA (US); Joshua Weinberg, Mountain View, CA (US); Christopher Wilson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/798,235

(22) Filed: Oct. 30, 2017

(65) Prior Publication Data

US 2018/0329587 A1    Nov. 15, 2018

Related U.S. Application Data

(63) Continuation of application No. 62/505,782, filed on May 12, 2017.

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0362* (2013.01); *G06F 3/0485* (2013.01);
(Continued)

(58) Field of Classification Search
CPC ..... G06F 3/0482; G06F 3/0485; G06F 3/0488
See application file for complete search history.

(56) References Cited

U.S. PATENT DOCUMENTS

| 3,148,500 A | 9/1964 | Hayes |
| 4,205,628 A | 6/1980 | Null |

(Continued)

FOREIGN PATENT DOCUMENTS

| AU | 2010249319 A1 | 6/2012 |
| AU | 2015101019 A4 | 9/2015 |

(Continued)

OTHER PUBLICATIONS

International Preliminary Report on Patentability received for PCT Patent Application No. PCT/US2015/054223, dated Dec. 14, 2017, 18 pages.

(Continued)

*Primary Examiner* — Haoshian Shih
(74) *Attorney, Agent, or Firm* — Dentons US LLP

(57) ABSTRACT

Context-specific user interfaces, e.g., for use with a portable multifunction device, provide, inter alia, indications of time and, optionally, a variety of additional information. A user interface screen including a current time indicator and a first platter is displayed. The first platter is at a first position, is associated with a first application, and displays a first set of information obtained from the first application. The first set of information relates to a first temporal context of the current day. In response to detecting a user input, the first platter is displayed at a second position and a second platter is displayed at the first position. The second platter is associated with a second application and displays a second set of information obtained from the second application. The second set of information relates to a second temporal context of the current day.

48 Claims, 65 Drawing Sheets

(51) Int. Cl.
*G06F 3/0362* (2013.01)
*G06F 3/0484* (2013.01)
*G06F 3/0485* (2013.01)
*H04L 12/58* (2006.01)
*G06F 3/0488* (2013.01)
*H04M 1/725* (2006.01)

(52) U.S. Cl.
CPC ........ *G06F 3/0488* (2013.01); *G06F 3/04847* (2013.01); *H04L 51/24* (2013.01); *H04M 1/72519* (2013.01)

(56) References Cited

U.S. PATENT DOCUMENTS

| | | |
|---|---|---|
| 5,124,959 A | 6/1992 | Yamazaki et al. |
| 5,208,790 A | 5/1993 | Sato |
| 5,455,808 A | 10/1995 | Grupp et al. |
| 5,508,979 A | 4/1996 | Eisenegger |
| 5,659,693 A | 8/1997 | Hansen et al. |
| 5,825,353 A | 10/1998 | Will |
| 5,845,257 A | 12/1998 | Fu et al. |
| 5,892,519 A | 4/1999 | Hirai |
| 5,986,655 A | 11/1999 | Chiu et al. |
| 5,999,195 A | 12/1999 | Santangeli |
| 6,043,818 A | 3/2000 | Nakano et al. |
| 6,128,012 A | 10/2000 | Seidensticker et al. |
| 6,160,767 A | 12/2000 | Ho |
| 6,279,018 B1 | 8/2001 | Kudrolli et al. |
| 6,359,839 B1 | 3/2002 | Schenk et al. |
| 6,441,824 B2 | 8/2002 | Hertzfeld |
| 6,449,219 B1 | 9/2002 | Hepp et al. |
| 6,452,597 B1 | 9/2002 | Goldberg et al. |
| 6,477,117 B1 | 11/2002 | Narayanaswami et al. |
| 6,496,780 B1 | 12/2002 | Harris et al. |
| 6,525,997 B1 | 2/2003 | Narayanaswami et al. |
| 6,539,243 B1 | 3/2003 | Kimura et al. |
| 6,539,343 B2 | 3/2003 | Zhao et al. |
| 6,549,218 B1 | 4/2003 | Gershony et al. |
| 6,556,222 B1 | 4/2003 | Narayanaswami |
| 6,690,623 B1 | 2/2004 | Maano |
| 6,728,533 B2 | 4/2004 | Ishii |
| 6,809,724 B1 | 10/2004 | Shiraishi et al. |
| 6,871,076 B2 | 3/2005 | Samn |
| 7,203,380 B2 | 4/2007 | Chiu et al. |
| 7,257,254 B2 | 8/2007 | Tunney |
| 7,302,650 B1 | 11/2007 | Allyn et al. |
| 7,378,954 B2 | 5/2008 | Wendt |
| 7,479,949 B2 | 1/2009 | Jobs et al. |
| 7,515,509 B2 | 4/2009 | Klein |
| 7,515,903 B1 | 4/2009 | Cast |
| 7,619,615 B1 | 11/2009 | Donoghue |
| 7,751,285 B1 | 7/2010 | Cain |
| 7,773,460 B2 | 8/2010 | Holt |
| 7,843,769 B2 | 11/2010 | Ishida et al. |
| 7,898,542 B1 | 3/2011 | Yu et al. |
| 7,907,476 B2 | 3/2011 | Lee |
| 8,238,876 B2 | 8/2012 | Teng et al. |
| 8,245,143 B2 | 8/2012 | Yach et al. |
| 8,462,997 B2 | 6/2013 | Pettit et al. |
| 8,595,649 B2 | 11/2013 | Sherrard et al. |
| 8,725,842 B1 | 5/2014 | Al-Nasser |
| 8,847,903 B2 | 9/2014 | Stokes et al. |
| 8,854,925 B1 | 10/2014 | Lee et al. |
| 8,938,394 B1 | 1/2015 | Faaborg et al. |
| 8,948,819 B2 | 2/2015 | Yun et al. |
| 8,963,894 B2 | 2/2015 | Klassen et al. |
| 9,070,092 B2 | 6/2015 | Chou et al. |
| 9,082,314 B2 | 7/2015 | Tsai |
| 9,141,270 B1 | 9/2015 | Stuart et al. |
| 9,152,211 B2 | 10/2015 | Gunn et al. |
| 9,152,212 B2 | 10/2015 | Gunn |
| 9,173,052 B2 | 10/2015 | Hauser et al. |
| 9,197,738 B2 | 11/2015 | Peev et al. |
| 9,239,605 B1 | 1/2016 | Nanda et al. |
| 9,459,781 B2 | 10/2016 | Wilson et al. |
| 9,547,425 B2 | 1/2017 | Wilson et al. |
| 9,568,891 B2 | 2/2017 | Adams et al. |
| 9,582,165 B2 | 2/2017 | Kocienda et al. |
| 9,600,178 B2 | 3/2017 | Yun et al. |
| 9,753,436 B2 | 9/2017 | Ely et al. |
| 9,794,397 B2 | 10/2017 | Min et al. |
| 10,304,347 B2 | 5/2019 | Wilson et al. |
| 10,620,590 B1 | 4/2020 | Guzman et al. |
| 2002/0054066 A1 | 5/2002 | Kikinis et al. |
| 2002/0054541 A1 | 5/2002 | Hall |
| 2002/0059623 A1 | 5/2002 | Rodriguez et al. |
| 2002/0131331 A1 | 9/2002 | Molander |
| 2003/0002391 A1 | 1/2003 | Biggs |
| 2003/0027621 A1 | 2/2003 | Libby et al. |
| 2003/0067497 A1 | 4/2003 | Pichon |
| 2003/0164847 A1 | 9/2003 | Zaima et al. |
| 2003/0214885 A1 | 11/2003 | Powell et al. |
| 2003/0229900 A1 | 12/2003 | Reisman |
| 2004/0001105 A1 | 1/2004 | Chew et al. |
| 2004/0017733 A1 | 1/2004 | Sullivan |
| 2004/0021699 A1 | 2/2004 | Fildebrandt |
| 2004/0047244 A1 | 3/2004 | Lino et al. |
| 2004/0066710 A1 | 4/2004 | Yuen et al. |
| 2004/0075700 A1 | 4/2004 | Liu et al. |
| 2004/0168107 A1 | 8/2004 | Sharp et al. |
| 2004/0192332 A1 | 9/2004 | Samn |
| 2004/0218472 A1 | 11/2004 | Narayanaswami et al. |
| 2004/0225966 A1 | 11/2004 | Besharat et al. |
| 2004/0243547 A1* | 12/2004 | Chhatrapati ...... G06F 17/30471 |
| 2004/0266491 A1 | 12/2004 | Howard et al. |
| 2005/0041667 A1 | 2/2005 | Miller et al. |
| 2005/0052446 A1 | 3/2005 | Plut |
| 2005/0094492 A1 | 5/2005 | Rosevear |
| 2005/0139852 A1 | 6/2005 | Chen et al. |
| 2005/0156873 A1 | 7/2005 | Walter et al. |
| 2005/0200611 A1 | 9/2005 | Goto et al. |
| 2005/0278757 A1 | 12/2005 | Grossman et al. |
| 2006/0007785 A1 | 1/2006 | Fernandez et al. |
| 2006/0035628 A1 | 2/2006 | Miller et al. |
| 2006/0085765 A1 | 4/2006 | Peterson et al. |
| 2006/0092770 A1 | 5/2006 | Demas |
| 2006/0214935 A1 | 9/2006 | Boyd et al. |
| 2007/0004451 A1 | 1/2007 | C. Anderson |
| 2007/0006096 A1 | 1/2007 | Kim et al. |
| 2007/0055947 A1 | 3/2007 | Ostojic et al. |
| 2007/0057775 A1 | 3/2007 | O'Reilly et al. |
| 2007/0094330 A1 | 4/2007 | Russell |
| 2007/0101279 A1 | 5/2007 | Chaudhri et al. |
| 2007/0211042 A1 | 9/2007 | Kim et al. |
| 2007/0236475 A1 | 10/2007 | Wherry |
| 2007/0239754 A1 | 10/2007 | Schnitman |
| 2007/0261537 A1 | 11/2007 | Eronen et al. |
| 2007/0279190 A1 | 12/2007 | Lugt et al. |
| 2007/0287140 A1 | 12/2007 | Liebowitz |
| 2008/0082930 A1 | 4/2008 | Omernick et al. |
| 2008/0127268 A1 | 5/2008 | Bergeron et al. |
| 2008/0130421 A1 | 6/2008 | Akaiwa et al. |
| 2008/0150959 A1 | 6/2008 | Marui et al. |
| 2008/0167834 A1 | 7/2008 | Herz et al. |
| 2008/0168396 A1 | 7/2008 | Matas et al. |
| 2008/0186808 A1 | 8/2008 | Lee |
| 2008/0192021 A1 | 8/2008 | Lim et al. |
| 2008/0215240 A1 | 9/2008 | Howard et al. |
| 2008/0246778 A1 | 10/2008 | Ham et al. |
| 2008/0270934 A1 | 10/2008 | Firebaugh et al. |
| 2009/0012988 A1 | 1/2009 | Brown |
| 2009/0051327 A1 | 2/2009 | Bohne |
| 2009/0058821 A1* | 3/2009 | Chaudhri ............ G06F 3/04817 345/173 |
| 2009/0059730 A1 | 3/2009 | Lyons et al. |
| 2009/0143114 A1 | 6/2009 | Vargas et al. |
| 2009/0146962 A1 | 6/2009 | Ahonen et al. |
| 2009/0158173 A1 | 6/2009 | Palahnuk et al. |
| 2009/0164923 A1* | 6/2009 | Ovi .................... G06F 3/04817 715/764 |
| 2009/0178007 A1 | 7/2009 | Matas et al. |
| 2009/0178008 A1* | 7/2009 | Herz .................. G06F 3/04817 715/840 |
| 2009/0199130 A1 | 8/2009 | Tsern et al. |

(56) References Cited

U.S. PATENT DOCUMENTS

| | | |
|---|---|---|
| 2009/0249247 A1 | 10/2009 | Tseng et al. |
| 2009/0259958 A1 | 10/2009 | Ban |
| 2009/0264116 A1 | 10/2009 | Thompson |
| 2009/0279392 A1 | 11/2009 | Scott et al. |
| 2009/0284389 A1 | 11/2009 | Klassen et al. |
| 2009/0287470 A1 | 11/2009 | Farnsworth et al. |
| 2009/0300146 A1 | 12/2009 | Park et al. |
| 2009/0305732 A1 | 12/2009 | Marcellino et al. |
| 2009/0312059 A1 | 12/2009 | Pratt et al. |
| 2009/0319467 A1 | 12/2009 | Berg et al. |
| 2009/0327886 A1 | 12/2009 | Whytock et al. |
| 2010/0026640 A1 | 2/2010 | Kim et al. |
| 2010/0060586 A1 | 3/2010 | Pisula et al. |
| 2010/0064255 A1 | 3/2010 | Rottler et al. |
| 2010/0069035 A1 | 3/2010 | Johnson |
| 2010/0081473 A1 | 4/2010 | Chatterjee et al. |
| 2010/0085203 A1 | 4/2010 | Kahn et al. |
| 2010/0110082 A1 | 5/2010 | Myrick et al. |
| 2010/0124152 A1 | 5/2010 | Lee |
| 2010/0146437 A1 | 6/2010 | Woodcock et al. |
| 2010/0156833 A1 | 6/2010 | Kim et al. |
| 2010/0157742 A1* | 6/2010 | Relyea ............... G04G 9/0082 368/28 |
| 2010/0167712 A1* | 7/2010 | Stallings ............... G06F 3/0485 455/418 |
| 2010/0205563 A1 | 8/2010 | Haapsaari et al. |
| 2010/0217657 A1 | 8/2010 | Gazdzinski |
| 2010/0223563 A1 | 9/2010 | Green |
| 2010/0225495 A1 | 9/2010 | Marui |
| 2010/0226213 A1 | 9/2010 | Drugge |
| 2010/0235726 A1 | 9/2010 | Ording et al. |
| 2010/0243516 A1 | 9/2010 | Martin et al. |
| 2010/0281374 A1 | 11/2010 | Schulz et al. |
| 2011/0003665 A1 | 1/2011 | Burton et al. |
| 2011/0004835 A1 | 1/2011 | Yanchar et al. |
| 2011/0025719 A1 | 2/2011 | Yanase |
| 2011/0029870 A1 | 2/2011 | May et al. |
| 2011/0061010 A1 | 3/2011 | Wasko et al. |
| 2011/0070924 A1 | 3/2011 | Kim |
| 2011/0076992 A1 | 3/2011 | Chou et al. |
| 2011/0078624 A1 | 3/2011 | Missig et al. |
| 2011/0083111 A1 | 4/2011 | Forutanpour et al. |
| 2011/0098928 A1 | 4/2011 | Hoffman et al. |
| 2011/0109540 A1 | 5/2011 | Milne et al. |
| 2011/0138329 A1 | 6/2011 | Wells et al. |
| 2011/0151415 A1 | 6/2011 | Darling |
| 2011/0157046 A1 | 6/2011 | Lee et al. |
| 2011/0166777 A1 | 7/2011 | Chavakula |
| 2011/0173221 A1* | 7/2011 | Ahiakpor ............... G06Q 10/109 707/769 |
| 2011/0179372 A1 | 7/2011 | Moore et al. |
| 2011/0182151 A1 | 7/2011 | Geyer et al. |
| 2011/0191661 A1 | 8/2011 | Phillips et al. |
| 2011/0193878 A1 | 8/2011 | Seo et al. |
| 2011/0197165 A1 | 8/2011 | Filippov et al. |
| 2011/0202883 A1 | 8/2011 | Oh et al. |
| 2011/0205851 A1 | 8/2011 | Harris |
| 2011/0218765 A1 | 9/2011 | Rogers |
| 2011/0230986 A1 | 9/2011 | Lafortune et al. |
| 2011/0234152 A1 | 9/2011 | Frossen et al. |
| 2011/0261079 A1 | 10/2011 | Ingrassia et al. |
| 2011/0281342 A1 | 11/2011 | Porsch et al. |
| 2011/0296324 A1 | 12/2011 | Goossens et al. |
| 2011/0306421 A1 | 12/2011 | Nishimoto et al. |
| 2011/0316858 A1 | 12/2011 | Shen et al. |
| 2011/0320938 A1 | 12/2011 | Schorsch |
| 2012/0001922 A1 | 1/2012 | Escher et al. |
| 2012/0028707 A1 | 2/2012 | Raitt et al. |
| 2012/0059787 A1 | 3/2012 | Brown et al. |
| 2012/0062470 A1 | 3/2012 | Chang |
| 2012/0079375 A1 | 3/2012 | Ogino et al. |
| 2012/0084729 A1 | 4/2012 | Lin |
| 2012/0092383 A1 | 4/2012 | Hysek et al. |
| 2012/0110438 A1 | 5/2012 | Peraza et al. |
| 2012/0116550 A1 | 5/2012 | Hoffman et al. |
| 2012/0117507 A1 | 5/2012 | Tseng et al. |
| 2012/0124499 A1 | 5/2012 | Tsai |
| 2012/0154156 A1 | 6/2012 | Kuntzel |
| 2012/0182226 A1 | 7/2012 | Tuli |
| 2012/0197523 A1 | 8/2012 | Kirsch |
| 2012/0231849 A1 | 9/2012 | Yamashita |
| 2012/0243735 A1 | 9/2012 | Wu |
| 2012/0254804 A1 | 10/2012 | Sheha et al. |
| 2012/0254810 A1 | 10/2012 | Heck et al. |
| 2012/0288139 A1 | 11/2012 | Singhar |
| 2012/0297346 A1 | 11/2012 | Hoffknecht et al. |
| 2012/0304084 A1 | 11/2012 | Kim et al. |
| 2012/0319984 A1 | 12/2012 | Borovsky et al. |
| 2012/0324390 A1 | 12/2012 | Tao |
| 2013/0007665 A1* | 1/2013 | Chaudhri ............... H04L 51/24 715/830 |
| 2013/0021236 A1 | 1/2013 | Bender |
| 2013/0030892 A1 | 1/2013 | Liu et al. |
| 2013/0044072 A1 | 2/2013 | Kobayashi et al. |
| 2013/0050263 A1 | 2/2013 | Khoe et al. |
| 2013/0055147 A1 | 2/2013 | Vasudev et al. |
| 2013/0057566 A1 | 3/2013 | Kriese et al. |
| 2013/0063084 A1 | 3/2013 | Tilvis et al. |
| 2013/0063383 A1* | 3/2013 | Anderssonreimer ........................ G06F 1/1626 345/173 |
| 2013/0069893 A1 | 3/2013 | Brinda et al. |
| 2013/0076757 A1 | 3/2013 | Pritting |
| 2013/0082965 A1 | 4/2013 | Wada et al. |
| 2013/0107674 A1 | 5/2013 | Gossweiler, III et al. |
| 2013/0111579 A1 | 5/2013 | Newman et al. |
| 2013/0116967 A1 | 5/2013 | Akcasu et al. |
| 2013/0132888 A1 | 5/2013 | Tijssen |
| 2013/0141371 A1 | 6/2013 | Hallford et al. |
| 2013/0147825 A1 | 6/2013 | Martin et al. |
| 2013/0185813 A1 | 7/2013 | Shim et al. |
| 2013/0191785 A1 | 7/2013 | Rampson et al. |
| 2013/0205194 A1 | 8/2013 | Decker et al. |
| 2013/0215044 A1 | 8/2013 | Ahn et al. |
| 2013/0222271 A1 | 8/2013 | Alberth et al. |
| 2013/0232443 A1* | 9/2013 | Ryu ............... H04M 1/72583 715/784 |
| 2013/0239060 A1* | 9/2013 | Kang ............... G06F 9/448 715/835 |
| 2013/0254705 A1 | 9/2013 | Mooring et al. |
| 2013/0316763 A1 | 11/2013 | Kader |
| 2013/0318437 A1 | 11/2013 | Jung et al. |
| 2013/0318466 A1 | 11/2013 | Estrada et al. |
| 2013/0326418 A1 | 12/2013 | Utsuki et al. |
| 2013/0345980 A1 | 12/2013 | van os et al. |
| 2014/0013414 A1 | 1/2014 | Bruck |
| 2014/0022183 A1 | 1/2014 | Ayoub et al. |
| 2014/0037109 A1 | 2/2014 | Ban |
| 2014/0047525 A1 | 2/2014 | Bonhoff |
| 2014/0055495 A1 | 2/2014 | Kim et al. |
| 2014/0059493 A1 | 2/2014 | Kim |
| 2014/0074570 A1 | 3/2014 | Hope et al. |
| 2014/0082533 A1 | 3/2014 | Kelley et al. |
| 2014/0094224 A1 | 4/2014 | Lozovoy |
| 2014/0101169 A1 | 4/2014 | Kurata et al. |
| 2014/0126336 A1 | 5/2014 | Goeller et al. |
| 2014/0129959 A1 | 5/2014 | Battles et al. |
| 2014/0139454 A1* | 5/2014 | Mistry ............... G06F 3/041 345/173 |
| 2014/0139637 A1 | 5/2014 | Mistry et al. |
| 2014/0143678 A1 | 5/2014 | Mistry et al. |
| 2014/0143737 A1 | 5/2014 | Mistry et al. |
| 2014/0157189 A1 | 6/2014 | Morita |
| 2014/0157321 A1 | 6/2014 | Kurita |
| 2014/0173439 A1 | 6/2014 | Gutierrez et al. |
| 2014/0189578 A1 | 7/2014 | Shuttleworth et al. |
| 2014/0189584 A1 | 7/2014 | Weng et al. |
| 2014/0200691 A1 | 7/2014 | Lee et al. |
| 2014/0201655 A1 | 7/2014 | Mahaffey et al. |
| 2014/0229752 A1 | 8/2014 | Lee |
| 2014/0244165 A1 | 8/2014 | Bells |
| 2014/0245161 A1 | 8/2014 | Yuen et al. |
| 2014/0245177 A1 | 8/2014 | Maklouf |
| 2014/0250374 A1 | 9/2014 | Ohki et al. |

(56) References Cited

U.S. PATENT DOCUMENTS

| | | |
|---|---|---|
| 2014/0250391 A1 | 9/2014 | Jong et al. |
| 2014/0253487 A1 | 9/2014 | Bezinge et al. |
| 2014/0258935 A1 | 9/2014 | Nishida et al. |
| 2014/0267303 A1 | 9/2014 | Larkin et al. |
| 2014/0276244 A1 | 9/2014 | Kamyar |
| 2014/0282103 A1 | 9/2014 | Crandall |
| 2014/0282153 A1 | 9/2014 | Christiansen et al. |
| 2014/0282254 A1 | 9/2014 | Feiereisen et al. |
| 2014/0289660 A1 | 9/2014 | Min |
| 2014/0293755 A1 | 10/2014 | Geiser et al. |
| 2014/0304664 A1 | 10/2014 | Lee et al. |
| 2014/0310618 A1 | 10/2014 | Venkatesh |
| 2014/0317543 A1 | 10/2014 | Kim |
| 2014/0325384 A1 | 10/2014 | Kobayashi |
| 2014/0325408 A1 | 10/2014 | Leppanen et al. |
| 2014/0328151 A1 | 11/2014 | Serber |
| 2014/0344723 A1 | 11/2014 | Malik et al. |
| 2014/0347275 A1 | 11/2014 | Kim et al. |
| 2014/0359477 A1 | 12/2014 | Chen |
| 2014/0362105 A1 | 12/2014 | Kocienda et al. |
| 2014/0380229 A1 | 12/2014 | Volodin et al. |
| 2015/0022438 A1 | 1/2015 | Hong |
| 2015/0055197 A1 | 2/2015 | Romanoff et al. |
| 2015/0058651 A1 | 2/2015 | Choi et al. |
| 2015/0062130 A1 | 3/2015 | Ho |
| 2015/0083970 A1 | 3/2015 | Koh et al. |
| 2015/0100621 A1 | 4/2015 | Pan |
| 2015/0105125 A1 | 4/2015 | Min et al. |
| 2015/0106752 A1 | 4/2015 | Yang |
| 2015/0111558 A1 | 4/2015 | Yang |
| 2015/0113468 A1 | 4/2015 | Clark |
| 2015/0117162 A1 | 4/2015 | Tsai |
| 2015/0143234 A1 | 5/2015 | Norris, III |
| 2015/0160806 A1 | 6/2015 | Fey et al. |
| 2015/0160812 A1 | 6/2015 | Yuan et al. |
| 2015/0160856 A1 | 6/2015 | Jang et al. |
| 2015/0172438 A1 | 6/2015 | Yang |
| 2015/0185703 A1 | 7/2015 | Tanaka |
| 2015/0185995 A1 | 7/2015 | Shoemaker et al. |
| 2015/0194137 A1 | 7/2015 | Wyatt |
| 2015/0205509 A1 | 7/2015 | Scriven et al. |
| 2015/0207922 A1 | 7/2015 | Kobayashi et al. |
| 2015/0217163 A1 | 8/2015 | Amis et al. |
| 2015/0248235 A1 | 9/2015 | Offenberg et al. |
| 2015/0254875 A1 | 9/2015 | Zhang |
| 2015/0277545 A1 | 10/2015 | Flowers et al. |
| 2015/0286372 A1 | 10/2015 | Swindell et al. |
| 2015/0286391 A1 | 10/2015 | Jacobs et al. |
| 2015/0301506 A1 | 10/2015 | Koumaiha |
| 2015/0301608 A1 | 10/2015 | Nagaraju et al. |
| 2015/0346694 A1 | 12/2015 | Hoobler et al. |
| 2015/0355830 A1 | 12/2015 | Chaudhri et al. |
| 2015/0365892 A1 | 12/2015 | Ma et al. |
| 2015/0379476 A1 | 12/2015 | Chaudhri et al. |
| 2016/0004393 A1 | 1/2016 | Faaborg et al. |
| 2016/0022202 A1 | 1/2016 | Peterson et al. |
| 2016/0027420 A1 | 1/2016 | Eronen |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0044091 A1 | 2/2016 | Doumet |
| 2016/0048283 A1 | 2/2016 | Yang et al. |
| 2016/0054892 A1 | 2/2016 | Kim et al. |
| 2016/0062450 A1 | 3/2016 | Han et al. |
| 2016/0062540 A1 | 3/2016 | Yang et al. |
| 2016/0062570 A1* | 3/2016 | Dascola .............. G06F 3/0482 715/765 |
| 2016/0062589 A1 | 3/2016 | Wan et al. |
| 2016/0085397 A1 | 3/2016 | Jain |
| 2016/0091867 A1 | 3/2016 | Mansour et al. |
| 2016/0098137 A1 | 4/2016 | Kim et al. |
| 2016/0188179 A1 | 6/2016 | Roh |
| 2016/0188181 A1 | 6/2016 | Smith et al. |
| 2016/0261675 A1 | 9/2016 | Block et al. |
| 2016/0266548 A1 | 9/2016 | Akiyama |
| 2016/0283094 A1 | 9/2016 | Choi |
| 2016/0327911 A1 | 11/2016 | Eim et al. |
| 2016/0327915 A1 | 11/2016 | Katzer et al. |
| 2016/0342327 A1 | 11/2016 | Chi et al. |
| 2016/0357354 A1 | 12/2016 | Chen et al. |
| 2016/0358311 A1 | 12/2016 | Chen et al. |
| 2017/0046024 A1 | 2/2017 | Dascola et al. |
| 2017/0053542 A1 | 2/2017 | Wilson et al. |
| 2017/0061934 A1 | 3/2017 | Shin |
| 2017/0068407 A1 | 3/2017 | Wilson et al. |
| 2017/0109011 A1 | 4/2017 | Jiang |
| 2017/0123571 A1 | 5/2017 | Huang et al. |
| 2017/0123640 A1 | 5/2017 | Wilson et al. |
| 2017/0134321 A1 | 5/2017 | Ushio et al. |
| 2017/0160898 A1 | 6/2017 | Lee et al. |
| 2017/0269715 A1 | 9/2017 | Kim et al. |
| 2017/0269792 A1 | 9/2017 | Xu et al. |
| 2017/0277136 A1 | 9/2017 | Minami et al. |
| 2017/0287312 A1 | 10/2017 | Schofield et al. |
| 2017/0322658 A1 | 11/2017 | Lee et al. |
| 2017/0325196 A1 | 11/2017 | Cho et al. |
| 2017/0357329 A1 | 12/2017 | Park et al. |
| 2017/0357358 A1 | 12/2017 | Teutschler et al. |
| 2017/0357426 A1 | 12/2017 | Wilson et al. |
| 2017/0357427 A1 | 12/2017 | Wilson et al. |
| 2018/0011450 A1 | 1/2018 | Stackowski |
| 2018/0024619 A1 | 1/2018 | Kasuo et al. |
| 2018/0033311 A1 | 2/2018 | Berggren |
| 2018/0052428 A1 | 2/2018 | Abramov |
| 2018/0067633 A1 | 3/2018 | Wilson et al. |
| 2018/0081515 A1 | 3/2018 | Block et al. |
| 2018/0088797 A1 | 3/2018 | Mcatee et al. |
| 2018/0136810 A1 | 5/2018 | Martin et al. |
| 2018/0150212 A1 | 5/2018 | Chen et al. |
| 2018/0275739 A1 | 9/2018 | Minami et al. |
| 2018/0343023 A1 | 11/2018 | Park et al. |
| 2018/0374429 A1 | 12/2018 | Nakamura |
| 2019/0069244 A1 | 2/2019 | Jeon et al. |
| 2019/0121300 A1 | 4/2019 | Peterson et al. |
| 2019/0212707 A1 | 7/2019 | Minami et al. |
| 2019/0213037 A1 | 7/2019 | Kim et al. |
| 2019/0250813 A1 | 8/2019 | Block et al. |
| 2019/0279520 A1 | 9/2019 | Wilson et al. |
| 2019/0281154 A1 | 9/2019 | Choi et al. |
| 2019/0339860 A1 | 11/2019 | Chen et al. |
| 2020/0050332 A1 | 2/2020 | Yang et al. |

FOREIGN PATENT DOCUMENTS

| | | |
|---|---|---|
| CA | 2781636 A1 | 7/2010 |
| CA | 2986980 A1 | 5/2019 |
| CH | 707412 A2 | 6/2014 |
| CN | 1337638 A | 2/2002 |
| CN | 1397904 A | 2/2003 |
| CN | 1536511 A | 10/2004 |
| CN | 1997957 A | 7/2007 |
| CN | 101382438 A | 3/2009 |
| CN | 103562832 A | 3/2009 |
| CN | 101505320 A | 8/2009 |
| CN | 101627349 A | 1/2010 |
| CN | 101702112 A | 5/2010 |
| CN | 101819486 A | 9/2010 |
| CN | 101981987 A | 2/2011 |
| CN | 102687176 A | 9/2012 |
| CN | 103399480 A | 11/2013 |
| CN | 103607660 A | 2/2014 |
| CN | 103902165 A | 7/2014 |
| CN | 104501043 A | 4/2015 |
| CN | 105260049 A | 1/2016 |
| CN | 105388966 A | 3/2016 |
| CN | 105389107 A | 3/2016 |
| CN | 205608658 U | 9/2016 |
| CN | 106056848 A | 10/2016 |
| EP | 0831629 A2 | 3/1998 |
| EP | 1659504 A2 | 5/2006 |
| EP | 1674889 A1 | 6/2006 |
| EP | 1674977 A2 | 6/2006 |

(56) References Cited

FOREIGN PATENT DOCUMENTS

| | | |
|---|---|---|
| EP | 1750242 A2 | 2/2007 |
| EP | 1832969 A2 | 9/2007 |
| EP | 1855170 A2 | 11/2007 |
| EP | 2120115 A2 | 11/2009 |
| EP | 2194508 A1 | 6/2010 |
| EP | 2204702 A1 | 7/2010 |
| EP | 2290922 A1 | 3/2011 |
| EP | 2312512 A1 | 4/2011 |
| EP | 2413577 A2 | 2/2012 |
| EP | 2423810 A1 | 2/2012 |
| EP | 2426902 A1 | 3/2012 |
| EP | 2600215 A1 | 6/2013 |
| EP | 2738640 A2 | 6/2014 |
| EP | 2942932 A1 | 11/2015 |
| EP | 3056949 A1 | 8/2016 |
| EP | 3376342 A1 | 9/2018 |
| EP | 3401770 A1 | 11/2018 |
| GB | 2475669 A | 6/2011 |
| JP | 8-110955 A | 4/1996 |
| JP | 9-251084 A | 9/1997 |
| JP | 11-160470 A | 6/1999 |
| JP | 11-232013 A | 8/1999 |
| JP | 2001-318852 A | 11/2001 |
| JP | 2002-507718 A | 3/2002 |
| JP | 2002-271451 A | 9/2002 |
| JP | 2003-296246 A | 10/2003 |
| JP | 2005-339017 A | 12/2005 |
| JP | 2009-147889 A | 7/2009 |
| JP | 2010-124181 A | 6/2010 |
| JP | 2010-257051 A | 11/2010 |
| JP | 3168099 U | 6/2011 |
| JP | 2012-53642 A | 3/2012 |
| JP | 2012-505478 A | 3/2012 |
| JP | 2012-147432 A | 8/2012 |
| JP | 2012-517630 A | 8/2012 |
| JP | 2012-203832 A | 10/2012 |
| JP | 2012-531607 A | 12/2012 |
| JP | 2014-123197 A | 7/2014 |
| JP | 2014-519126 A | 8/2014 |
| JP | 2014-216868 A | 11/2014 |
| JP | 2015-210587 A | 11/2015 |
| KR | 20-0425314 Y1 | 9/2006 |
| KR | 10-2008-0058246 A | 6/2008 |
| KR | 10-2013-0109466 A | 10/2013 |
| KR | 10-2014-0064687 A | 5/2014 |
| KR | 10-2015-0038711 A | 4/2015 |
| KR | 10-2015-0081140 A | 7/2015 |
| KR | 10-2017-0076452 A | 7/2017 |
| KR | 10-2017-0082698 A | 7/2017 |
| TW | 498240 B | 8/2002 |
| TW | 546942 B | 8/2003 |
| TW | 200512616 A | 4/2005 |
| TW | 200850058 A | 12/2008 |
| TW | 200915698 A | 4/2009 |
| TW | I348803 B | 9/2011 |
| TW | 201232486 A | 8/2012 |
| TW | 201419115 A | 5/2014 |
| WO | 2001/71433 A1 | 9/2001 |
| WO | 2002/054157 A1 | 7/2002 |
| WO | 2006/012343 A2 | 2/2006 |
| WO | 2006/112641 A1 | 10/2006 |
| WO | 2007/018881 A2 | 2/2007 |
| WO | 2009/146857 A2 | 12/2009 |
| WO | 2010/017627 A1 | 2/2010 |
| WO | 2011/000893 A1 | 1/2011 |
| WO | 2012/021507 A2 | 2/2012 |
| WO | 2012/161434 A2 | 11/2012 |
| WO | 2012/170446 A2 | 12/2012 |
| WO | 2013/051048 A1 | 4/2013 |
| WO | 2013/093558 A1 | 6/2013 |
| WO | 2013/136548 A1 | 9/2013 |
| WO | 2013/169842 A2 | 11/2013 |
| WO | 2013/169849 A2 | 11/2013 |
| WO | 2013/169875 A2 | 11/2013 |
| WO | 2013/169882 A2 | 11/2013 |
| WO | 2014/078114 A1 | 5/2014 |
| WO | 2014/105278 A1 | 7/2014 |
| WO | 2014/189197 A1 | 11/2014 |
| WO | 2015/163536 A1 | 10/2015 |
| WO | 2016/022203 A1 | 2/2016 |
| WO | 2016/022205 A1 | 2/2016 |
| WO | 2016/022496 A2 | 2/2016 |
| WO | 2016/036427 A1 | 3/2016 |
| WO | 2016/099097 A1 | 6/2016 |
| WO | 2016/144563 A1 | 9/2016 |

OTHER PUBLICATIONS

International Preliminary Report on Patentability received for PCT Patent Application No. PCT/US2016/035090, dated Dec. 14, 2017, 14 pages.
International Search Report and Written Opinion received for PCT Patent Application No. PCT/US2017/034834, dated Aug. 23, 2017, 10 pages.
Non-Final Office Action received for U.S. Appl. No. 14/841,606, dated Dec. 7, 2017, 30 pages.
Office Action received for European Patent Application No. 15730924. 6, dated Dec. 12, 2017, 8 pages.
Block, Eliza, U.S. Appl. No. 15/554,204 entitled "Sharing User-Configurable Graphical Constructs", filed Aug. 28, 2017, 247 pages.
Tweedie, Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
Whitwam, Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.
Fuchphone Extras, "LG G Watch—Designs | Watch Faces", Available online at: https://www.youtube.com/watch?v=yqxzqdi_MSE, Jul. 27, 2014, 1 page.
Fuchphone Extras, "Samsung Gear Live—Designs | Watch Faces", Available online at: https://www.youtube.com/watch?v=fFjtVAxyimE, Jul. 26, 2014, 1 page.
Office Action received for Danish Patent Application No. PA201570499, dated Nov. 1, 2017, 6 pages.
Talkandroid, "Android Wear walkthrough", Available online at: https://www.youtube.com/watch?v=4xntpZac4sw, Jun. 30, 2014, 1 page.
Non-Final Office Action received for U.S. Appl. No. 14/846,511 dated Oct. 27, 2017, 15 pages.
Notice of Allowance received for Taiwanese Patent Application No. 104124963, dated Sep. 28, 2017, 5 pages. (See Communication under 37 CFR § 1.98(a) (3)).
Notice of Allowance received for U.S. Appl. No. 14/839,889, dated Oct. 30, 2017, 16 pages.
Office Action received for Danish Patent Application No. PA201570497, dated Oct. 24, 2017, 2 pages.
Office Action received for Danish Patent Application No. PA201570498, dated Oct. 26, 2017, 5 pages.
Decision to Grant received for Danish Patent Application No. PA201770397, dated Feb. 6, 2018, 2 pages.
Office Action received for Danish Patent Application No. PA201770791, dated Jan. 31, 2018, 8 pages.
Office Action received for Taiwanese Patent Application No. 104132636, dated Oct. 31, 2017, 10 pages (4 pages of English Translation and 6 pages of Official Copy).
Advisory Action received for U.S. Appl. No. 14/815,898, dated Aug. 30, 2016, 3 pages.
"AdyClock—Night Alarm Clock", App for android, Google play store page: <https://web.archive.org/web/20130924223153/https://play.google.com/store/apps/details?id=com.adyclock&hl=en>, Sep. 24, 2013, 2 pages.
"Airshow App for Mobile Devices", Retrieved from: <URL:http://www.rockwellcollins.com/~/media/Files/Unsecure/Products/Product%20Brochures/Cabin/Airhshow%204000/Airshow%20Mobile%20Devices.aspx>, 2012, 4 pages.

(56) References Cited

OTHER PUBLICATIONS

APK Root, "Butterfly 3D Live Wallpaper 1.0 APK", Available at <http://apk-root.blogspot.in/2015/09/download-butterfly-3d-live-wallpaper-10.html/>, Feb. 26, 2013, 7 pages.
Avdonin, Nikita, "Astroviewer 3D", Available at <https://www.youtube.com/watch?v=zY0tslx3JHY>, Nov. 5, 2013, 2 pages.
Bogdanov, Alexei, "SKMEI 1016", Available online at <URL:https://www.youtube.com/watch?v=E4q4Fug05Fw>, Published on Jun. 21, 2014, 2 pages.
Castellini, Rick, "Google Earth", How to Use Google Earth for Beginners, Retrieved from <https://www.youtube.com/watch?v=bgjMSBXsFZQ>, Feb. 12, 2013, 3 pages.
Corrected Notice of Allowance received for U.S. Appl. No. 14/815,879, dated Jul. 13, 2017, 3 pages.
Corrected Notice of Allowance received for U.S. Appl. No. 14/815,879, dated Jul. 28, 2017, 3 pages.
Corrected Notice of Allowance received for U.S. Appl. No. 14/815,879, dated Sep. 21, 2017, 2 pages.
Cyr, Jim, "Apple Watch—Customize Modular Watch Face", Available online at: <https://www.youtube.com/watch?v=02W93HbKIK8>, May 13, 2015, 2 pages.
"Deluxe Moon—Guide", Lifeware Solutions, Available online at: <https://web.archive.org/web/20130520161057/http://www.lifewaresolutions.com/deluxe_moon_guide_ip.html>, May 20, 2013, 5 pages.
"Digital alarm clock app for Android", Goggle play store digital alarm clock description page, Mar. 25, 2015, 3 pages.
Evgenyevich, Sergey, "Earth & Moon in HD Gyro 3D", Available at <https://www.youtube.com/watch?v=IRwNcaSYrls/>, Dec. 1, 2013, 2 pages.
Final Office Action received for U.S. Appl. No. 14/815,890, dated Nov. 21, 2016, 18 pages.
Final Office Action received for U.S. Appl. No. 14/815,898, dated Jun. 9, 2016, 19 pages.
Final Office Action received for U.S. Appl. No. 14/815,879, dated Mar. 24, 2016, 46 pages.
First Action Interview received for U.S. Appl. No. 14/815,890, dated Aug. 12, 2016, 3 pages.
"Fitbit surge" Fitness Super Watch, Manual version 1.0, May 7, 2015, 48 pages.
Geek, "How to Put the Day of the Week into the Windows Taskbar Clock", Available online at: <https://www.howtogeek.com/194103/how-to-put-the-day-of-the-week-into-the-windows-taskbar-clock/>, 2014, 4 pages.
"Google Earth 7.0.1.8244", Retrieved from the Internet: <http://dl.google.com/dl/earth/client/ge7/release_7_0_1/googleearth-win-bundle-7.0.1.8244.exe>, Oct. 29, 2012, 1 page.
"Google Earth on Android—AndroidCentral.com", Available online at: <https://www.youtube.com/watch?v=1WxN1RunrE4>, Feb 22, 2010, 1 page.
Gottabemobile, "How to Change Watch Faces on Android Wear", Available online at: <URL:https://www.youtube.com/watch?v=B8iRGkGq6a8>, Jul. 9, 2014, 4 pages.
Intention to Grant received for Danish Patent Application No. PA201570496, dated Feb. 17, 2016, 6 pages.
Intention to Grant received for Danish Patent Application No. PA201770397, dated Aug. 18, 2017, 7 pages.
International Preliminary Report on Patentability received for PCT Patent Application No. PCT/US2015/034604, dated Feb. 16, 2017, 21 pages.
International Preliminary Report on Patentability received for PCT Patent Application No. PCT/US2015/034606, dated Feb. 16, 2017, 11 pages.
International Preliminary Report on Patentability received for PCT Patent Application No. PCT/US2015/034607, dated Feb. 16, 2017, 18 pages.
International Preliminary Report on Patentability received for PCT Patent Application No. PCT/US2015/044473, dated Mar. 2, 2017, 20 pages.
International Preliminary Report on Patentability received for PCT Patent Application No. PCT/US2015/044485, dated Mar. 2, 2017, 20 pages.
International Preliminary Report on Patentability received for PCT Patent Application No. PCT/US2015/053353, dated Sep. 21, 2017, 15 pages.
International Preliminary Report on Patentability received for PCT Patent Application No. PCT/US2016/021403, dated Sep. 21, 2017, 21 pages.
International Search Report and Written Opinion received for PCT Patent Application No. PCT/US2015/034604, dated Nov. 9, 2015, 30 pages.
International Search Report and Written Opinion received for PCT Patent Application No. PCT/US2015/034606, dated Dec. 2, 2015, 17 pages.
International Search Report and Written Opinion received for PCT Patent Application No. PCT/US2015/044473, dated Feb. 12, 2016, 24 pages.
International Search Report and Written Opinion received for PCT Patent Application No. PCT/US2015/044485, dated Feb. 9, 2016, 27 pages.
International Search Report and Written Opinion received for PCT Patent Application No. PCT/US2015/053353, dated May 9, 2016, 21 pages.
International Search Report and Written Opinion received for PCT Patent Application No. PCT/US2015/054223, dated Jul. 6, 2016, 25 pages.
International Search Report and Written Opinion received for PCT Patent Application No. PCT/US2016/021403, dated May 12, 2016, 23 pages.
International Search Report and Written Opinion received for PCT Patent Application No. PCT/US2016/035090, dated Oct. 4, 2016, 17 pages.
International Search Report and Written Opinion received for PCT Patent Application No. PCT/US2016/037686, dated Sep. 9, 2016, 19 pages.
International Search Report and Written Opinion received for PCT Patent Application No. PCT/US2015/034607, dated Dec. 1, 2015, 23 pages.
Invitation to Additional Fees received for PCT Patent Application No. PCT/US2015/034604 dated Sept. 4, 2015, 6 pages.
Invitation to Additional Fees received for PCT Patent Application No. PCT/US2015/034606 dated Sep. 9, 2015, 6 pages.
Invitation to Pay Additional Fees received for PCT Patent Application No. PCT/US2015/034607, dated Sep. 30, 2015, 4 pages.
Invitation to Pay Additional Fees received for PCT Patent Application No. PCT/US2015/044473, dated Nov. 3, 2015, 5 pages.
Invitation to Pay Additional Fees received for PCT Patent Application No. PCT/US2015/044485, dated Nov. 3, 2015, 7 pages.
Invitation to Pay Additional Fees received for PCT Patent Application No. PCT/US2015/053353, dated Jan. 21, 2016, 7 pages.
Invitation to Pay additional Fees received for PCT Patent Application No. PCT/US2015/054223, dated Mar. 9, 2016, 9 pages.
Invitation to Pay Additional Fees received for PCT Patent Application No. PCT/US2016/035090, dated Jul. 15, 2016, 2 pages.
ISO 9241-13:1998, "Ergonomic requirements for office work with visual display terminals (VDTs)", Part 13: User guidance, International Standard ISO, Zuerich, CH, vol. 9241-13, Jul. 15, 1998, 40 pages.
"Kidizoom Smartwatch", Vtech, Available online at <URL:https://www.vtechnl.com/media/downloads/Kidizoom-Smart-Watch.pdf>, Jun. 24, 2014, 23 pages.
"Link to Wayback Machine with link to Google Play showing different layouts of complications associated with a clock face", Available online at <https://play.google.com/store/apps/details?id=com.levelup.beautifulwidgets.free&hl=dam, Sep. 9, 2013, 6 pages.
"Living Earth", Available at: <http://www.livingearthapp.com/>, 2014, 6 pages.
"MS Excel 2013", Jan. 29, 2013, 2 pages.
Nerdtalk, "The Best Android Clock Widgets", Available at: <https://www.youtube.com/watch?v=E1bAprWByfU>, Apr. 25, 2011, 1 page.

(56) References Cited

OTHER PUBLICATIONS

"New, But Unsigned—Easy StopWatch for Symbian", All About Symbian, Available online at: <http://www.allaboutsymbian.com/flow/item/19490_New_but_unsigned-Easy_StopWatc.php>, Mar. 15, 2014, 15 pages.
"Night Display (Alarm Clock) App", Google Play Store Night Display (Alarm Clock) Description page, Available at: <https://web.archive.org/web/20141007124222/https://play.google.com/store/apps/details?id=com.srk.nighttimedisplay&hl=en>, Oct. 7, 2014, pp. 1-3.
Non Final Office Action received for U.S. Appl. No. 14/815,890, dated Jun. 6, 2017, 19 pages.
Non Final Office Action received for U.S. Appl. No. 14/815,890, dated Oct. 19, 2015, 5 pages.
Non-Final Office Action received for U.S. Appl. No. 14/815,879, dated Dec. 15, 2016, 33 pages.
Non-Final Office Action received for U.S. Appl. No. 14/821,667, dated Jul. 14, 2017, 12 pages.
Non-Final Office Action received for U.S. Appl. No. 14/839,889, dated Mar. 7, 2017, 26 pages.
Non-Final Office Action received for U.S. Appl. No. 14/815,879, dated Nov. 6, 2015, 35 pages.
Non-Final Office Action received for U.S. Appl. No. 14/815,898, dated Dec. 1, 2015, 22 pages.
Non-Final Office Action received for U.S. Appl. No. 14/815,907, dated Jan. 12, 2016, 22 pages.
Non-Final Office Action received for U.S. Appl. No. 14/815,909, dated Nov. 27, 2015, 12 pages.
Notice of Allowance received for Chinese Patent Application No. 201520594249.X, dated Jul. 12, 2016, 4 pages (2 pages of English Translation and 2 pages of Official Copy).
Notice of Allowance received for Danish Patent Application No. PA201570495, dated Feb. 22, 2017, 1 page.
Notice of Allowance received for Danish Patent Application No. PA201570496, dated Apr. 18, 2016, 2 pages.
Notice of Allowance received for Taiwanese Patent Application No. 104124962, dated Jul. 27, 2017, 3 pages (Official Copy only) {See Communication under 37 CFR § 1.98(a) (3)}.
Notice of Allowance received for Taiwanese Patent Application No. 104124995, dated Jul. 27, 2017, 3 pages (Official Copy only) {See Communication under 37 CFR § 1.98(a) (3)}.
Notice of Allowance received for Taiwanese Patent Application No. 104124997, dated Jun. 16, 2017, 5 pages (1 page of English Translation of Search report and 4 pages of Official Copy).
Notice of Allowance received for Taiwanese Patent Application No. 104124998, dated Mar. 31, 2017, 3 pages (Official copy only) {See Communication under 37 CFR § 1.98(a) (3)}.
Notice of Allowance received for Taiwanese Patent Application No. 104134740, dated Dec. 8, 2016, 5 pages (1 page of English Translation of Search Report and 4 pages of Official Copy.
Notice of Allowance received for U.S. Appl. No. 14/815,879, dated Jun. 26, 2017, 8 pages.
Notice of Allowance received for U.S. Appl. No. 14/815,898, dated Dec. 5, 2016, 3 pages.
Notice of Allowance received for U.S. Appl. No. 14/815,898, dated Oct. 24, 2016, 14 pages.
Notice of Allowance received for U.S. Appl. No. 14/815,907, dated Jul. 28, 2016, 9 pages.
Notice of Allowance received for U.S. Appl. No. 14/815,907, dated Nov. 30, 2016, 2 pages.
Notice of Allowance received for U.S. Appl. No. 14/815,909, dated Jun. 9, 2016, 3 pages.
Notice of Allowance received for U.S. Appl. No. 14/815,909, dated May 3, 2016, 12 pages.
Notice of Allowance received for U.S. Appl. No. 14/815,909, dated May 20, 2016, 2 pages.
Notice of Allowance received for U.S. Appl. No. 14/815,909, dated Sep. 6, 2016, 2 pages.
Nova, "Tour of the Solar System", Retrieved from: <http://www.pbs.org/wgbh/nova/space/tour-solar-system.html>, May 24, 2013, 14 pages.
Office Action received for Australian Patent Application No. 2015101019, dated Oct. 14, 2015, 3 pages.
Office Action received for Australian Patent Application No. 2015101019, dated Apr. 7, 2016, 4 pages.
Office Action received for Australian Patent Application No. 2015101020, dated Oct. 26, 2015, 8 pages.
Office Action received for Australian Patent Application No. 2015101021, dated Apr. 26, 2016, 4 pages.
Office Action received for Australian Patent Application No. 2015101021, dated Oct. 28, 2015, 10 pages.
Office Action received for Australian Patent Application No. 2015298710, dated Apr. 13, 2017, 3 pages.
Office Action received for Australian Patent Application No. 2015298710, dated Feb. 15, 2017, 2 pages.
Office Action received for Australian Patent Application No. 2016100411, dated Jun. 10, 2016, 3 pages.
Office Action received for Australian Patent Application No. 2016100476, dated Jun. 9, 2016, 4 pages.
Office Action received for Australian Patent Application No. 2016100765, dated Aug. 5, 2016, 2 pages.
Office Action received for Australian Patent Application No. 2016100765, dated Dec. 16, 2016, 3 pages.
Office Action received for Australian Patent Application No. 2015101019, dated Feb. 12, 2016, 4 pages.
Office Action received for Chinese Patent Application No. 201520595384.6, dated Mar. 25, 2016, 3 pages (1 page of English Translation and 2 pages of Official copy).
Office Action received for Chinese Patent Application No. 201520594249.X, dated Mar. 25, 2016, 3 pages (1 page of English Translation and 2 pages of Official copy).
Office Action received for Chinese Patent Application No. 201520595384.6, dated Dec. 30, 2016, 2 pages (Official Copy only) {See Communication under 37 CFR § 1.98(a) (3)}.
Office Action received for Chinese Patent Application No. 201520595384.6, dated Jul. 22, 2016, 3 pages (1 page of English Translation and 2 pages of Official Copy).
Office Action received for Chinese Patent Application No. 201520595385.0, dated Dec. 30, 2016, 2 pages (Official Copy only) {See Communication under 37 CFR § 1.98(a) (3)}.
Office Action received for Chinese Patent Application No. 201520595385.0, dated Jul. 22, 2016, 3 pages (1 page of English Translation and 2 pages of Official Copy).
Office Action received for Chinese Patent Application No. 201520595385.0, dated Mar. 25, 2016, 3 pages (1 page of English Translation and 2 pages of Official copy).
Office Action received for Chinese Patent Application No. 201520595408.8, dated Dec. 9, 2015, 4 pages (2 pages of English Translation and 2 pages of Official Copy).
Office Action received for Chinese Patent Application No. 201520595408.8, dated Dec. 30, 2016, 2 pages (Official Copy Only) {See Communication under 37 CFR § 1.98(a) (3)}.
Office Action received for Chinese Patent Application No. 201520595408.8, dated Jul. 25, 2016, 3 pages (1 page of English Translation and 2 pages of Official Copy).
Office Action received for Chinese Patent Application No. 201520595408.8, dated Mar. 25, 2016, 3 pages (1 page of English Translation and 2 pages of Official copy).
Office Action received for Chinese Patent Application No. 201520595538.1, dated Dec. 30, 2016, 2 pages (Official Copy only) {See Communication under 37 CFR § 1.98(a) (3)}.
Office Action received for Chinese Patent Application No. 201520595538.1, dated Jul. 22, 2016, 3 pages (1 page of English Translation and 2 pages of Official copy).
Office Action received for Chinese Patent Application No. 201520595538.1, dated Mar. 25, 2016, 3 pages (1 page of English Translation and 2 pages of Official copy).
Office Action received for Chinese Patent Application No. 201520594249.X, dated Dec. 9, 2015, 4 pages (2 pages of English Translation and 2 pages of Official Copy).
Office Action received for Chinese Patent Application No. 201520595384.6, dated Dec. 9, 2015, 4 pages (2 pages of English Translation and 2 pages of Official Copy).

(56) References Cited

OTHER PUBLICATIONS

Office Action received for Chinese Patent Application No. 201520595385.0, dated Dec. 9, 2015, 4 pages (2 pages of English Translation and 2 pages of Official Copy).
Office Action received for Chinese Patent Application No. 201520595538.1, dated Dec. 9, 2015, 4 pages (2 pages of English Translation and 2 pages of Official Copy).
Office Action received for Danish Patent Application No. PA201570495, dated Dec. 9, 2016, 2 pages.
Office action received for Danish Patent Application No. PA201570495, dated May 4, 2016, 8 pages.
Office Action received for Danish Patent Application No. PA201570495, dated Oct. 29, 2015, 7 pages.
Office Action received for Danish Patent Application No. PA201570497, dated Feb. 21, 2017, 3 pages.
Office Action received for Danish Patent Application No. PA201570497, dated May 17, 2016, 6 pages.
Office Action received for Danish Patent Application No. PA201570497, dated Nov. 15, 2016, 2 pages.
Office Action received for Danish Patent Application No. PA201570498, dated Feb. 6, 2017, 2 pages.
Office Action received for Danish Patent Application No. PA201570498, dated Jun. 2, 2016, 8 pages.
Office Action received for Danish Patent Application No. PA201570498, dated Oct. 30, 2015, 7 pages.
Office Action received for Danish Patent Application No. PA201570499, dated Feb. 14, 2017, 2 pages.
Office Action received for Danish Patent Application No. PA201570499, dated Jun. 16, 2016, 8 pages.
Office Action received for Danish Patent Application No. PA201570499, dated Nov. 3, 2015, 7 pages.
Office Action received for Danish Patent Application No. PA201570768, dated Sep. 13, 2016, 8 pages.
Office Action received for Danish Patent Application No. PA201570770, dated Apr. 7, 2017, 7 pages.
Office Action received for Danish Patent Application No. PA201570770, dated Mar. 17, 2016, 9 pages.
Office Action received for Danish Patent Application No. PA201570770, dated Sep. 12, 2016, 6 pages.
Office Action received for Danish Patent Application No. PA201570496, dated Oct. 29, 2015, 6 pages.
Office Action received for Danish Patent Application No. PA201570497, dated Oct. 30, 2015, 6 pages.
Office Action received for Japanese Patent Application No. 2017-505450, dated Jun. 20, 2017, 8 pages (4 pages of English Translation and 4 pages of Official Copy).
Office Action received for Korean Patent Application No. 10-2017-7005939, dated Jun. 30, 2017, 6 pages (2 pages of English Translation and 4 pages of Official copy).
Office Action received for Netherland Patent Application No. 2015239, dated Oct. 28, 2016, 13 pages (5 pages of English Translation and 8 pages of Official Copy).
Office Action received for Netherlands Patent Application No. 2015245, dated Jan. 24, 2017, 11 pages.
Office Action received for Taiwanese Patent Application No. 104124962, dated Nov. 29, 2016, 6 pages (3 pages of English Translation and 3 pages of Official Copy).
Office Action received for Taiwanese Patent Application No. 104124963, dated Jan. 5, 2017, 11 pages (5 pages of English Translation and 6 pages of Official Copy).
Office Action received for Taiwanese Patent Application No. 104124995, dated Dec. 1, 2016, 6 pages (3 pages of English Translation and 3 pages of Official Copy).
Office Action received for Taiwanese Patent Application No. 104124997, dated Dec. 8, 2016, 12 pages (5 pages of English Translation and 7 pages of Official Copy).
Office Action received for Taiwanese Patent Application No. 104124998, dated Nov. 29, 2016, 6 pages (3 pages of English Translation and 3 pages of Official Copy).
Office Action received for Taiwanese Patent Application No. 104126627, dated Nov. 29, 2016, 9 pages (4 pages of English Translation and 5 pages of Official Copy).
Office Action received for Taiwanese Patent Application No. 104132636, dated Mar. 23, 2017, 25 pages (10 pages of English Translation and 15 pages of Official copy).
"Online Alarm Clock", Available at: <https://web.archive.org/web/20150505081746/http://www.online-stopwatch.com/online-alarm-clock>, May 5, 2015, 2 pages.
"Pentax K20D Operating Manual", Available at: <http://www.ricoh-imaging.eu/en/operating-manuals-download.html>, Pentax Corporation, 2008, pp. 173-174.
Pre-Interview First Office Action received for U.S. Appl. No. 14/815,890, dated May 26, 2016, 4 pages.
Rehman, A, "Install Android 4.2 Gesture-Based Keyboard & Clock App on Jelly Bean 4.1 or Higher", Available online at: <http://www.addictivetips.com/android/install-android-4-2-keyboard-clock-app-apk-on-jelly-bean-4-1-x/>, Nov. 3, 2012, 4 pages.
Restriction Requirement received for U.S. Appl. No. 14/815,890, dated Feb. 22, 2016, 5 pages.
Search Report and Opinion Received for Netherlands Patent Application No. 2015232, dated Jan. 25, 2017, 9 pages (1 page of English Translation and 8 pages of Official Copy) {See Communication under 37 CFR § 1.98(a) (3)}.
Search Report and Opinion received for Netherlands Patent Application No. 2015242, dated Jul. 4, 2017, 20 pages.
Search Report and Opinion received for Netherlands Patent Application No. 2018531, dated Jul. 27, 2017, 14 pages.
Search Report received for Danish Patent Application No. PA201570768, dated Mar. 17, 2016, 11 pages.
Smartwatch, "App Earth Space HD Live Wallpaper APK for Smart Watch", Version 1.7, Android version 2.2, Aug. 27, 2013, 1 page.
"Solar Walk Free", Vito Technology, Jun. 19, 2014, 9 pages.
Sony, "Live View™ Micro Display", Extended User Guide, Aug. 2010, 27 pages.
Sony, "Sony SmartWatch", User Guide, Dec. 2011, 18 pages.
"Sun Set—Solar Image Clock", Available at: <https://web.archive.orgjweb/20140719005410/http://www.sunsetclock.com/>, 2013, 5 pages.
"The Simply Alarm app for Pebble", Available online at <https://web.archive.org/web/20150517070400>/http://www.rebootsramblings.ca/n/sahhelp/https://www.youtube.com/watch?v=IVp1scQPw08>, May 17, 2015, 1 page.
"UIKit User Interface Catalog: Page Controls", Available at: <https://web.archive.org/web/20140703123442/https://developer.apple.com/library/ios/documentation/userexperience/conceptuai/UIKitUICatalog/UIPageControl.html>, Jul. 3, 2014, 4 pages.
Viticci, Frederico, "Checking Time Zones with Living Earth—MacStories", Available at <https://www.macstories.net/reviews/checking-time-zones-with-living- earth/>, Dec. 11, 2013, pp. 1-5.
Zukerman, Erez, "6 Beautiful, Interesting & Versatile Timer Apps [Android]", Available at: http://www.makeuseof.com/tag/beautiful-interesting-versatile-timer-apps-android/, May 18, 2012, 5 pages.
Office Action received for Danish Patent Application No. PA201770791, dated Jul. 13, 2018, 2 pages.
Office Action received for Australian Patent Application No. 2016229847, dated Jul. 3, 2018, 4 pages.
Decision on Opposition received for Australian Patent Application No. 2015298710, dated Aug. 20, 2018, 20 pages.
Final Office Action received for U.S. Appl. No. 14/841,606, dated Sep. 7, 2018, 34 pages.
Invitation to Pay Additional Fees received for PCT Patent Application No. PCT/US2018/032164, dated Aug. 21, 2018, 10 pages.
Office action received for Chinese Patent Application No. 201510483305.7, dated Dec. 1, 2017, 13 pages (5 pages English Translation and 8 pages of Official Copy).
Feldman, Ari, "Excerpts from: Designing Arcade Computer Game Graphics", Available online at: http://www.phatcode.net/res/269/files/dacgg.pdf, Jan. 1, 2001, 35 pages.
Non Final Office Action received for U.S. Appl. No. 15/881,544, dated Jun. 7, 2018, 15 pages.

(56) References Cited

OTHER PUBLICATIONS

Office Action received for Chinese Patent Application No. 201510484514.3, dated Apr. 4, 2018, 12 pages (5 pages of English Translation and 7 pages of Official Copy).
"Reuse Animations—Synfig Animation Studio", Available online at: https://wiki.synfig.org/index.php?title=Doc:Reuse_Animations &oldid=18173, May 20, 2013, 5 pages.
Summons to Attend Oral Proceedings received for European Patent Application No. 15730924.6, dated Jun. 13, 2018, 10 pages.
"Tropical Fish 14", Available online at: https://www.turbosquid.com/3d-models/tropical-fish-3d-model/388510, Feb. 4, 2008, 2 pages.
Office Action received for Australian Patent Application No. 2018206770, dated Jul. 25, 2018, 5 pages.
Final Office Action received for U.S. Appl. No. 14/815,890, dated Feb. 26, 2018, 20 pages.
International Preliminary Report on Patentability received for PCT Application No. PCT/US2016/037686, dated Mar. 1, 2018, 12 pages.
Invitation to Pay Additional Fee received for European Patent Application No. 15747595.5, dated Feb. 9, 2018, 6 pages.
Notice of Allowance received for Japanese Patent Application No. 2017-505450, dated Mar. 9, 2018, 10 pages (7 pages of English Translation and 3 pages of Official Copy).
Office Action received for Chinese Patent Application No. 201510481525.6, dated Nov. 29, 2017, 9 pages (3 pages of English Translation and 6 pages of Official Copy).
Office Action received for Chinese Patent Application No. 201510483268.X, dated Dec. 1, 2017, 11 pages (5 pages of English Translation and 6 pages of Official Copy).
Final Office Action received for U.S. Appl. No. 14/821,667, dated Apr. 26, 2018, 13 pages.
Notice of Allowance received for Korean Patent Application No. 10-2017-7005939, dated Mar. 30, 2018, 5 pages (2 pages of English Translation and 3 pages of Official Copy).
Office Action received for European Patent Application No. 15730925.3, dated Apr. 12, 2018, 8 pages.
Office Action received for German Patent Application No. 112015003083.2, dated Mar. 9, 2018, 12 pages (5 pages of English Translation and 7 pages of Official Copy).
Non-Final Office Action received for U.S. Appl. No. 15/183,663, dated Jul. 9, 2018, 13 pages.
Office Action received for Danish Patent Application No. PA201570499, dated Jun. 19, 2018, 4 pages.
Office Action received for European Patent Application No. 15747595.5, dated Jun. 27, 2018, 8 pages.
European Search Report received for European Patent Application No. 17206177.2, dated Apr. 30, 2018, 4 pages.
Office Action received for Chinese Patent Application No. 201510479088.4, dated Mar. 12, 2018, 20 pages (6 pages of English Translation and 14 pages of Official Copy).
Office Action received for Taiwanese Patent Application No. 104126627, dated Oct. 16, 2017, 7 pages (3 pages of English Translation and 4 pages of Official Copy).
Final Office Action received for U.S. Appl. No. 14/846,511 dated May 10, 2018, 21 pages.
Office Action received for European Patent Application No. 17206177.2, dated May 15, 2018, 6 pages.
Decision to Refuse received for European Patent Application No. 15730924.6, dated Mar. 15, 2019, 12 pages.
Extended European Search Report received for European Patent Application No. 16837432.0, dated Mar. 11, 2019, 10 pages.
Minutes of Oral Proceedings received for European Patent Application No. 15730924.6, mailed on Mar. 13, 2019, 4 pages.
Office Action received for Australian Patent Application No. 2018206770, dated Mar. 5, 2019, 3 pages.
Office Action received for European Patent Application No. 15730925.3, dated Feb. 27, 2019, 5 pages.
Office Action received for Korean Patent Application No. 10-2018-7022101, dated Feb. 14, 2019, 15 pages (6 pages of English Translation and 9 pages of Official Copy).

Android Central, "BeWeather weather app for Android", Available online at: https://www.youtube.com/watch?v=G2EY2K-XkSI, Sep. 1, 2011, 1 page.
Kenney, Briley, "How to Customize a Smartwatch and other Personalization Questions", Available online at: https://smartwatches.org/learn/customize-smartwatch/, Jan. 23, 2014, 3 pages.
Extended European Search Report received for European Patent Application No. 16762356.0, dated Nov. 9, 2018, 10 pages.
International Preliminary Report on Patentability received for PCT Patent Application No. PCT/US2017/034834, dated Dec. 20, 2018, 9 pages.
Non-Final Office Action received for U.S. Appl. No. 14/815,890, dated Dec. 18, 2018, 21 pages.
Non-Final Office Action received for U.S. Appl. No. 14/846,511, dated Nov. 30, 2018, 22 pages.
Office Action received for Australian Patent Application No. 2015298710, dated Nov. 6, 2018, 4 pages.
Office Action received for Australian Patent Application No. 2015298710, dated Sep. 24, 2018, 4 pages.
Office Action received for Chinese Patent Application No. 201510481525.6, dated Aug. 29, 2018, 10 pages (5 pages of English Translation and 5 pages of Official copy).
Office Action received for Chinese Patent Application No. 201510483268.X, dated Oct. 19, 2018, 10 pages (5 pages of English Translation and 5 pages of Official Copy).
Office action received for Chinese Patent Application No. 201510483305.7, dated Aug. 31, 2018, 10 pages (5 pages of English Translation and 5 pages of Official copy).
Office Action received for Chinese Patent Application No. 201810037665.8, dated Dec. 7, 2018, 10 pages (5 pages of English Translation and 5 pages of Official Copy).
Office Action received for Japanese Patent Application No. 2017-545918, dated Sep. 14, 2018, 12 pages (7 pages of English Translation and 5 pages of Official copy).
Office Action received for Korean Patent Application No. 10-2017-7024570, dated Sep. 28, 2018, 14 pages (6 pages of English Translation and 8 pages of Official copy).
Office Action received for Taiwanese Patent Application No. 104126627, dated Aug. 30, 2018, 22 pages (9 pages of English Translation and 13 pages of Official Copy).
Clark, Josh, "Designing Great Phone Apps", O'Reilly Japan Co., O'Reilly Tim, vol. 1, May 24, 2012, 5 pages (Official Copy only) (See Communication under 37 CFR § 1.98(a) (3)).
Corrected Notice of Allowance received for U.S. Appl. No. 15/183,663, dated Mar. 27, 2019, 2 pages.
Feist, Jonathan, "Android customization—How to Create a Custom Clock Widget using Zooper Widget", Available Online at: https://www.androidauthority.com/zooper-widget-clock-366476/, May 15, 2014, 10 pages.
Gazer, "iPhone 4S Super Manual", Shuwa System Co., Saito Kazukuni, vol. 1, Jun. 6, 2013, 7 pages (Official Copy only) (See Communication under 37 CFR § 1,98(a) (3)).
Non-Final Office Action received for U.S. Appl. No. 15/421,865, dated Mar. 21, 2019, 18 pages.
Obara, Yuuta, "iPhone Application Selection for University Students", Shuwa System Co., Saito Kazukuni, vol. 1, May 16, 2013, 4 pages (Official Copy only) (See Communication under 37 CFR § 1.98(a) (3)).
Octoba, "Just Install It—Utilizing Method for Android Application Business", ASCII Media Works Co. Takano Kiyoshi, vol. 1, Apr. 25, 2013, 6 pages (Official Copy only) (See Communication under 37 CFR § 1.98(a) (3)).
Office Action received for Japanese Patent Application No. 2017-505842, dated Feb. 22, 2019, 11 pages (6 pages of English Translation and 5 pages of Official Copy).
Office Action received for Japanese Patent Application No. 2017-505847, dated Feb. 12, 2019, 13 pages (6 pages of English Translation and 7 pages of Official Copy).
Final Office Action received for U.S. Appl. No. 15/881,544, dated Jan. 29, 2019, 14 pages.
Non-Final Office Action received for U.S. Appl. No. 14/821,667, dated Feb. 4, 2019, 13 pages.

(56) References Cited

OTHER PUBLICATIONS

Notice of Allowance received for Chinese Patent Application No. 201510483305.7, dated Jan. 8, 2019, 3 pages (1 page of English Translation and 2 pages of Official Copy).
Notice of Allowance received for U.S. Appl. No. 15/183,663, dated Jan. 17, 2019, 6 pages.
Office Action received for Chinese Patent Application No. 201510484514.3, dated Dec. 24, 2018, 10 pages (5 pages of English Translation and 5 pages of Official Copy).
Office Action received for Taiwanese Patent Application No. 104132636, dated Dec. 13, 2018, 26 pages (9 pages of English Translation and 17 pages of Official Copy).
International Search Report and Written Opinion received for PCT Patent Application No. PCT/US2018/032164, dated Oct. 18, 2018, 16 pages.
Advisory Action received for U.S. Appl. No. 14/846,511, dated Sep. 19, 2018, 8 pages.
Notice of Acceptance received for Australian Patent Application No. 2016229847, dated Sep. 12, 2018, 3 pages.
Advisory Action received for U.S. Appl. No. 14/841,606, dated Feb. 28, 2019, 3 pages.
Corrected Notice of Allowance received for U.S. Appl. No. 15/183,663, dated Feb. 25, 2019, 3 pages.
Office Action received for Japanese Patent Application No. 2018-074971, dated Jan. 28, 2019, 6 pages (3 pages of English Translation and 3 pages of Official Copy).
Office Action received for Taiwanese Patent Application No. 104126627, dated Dec. 20, 2018, 4 pages (2 pages of English Translation and 2 pages of Official Copy).
Fukuda, Kazuhiro, "Xperia Z1 Perfect Manual", Sotec Co., Ltd., No. 1, Nov. 15, 2013, pp. 217-218 (See Communication under 37 CFR § 1.98(a) (3)).
Geary, David, "Programming HTML5 Canvas", O'Reilly Japan, Inc., No. 1, Jul. 23, 2014, pp. 327-330 (See Communication under 37 CFR § 1.98(a) (3)).
Shiota, Shinji, "Windows 7 Dojo", Weekly ASCII, Ascii Mediaworks Inc., vol. 798, Aug. 31, 2010, 3 pages (See Communication under 37 CFR § 1.98(a) (3)).
"XPERIA ZL2 SOL25", Instruction Manual, Detailed version, KDDI Corporation, No. 1, vol. 1, Jun. 2014, 5 pages (See Communication under 37 CFR § 1.98(a) (3)).
Final Office Action received for U.S. Appl. No. 14/815,890, dated May 14, 2019, 22 pages.
Notice of Allowance received for Japanese Patent Application No. 2017-505847, dated May 20, 2019, 4 pages (1 page of English Translation and 3 pages of Official Copy).
Notice of Allowance received for U.S. Appl. No. 15/798,257, dated May 22, 2019, 14 pages.
Office Action received for Australian Patent Application No. 2018206770, dated Apr. 30, 2019, 4 pages.
Office Action received for Chinese Patent Application No. 201510483268.X, dated Apr. 16, 2019, 6 pages (3 pages of English Translation and 3 pages of Official Copy).
Watchophilia, "Mickey Mouse Watches", Online Available at: https://web.archive.org/web/20130929065422/https://www.watchophilia.com/photogallery/mickey-mouse/, Sep. 29, 2013, 16 pages.
Watchuseek, "The watch every father needs: M-I-C-K-E-Y, M-O-U-S-E. Mickey Mouse . . . ?" Online Available at: https://forums.watchuseek.com/f2/watch-every-father-needs-m-i-c-k-e-y-m-o-u-s-e-mickey-mouse-855069.html, 2013, 3 pages.
Corrected Notice of Allowance received for U.S. Appl. No. 15/798,257, dated Jun. 12, 2019, 2 pages.
Final Office Action received for U.S. Appl. No. 14/846,511, dated Jun. 5, 2019, 24 pages.
Non-Final Office Action received for U.S. Appl. No. 15/355,956, dated May 31, 2019, 32 pages.
Non-Final Office Action received for U.S. Appl. No. 15/405,122, dated May 31, 2019, 43 pages.

Notice of Allowance received for Chinese Patent Application No. 201510481525.6, dated May 27, 2019, 2 pages (1 page of English Translation and 1 page of Official Copy).
Notice of Allowance received for U.S. Appl. No. 14/821,667, dated Jun. 12, 2019, 9 pages.
Office Action received for Chinese Patent Application No. 201510479088.4, dated May 7, 2019, 6 pages (3 pages of English Translation and 3 pages of Official Copy).
Office Action received for Danish Patent Application No. PA201770791, dated Jun. 11, 2019, 3 pages.
Summons to Attend Oral Proceedings received for European Patent Application No. 17206177.2, dated Jun. 3, 2019, 8 pages.
Android Central, "Changing the watchface on your Android Wear device", Retrieved from: https://www.youtube.com/watch?v=YYwFe2K_gil, Jul. 2, 2014, 4 pages.
EBPMAN Tech Reviews, "LG G3 Tips: How to customize the clock face", Available online at: https://www.youtube.com/watch?v=evraMWFb1fY, Jul. 25, 2014, 1 page.
Omar Romero, "Sony Smartwatch 2 Custom Watchfaces Tutorial", Retrieved From: https://www.youtube.com/watch?v=8odbxgwSQR8, May 1, 2014, 2 pages.
StateofTech, "Samsung Galaxy Gear Tips—Change the Clock Face", Retrieved from: https://www.youtube.com/watch?v=GOom7AZUAjY, Dec. 11, 2013, 2 pages.
Non-Final Office Action received for U.S. Appl. No. 15/554,204, dated Apr. 17, 2019, 19 pages.
Office Action received for Chinese Patent Application No. 201680047983.1, dated Mar. 18, 2019, 18 pages (6 pages of English Translation and 12 pages of Official Copy).
Office Action received for European Patent Application No. 15747595.5, dated Apr. 15, 2019, 4 pages.
Non-Final Office Action received for U.S. Appl. No. 14/841,606, dated May 8, 2019, 28 pages.
Notice of Allowance received for Japanese Patent Application No. 2018-074971, dated Apr. 23, 2019, 4 pages (1 page of English Translation and 3 pages of Official Copy).
Decision on Acceptance received for Australian Patent Application No. 2015298710, dated Jul. 19, 2019, 18 pages.
Invitation to Pay Additional Fees and Partial International Search Report received for PCT Patent Application No. PCT/US2019/030770, dated Jul. 26, 2019, 15 pages.
Notice of Allowance received for Japanese Patent Application No. 2017-545918, dated Jul. 22, 2019, 4 pages (1 page of English Translation and 3 pages of Official Copy).
Office Action received for Japanese Patent Application No. 2018-537840, dated Jul. 8, 2019, 15 pages (8 pages of English Translation and 7 pages of Official copy).
Notice of Allowance received for U.S. Appl. No. 15/881,544, dated Jun. 26, 2019, 6 pages.
Office Action received for Australian Patent Application No. 2017277813, dated Jun. 11, 2019, 3 pages.
Office Action received for Australian Patent Application No. 2018279037, dated Jun. 18, 2019, 5 pages.
Corrected Notice of Allowance received for U.S. Appl. No. 15/798,257, dated Aug. 26, 2019, 2 pages.
Decision on Opposition received for Australian Patent Application No. 2015298710, dated Aug. 9, 2019, 4 pages.
Office Action received for Korean Patent Application No. 10-2018-7018904, dated Aug. 20, 2019, 8 pages (3 pages of English Translation and 5 pages of Official Copy).
Notice of Allowance received for Chinese Patent Application No. 201810037665.8, dated Jul. 9, 2019, 4 pages (1 page of English Translation and 3 pages of Official Copy).
Office Action received for Australian Patent Application No. 2018206770, dated Jul. 16, 2019, 5 pages.
Office Action received for Korean Patent Application No. 10-2017-7024570, dated Jul. 10, 2019, 6 pages (3 pages of English Translation and 3 pages of Official Copy).
Office Action received for Korean Patent Application No. 10-2018-7022101, dated Jul. 9, 2019, 10 pages (5 pages of English Translation and 5 pages of Official Copy).
Corrected Notice of Allowance received for U.S. Appl. No. 15/798,257, dated Jul. 9, 2019, 2 pages.

(56) References Cited

OTHER PUBLICATIONS

Notice of Allowance received for Chinese Patent Application No. 201510484514.3, dated Jun. 6, 2019, 2 pages (1 page of English Translation and 1 page of Official Copy).
Brief Communication regarding Oral Proceedings received for European Patent Application No. 17206117.2, dated Nov. 21, 2019, 5 pages.
International Preliminary Report on Patentability received for PCT Patent Application No. PCT/US2018/032164, dated Nov. 21, 2019, 11 pages.
Notice of Allowance received for Korean Patent Application No. 10-2018-7022101, dated Oct. 14, 2019, 4 pages (1 page of English Translation and 3 pages of Official Copy).
Cancellation of Oral Proceedings received for European Patent Application No. 17206177.2, mailed on Dec. 4, 2019, 2 pages.
Advisory Action received for U.S. Appl. No. 15/554,204, dated Mar. 12, 2020, 3 pages.
Brief Communication regarding Oral Proceedings received for European Patent Application No. 15730925.3, mailed on Feb. 18, 2020, 7 pages.
Intention to Grant received for Danish Patent Application No. PA201770791, dated Feb. 19, 2020, 2 pages.
Intention to Grant received for European Patent Application No. 17206177.2, dated Feb. 24, 2020, 8 pages.
Advisory Action received for U.S. Appl. No. 14/846,511, dated Oct. 22, 2019, 5 pages.
Andro Dollar, Huawei Watch GT Always on Mode Update is finally here! LK, Online Available online at: https://www.youtube.com/watch?v=AJw_FlAf7v4, Jun. 6, 2019, 4 pages.
Applicant-Initiated Interview Summary received for U.S. Appl. No. 15/421,865, dated Feb. 3, 2020, 5 pages.
Applicant-Initiated Interview Summary received for U.S. Appl. No. 15/554,204, dated Jan. 31, 2020, 3 pages.
Applicant-Initiated Interview Summary received for U.S. Appl. No. 15/554,204, dated Oct. 11, 2019, 5 pages.
Big Phil TV, "Gear S3 Watch faces with great always on display(A O D)", Available online at: https://www.youtube.com/watch?v=2cxMnrMiGU8, Apr. 5, 2017, 3 pages.
Cengic, Suad, "Samsung Gear S3—Display Always On! Cool!", Available online at: https://www.youtube.com/watch?v=ceeDinbPwOY, Mar. 10, 2017, 3 pages.
Corrected Notice of Allowance received for U.S. Appl. No. 15/355,956, dated Jan. 3, 2020, 2 pages.
Droid Life, "How to: Use Always-on Apps with Android Wear", Available online at: https://www.youtube.com/watch?v=_-xYB9EBTaA, Jun. 26, 2015, 3 pages.
Extended European Search Report received for European Patent Application No. 17810723.1, dated Nov. 12, 2019, 9 pages.
Final Office Action received for U.S. Appl. No. 15/405,122, dated Jan. 21, 2020, 36 pages.
Final Office Action received for U.S. Appl. No. 15/421,865, dated Dec. 2, 2019, 19 pages.
Final Office Action received for U.S. Appl. No. 15/554,204, dated Oct. 31, 2019, 22 pages.
Intention to Grant received for European Patent Application No. 15747595.5, dated Feb. 17, 2020, 8 pages.
International Search Report and Written Opinion received for PCT Patent Application No. PCT/US2019/030770, dated Oct. 31, 2019, 23 pages.
Internet Blog Post, "[PC] Pre-Customization of Black Desert's Characters", Online Available at:—<https://blog.naver.com/hsh6051/220209813968>, Dec. 14, 2014, 41 pages (21 pages of English translation and 20 pages of Official Copy).
Non-Final Office Action received for U.S. Appl. No. 14/846,511 dated Jan. 7, 2020, 25 pages.
Notice of Acceptance received for Australian Patent Application No. 2015298710, dated Oct. 8, 2019, 3 pages.
Notice of Allowance received for Chinese Patent Application No. 201510483268.X, dated Nov. 6, 2019, 2 pages (1 page of English Translation and 1 page of Official Copy).

Notice of Allowance received for U.S. Appl. No. 15/355,956, dated Nov. 22, 2019, 29 pages.
Notice of Allowance received for U.S. Appl. No. 15/881,544, dated Nov. 7, 2019, 5 pages.
Office Action received for Australian Patent Application No. 2018201089, dated Oct. 11, 2019, 4 pages.
Office Action received for Australian Patent Application No. 2018279037, dated Jan. 17, 2020, 4 pages.
Office Action received for Chinese Patent Application No. 201680047983.1, dated Nov. 28, 2019, 9 pages (4 pages of English Translation and 5 pages of Official Copy).
Office Action received for European Patent Application No. 16837432.0, dated Jan. 10, 2020, 7 pages.
Office Action received for Japanese Patent Application No. 2017-505842, dated Sep. 9, 2019, 7 pages (3 pages of English Translation and 4 pages of Official Copy).
Office Action received for Korean Patent Application No. 10-2019-7029673, dated Nov. 5, 2019, 10 pages (4 pages of English Translation and 6 pages of Official Copy).
Phandroid, "New Android Wear Wrist Gestures in Marshmallow", Available online at: https://www.youtube.comiwatch?v=0WhKuklpQ9A, Feb. 11, 2016, 3 pages.
Summons to Attend Oral Proceedings received for European Patent Application No. 15730925.3, dated Oct. 2, 2019, 8 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Zephyrnix, "Steam's In-Game Home menu", Online Available at: <https://www.youtube.com/watch?v=jLoRFiPkcUw>, see 0;00-1:06., Feb. 15, 2011, 3 pages.
Notice of Allowance received for Japanese Patent Application No. 2018-537840, dated Mar. 19, 2020, 4 pages (1 page of English Translation and 3 pages of Official Copy).
Office Action received for Australian Patent Application No. 2019208225, dated Mar. 20, 2020, 3 pages.
Advisory Action received for U.S. Appl. No. 15/421,865, dated Apr. 16, 2020, 7 pages.
Android Tips, "Create a Minimal Lock Screen With WidgetLocker", Online Available at: http://appstap192.blogspot.com/2012/01/create-minimal-lock-screen-with.html, Jan. 18, 2012, 6 pages.
AOD too dim. I've answered my own question to help others, Online Available at: https://forums.androidcentral.com/samsung-galaxy-s9-s9-plus/874444-aod-too-dim-ive-answered-my-own-question-help-others.html, Mar. 11, 2018, 3 pages.
Applicant Initiated Interview Summary received for U.S. Appl. No. 16/582,020, dated Mar. 25, 2020, 5 pages.
Applicant Initiated Interview Summary received for U.S. Appl. No. 16/585,399, dated Mar. 25, 2020, 3 pages.
Applicant-Initiated Interview Summary received for U.S. Appl. No. 14/846,511, dated Apr. 20, 2020, 4 pages.
Applicant-Initiated Interview Summary received for U.S. Appl. No. 15/405,122, dated May 21, 2020, 5 pages.
Brightness on lock screen, Online Available at: https://www.reddit.com/r/galaxys10/comments/b4d5fb/brightness_on_lock_screen/, Mar. 22, 2019, 1 page.
Dan, "Get This Look: 'Minimal' Zooper Widget", Online Available at: https://www.androidguys.com/featured/customize/get-look-minimal-zooper-widget/, Mar. 7, 2014, 2 pages.
Examiner's Answer to Appeal Brief received for U.S. Appl. No. 14/815,890, dated Mar. 20, 2020, 16 pages.
Final Office Action received for U.S. Appl. No. 16/582,020, dated Apr. 28, 2020, 31 pages.
Intention to Grant received for European Patent Application No. 15730925.3, dated May 28, 2020, 10 pages.
Looking for a launcher that changes the default homescreen or widgets based on wifi, location, or other context., Online Available at: https://www.reddit.com/r/androidapps/comments/35lu90/looking_for_a_launcher_that_changes_the_default/, May 11, 2015, 2 pages.
Minutes of Oral Proceedings received for European Patent Application No. 15730925.3, dated May 26, 2020, 11 pages.

(56) References Cited

OTHER PUBLICATIONS

Non-Final Office Action received for U.S. Appl. No. 16/389,722, dated Apr. 3, 2020, 15 pages.
Non-Final Office Action received for U.S. Appl. No. 16/418,786, dated Apr. 24, 2020, 16 pages.
Non-Final Office Action received for U.S. Appl. No. 16/582,020, dated Jan. 13, 2020, 39 pages.
Non-Final Office Action received for U.S. Appl. No. 16/585,399, dated Jan. 23, 2020, 28 pages.
Notice of Acceptance received for Australian Patent Application No. 2018279037, dated May 13, 2020, 3 pages.
Notice of Allowance received for Japanese Patent Application No. 2017-505842, dated Mar. 16, 2020, 4 pages (1 page of English Translation and 3 pages of Official Copy).
Notice of Allowance received for U.S. Appl. No. 16/585,366, dated Jan. 2, 2020, 6 pages.
Nova Launcher—Lock Screen Edit, Online Available at: https://forums.androidcentral.com/ask-question/835057-nova-launcher-lock-screen-edit.html, Sep. 26, 2017, 2 pages.
Office Action received for Australian Patent Application No. 2017277813, dated Mar. 20, 2020, 4 pages.
Office Action received for Chinese Patent Application No. 201510479088.4, dated Apr. 22, 2020, 7 pages (3 pages of English Translation and 4 pages of Official Copy).
Office Action received for Chinese Patent Application No. 201680013193.1, dated Mar. 25, 2020, 21 pages (8 pages of English Translation and 13 pages of Official Copy).
Wade Cliff, "Get the most out of Nova Launcher: Changing Icon Sizes", Online Available at: https://www.androidguys.com/tips-tools/get-nova-launcher-changing-icon-sizes/, Nov. 16, 2015, 3 pages.
Wade, Cliff, "Get the most out of Nova Launcher: Customizing the Dock (Contest Included)", Online Available at: https://www.androidguys.com/tips-tools/get-nova-launcher-customizing-dockcontest-included/, Dec. 1, 2015, 5 pages.
Corrected Notice of Allowance received for U.S. Appl. No. 15/554,204, dated Aug. 19, 2020, 3 pages.
Supplemental Notice of Allowance received for U.S. Appl. No. 16/585,399, dated Aug. 26, 2020, 2 pages.
Advisory Action received for U.S. Appl. No. 16/582,020, dated Aug. 3, 2020, 4 pages.
Decision to Grant received for European Patent Application No. 17206177.2, dated Aug. 6, 2020, 2 pages.
Final Office Action received for U.S. Appl. No. 14/846,511, dated Aug. 11, 2020, 25 pages.
Invitation to Pay Additional Fees received for PCT Patent Application No. PCT/US2020/030079, dated Jul. 14, 2020, 12 pages.
Office Action received for Australian Patent Application No. 2018201089, dated Jul. 23, 2020, 4 pages.
Office Action received for European Patent Application No. 20172197.4, dated Aug. 5, 2020, 6 pages.
Decision to Grant received for European Patent Application No. 15747595.5, dated Jul. 16, 2020, 2 pages.
European Search Report received for European Patent Application No. 20172197.4, dated Jul. 28, 2020, 4 pages.
Notice of Allowance received for U.S. Appl. No. 16/585,399, dated Jul. 21, 2020, 9 pages.
Office Action received for Chinese Patent Application No. 201680047983.1, dated Jul. 1, 2020, 6 pages (3 pages of English Translation and 3 pages of Official Copy).
Applicant Initiated Interview Summary received for U.S. Appl. No. 16/389,722, dated Jul. 7, 2020, 5 pages.
Applicant Initiated Interview Summary received for U.S. Appl. No. 16/582,020, dated Jul. 14, 2020, 5 pages.
Decision to Grant received for Danish Patent Application No. PA201770791, dated Jul. 7, 2020, 2 pages.
Intention to Grant received for European Patent Application No. 15747595.5, dated Jul. 8, 2020, 7 pages.
Notice of Acceptance received for Australian Patent Application No. 2017277813, dated Jun. 16, 2020, 3 pages.
Notice of Allowance received for Japanese Patent Application No. 2019-096219, dated Jun. 26, 2020, 4 pages. (1 page of English Translation and 3 pages of Official Copy).
Notice of Allowance received for Korean Patent Application No. 10-2018-7018904, dated Jun. 1, 26, 2020, 4 pages (1 page of English Translation and 3 pages of Official copy).
Notice of Allowance received for U.S. Appl. No. 15/554,204, dated Jul. 13, 2020, 10 pages.
Office Action received for Korean Patent Application No. 10-2019-7029673, dated Sep. 3, 2020, 9 pages (4 pages of English Translation and 5 pages of Official Copy).
Phlam, Dev, "Clockwork Tomato Presentation", Retrieved from the Internet: URL: https://www.youtube.com/watch?v=2IQDx9REn0E, Apr. 29, 2016, 6 pages.

\* cited by examiner

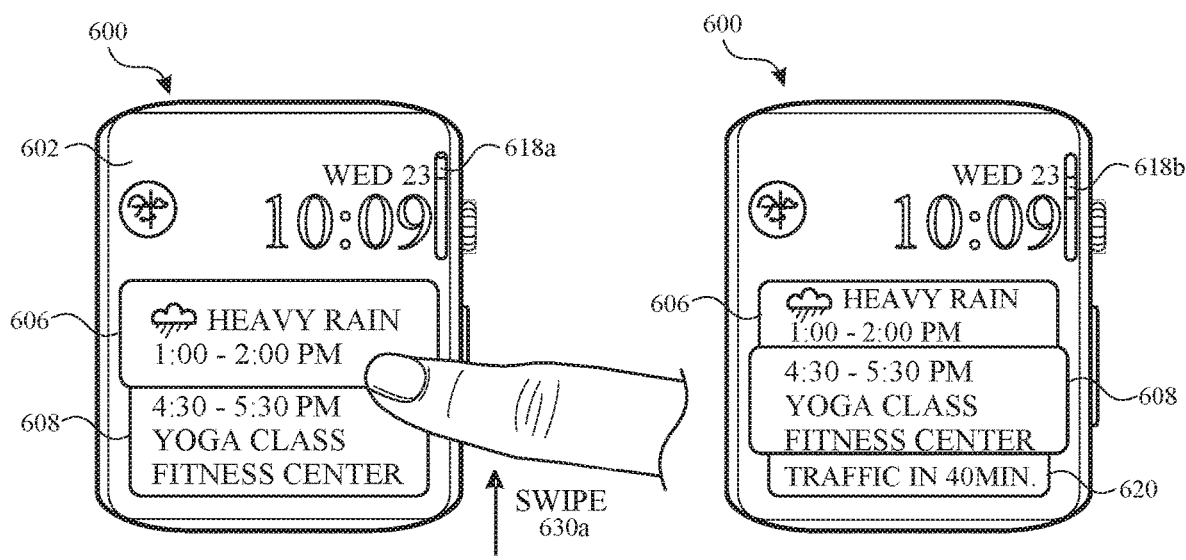

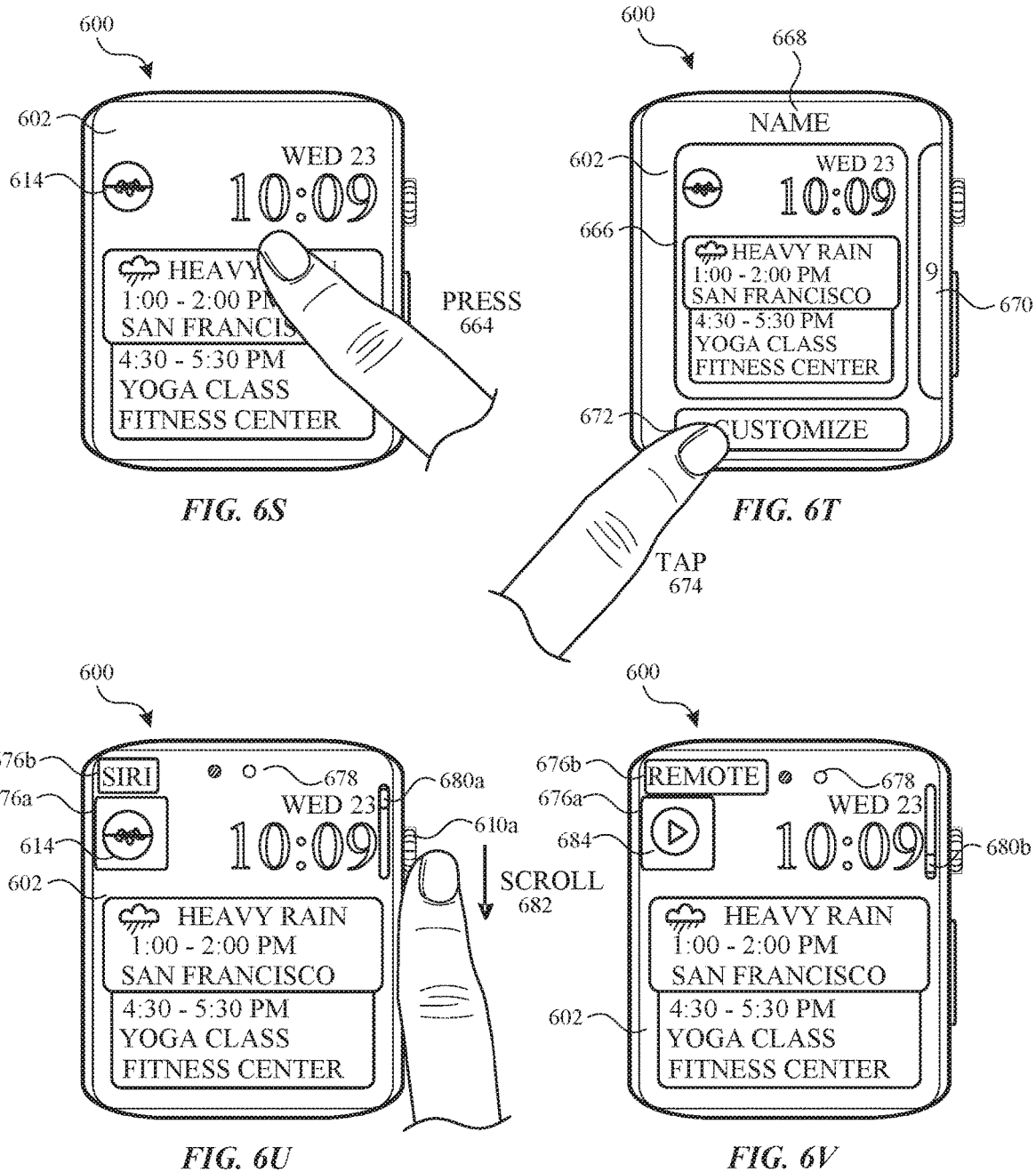

800

802
At a first time, display a first user interface screen comprising a current time indicator, a first platter at a first position, and an affordance at a second position, where:

804
The first platter is associated with a first application and displays a first set of information from the first application.

806
The first set of information relates to a first temporal context of the current day.

808
The affordance represents an application.

810
Detect a first user input corresponding to a request to scroll the first user interface screen.

812
In response to detecting the first user input, maintain display of the affordance at the second position.

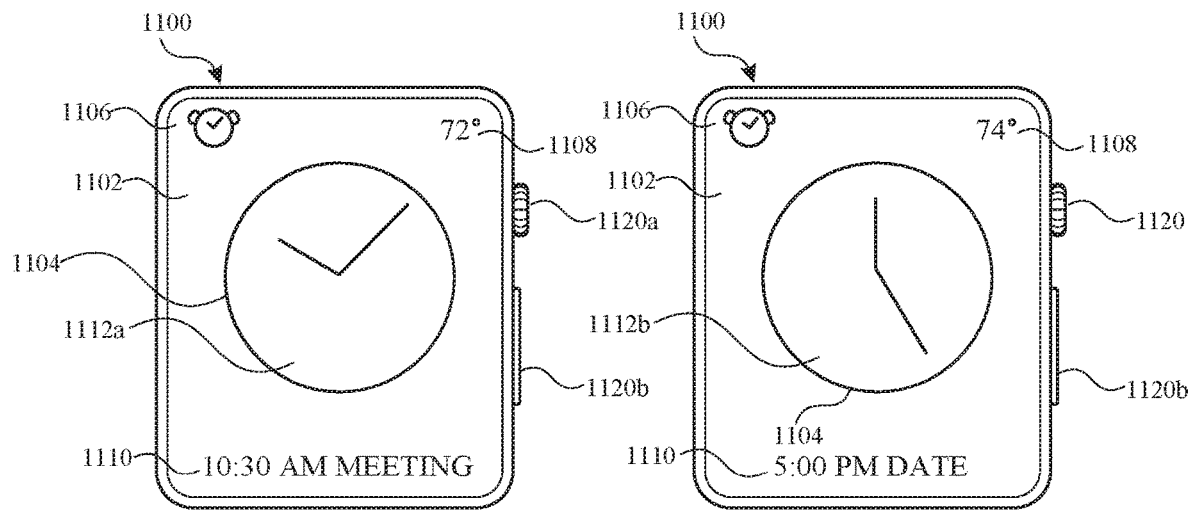
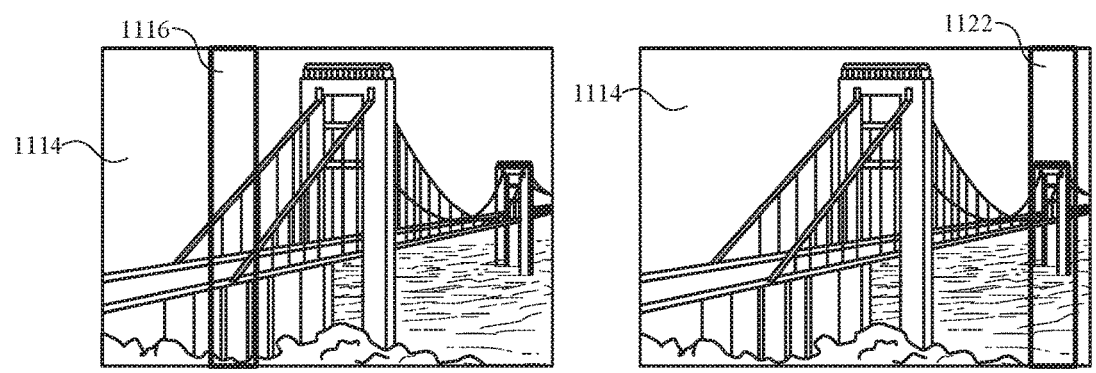
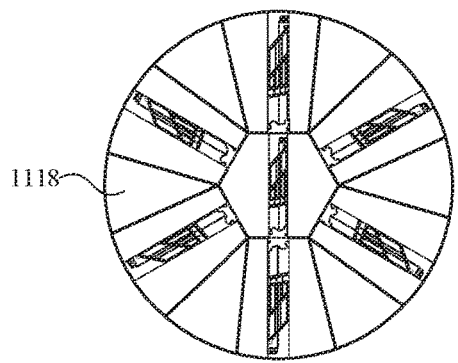 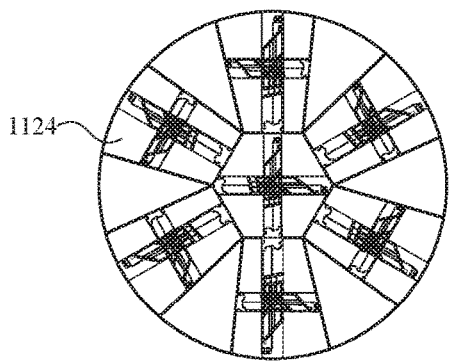
*FIG. 11A*       *FIG. 11B*

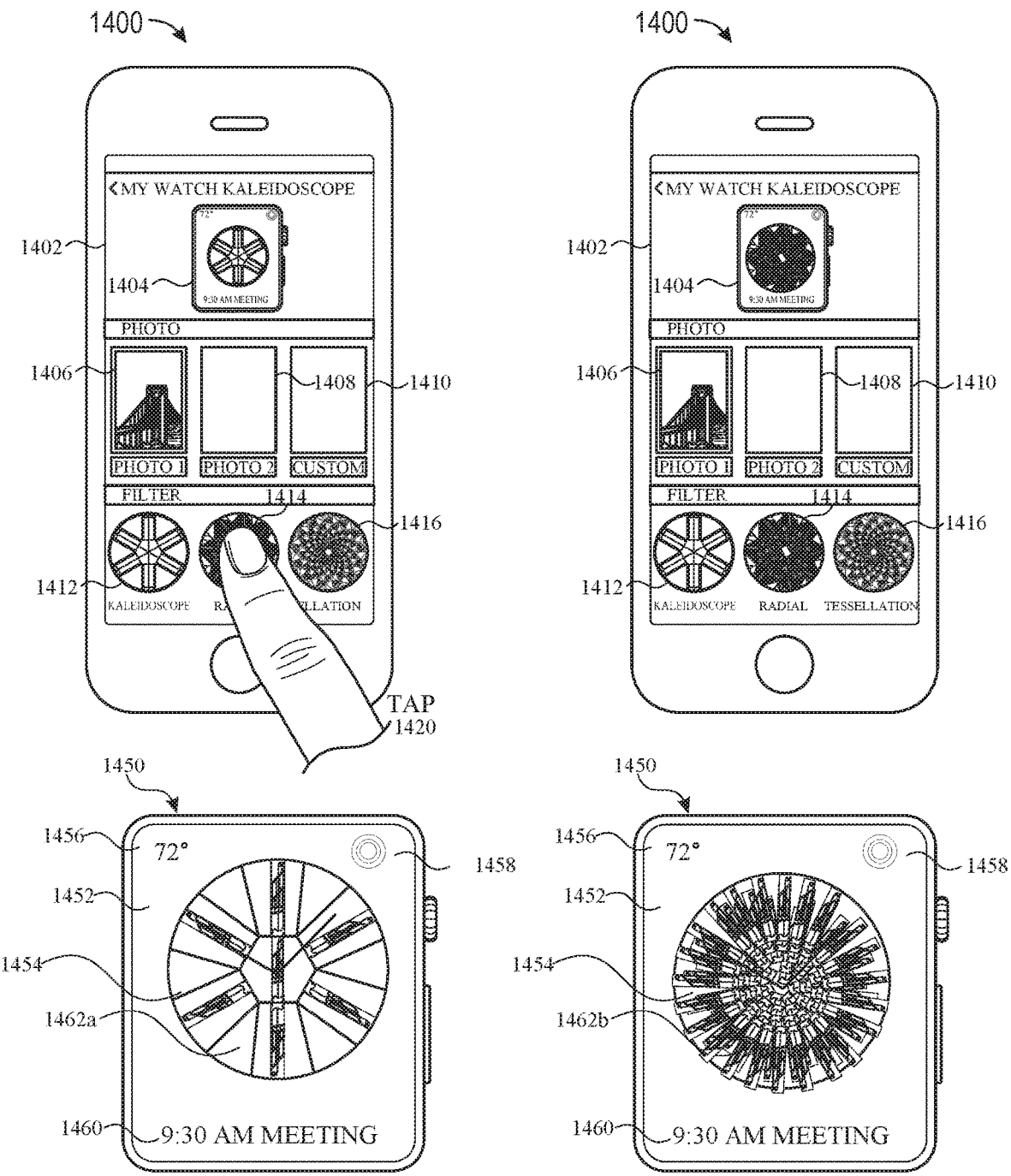
*FIG. 14B*          *FIG. 14C*

CONTEXT-SPECIFIC USER INTERFACES

CROSS-REFERENCE TO RELATED APPLICATIONS

This application claims priority to U.S. Provisional Patent Application Ser. No. 62/505,782, entitled "Context-Specific User Interfaces," filed May 12, 2017, the content of which is hereby incorporated by reference in its entirety.

This application relates to the following applications: International Patent Application Serial No. PCT/US2015/034604, titled "Context-Specific User Interfaces," filed Jun. 7, 2015, published as WIPO Publication No. WO/2016/022203; International Patent Application Serial No. PCT/US2015/034606, titled "Context-Specific User Interfaces," filed Jun. 7, 2015, published as WIPO Publication No. WO/2016/022204; and International Patent Application Serial No. PCT/US2015/034607, titled "Context-Specific User Interfaces," filed Jun. 7, 2015, published as WIPO Publication No. WO/2016/022205. The content of these applications is hereby incorporated by reference in their entirety.

FIELD

The present disclosure relates generally to computer user interfaces, and more specifically to techniques for providing context-specific user interfaces.

BACKGROUND

Portable multifunction devices allow users to access information from a variety of applications and data sources on a reduced-size device they can keep with them throughout the day in a variety of contexts (e.g., at work, at home, while traveling, etc.). However, as context changes, the types of information a user may wish to view can also change. Thus, it is a challenge to provide an efficient interface that displays relevant information to a user throughout the day. For example, a user may wish to know the time of sunset, but a widget dedicated to sunset time is only relevant to a user as sunset approaches. The rest of the day, this screen "real estate" is providing irrelevant information and taking up space that could be used to provide more relevant information. This is a particular concern for portable devices with reduced-size interfaces.

SUMMARY

Users rely on portable multifunction devices for keeping time, among a variety of other operations including running software applications. However, some techniques for providing context-specific user interfaces (e.g., for keeping time and/or other operations) are generally cumbersome and inefficient. For example, some existing techniques use a complex and time-consuming user interface, which may include multiple key presses or keystrokes. Some existing techniques require more multiple user interactions in order to display all of the information the user wishes to view. Existing techniques require more time than necessary, wasting user time and device energy. This latter consideration is particularly important in battery-operated devices.

Accordingly, the present technique provides electronic devices with faster, more efficient methods and interfaces for providing context-specific user interfaces. Such methods and interfaces optionally complement or replace other methods for providing context-specific user interfaces. Such methods and interfaces reduce the cognitive burden on a user and produce a more efficient human-machine interface. For battery-operated computing devices, such methods and interfaces conserve power and increase the time between battery charges and reduce the number of unnecessary, extraneous, and/or repetitive received inputs required to access information.

In some embodiments, a method comprises at an electronic device with a display, one or more processors, and memory: displaying on the display a user interface screen comprising: a current time indicator; and a first platter at a first position on the display, wherein the first platter is associated with a first application and displays a first set of information obtained from the first application, wherein the first set of information relates to a first temporal context of the current day; detecting a user input; and in response to detecting the user input: displaying the first platter at a second position different from the first position on the display; and displaying a second platter at the first position on the display, wherein the second platter is associated with a second application and displays a second set of information obtained from the second application, wherein the second set of information relates to a second temporal context of the current day, and wherein the first and the second applications are different.

In some embodiments, a method comprises at an electronic device with a display, one or more processors, and memory: at a first time of the current day, displaying on the display a first user interface screen comprising: a current time indicator, wherein the current time indicator reflects the first time of the current day; a first platter at a first position on the display, wherein the first platter is associated with a first application and displays a first set of information obtained from the first application, wherein the first set of information relates to a first temporal context of the current day; and an affordance at a second position on the display, wherein the affordance represents an application; detecting a first user input corresponding to a request to scroll the first user interface screen; and in response to detecting the first user input: maintaining display of the affordance at the second position; and displaying a second platter at the first position, wherein the second platter is associated with a second application and displays a second set of information obtained from the second application, and wherein the second set of information relates to the current day; at a second time of the current day different from the first time, displaying on the display a second user interface screen comprising: the current time indicator, wherein the current time indicator reflects the second time of the current day; a third platter at the first position on the display, wherein the third platter is associated with a third application and displays a third set of information obtained from the third application, wherein the third set of information relates to a third temporal context of the current day; and the affordance at the second position on the display; detecting a second user input corresponding to a request to scroll the second user interface screen; and in response to detecting the second user input: maintaining display of the affordance at the second position; and displaying the second platter at the first position.

In some embodiments, a method comprises at an electronic device with a display, one or more processors, and memory: displaying on the display a user interface screen comprising: a current time indicator; and a first non-textual, graphical depiction of a first set of information obtained from a first application, wherein the first set of information relates to a first temporal context of the current day; detecting a user input; and in response to detecting the user input: ceasing to display the first non-textual, graphical depiction; and displaying a second non-textual, graphical depiction, wherein the second non-textual, graphical depiction depicts a second set of information obtained from a second application, wherein the second set of information relates to a second temporal context of the current day, and wherein the first and the second applications are different.

In some embodiments, a method comprises at an electronic device with a display, one or more processors, and memory: displaying on the display a user interface screen comprising: a current time indicator; and a background; detecting a change in time; in response to detecting the change in time: selecting a first portion of an image, wherein the first portion is less than the entire image; reflecting the first portion across a first plurality of axes of reflection to generate a first plurality of reflected portions; and replacing the background with a first composite image comprising the first plurality of reflected portions; detecting a second change in time; and in response to detecting the second change in time: selecting a second portion of the image, wherein the second portion is less than the entire image, and wherein the second portion is different from the first portion; reflecting the second portion across a second plurality of axes of reflection to generate a second plurality of reflected portions; and replacing the first composite image with a second composite image comprising the second plurality of reflected portions.

In some embodiments, a method comprises at an electronic device with a display, one or more processors, and memory: displaying on the display a user interface screen comprising: a current time indicator; and a first composite image that is generated by the electronic device by: selecting a first portion of an image; reflecting the first portion across a first plurality of axes of reflection to generate a first plurality of reflected portions; and displaying the first plurality of reflected portions; detecting a user input corresponding to a request to edit the first composite image; and in response to detecting the user input, ceasing to display the first composite image and displaying a second composite image that is generated by the electronic device by: selecting a second portion of the image; reflecting the second portion across a second plurality of axes of reflection to generate a second plurality of reflected portions, wherein the first and the second plurality of axes of reflection are different; and displaying the second plurality of reflected portions.

In some embodiments, a non-transitory computer-readable storage medium stores one or more programs configured to be executed by one or more processors of an electronic device with a display, the one or more programs including instructions for: displaying on the display a user interface screen comprising: a current time indicator; and a first platter at a first position on the display, wherein the first platter is associated with a first application and displays a first set of information obtained from the first application, wherein the first set of information relates to a first temporal context of the current day; detecting a user input; and in response to detecting the user input: displaying the first platter at a second position different from the first position on the display; and displaying a second platter at the first position on the display, wherein the second platter is associated with a second application and displays a second set of information obtained from the second application, wherein the second set of information relates to a second temporal context of the current day, and wherein the first and the second applications are different.

In some embodiments, a non-transitory computer-readable storage medium stores one or more programs configured to be executed by one or more processors of an electronic device with a display, the one or more programs including instructions for: at a first time of the current day, displaying on the display a first user interface screen comprising: a current time indicator, wherein the current time indicator reflects the first time of the current day; a first platter at a first position on the display, wherein the first platter is associated with a first application and displays a first set of information obtained from the first application, wherein the first set of information relates to a first temporal context of the current day; and an affordance at a second position on the display, wherein the affordance represents an application; detecting a first user input corresponding to a request to scroll the first user interface screen; and in response to detecting the first user input: maintaining display of the affordance at the second position; and displaying a second platter at the first position, wherein the second platter is associated with a second application and displays a second set of information obtained from the second application, and wherein the second set of information relates to the current day; at a second time of the current day different from the first time, displaying on the display a second user interface screen comprising: the current time indicator, wherein the current time indicator reflects the second time of the current day; a third platter at the first position on the display, wherein the third platter is associated with a third application and displays a third set of information obtained from the third application, wherein the third set of information relates to a third temporal context of the current day; and the affordance at the second position on the display; detecting a second user input corresponding to a request to scroll the second user interface screen; and in response to detecting the second user input: maintaining display of the affordance at the second position; and displaying the second platter at the first position.

In some embodiments, a non-transitory computer-readable storage medium stores one or more programs configured to be executed by one or more processors of an electronic device with a display, the one or more programs including instructions for: displaying on the display a user interface screen comprising: a current time indicator; and a first non-textual, graphical depiction of a first set of information obtained from a first application, wherein the first set of information relates to a first temporal context of the current day; detecting a user input; and in response to detecting the user input: ceasing to display the first non-textual, graphical depiction; and displaying a second non-textual, graphical depiction, wherein the second non-textual, graphical depiction depicts a second set of information obtained from a second application, wherein the second set of information relates to a second temporal context of the current day, and wherein the first and the second applications are different.

In some embodiments, a non-transitory computer-readable storage medium stores one or more programs configured to be executed by one or more processors of an electronic device with a display, the one or more programs including instructions for: displaying on the display a user interface screen comprising: a current time indicator; and a background; detecting a change in time; in response to detecting the change in time: selecting a first portion of an image, wherein the first portion is less than the entire image; reflecting the first portion across a first plurality of axes of reflection to generate a first plurality of reflected portions; and replacing the background with a first composite image comprising the first plurality of reflected portions; detecting a second change in time; and in response to detecting the second change in time: selecting a second portion of the image, wherein the second portion is less than the entire image, and wherein the second portion is different from the first portion; reflecting the second portion across a second plurality of axes of reflection to generate a second plurality of reflected portions; and replacing the first composite image with a second composite image comprising the second plurality of reflected portions.

In some embodiments, a non-transitory computer-readable storage medium stores one or more programs configured to be executed by one or more processors of an electronic device with a display, the one or more programs including instructions for: displaying on the display a user interface screen comprising: a current time indicator; and a first composite image that is generated by the electronic device by: selecting a first portion of an image; reflecting the first portion across a first plurality of axes of reflection to generate a first plurality of reflected portions; and displaying the first plurality of reflected portions; detecting a user input corresponding to a request to edit the first composite image; and in response to detecting the user input, ceasing to display the first composite image and displaying a second composite image that is generated by the electronic device by: selecting a second portion of the image; reflecting the second portion across a second plurality of axes of reflection to generate a second plurality of reflected portions, wherein the first and the second plurality of axes of reflection are different; and displaying the second plurality of reflected portions.

In some embodiments, a transitory computer-readable storage medium stores one or more programs configured to be executed by one or more processors of an electronic device with a display, the one or more programs including instructions for: displaying on the display a user interface screen comprising: a current time indicator; and a first platter at a first position on the display, wherein the first platter is associated with a first application and displays a first set of information obtained from the first application, wherein the first set of information relates to a first temporal context of the current day; detecting a user input; and in response to detecting the user input: displaying the first platter at a second position different from the first position on the display; and displaying a second platter at the first position on the display, wherein the second platter is associated with a second application and displays a second set of information obtained from the second application, wherein the second set of information relates to a second temporal context of the current day, and wherein the first and the second applications are different.

In some embodiments, a transitory computer-readable storage medium stores one or more programs configured to be executed by one or more processors of an electronic device with a display, the one or more programs including instructions for: at a first time of the current day, displaying on the display a first user interface screen comprising: a current time indicator, wherein the current time indicator reflects the first time of the current day; a first platter at a first position on the display, wherein the first platter is associated with a first application and displays a first set of information obtained from the first application, wherein the first set of information relates to a first temporal context of the current day; and an affordance at a second position on the display, wherein the affordance represents an application; detecting a first user input corresponding to a request to scroll the first user interface screen; and in response to detecting the first user input: maintaining display of the affordance at the second position; and displaying a second platter at the first position, wherein the second platter is associated with a second application and displays a second set of information obtained from the second application, and wherein the second set of information relates to the current day; at a second time of the current day different from the first time, displaying on the display a second user interface screen comprising: the current time indicator, wherein the current time indicator reflects the second time of the current day; a third platter at the first position on the display, wherein the third platter is associated with a third application and displays a third set of information obtained from the third application, wherein the third set of information relates to a third temporal context of the current day; and the affordance at the second position on the display; detecting a second user input corresponding to a request to scroll the second user interface screen; and in response to detecting the second user input: maintaining display of the affordance at the second position; and displaying the second platter at the first position.

In some embodiments, a transitory computer-readable storage medium stores one or more programs configured to be executed by one or more processors of an electronic device with a display, the one or more programs including instructions for: displaying on the display a user interface screen comprising: a current time indicator; and a first non-textual, graphical depiction of a first set of information obtained from a first application, wherein the first set of information relates to a first temporal context of the current day; detecting a user input; and in response to detecting the user input: ceasing to display the first non-textual, graphical depiction; and displaying a second non-textual, graphical depiction, wherein the second non-textual, graphical depiction depicts a second set of information obtained from a second application, wherein the second set of information relates to a second temporal context of the current day, and wherein the first and the second applications are different.

In some embodiments, a transitory computer-readable storage medium stores one or more programs configured to be executed by one or more processors of an electronic device with a display, the one or more programs including instructions for: displaying on the display a user interface screen comprising: a current time indicator; and a background; detecting a change in time; in response to detecting the change in time: selecting a first portion of an image, wherein the first portion is less than the entire image; reflecting the first portion across a first plurality of axes of reflection to generate a first plurality of reflected portions; and replacing the background with a first composite image comprising the first plurality of reflected portions; detecting a second change in time; and in response to detecting the second change in time: selecting a second portion of the image, wherein the second portion is less than the entire image, and wherein the second portion is different from the first portion; reflecting the second portion across a second plurality of axes of reflection to generate a second plurality of reflected portions; and replacing the first composite image with a second composite image comprising the second plurality of reflected portions.

In some embodiments, a transitory computer-readable storage medium stores one or more programs configured to be executed by one or more processors of an electronic device with a display, the one or more programs including instructions for: displaying on the display a user interface screen comprising: a current time indicator; and a first composite image that is generated by the electronic device by: selecting a first portion of an image; reflecting the first portion across a first plurality of axes of reflection to generate a first plurality of reflected portions; and displaying the first plurality of reflected portions; detecting a user input corresponding to a request to edit the first composite image; and in response to detecting the user input, ceasing to display the first composite image and displaying a second composite image that is generated by the electronic device by: selecting a second portion of the image; reflecting the second portion across a second plurality of axes of reflection to generate a second plurality of reflected portions, wherein the first and the second plurality of axes of reflection are different; and displaying the second plurality of reflected portions.

In some embodiments, an electronic device comprises a display; one or more processors; and memory storing one or more programs configured to be executed by the one or more processors, the one or more programs including instructions for: displaying on the display a user interface screen comprising: a current time indicator; and a first platter at a first position on the display, wherein the first platter is associated with a first application and displays a first set of information obtained from the first application, wherein the first set of information relates to a first temporal context of the current day; detecting a user input; and in response to detecting the user input: displaying the first platter at a second position different from the first position on the display; and displaying a second platter at the first position on the display, wherein the second platter is associated with a second application and displays a second set of information obtained from the second application, wherein the second set of information relates to a second temporal context of the current day, and wherein the first and the second applications are different.

In some embodiments, an electronic device comprises a display; one or more processors; and memory storing one or more programs configured to be executed by the one or more processors, the one or more programs including instructions for: at a first time of the current day, displaying on the display a first user interface screen comprising: a current time indicator, wherein the current time indicator reflects the first time of the current day; a first platter at a first position on the display, wherein the first platter is associated with a first application and displays a first set of information obtained from the first application, wherein the first set of information relates to a first temporal context of the current day; and an affordance at a second position on the display, wherein the affordance represents an application; detecting a first user input corresponding to a request to scroll the first user interface screen; and in response to detecting the first user input: maintaining display of the affordance at the second position; and displaying a second platter at the first position, wherein the second platter is associated with a second application and displays a second set of information obtained from the second application, and wherein the second set of information relates to the current day; at a second time of the current day different from the first time, displaying on the display a second user interface screen comprising: the current time indicator, wherein the current time indicator reflects the second time of the current day; a third platter at the first position on the display, wherein the third platter is associated with a third application and displays a third set of information obtained from the third application, wherein the third set of information relates to a third temporal context of the current day; and the affordance at the second position on the display; detecting a second user input corresponding to a request to scroll the second user interface screen; and in response to detecting the second user input: maintaining display of the affordance at the second position; and displaying the second platter at the first position.

In some embodiments, an electronic device comprises a display; one or more processors; and memory storing one or more programs configured to be executed by the one or more processors, the one or more programs including instructions for: displaying on the display a user interface screen comprising: a current time indicator; and a first non-textual, graphical depiction of a first set of information obtained from a first application, wherein the first set of information relates to a first temporal context of the current day; detecting a user input; and in response to detecting the user input: ceasing to display the first non-textual, graphical depiction; and displaying a second non-textual, graphical depiction, wherein the second non-textual, graphical depiction depicts a second set of information obtained from a second application, wherein the second set of information relates to a second temporal context of the current day, and wherein the first and the second applications are different.

In some embodiments, an electronic device comprises a display; one or more processors; and memory storing one or more programs configured to be executed by the one or more processors, the one or more programs including instructions for: displaying on the display a user interface screen comprising: a current time indicator; and a background; detecting a change in time; in response to detecting the change in time: selecting a first portion of an image, wherein the first portion is less than the entire image; reflecting the first portion across a first plurality of axes of reflection to generate a first plurality of reflected portions; and replacing the background with a first composite image comprising the first plurality of reflected portions; detecting a second change in time; and in response to detecting the second change in time: selecting a second portion of the image, wherein the second portion is less than the entire image, and wherein the second portion is different from the first portion; reflecting the second portion across a second plurality of axes of reflection to generate a second plurality of reflected portions; and replacing the first composite image with a second composite image comprising the second plurality of reflected portions.

In some embodiments, an electronic device comprises a display; one or more processors; and memory storing one or more programs configured to be executed by the one or more processors, the one or more programs including instructions for: displaying on the display a user interface screen comprising: a current time indicator; and a first composite image that is generated by the electronic device by: selecting a first portion of an image; reflecting the first portion across a first plurality of axes of reflection to generate a first plurality of reflected portions; and displaying the first plurality of reflected portions; detecting a user input corresponding to a request to edit the first composite image; and in response to detecting the user input, ceasing to display the first composite image and displaying a second composite image that is generated by the electronic device by: selecting a second portion of the image; reflecting the second portion across a second plurality of axes of reflection to generate a second plurality of reflected portions, wherein the first and the second plurality of axes of reflection are different; and displaying the second plurality of reflected portions.

In some embodiments, an electronic device comprises a display; means for displaying on the display a user interface screen comprising: a current time indicator; and a first platter at a first position on the display, wherein the first platter is associated with a first application and displays a first set of information obtained from the first application, wherein the first set of information relates to a first temporal context of the current day; means for detecting a user input; and means responsive at least in part to detecting the user input for displaying the first platter at a second position different from the first position on the display; and means responsive at least in part to detecting the user input for displaying a second platter at the first position on the display, wherein the second platter is associated with a second application and displays a second set of information obtained from the second application, wherein the second set of information relates to a second temporal context of the current day, and wherein the first and the second applications are different.

In some embodiments, an electronic device comprises a display; means for displaying on the display, at a first time of the current day, a first user interface screen comprising: a current time indicator, wherein the current time indicator reflects the first time of the current day; a first platter at a first position on the display, wherein the first platter is associated with a first application and displays a first set of information obtained from the first application, wherein the first set of information relates to a first temporal context of the current day; and an affordance at a second position on the display, wherein the affordance represents an application; means for detecting a first user input corresponding to a request to scroll the first user interface screen; and means responsive at least in part to detecting the first user input for maintaining display of the affordance at the second position; and means responsive at least in part to detecting the first user input for displaying a second platter at the first position, wherein the second platter is associated with a second application and displays a second set of information obtained from the second application, and wherein the second set of information relates to the current day; means for displaying on the display, at a second time of the current day different from the first time, a second user interface screen comprising: the current time indicator, wherein the current time indicator reflects the second time of the current day; a third platter at the first position on the display, wherein the third platter is associated with a third application and displays a third set of information obtained from the third application, wherein the third set of information relates to a third temporal context of the current day; and the affordance at the second position on the display; means for detecting a second user input corresponding to a request to scroll the second user interface screen; and means responsive at least in part to detecting the second user input for maintaining display of the affordance at the second position; and means responsive at least in part to detecting the second user input for displaying the second platter at the first position.

In some embodiments, an electronic device comprises a display; means for displaying on the display a user interface screen comprising: a current time indicator; and a first non-textual, graphical depiction of a first set of information obtained from a first application, wherein the first set of information relates to a first temporal context of the current day; means for detecting a user input; and means responsive at least in part to detecting the user input for ceasing to display the first non-textual, graphical depiction; and means responsive at least in part to detecting the user input for displaying a second non-textual, graphical depiction, wherein the second non-textual, graphical depiction depicts a second set of information obtained from a second application, wherein the second set of information relates to a second temporal context of the current day, and wherein the first and the second applications are different.

In some embodiments, an electronic device comprises a display; means for displaying on the display a user interface screen comprising: a current time indicator; and a background; means for detecting a change in time; means responsive at least in part to detecting the change in time for selecting a first portion of an image, wherein the first portion is less than the entire image; means responsive at least in part to detecting the change in time for reflecting the first portion across a first plurality of axes of reflection to generate a first plurality of reflected portions; and means responsive at least in part to detecting the change in time for replacing the background with a first composite image comprising the first plurality of reflected portions; means detecting a second change in time; and means responsive at least in part to detecting the second change in time for selecting a second portion of the image, wherein the second portion is less than the entire image, and wherein the second portion is different from the first portion; means responsive at least in part to detecting the second change in time for reflecting the second portion across a second plurality of axes of reflection to generate a second plurality of reflected portions; and means responsive at least in part to detecting the second change in time for replacing the first composite image with a second composite image comprising the second plurality of reflected portions.

In some embodiments, an electronic device comprises a display; means for displaying on the display a user interface screen comprising: a current time indicator; and a first composite image that is generated by the electronic device by: selecting a first portion of an image; reflecting the first portion across a first plurality of axes of reflection to generate a first plurality of reflected portions; and displaying the first plurality of reflected portions; means for detecting a user input corresponding to a request to edit the first composite image; and means responsive at least in part to detecting the user input for ceasing to display the first composite image and displaying a second composite image that is generated by the electronic device by: selecting a second portion of the image; reflecting the second portion across a second plurality of axes of reflection to generate a second plurality of reflected portions, wherein the first and the second plurality of axes of reflection are different; and displaying the second plurality of reflected portions.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing context-specific user interfaces. Such methods and interfaces may complement or replace other methods for providing context-specific user interfaces.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 8A-8G illustrate a flow diagram depicting a process for providing context-specific user interfaces in accordance with some embodiments.

FIGS. 14A-14E illustrate exemplary context-specific user interfaces.

DESCRIPTION OF EMBODIMENTS

Figure 1A:
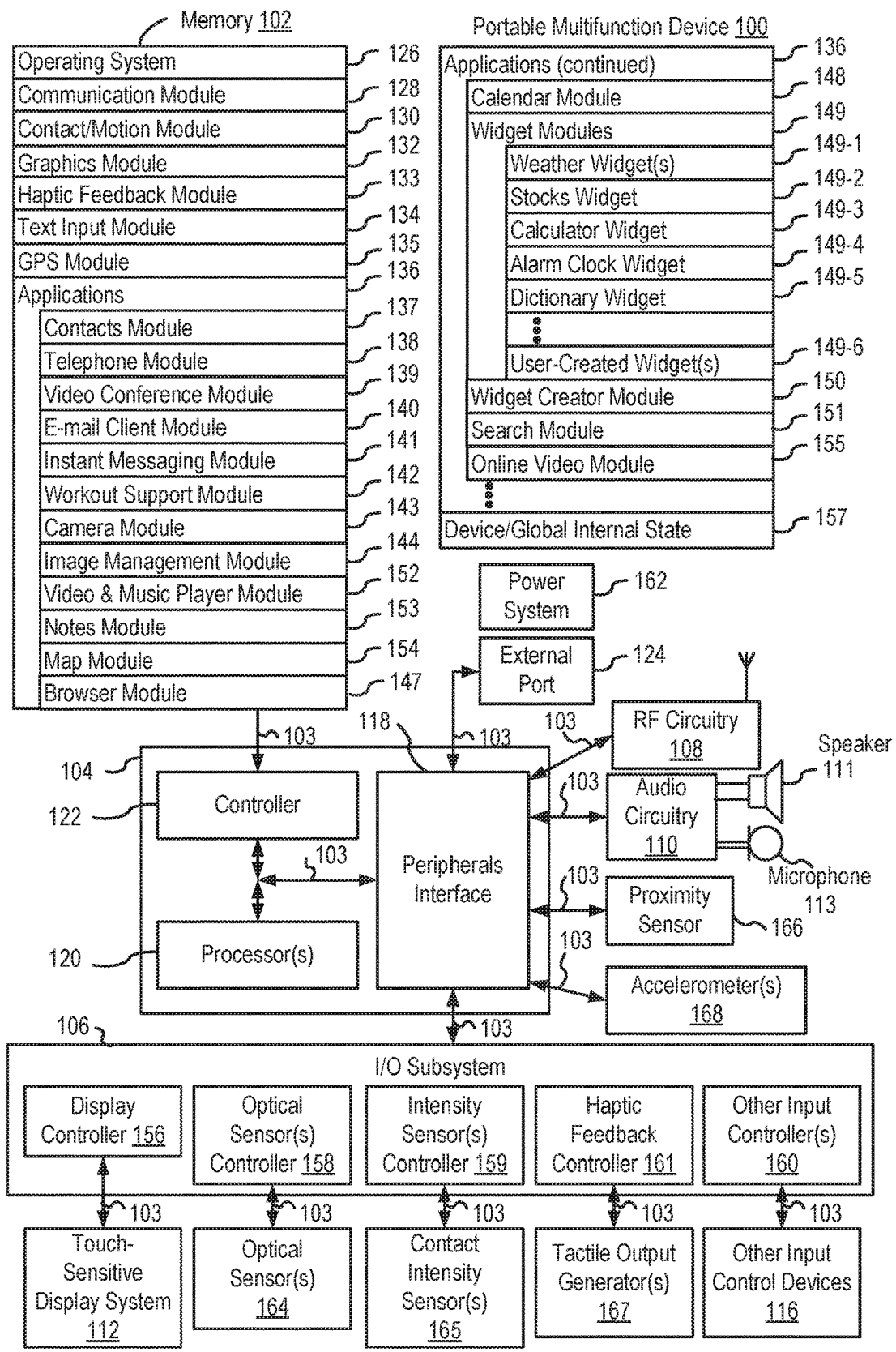
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for context-specific user interfaces, e.g., that display the time along with additional information. This is particularly true for portable multifunction devices with reduced-size displays. Providing the user with relevant information (e.g., obtained from one or more applications) at a glance in a convenient, customizable interface reduces the number of inputs needed to access the information and conserves battery life. Moreover, providing user interfaces that change displayed content as the context in which the user is using the interfaces changes (e.g., throughout the day) makes accessing such information through the interfaces even more efficient. An interface that changes the type of displayed information as a user's context changes provides more efficient use of screen "real estate," which in turn reduces the number of user interactions required to access relevant data at any time of day. Such techniques can reduce the cognitive burden on a user who uses the context-specific user interfaces to access information and/or keep time. Further, such techniques can reduce processor and battery power otherwise wasted on redundant user inputs.

Below, FIGS. 1A-1B, 2, 3, 4A-4B, and 5A-5H provide a description of exemplary devices for performing the techniques for configuring context-specific user interfaces. FIGS. 6A-6V, 9A-9L, 11A-14E, 17A, 17B, and 19A-19F illustrate exemplary user interfaces for providing context-specific user interfaces. The user interfaces in the figures are also used to illustrate the processes described below, including the processes in FIGS. 7A-8G, 10A-10C, 15A-16D, and 18.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
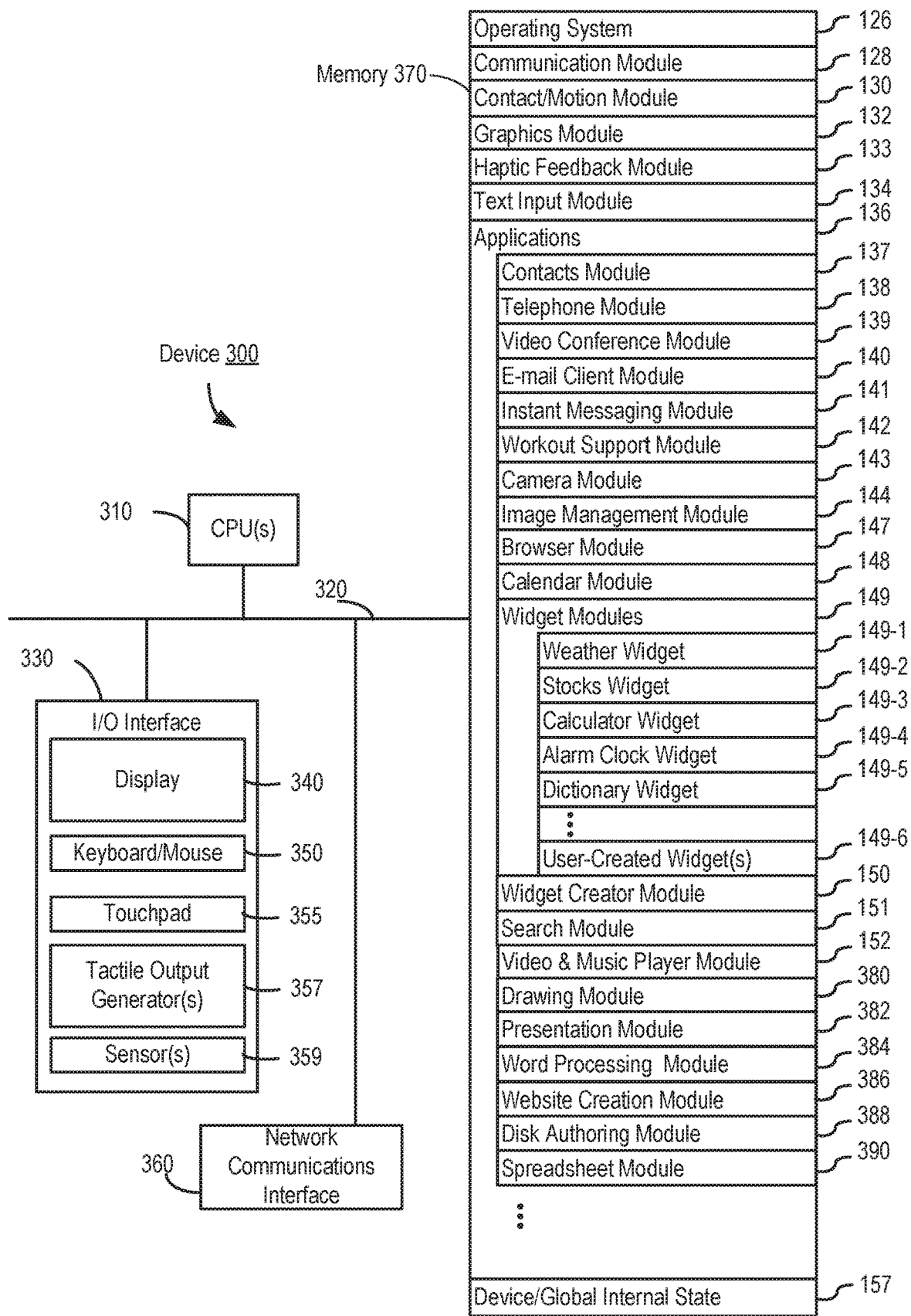
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
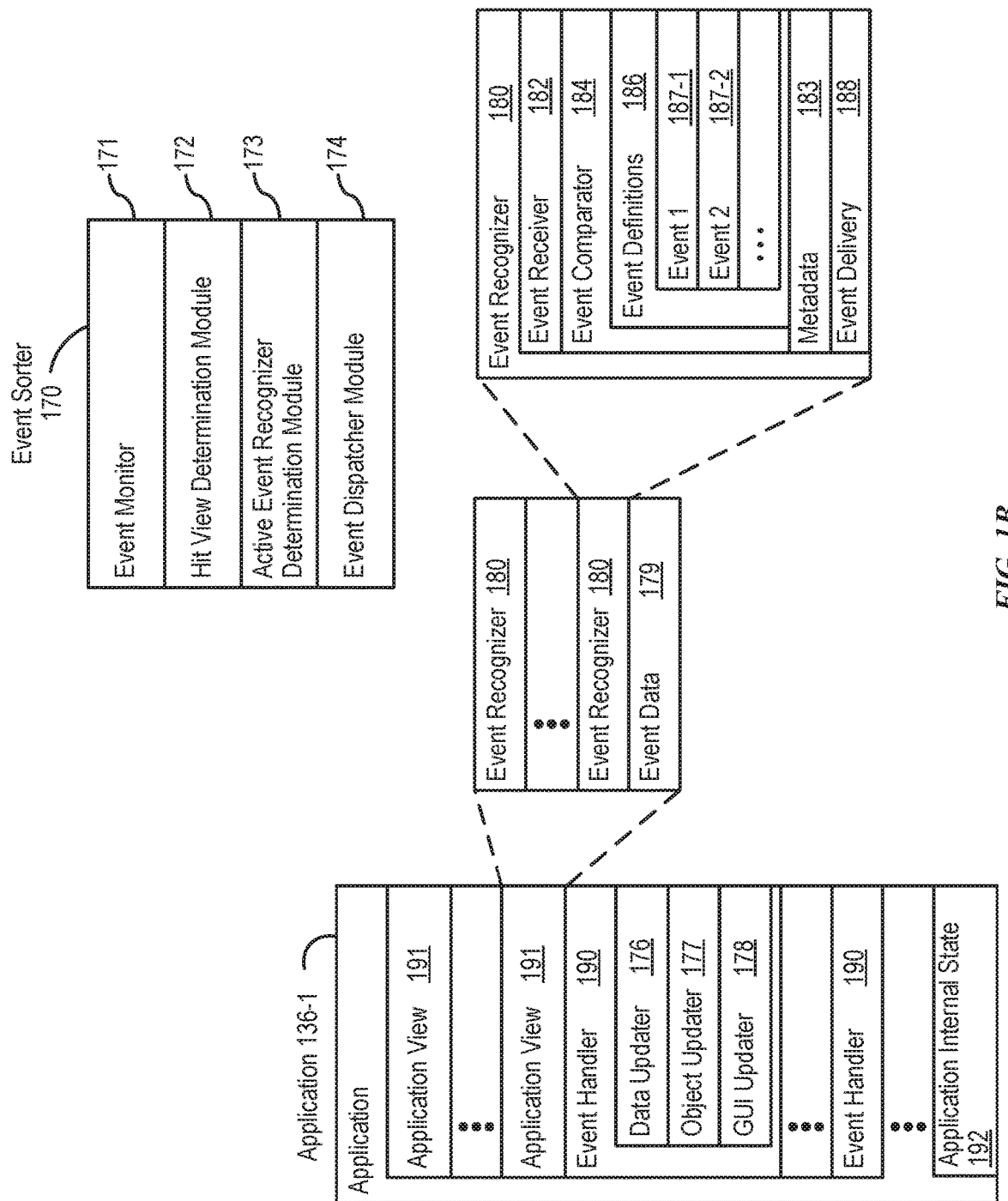
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
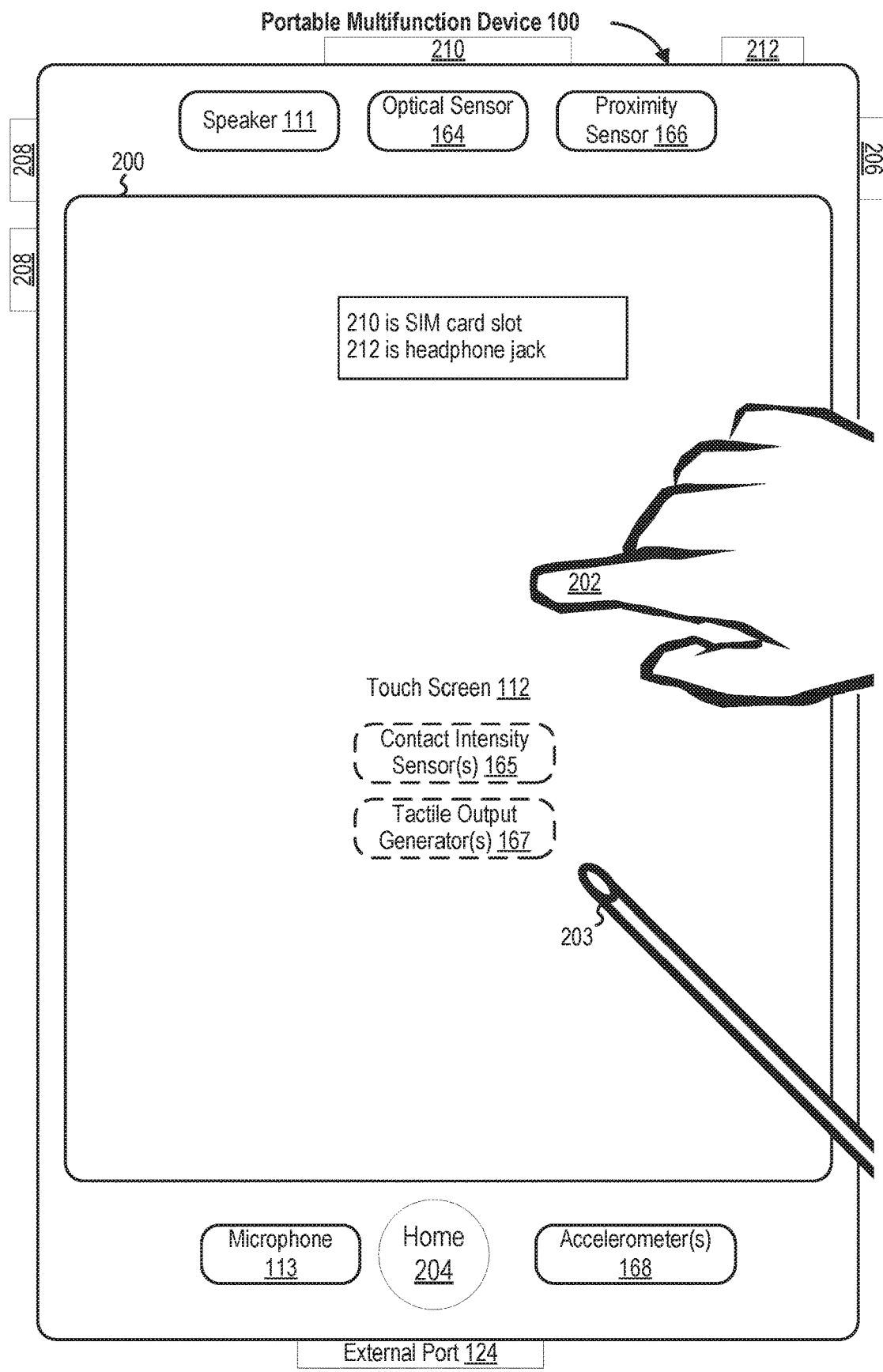
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
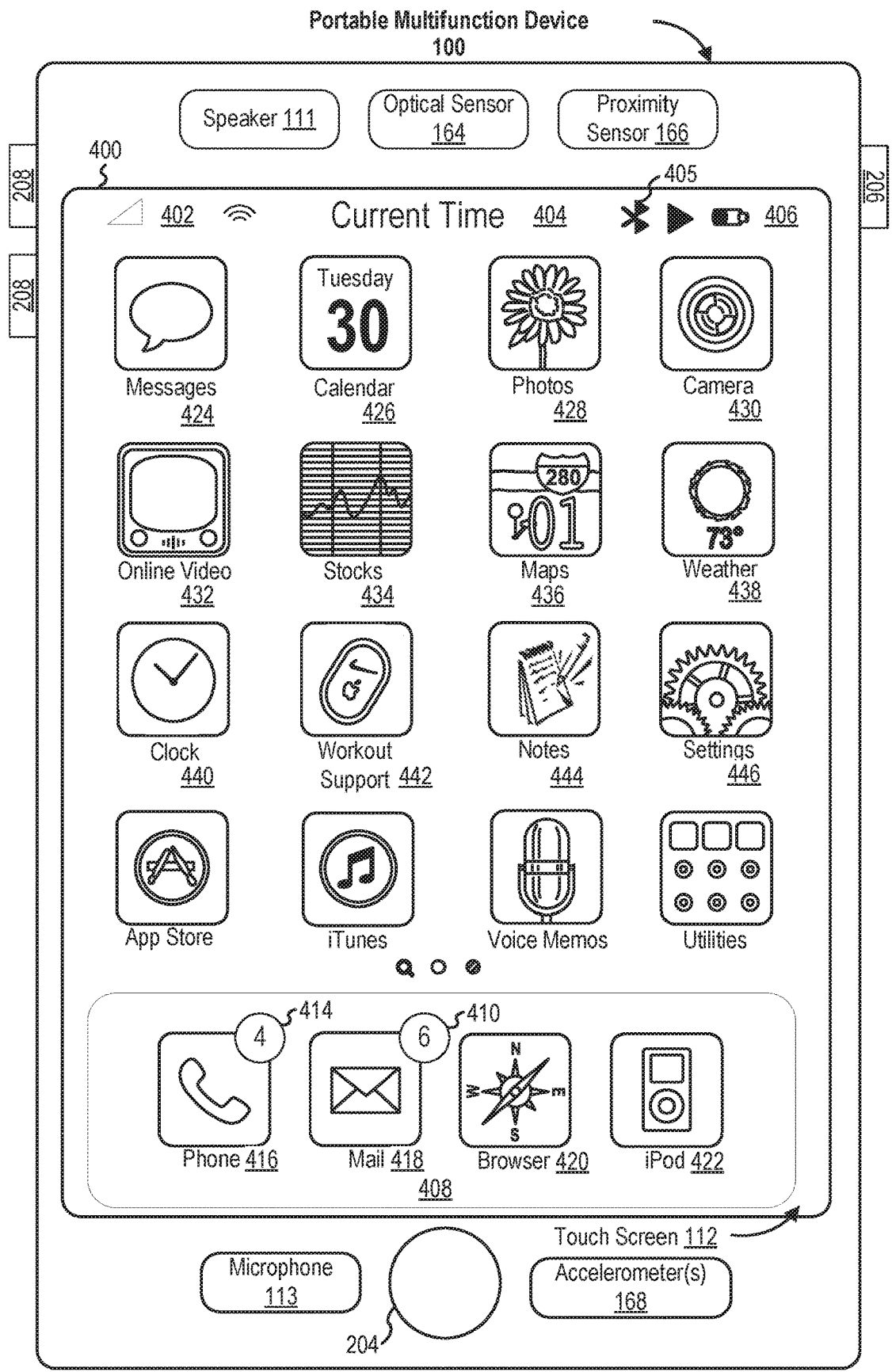
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and
Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
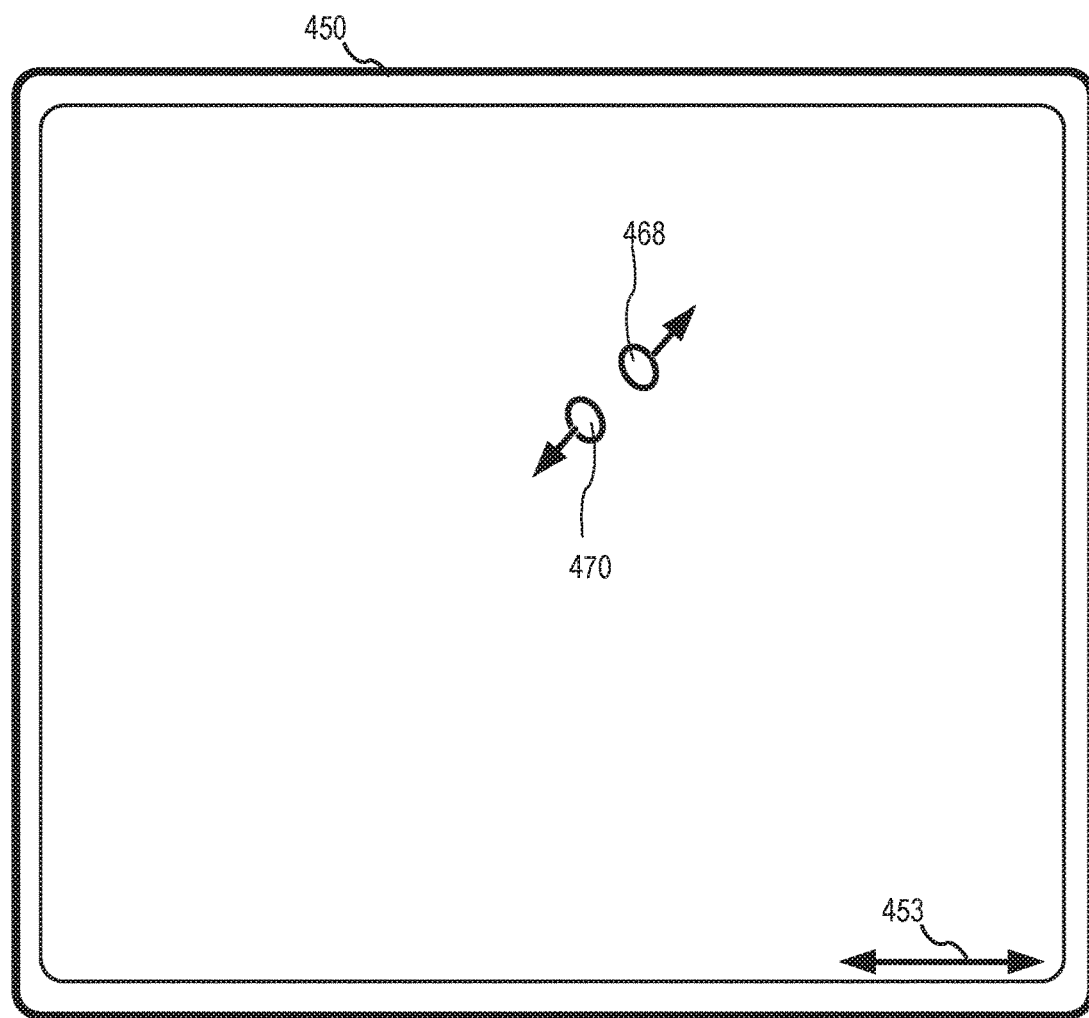
FIG. 4B illustrates an exemplary user interface for a multifunction device with a touch-sensitive surface that is separate from the display in accordance with some embodiments.
Figure 4B:
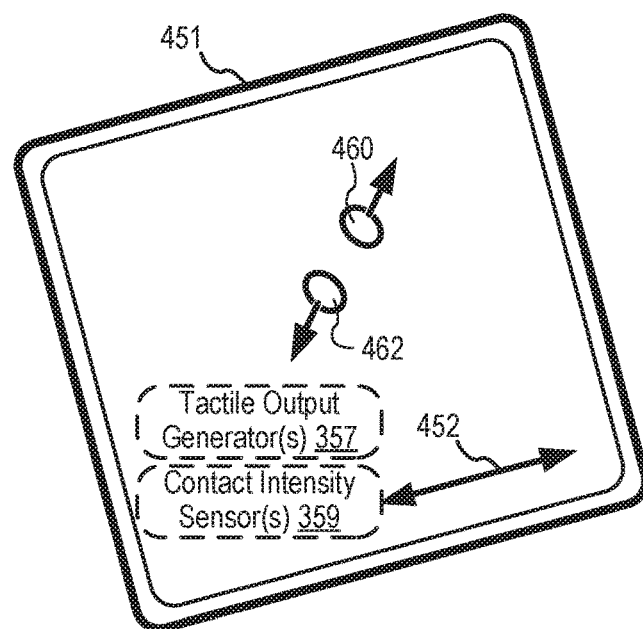

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
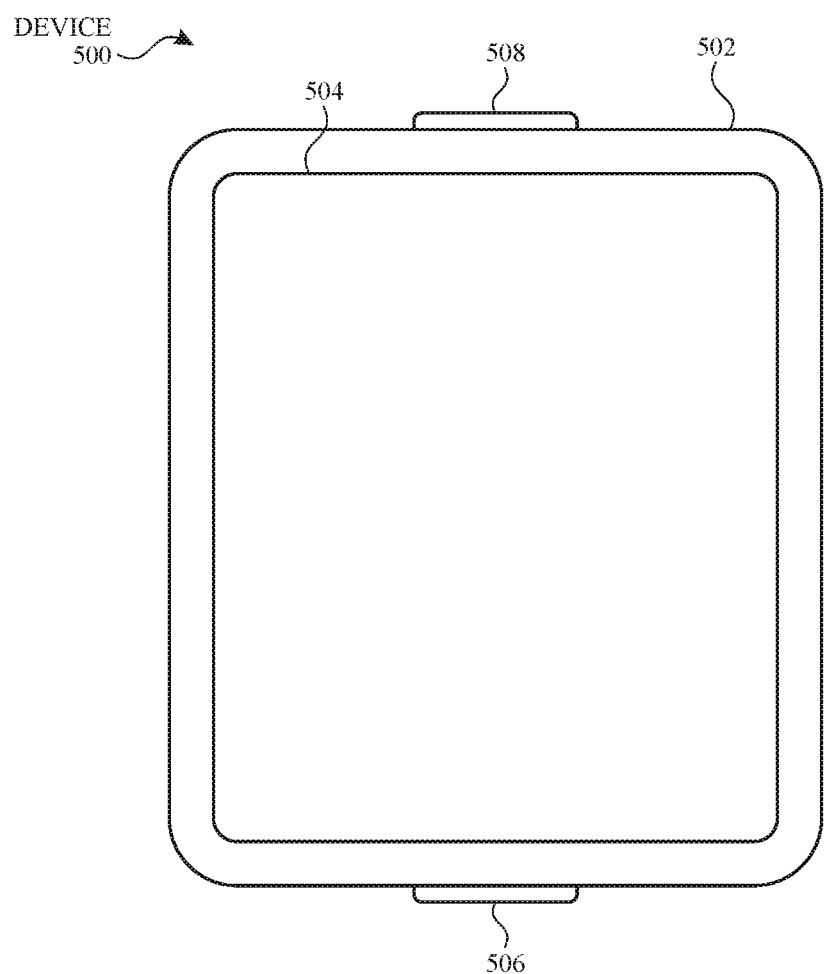
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
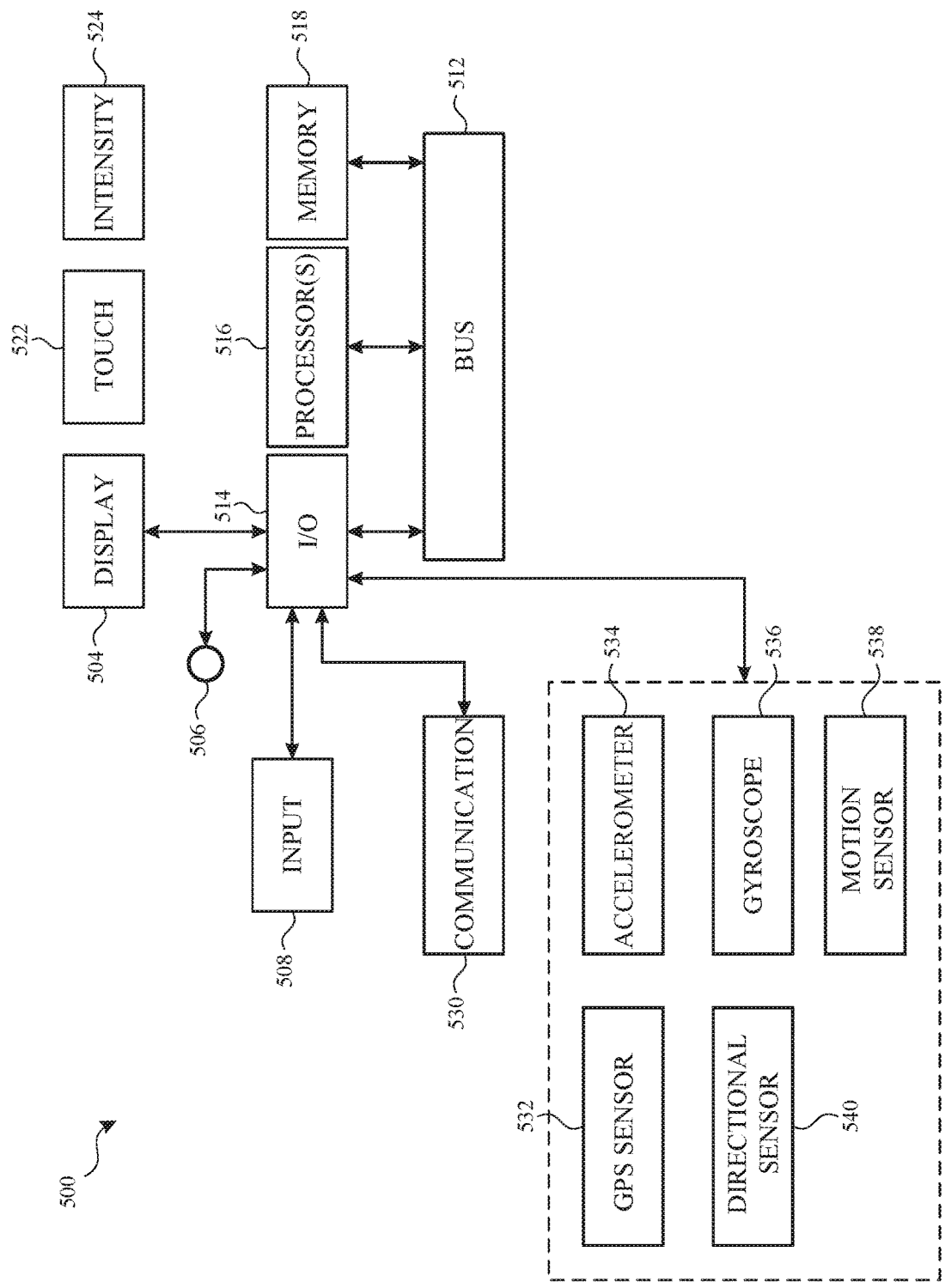
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, 1000, 1500, 1600, and 1800 (FIGS. 7A-8G, 10A-10C, 15A-16D, and 18). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
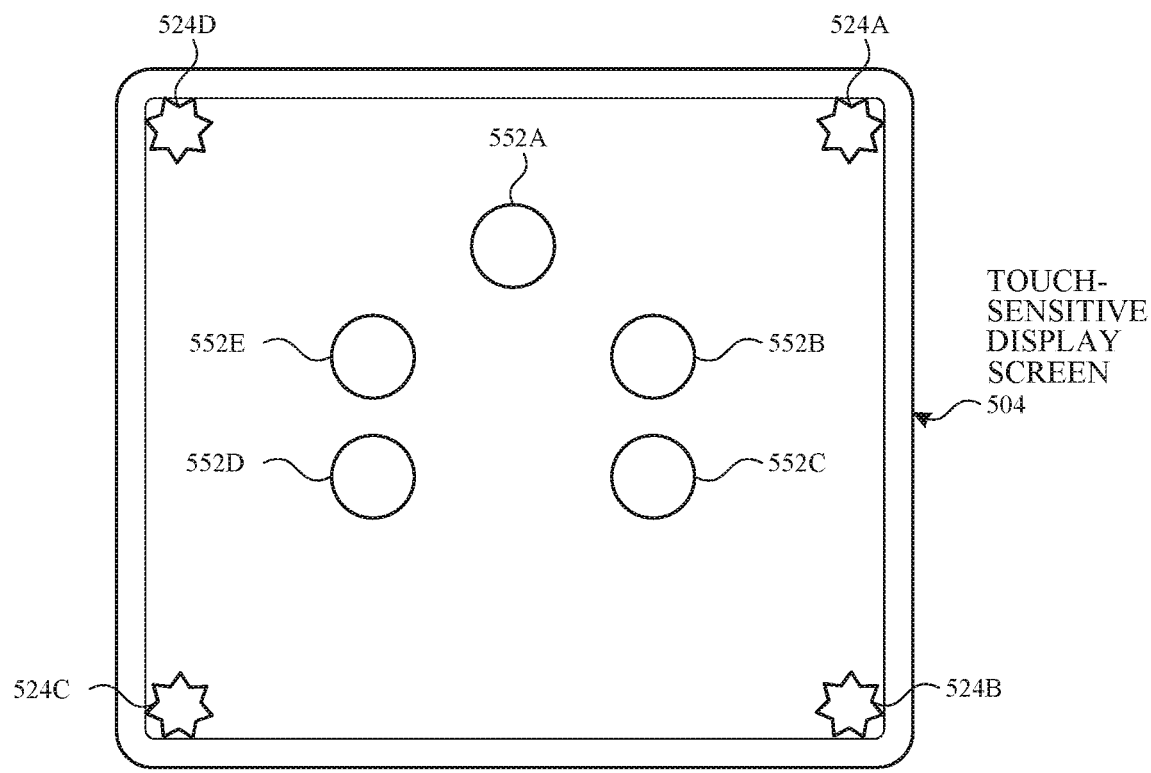
FIGS. 5C-5D illustrate exemplary components of a personal electronic device having a touch-sensitive display and intensity sensors in accordance with some embodiments.
Figure 5C:
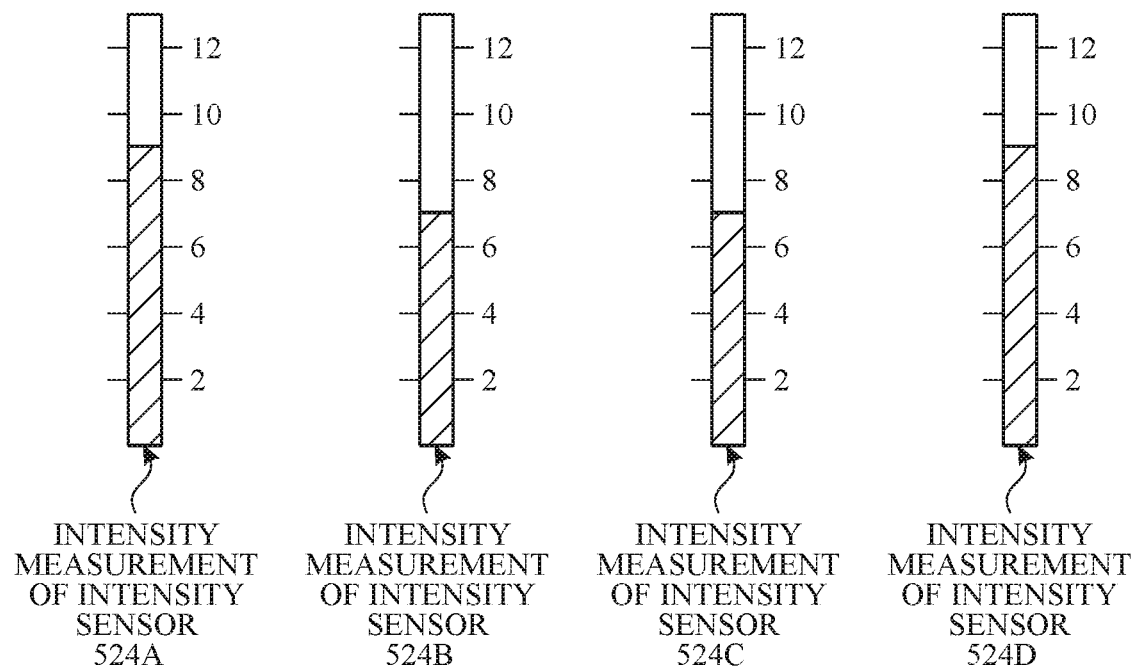
Figure 5D:
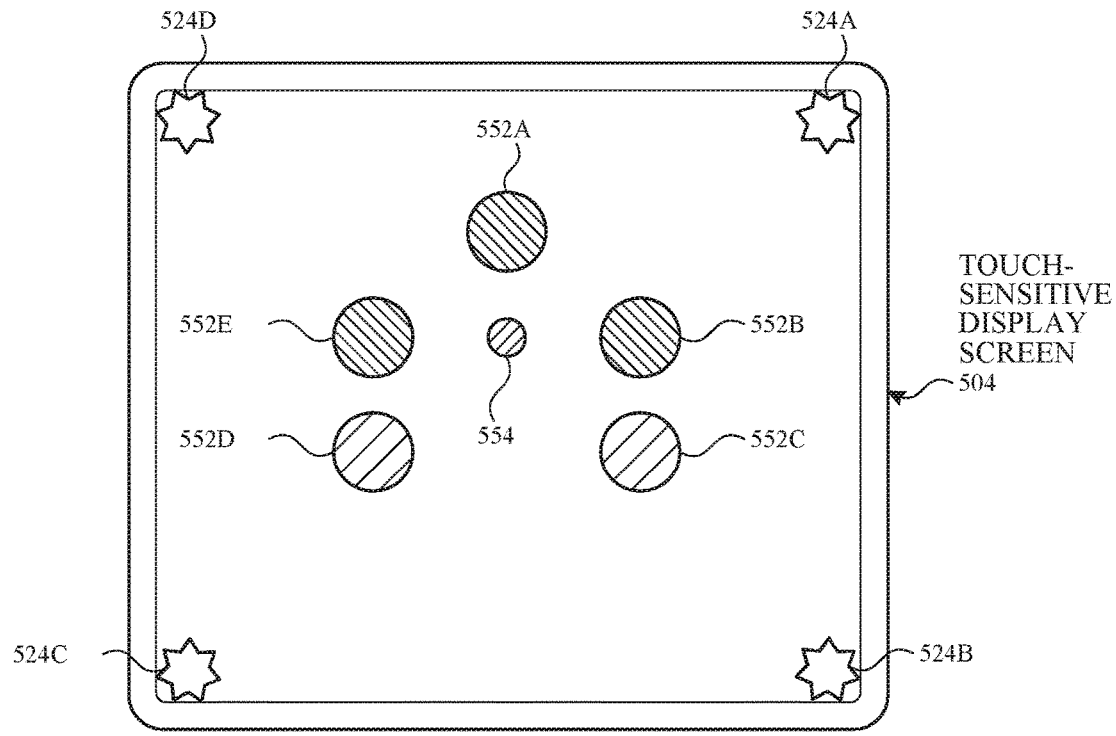
Figure 5D:
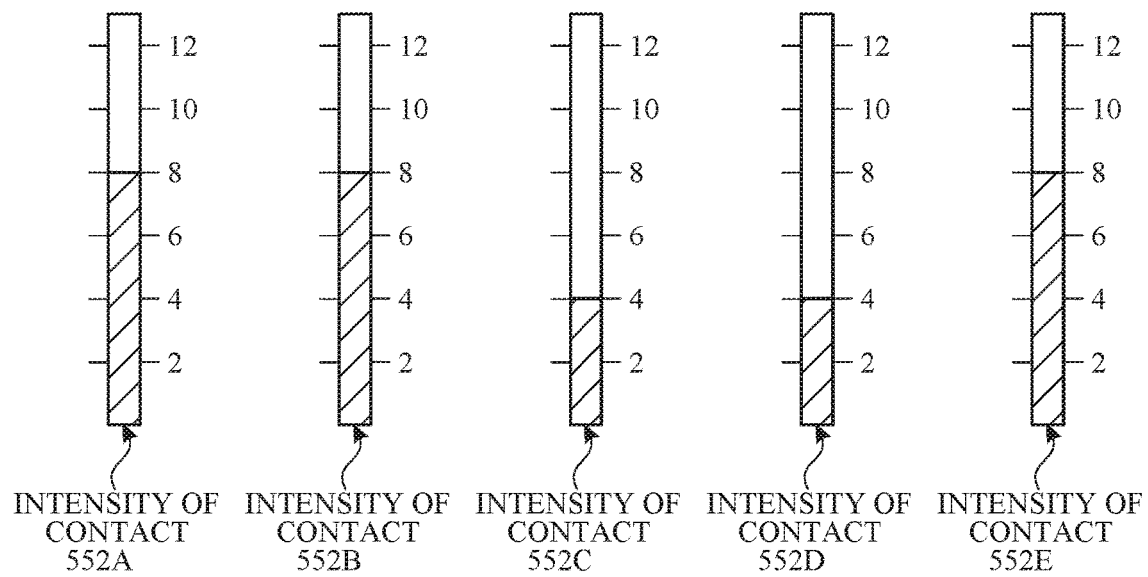

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/D\Sigma)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
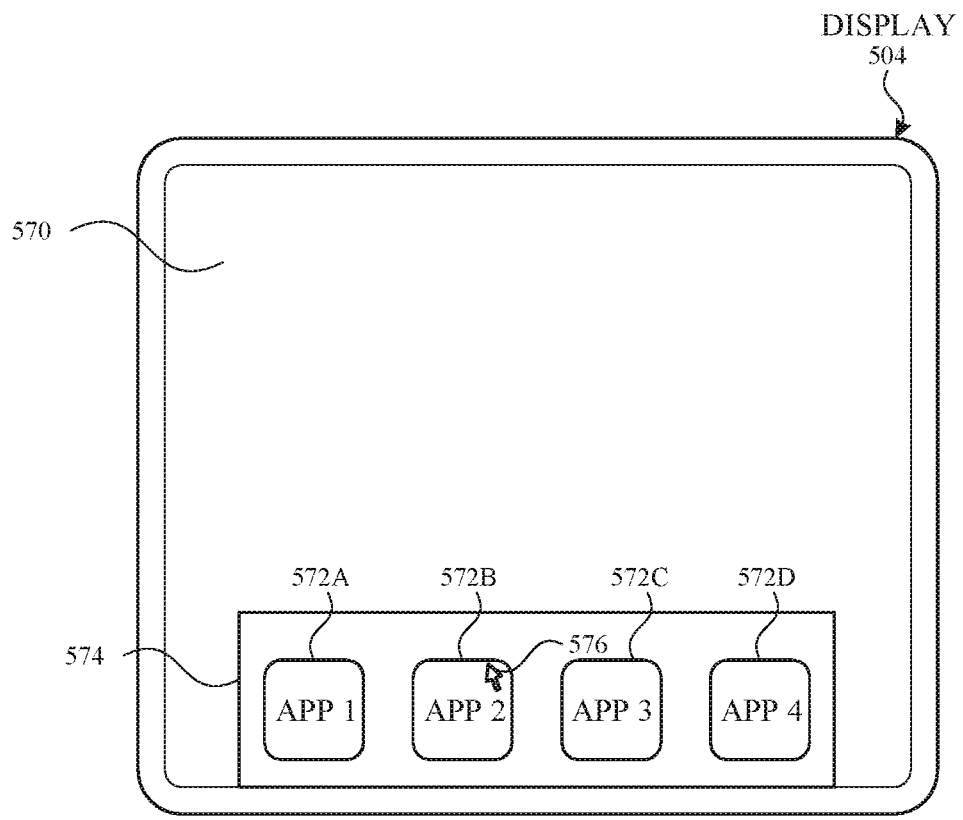
FIGS. 5E-5H illustrate exemplary components and user interfaces of a personal electronic device in accordance with some embodiments.
Figure 5E:
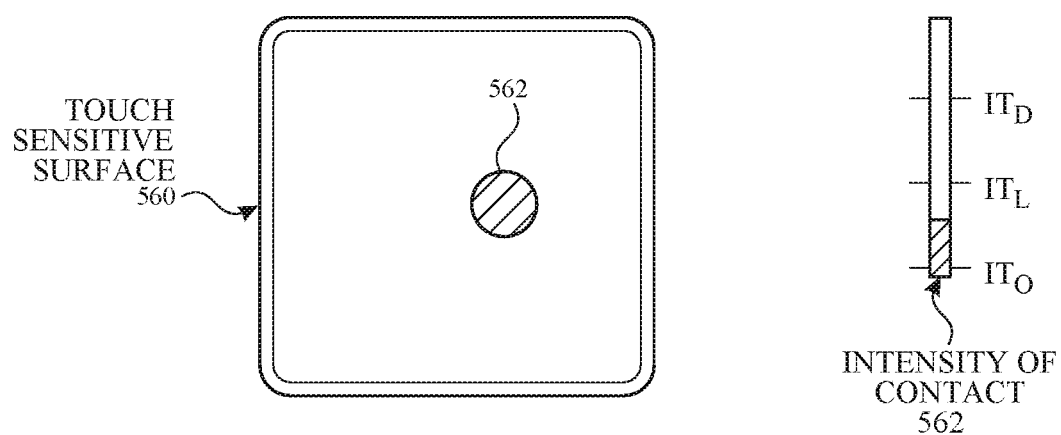
Figure 5F:
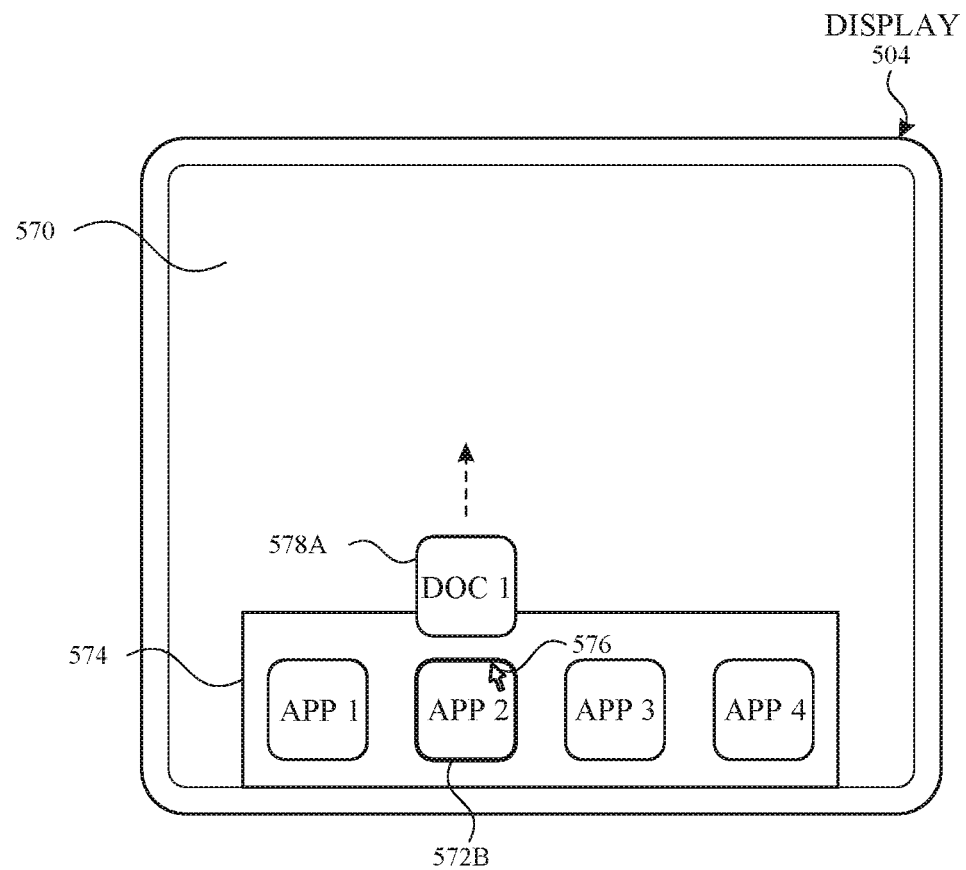
Figure 5F:
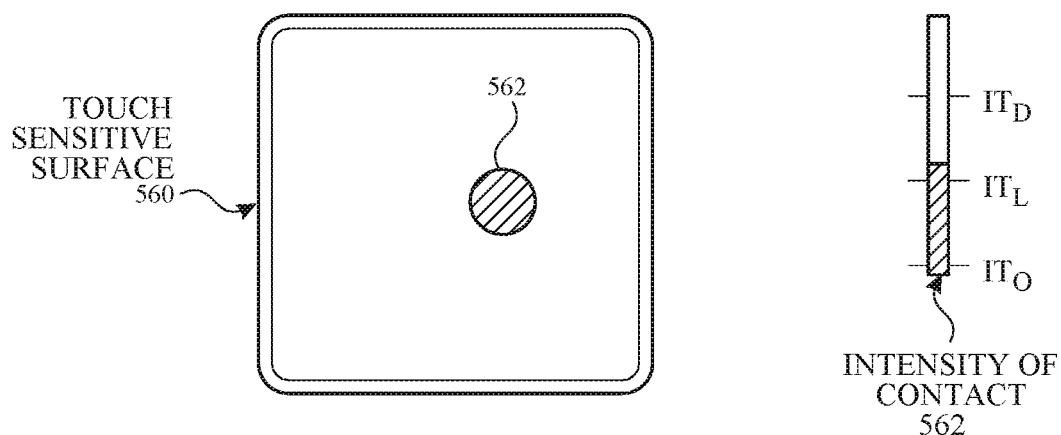
Figure 5G:
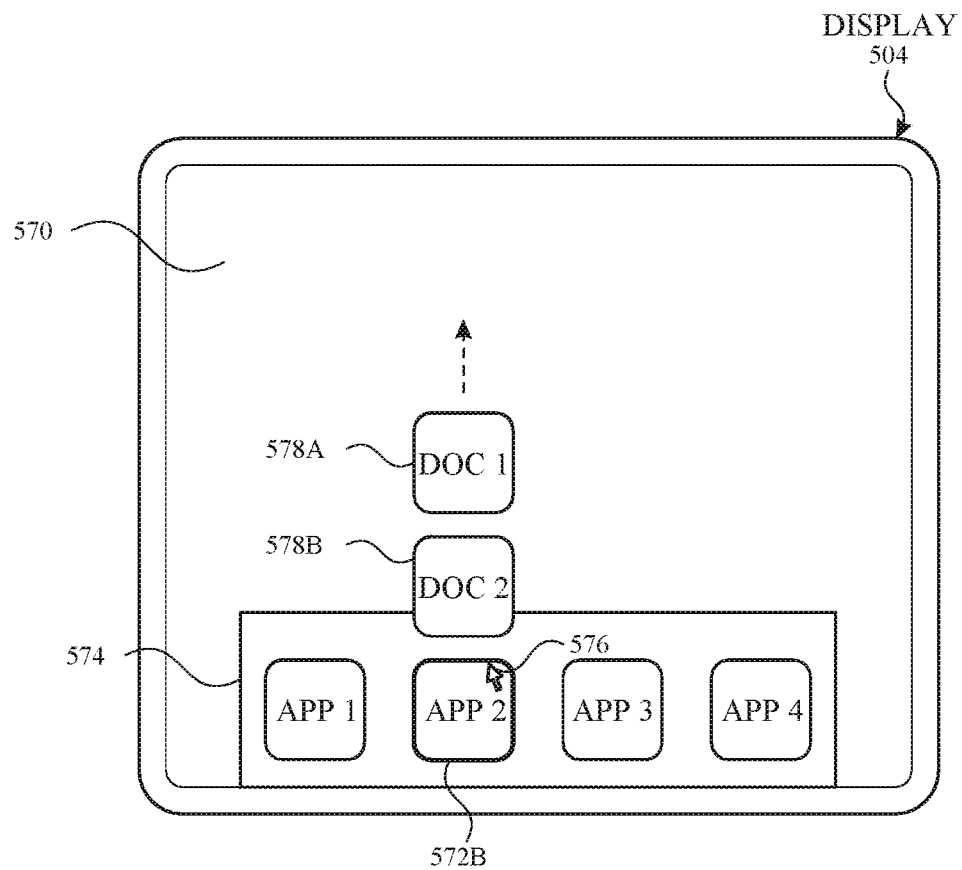
Figure 5G:
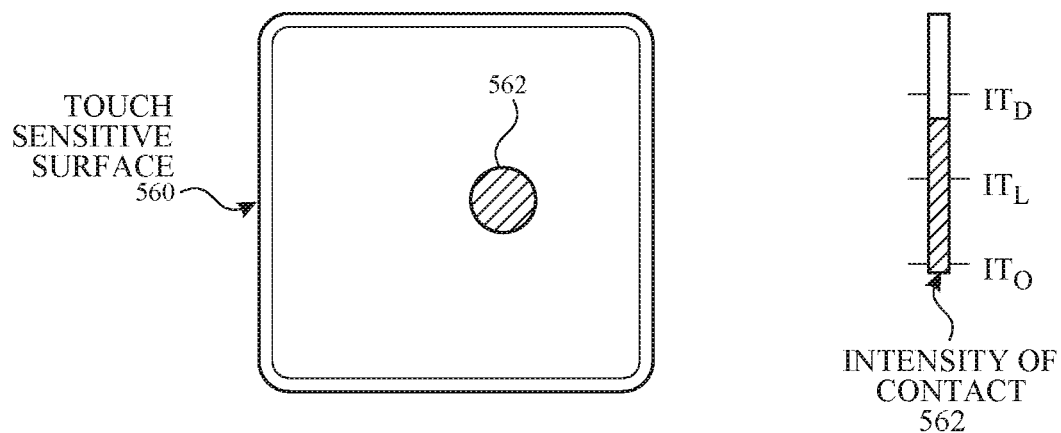
Figure 5H:
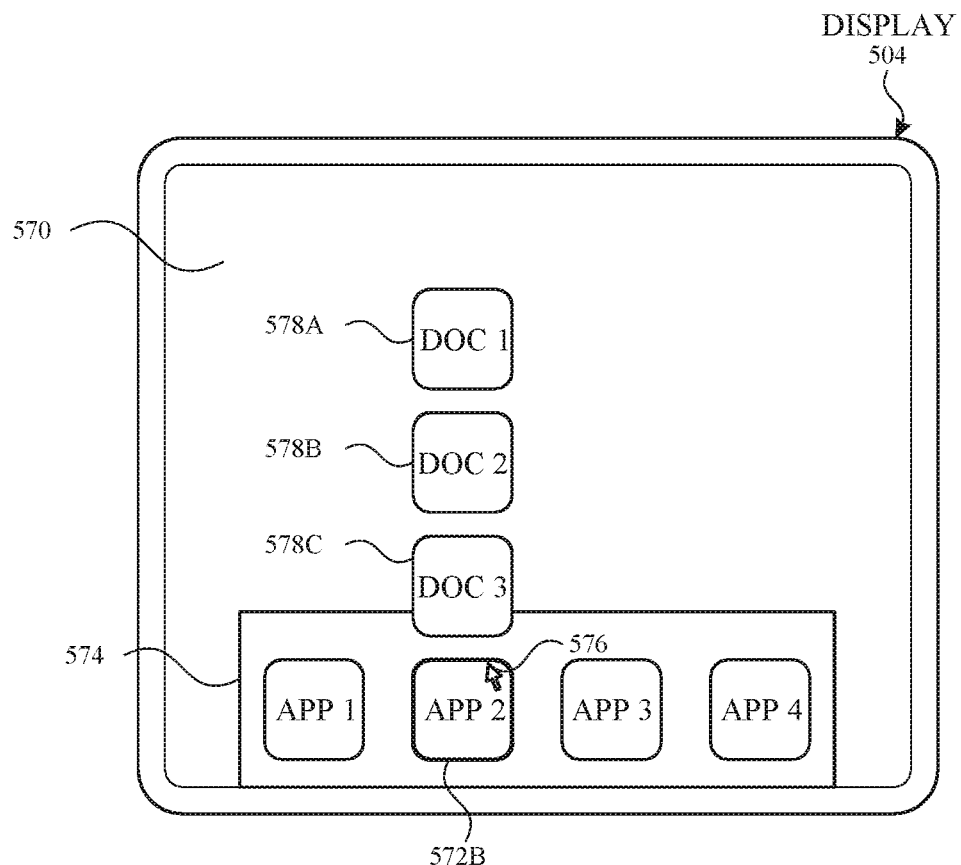
Figure 5H:
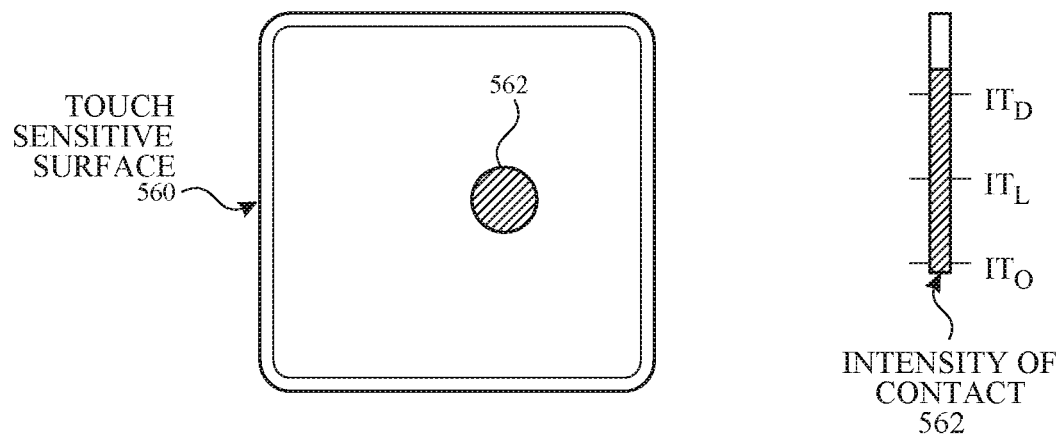

FIGS. 5E-5H illustrate detection of a gesture that includes a press input that corresponds to an increase in intensity of a contact 562 from an intensity below a light press intensity threshold (e.g., "IT$_L$") in FIG. 5E, to an intensity above a deep press intensity threshold (e.g., "IT$_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT$_D$"). Contact 562 is maintained on touch-sensitive surface 560. In response to the detection of the gesture, and in accordance with contact 562 having an intensity that goes above the deep press intensity threshold (e.g., "IT$_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT$_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of providing context-specific user interfaces and associated processes that may be implemented on a portable multifunction device with a display and a touch-sensitive surface, such as devices 100, 300, and/or 500 (FIGS. 1A, 3, and/or 5A).

The following examples illustrate exemplary embodiments of context-specific user interfaces. Described herein are overall concepts related to interactive and/or customizable context-specific user interfaces. It is noted that the context-specific user interfaces described herein are editable in a number of ways. A user interface may display or otherwise indicate various types of information related to time, and the type(s) of information may be customizable by the user. A user interface may include aspects such as colors, density of display, and complications (or lack of complications) that are also customizable. As used here, consistent with its accepted meaning in art, a complication refers to any clock face feature other than those used to indicate the hours and minutes of a time (e.g., clock hands or hour/minute indications). Complications may provide different types of information to a user, such as data obtained from an application, and the information conveyed to a user by a complication is also customizable, as described below. In some embodiments, a complication may also serve as an affordance for launching an application. Additional descriptions of context-specific user interfaces, as well as features thereof and techniques related thereto (e.g., editing and/or selecting context-specific user interfaces), are found in International Patent Application Serial No. PCT/US2015/034604, titled "Context-Specific User Interfaces," filed Jun. 7, 2015, published as WIPO Publication No. WO/2016/022203; International Patent Application Serial No. PCT/US2015/034606, titled "Context-Specific User Interfaces," filed Jun. 7, 2015, published as WIPO Publication No. WO/2016/022204; and International Patent Application Serial No. PCT/US2015/034607, titled "Context-Specific User Interfaces," filed Jun. 7, 2015, published as WIPO Publication No. WO/2016/022205; each of which is incorporated by reference herein in its entirety.

As described supra, users may wish to view different types of information in different contexts (e.g., throughout the day) using a portable multifunction device. Widgets dedicated to a particular application can display specific sets of information from the application, but if the user is not interested in that information or application at a particular time, the information is taking up screen "real estate" that could be used to provide more immediately relevant information. Therefore, providing application information based on temporal context, and/or not limited by the particular application from which the information is obtained, provides a more efficient interface that allows the user to view the right information at the right time, thereby reducing the number of inputs required to access the information, decreasing demands on battery life (e.g., to power the display), and making more efficient use of screen "real estate."

Figure 6A:
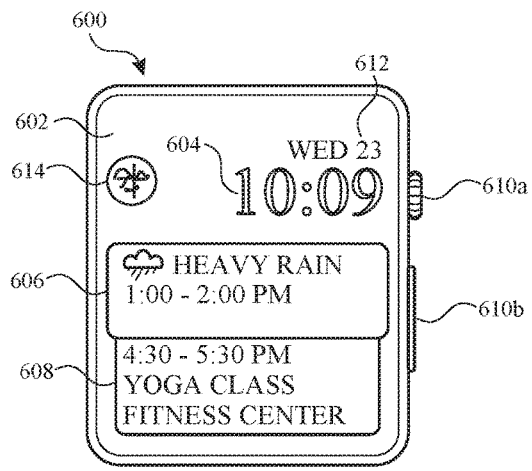
FIGS. 6A-6V illustrate exemplary context-specific user interfaces.

FIGS. 6A-6V show exemplary context-specific user interfaces that may be operated on device 600. Device 600 may be device 100, 300, or 500 in some embodiments. The electronic device has a display 602 (e.g., 504). In some embodiments, display 602 is a touch-sensitive display. In some embodiments, device 600 includes rotatable input mechanism 610a (e.g., 506) and/or input mechanism or button 610b (e.g., 508).

In FIG. 6A, device 600 displays a context-specific user interface on display 602. This exemplary context-specific user interface includes current time indicator 604 (e.g., a digital clock). Indicator 604 can optionally include a variety of features or aspects that are independently editable or configurable by the user.

In addition, the context-specific user interface also includes complications 612 614. In some embodiments, complications 612 and/or 614 obtain data and display information from one or more applications. In some embodiments, the displayed information can be updated, e.g., in accordance with updates to data obtained from the application. For example, as shown in FIG. 6A, complication 612 can display information from a calendar application (e.g., date and/or day of the week). In some embodiments, complication 614 does not display information updated in accordance with updates to data obtained from the application, but rather displays a static representation of the application.

The user interface screen displayed in FIG. 6A also includes platters 606 and 608. Platters 606 and 608 are each associated with an application. In this example, platter 606 is associated with a weather application, and platter 608 is associated with a calendar application. Platter 606 displays a set of information obtained from the weather application: the time of a predicted change in weather conditions or time of predicted inclement weather conditions, as well as textual and graphical indications of the weather conditions. Platter 608 displays a set of information obtained from the calendar application: the time of an upcoming calendar event, and indications of the event name and location. Platter 606 is displayed as larger and/or appearing closer to the user to emphasize its information (e.g., its temporal context (1:00-2:00 PM) is closer to the current time (10:09) than the temporal context of platter 608 (4:30-5:30 PM)).

Both platters 606 and 608 display information related to a temporal context of the current day. As used herein, a "temporal context" can relate to a time attached to a set of information by the user (e.g., the time of a calendar event), a time attached to a set of information by an external data source (e.g., the time of a predicted change in weather, based on data obtained from an external server), or a time attached to a set of information by an electronic device of the present disclosure (e.g., device 600). For example, as described in greater detail infra, device 600 can designate a time of day to surface a set of information to the user, such as a reminder to breathe or engage in exercise.

Platters 606 and 608 are selected by device 600 for display based, at least in part, on temporal context of the current day. Each represents a different application. Thus, information obtained from various applications can be presented to the user and optionally ordered by temporal context. This allows the user to view information obtained from one or more applications at a glance when it is relevant, rather than allocating screen "real estate" to dedicated information and/or applications that are not equally relevant throughout the day. In some embodiments, concurrently displayed platters can represent the same application (e.g., two platters representing sets of calendar application-related information related to different temporal contexts).

Figure 6B:
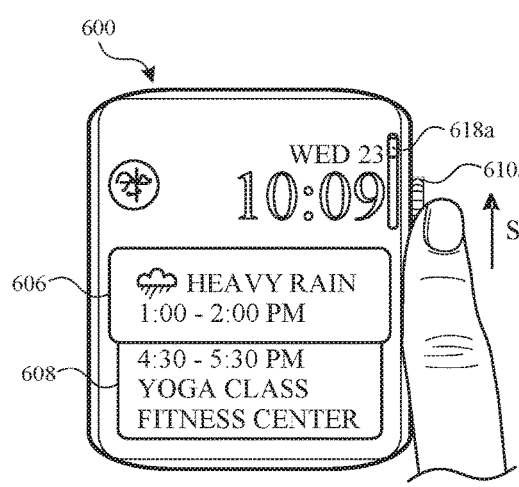

To view information related to later temporal contexts, the user rotates the rotatable input mechanism 610a (e.g., scroll 616a; FIG. 6B). Scroll indicator 618a is also displayed adjacent to 610a on display 602 to indicate to the user how many platters are displayable, and the position of the currently displayed platter(s) in a series of displayable platters. In some embodiments, scroll indicator 618a is displayed in response to detecting scroll 616a, thereby indicating to the user that additional information can be viewed using rotational inputs through rotatable input mechanism 610a.

Figure 6C:
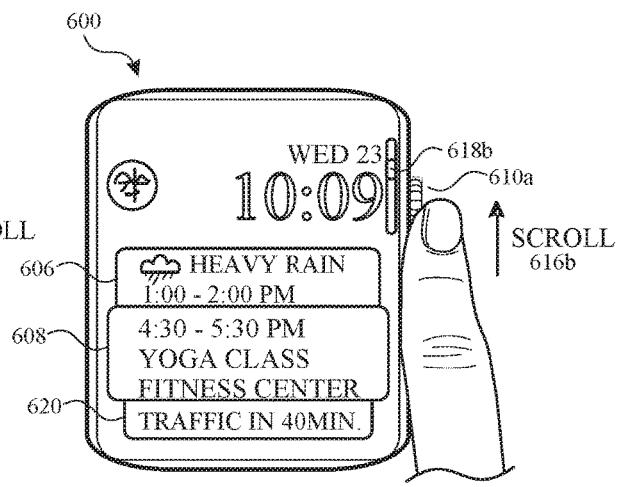

In response to detecting scroll 616a, as shown in FIG. 6C, platters 606 and 608 are translated on-screen, and platter 608 now appears larger and/or closer to the user. In addition, platter 620 is displayed at the bottom of display 602. Platter 620 is associated with a navigation application and displays a set of information obtained from the navigation application (e.g., the time of a predicted change in traffic conditions, such as a time of worsening predicted traffic or a typical time of day when the user is driving or taking public transportation). Platter 620 displays information related to a temporal context of the current day at the same time or later than the set of information shown in platter 608. The scroll indicator (e.g., 618b) is also updated to indicate the position of platter 608 in the series. In some embodiments, scroll indicator 618b is displayed in response to detecting scroll 616a, thereby indicating to the user that additional information can be viewed using rotational inputs through rotatable input mechanism 610a.

Figure 6D:
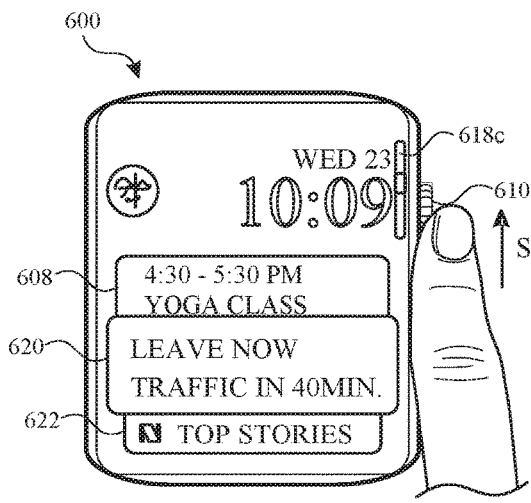

The user again rotates 610a (e.g., scroll 616b; FIG. 6C). In response to detecting scroll 616b, device 600 ceases to display platter 606 and displays platter 608 at the former position of platter 606 (e.g., by translating 608 on-screen; FIG. 6D). In addition, platter 620 is displayed at the former position of platter 608 at a larger size and/or appearing closer to the user. In some embodiments, platter 620 displays additional information in this display position, such as the "leave now" text to let the user know that their commute home is predicted to be disrupted by traffic in 40 minutes. Platter 622, associated with a news application, is displayed at the former position of platter 620. The scroll indicator (e.g., 618c) is also updated to indicate the position of platter 620 in the series.

Figure 6E:
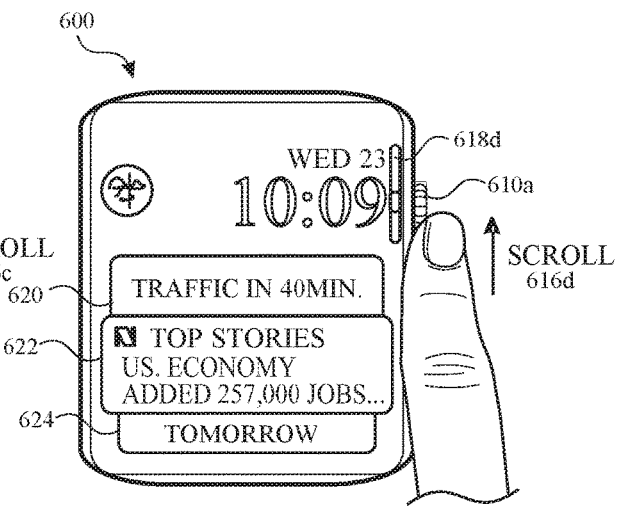

The user again rotates 610a (e.g., scroll 616c; FIG. 6D). In response to detecting scroll 616c, device 600 ceases to display platter 608 and displays platter 620 at the former position of platter 608 (e.g., by translating 620 on-screen; FIG. 6E). In addition, platter 622 is displayed at the former position of platter 620 at a larger size and/or appearing closer to the user. In some embodiments, platter 622 displays additional information in this display position, such as the top headline of the day. A partial view of platter 624, representing tomorrow's calendar events, is also displayed. The scroll indicator (e.g., 618d) is also updated to indicate the position of platter 622 in the series.

Figure 6F:
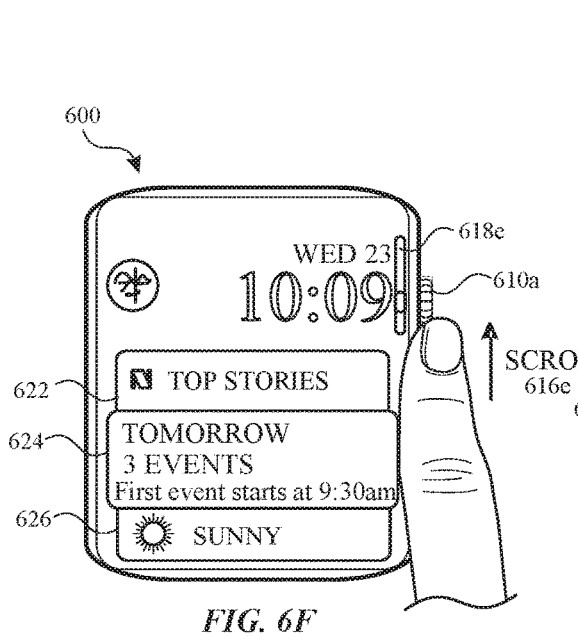

Platters 606, 608, 620, and 622 display sets of information obtained from various applications that relate to temporal context(s) of the current day. Platter 624 indicates to the user that information related to the next day is also displayable. The user rotates 610a (e.g., scroll 616d; FIG. 6E), and in response to detecting scroll 616d, the display is updated as shown in FIG. 6F. In FIG. 6F, device 600 ceases to display platter 620, displays 622 in the former position of 620, and displays a full view of platter 624. Platter 624 is associated with the calendar application and displays information obtained therefrom: an indication of the number of calendar events scheduled for tomorrow, and the time of the first calendar event scheduled for tomorrow. A partial view of platter 626, representing tomorrow's predicted weather, is also displayed. The scroll indicator (e.g., 618e) is also updated to indicate the position of platter 624 in the series.

Figure 6G:
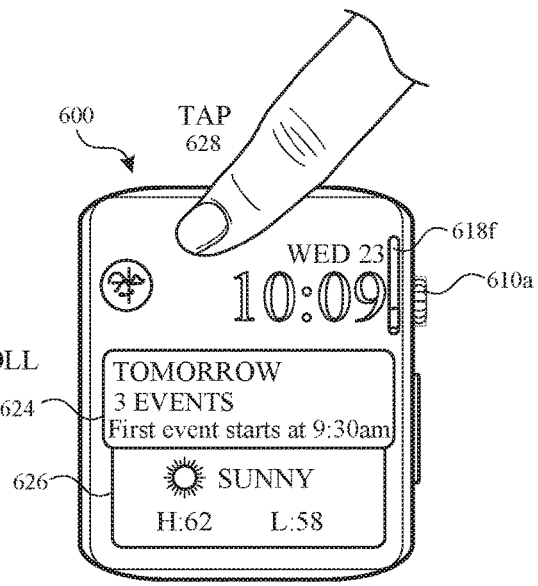

The user rotates 610a (e.g., scroll 618e; FIG. 6F) in order to view all of platters 624 and 626. As shown in FIG. 6G, platter 626 displays textual and graphical depictions of the weather conditions predicted for tomorrow, as well as the predicted high and low temperatures. The scroll indicator is also updated to indicate the position of platter 626 in the series (e.g., 618f). In some embodiments, as shown in FIG. 6G, platters 624 and 626 do not display sets of information related to discrete temporal contexts of tomorrow, but rather display information related to tomorrow generally, or related to multiple contexts of tomorrow. In some embodiments, platters associated with the current day display sets of information related to discrete temporal contexts of the current day (e.g., single calendar events or weather notifications), whereas platters associated with tomorrow display sets of information related to multiple temporal contexts of tomorrow or the majority of tomorrow (e.g., a summary of multiple calendar events or a summary of the entire day's weather).

In order to return to the current time view, the user taps display 602 (e.g., tap 628). In response to detecting tap 628, device 600 displays ceases to display platters 624 and 626 and displays platters 606 and 608 (FIG. 6H). Indicator 618a is also updated accordingly to reflect the position of platter 606 along the series of displayable platters. In some embodiments, the user returns to the user interface screen shown in FIG. 6H by scrolling in the opposite direction (e.g., by rotating 610a through rotational inputs in the opposite directions of scrolls 616a, 616b, 616c, 616d, and 616e).

In some embodiments, rather than scrolling the user interface screens by rotating 610a, the user swipes display 602 to scroll the user interface screens and navigate through temporal context. For example, in response to detecting swipe 630a, device 600 translates platters 606 and 608, displays platter 620, and updates scroll indicator 618b (FIG. 6I). FIGS. 6I and 6C demonstrate that swiping display 602 can be used interchangeably with rotating 610a to scroll the user interface (e.g., in either direction, as described herein).

Figure 6J:
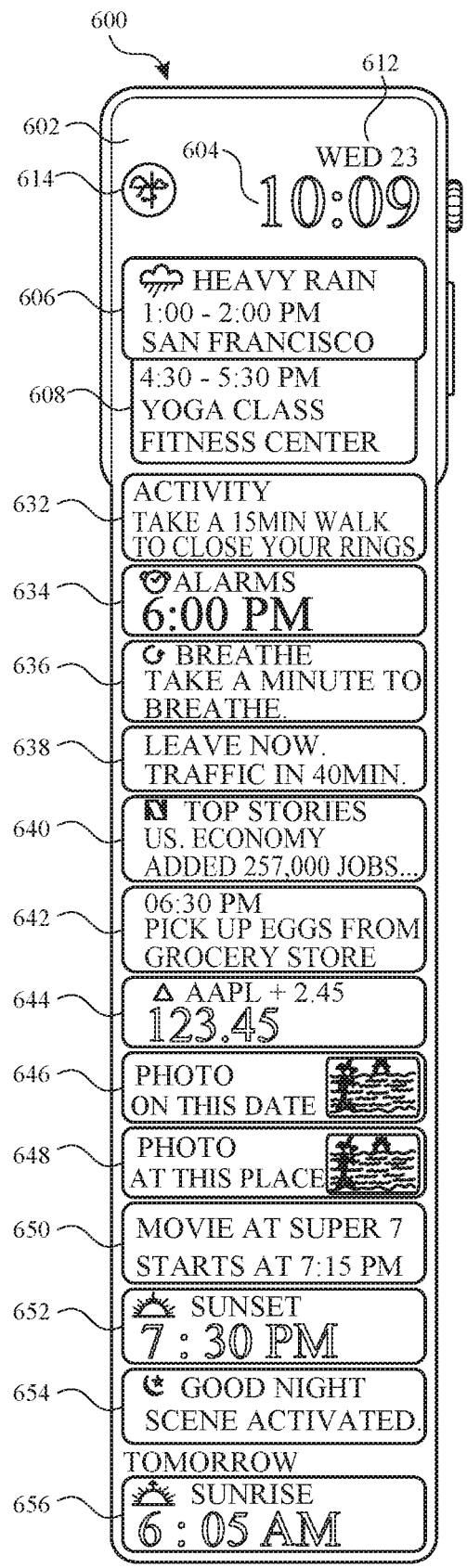

FIG. 6J illustrates exemplary platters 606, 608, 634, 636, 638, 640, 642, 644, 646, 648, 650, 652, 654, and 656 that can be displayed on display 602. For example, platter 632 is associated with an activity application and displays a reminder to engage in a type of physical activity for a particular duration to meet an exercise goal; platter 634 is associated with an alarm application and displays the time of an upcoming saved alarm; platter 636 is associated with a breathe reminder application and displays a reminder to breathe/meditate; platter 638 is associated with a navigation application and displays an indication of predicted traffic conditions; platter 640 is associated with a news application and displays a headline; platter 642 is associated with a reminder application and displays a reminder and its designated time; platter 644 is associated with a stocks application and displays a stock, its closing price, and recent stock activity; platter 646 is associated with a photos application and displays a user photo; platter 648 is associated with a photos application and displays a user photo; platter 650 is associated with a wallet application and displays a purchased movie ticket; platter 652 is associated with a sunrise/sunset application and displays the time of today's sunset; platter 654 is associated with a home application and displays an affordance for activating a stored setting for one or more home devices (e.g., lights, curtains, music, door/window locks, etc.); and platter 656 is associated with a sunrise/sunset application and displays the time of tomorrow's sunrise.

Device 600 can use a variety of selection criteria, alone or in any combination, to select what set(s) of information are surfaced to the user in a platter, as illustrated by FIG. 6J. In some embodiments, the set of selection criteria includes temporal context of the set of information. For example, a calendar event (e.g., as shown in platter 608), weather notification (e.g., as shown in platter 606), reminder (e.g., as shown in platter 642), alarm, (e.g., as shown in platter 634), photo (e.g., a photo taken on a previous date on the current day of the month or year, as shown in platter 646), sunset/sunrise time (e.g., as shown in platters 652 and 656), or closing stock price (e.g., as shown in platter 644) can be selected for display because they relate to a current or upcoming time (e.g., in the current day).

In some embodiments, the selection criteria includes temporal context of the set of information and one or more additional selection criteria. In some embodiments, whether a set of information obtained from an application is displayed in a platter is determined based on data obtained from multiple applications. For example, information can be surfaced to the user because it relates to a particular application and a set of selection criteria are met, determined based on data from another application; an activity platter can be selected for display because the displayed reminder relates to the activity application (e.g., based on data related to the user's daily activity goal) and a set of criteria are met based on data from the calendar application (e.g., a predetermined amount of time until the next scheduled calendar event). In some embodiments, the selection criteria includes proximity to a second device (e.g., device belonging to a contact).

In some embodiments, the selection criteria can include time until the next scheduled calendar event. In this example, the temporal context relates to a time of day when device 600 surfaces this set of information to the user. If the user has sufficient time between scheduled events, the device can surface a reminder from the activity application (e.g., platter 632) because the user has time for a workout or other activity. In some embodiments, the selection criteria can include a number of calendar events scheduled for the current day. Platter 636 can be displayed because the set of information relates to a different temporal context and the breathe reminder application. In this instance, device 600 can surface a breathe reminder to the user because several consecutive calendar events have been concluded, and thus the user may wish to take a minute to breathe and recover. In some embodiments, the selection criteria can include the application from which the information is obtained. For example, device 600 can select an activity reminder (e.g., as shown in platter 632) because an activity goal for the day is still outstanding, or device 600 can select a breathe reminder because the day's scheduled calendar events have concluded (as described above). These functionalities allow the device to surface sets of information from various applications at times when the user may wish to use these functionalities, rather than at a predetermined time designated by the user or an external data source.

In some embodiments, the selection criteria can include location information. For example, platter 650 can be displayed because the set of information (a movie ticket) relates to a temporal context (upcoming showtime during the current day; 7:15 pm in this example) and location (e.g., device 600 is close to the movie theater). Platter 638 can be displayed because the set of information (traffic conditions) relates to a temporal context (a time of day when the user typically begins their commute, or the time of day most common for commuting generally) and location (e.g., device 600 is close to the work, not home, and the predicted traffic is between work and home). Platter 648 can be displayed because it relates to location (e.g., device 600 is near the location where a previous user photo was taken). In some embodiments, device 600 obtains data representing its current location from a location sensor associated with device 600 (e.g., GPS sensor 532 of device 600, or GPS module 135 of device 100 paired or coupled via wireless communication with device 600). In some embodiments, the location information is obtained from another application, such as a calendar application. For example, the device can display a platter with a set of information (e.g., weather conditions) from a weather application pertaining to the location of an upcoming calendar event. If the user is in San Francisco, but has a calendar event or plane ticket to New York later in the day, the device can display a platter with weather information related to New York.

In some embodiments, the selection criteria can include one or more previous user inputs. For example, platter 654 can be displayed prior to a time of day when the user has previously used the home application (e.g., at bedtime). Platter 638 can be displayed prior to a time of day when the user has previously started their commute. In this example, the user input can be a movement of the device corresponding to the user traveling home, e.g., one or more inputs received from GPS sensor 532, accelerometer 534, directional sensor 540 (e.g., compass), gyroscope 536, motion sensor 538, and/or a combination thereof.

Figure 6K:
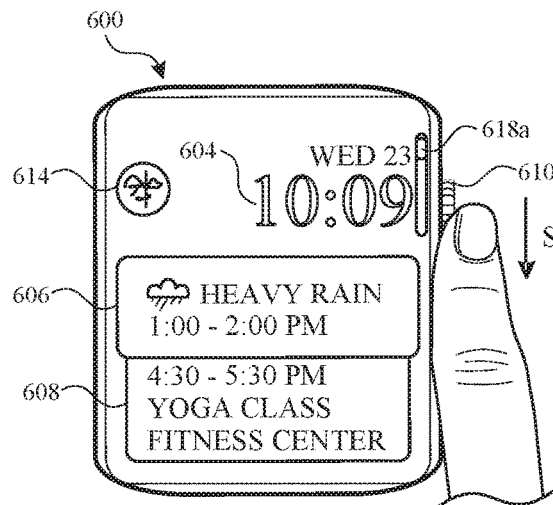

In addition to displaying sets of information related to particular temporal contexts of the current day, these context-specific user interfaces can also display sets of information related to the current day, e.g., independent of a specific temporal context, or related to a majority of the current day. These "all-day" events are also accessible by scrolling the user interface. As shown in FIG. 6K, when platters 606 and 608 are displayed (e.g., the current time view), the user rotates 610a in the direction opposite scroll 616a (e.g., scroll 658a).

Figure 6L:
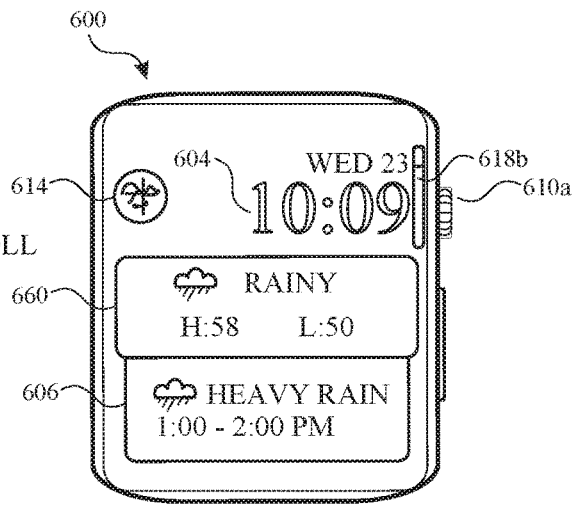

In response to detecting scroll 658a, the device 600 displays the screen shown in FIG. 6L. Platter 606 is translated on-screen, scroll indicator 618b is updated, and "all-day" platter 660 is displayed. Platter 660 is associated with a weather application and displays a set of information related to the entire current day (e.g., predicted weather conditions and high and low temperatures forecasted for the current day).

Figure 6M:
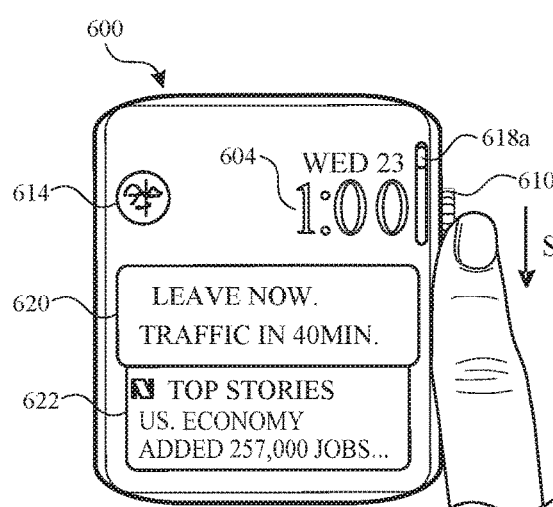

Later in the day, display 602 shows platters 620 and 622 (FIG. 6M). Current time indicator 604 has been updated in FIG. 6M to reflect the current time. Compared to the screen shown in FIG. 6K, the screen shown in FIG. 6M shows different events because the current time is later (e.g., 1:00 as compared to 10:09). Since the sets of information displayed in platters 620 and 622 are now most current at 1:00, these platters are displayed instead of platters 606 and 608. Thus, different platters can be displayed to the user at different times of day. In some embodiments, platters displaying sets of information related to past times in the current day cease to display on display 602. In some embodiments, one platter corresponding to the most recent past event is displayed.

Figure 6N:
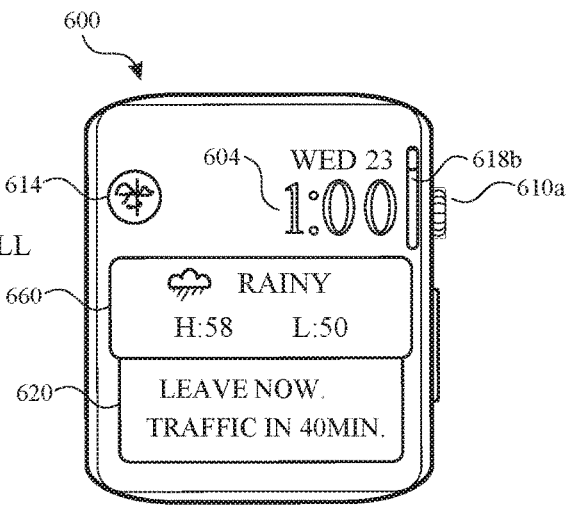

The user scrolls the user interface by rotating 610a via scroll 658b. In response to detecting scroll 658b, the device displays the screen shown in FIG. 6N. As shown in FIG. 6N, device 600 displays platters 620 and 660. Thus, the user can access information from "all-day" platters (e.g., 660) at any time in the current day, while event-specific platters (e.g., 606 or 620) can be displayed based on specific temporal contexts within the current day. In summary, scrolling the user interface screen (e.g., by rotating 610a and/or swiping) in one direction reveals future event platters related to the current day and/or the next day (see FIGS. 6B-6I), and scrolling the user interface screen (e.g., by rotating 610a and/or swiping) in the other direction reveals "all-day" event platters related to the current day (see FIGS. 6K-6N).

In some embodiments, one or more "all-day" event platters can be selected (e.g., by the device) for display based on one or more selection criteria, e.g., as described above. For example, platter 660 can be surfaced to the user because it relates to a location (e.g., all-day weather conditions at the current location of the device) and/or the application from which the set(s) of information are obtained (e.g., showing an all-day weather platter).

Figure 6O:
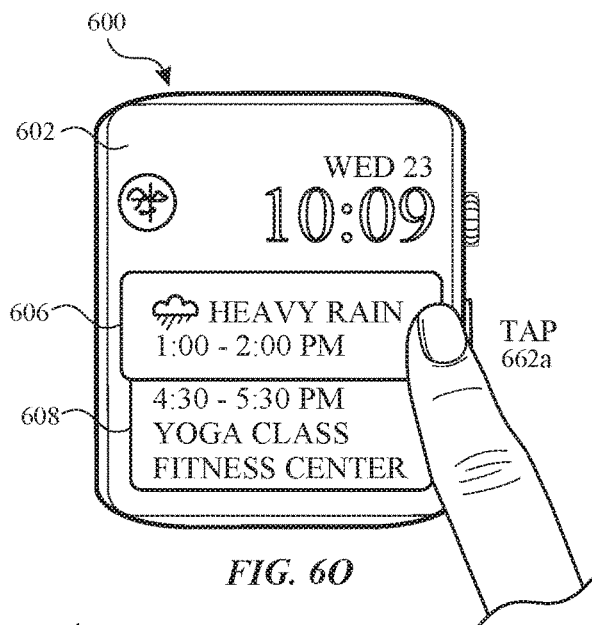
Figure 6P:
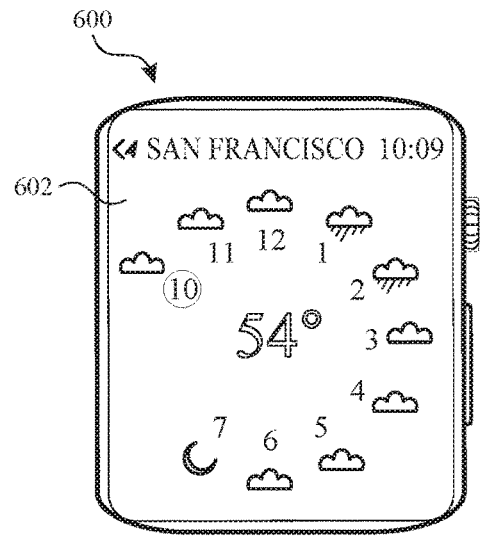

In some embodiments, in addition to or in place of displaying sets of information obtained from the corresponding application, event and all-day platters can also serve as affordances to launch the corresponding application. In FIG. 6O, the user contacts displayed platter 606 with tap 662a. In response to detecting tap 662a, device 600 ceases to display platter 606 and displays a user interface screen from the corresponding application (in this example, a weather application; FIG. 6P).

Figure 6Q:
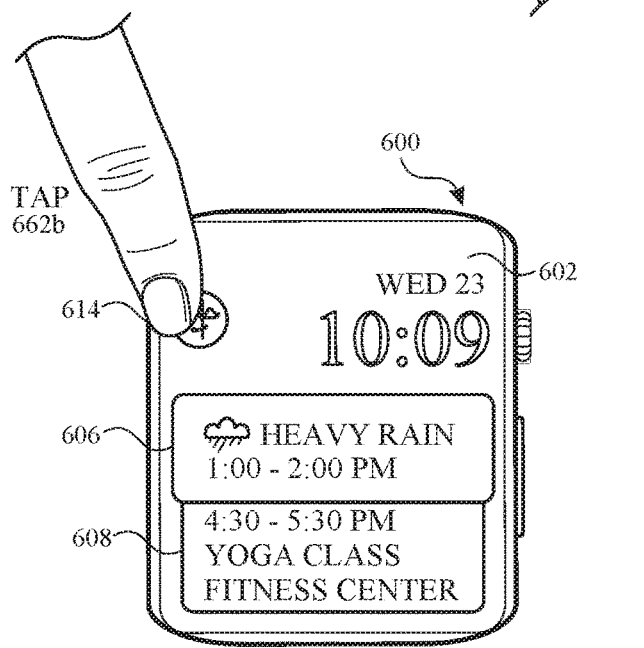
Figure 6R:
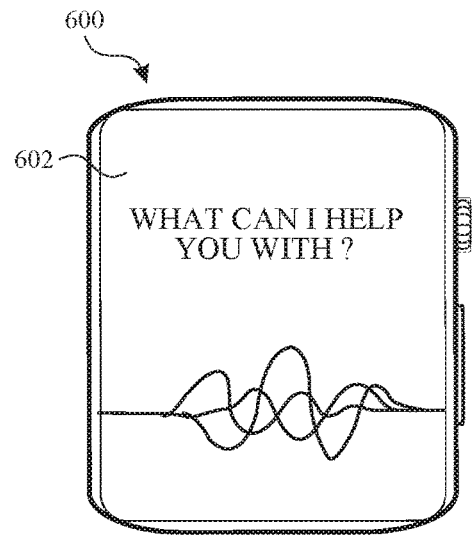

The user can also select displayed complications to launch applications. In FIG. 6Q, in order to launch a personal assistant application, the user contacts displayed complication 614 with tap 662b. In response to detecting tap 662b, device 600 ceases to display complication 614 and displays a user interface screen from the corresponding application (FIG. 6R). In some embodiments, complication 614 is "pinned" to the user interface screen such that it remains displayed (and optionally in a fixed position) while the event and/or all-day platters are scrolled (see FIGS. 6B-6N). This allows the user to use the complication at any time, regardless of which event platters are shown. In some embodiments, the personal assistant application is launched to reflect a context of a currently running application, or the most recently launched application.

The user may wish to edit the application represented by complication 614 and/or other aspects of the user interface, such as colors, density of displayed information, and so forth. Additional descriptions of editing and/or selecting context-specific user interfaces and sub-components thereof may be found in International Patent Application Serial No. PCT/US2015/034607, titled "Context-Specific User Interfaces," filed Jun. 7, 2015, published as WIPO Publication No. WO/2016/022205, which is incorporated by reference herein in its entirety.

In FIG. 6S, the user accesses an edit mode of device 600 through press 664, which in some embodiments can be a press having a duration longer than a predetermined duration (e.g., a "long press" input) or a contact having a characteristic intensity above an intensity threshold. In this example, in response to detecting press 664, device 600 enters a context-specific user interface selection mode and visually distinguishes the user interface screen to indicate the selection mode (FIG. 6T). Device 600 alerts to the user that it has entered into the selection mode by displaying smaller representation 666 of the user interface screen, name 668 corresponding to a name of the type of context-specific user interface currently selected, partial view 670 of an adjacent, stored context-specific user interface (which the user could select by swiping to view the full interface and tapping to select it), and edit affordance 672. In order to edit the user interface, the user contacts edit affordance 672 via tap 674.

In response to detecting tap 674, the device enters edit mode and visually distinguishes one or more aspects of the user interface for editing (FIG. 6U). In this example, complication 614 is selected for editing. Device 600 informs the user that complication 614 is selected for editing by visually distinguishing complication 614 via displaying outline 676a around complication 614 and indicator 676b, which indicates the application represented by the complication (in this example, the personal assistant application). Device 600 also displays scroll indicator 680a, which informs the user that additional applications can be selected by scrolling and indicates the position of the personal assistant application along the series of displayable application options. Device 600 also displays paging affordance 678, which indicates that two options for editing different aspects of the user interface can be selected (e.g., by swiping). In this example, the options include the application represented by complication 614 and one or more colors associated with the user interface (e.g., one or more colors of the current time indicator and/or displayed platters).

In response to detecting scroll 682 (a rotation of 610a), device 600 replaces complication 614 with complication 684, which represents a remote application (FIG. 6V). In addition, indicator 676b is updated to indicate the remote application, and scroll indicator 680b is updated to reflect the position of the remote application along the series of selectable application options. In some embodiments, in response to detecting one or more additional inputs, device 600 displays a user interface screen based on the display 602 shown in FIG. 6V (e.g., a depression of 610a followed by a tap on the displayed user interface in selection mode). In some embodiments, device 600 stores the edited user interface in memory (e.g., in memory 518 and/or memory 102 of device 100 paired or coupled via wireless communication with device 600). In some embodiments, the edited user interface screen can be subsequently selected in selection mode, e.g., as described in International Patent Application Serial No. PCT/US2015/034607, titled "Context-Specific User Interfaces," filed Jun. 7, 2015, published as WIPO Publication No. WO/2016/022205 (see, e.g., display 1322 in FIG. 13).

FIGS. 7A-7E show a flow diagram illustrating process 700 for providing context-specific user interfaces. In some embodiments, process 700 can be performed at an electronic device with a touch-sensitive display, one or more processors, and memory, such as device 100 (FIG. 1A), 300 (FIG. 3), 500 (FIGS. 5A-5H), or 600 (FIGS. 6A-6V). Some operations in process 700 can be combined, the order of some operations may be changed, and some operations can be omitted.

Figure 7A:
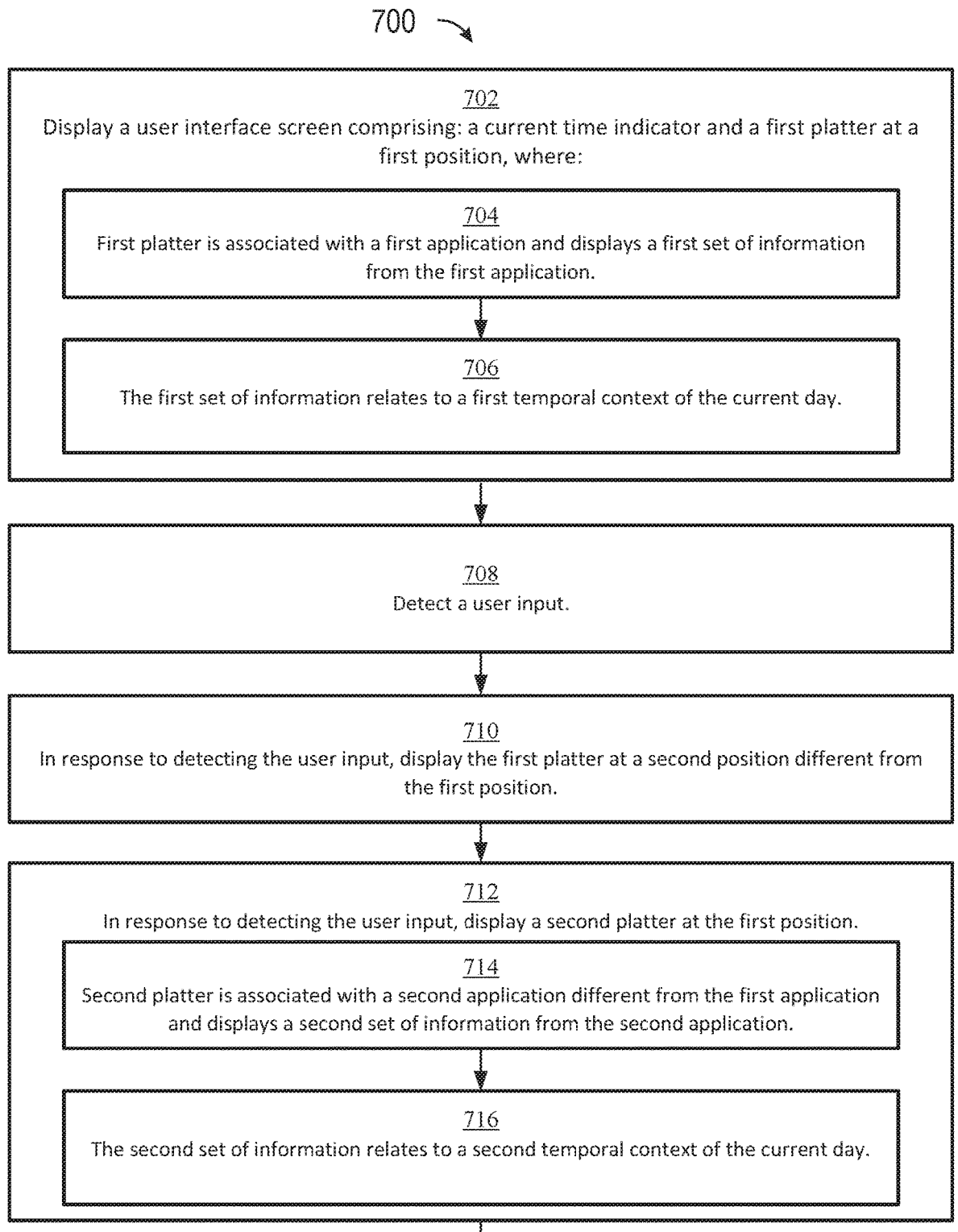
FIGS. 7A-7E illustrate a flow diagram depicting a process for providing context-specific user interfaces in accordance with some embodiments.

In FIG. 7A, at block 702, the device displays a user interface screen comprising a current time indicator and a first platter at a first position (e.g., on the display). As shown in block 704, the first platter is associated with a first application and displays a first set of information obtained from the first application (see, e.g., platter 608 in FIG. 6C, which is associated with a calendar application and displays the time, name, and location of a scheduled calendar event). As shown in block 706, the first set of information relates to a first temporal context of the current day (e.g., the time of the calendar event). As described above, a "temporal context" can relate to a time attached to a set of information by the user, a time attached to a set of information by an external data source, or a time attached to a set of information by an electronic device of the present disclosure.

At block 708, the device detects a user input. In some embodiments, detecting the user input comprises detecting a rotation of a rotatable input mechanism (e.g., scroll 616b in FIG. 6C). In some embodiments, detecting the user input comprises detecting a swipe on a touch-sensitive display (e.g., swipe 630a in FIG. 6H).

At block 710, in response to detecting the user input, the device displays the first platter at a second position different from the first position (cf. the position of platter 608 in FIGS. 6C and 6D). In some embodiments, the first platter is displayed at the second position at a larger size (e.g., appearing larger and/or closer to the viewer) than when displayed at the first position (cf. platter 608 in FIGS. 6C and 6D). In some embodiments, the first platter displays more information when displayed at the second position than when displayed at the first position (cf. platter 608 in FIGS. 6C and 6D).

At block 712, in response to detecting the user input, the device displays a second platter at the first position (e.g., platter 620 in FIG. 6D). As shown in block 714, the second platter is associated with a second application and displays a second set of information obtained from the second application (see, e.g., platter 620 in FIG. 6D, which is associated with a navigation application and displays the time of predicted traffic conditions). As shown in block 716, the second set of information relates to a second temporal context of the current day. In some embodiments, the first and the second applications are different. For example, in some embodiments, the first and the second applications are each an independently selected application selected from: weather, calendar, activity, breathe reminder, photos, reminder, and stocks applications. In some embodiments, the first and the second temporal contexts are different. In some embodiments, the first and the second temporal contexts are the same. Displaying sets of information obtained from different applications, throughout temporal contexts in the current day, provides the user with relevant application data (and optionally affordances for launching applications) from multiple applications without necessitating the display of multiple, dedicated application widgets (each dedicated to, and showing information obtained from, a single application). Providing additional control options without cluttering the user interface with additional displayed controls (e.g., dedicated application widgets) enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Figure 7B:
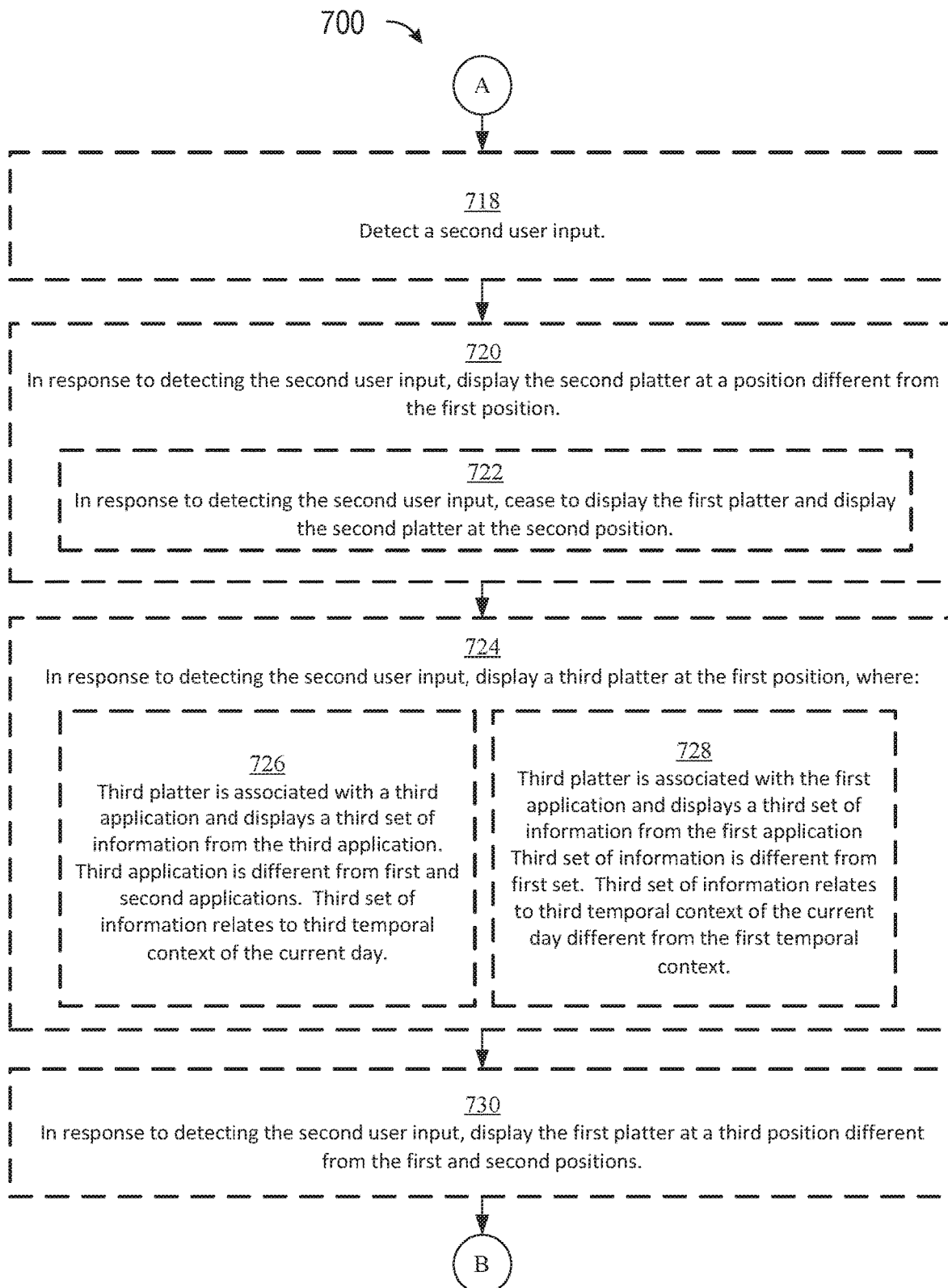

In FIG. 7B, at block 718, the device optionally detects a second user input (e.g., after displaying the second platter). In some embodiments, detecting the second user input comprises detecting a rotation of a rotatable input mechanism (e.g., scroll 616*c* in FIG. 6D). In some embodiments, detecting the second user input comprises detecting a swipe on a touch-sensitive display (e.g., swipe 630*a* in FIG. 6H).

At block 720, in response to detecting the second user input, the device optionally displays the second platter at a position different from the first position on the display (see platter 620 in FIG. 6E). As shown in block 722, in some embodiments, the device optionally ceases to display the first platter (see disappearance of platter 608 from FIG. 6D to FIG. 6E) before displaying the second platter (e.g., at the second position).

At block 724, in response to detecting the second user input, the device optionally displays a third platter at the first position (see platter 622 in FIG. 6E). In some embodiments, as shown in block 726, the third platter is associated with a third application and displays a third set of information obtained from the third application. The third application is different from the first and the second applications, and the third set of information relates to a third temporal context of the current day. In some embodiments, as shown in block 728, the third platter is associated with the first application and displays a third set of information obtained from the first application. The first and the third sets of information are different, the third set of information relates to a third temporal context of the current day, and the first and the third temporal contexts are different. This enables the device to display different sets of application information, each of which may be relevant at a different time of day, without requiring the user to launch the application(s) in order to access the multiple sets of information. Performing an operation when a set of conditions (e.g., relevant temporal context and/or particular application) has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 730, in response to detecting the second user input, the device optionally displays the first platter at a third position different from the first and the second positions on the display (see the positions of platter 620 in FIGS. 6C, 6D, and 6E).

Figure 7C:
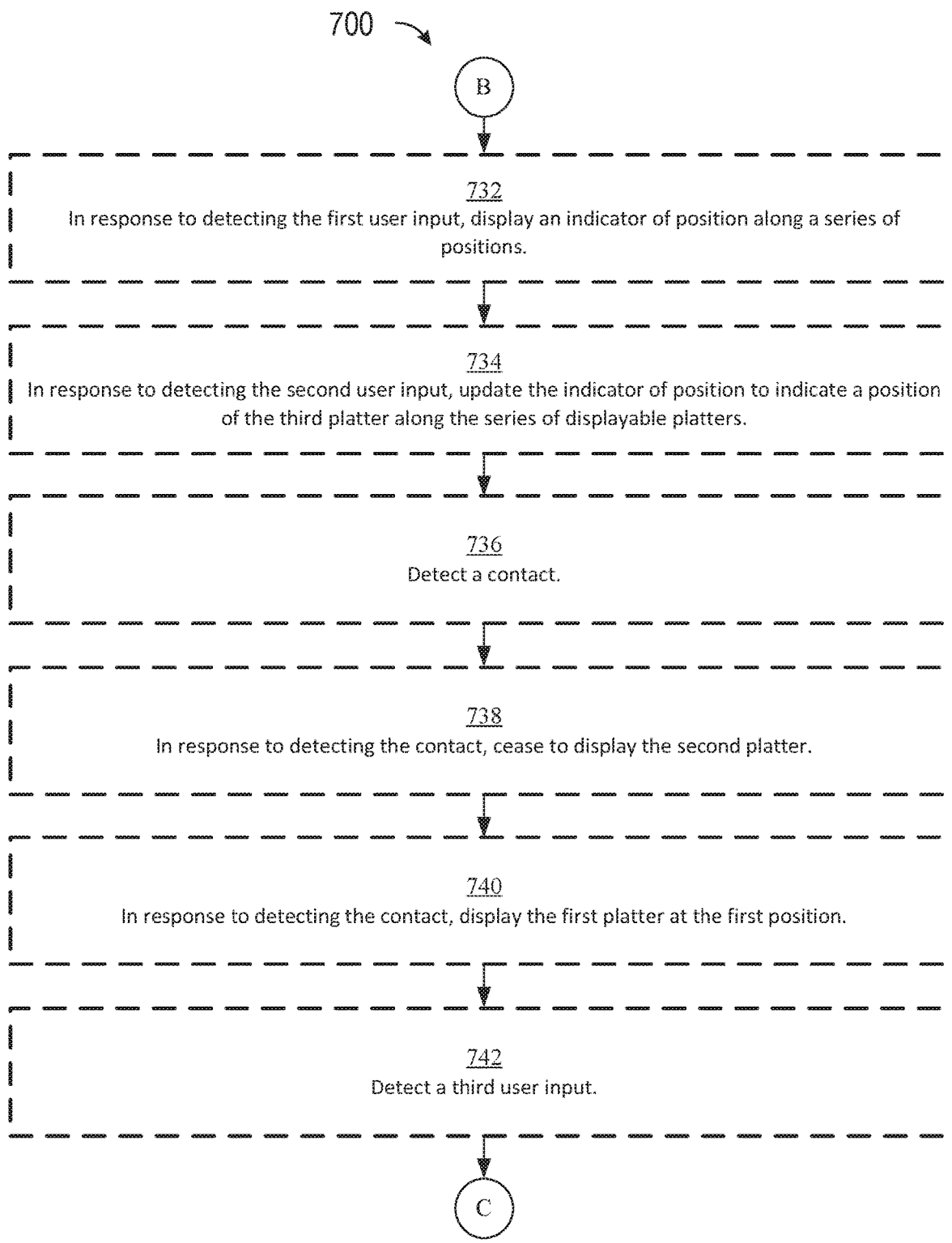

In FIG. 7C, at block 732, the device optionally displays on the display an indicator of position along a series of positions, e.g., in response to detecting the first user input (see indicator 618*b* in FIG. 6C). The indicator of position along a series of positions indicates a position of the second platter along a series of displayable platters.

At block 734, in response to detecting the second user input, the device optionally updates the indicator of position to indicate a position of the third platter along the series of displayable platters (cf. scroll indicators 618*a*-618*f* in FIGS. 6B-6G). Displaying an updating scroll indicator that indicates a position of a currently selected option along a series of selectable options provides feedback to the user that the received user input (e.g., rotating 610*a*) controls selection of the displayed option while helping the user to navigate through the entire series of options (as well as indicating to the user that additional options are displayable). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 736, the device optionally detects a contact (e.g., on the touch-sensitive display) after displaying the second platter. In some embodiments, the contact is at a position on the display different from the positions of the displayed platter(s) and/or complication(s). In some embodiments, the contact is a tap gesture (e.g., tap 628 in FIG. 6G).

At block 738, in response to detecting the contact, the device optionally ceases to display the second platter.

At block 740, in response to detecting the contact, the device optionally displays the first platter at the first position (see platter 608 in FIG. 6H).

At block 742, the device optionally detects a third user input, e.g., after displaying the second platter. In some embodiments, detecting the third user input comprises detecting a rotation of a rotatable input mechanism (e.g., scroll 616*d* or 616*e* in FIGS. 6E & 6F). In some embodiments, detecting the third user input comprises detecting a swipe on a touch-sensitive display (e.g., swipe 630*a* in FIG. 6H).

Figure 7D:
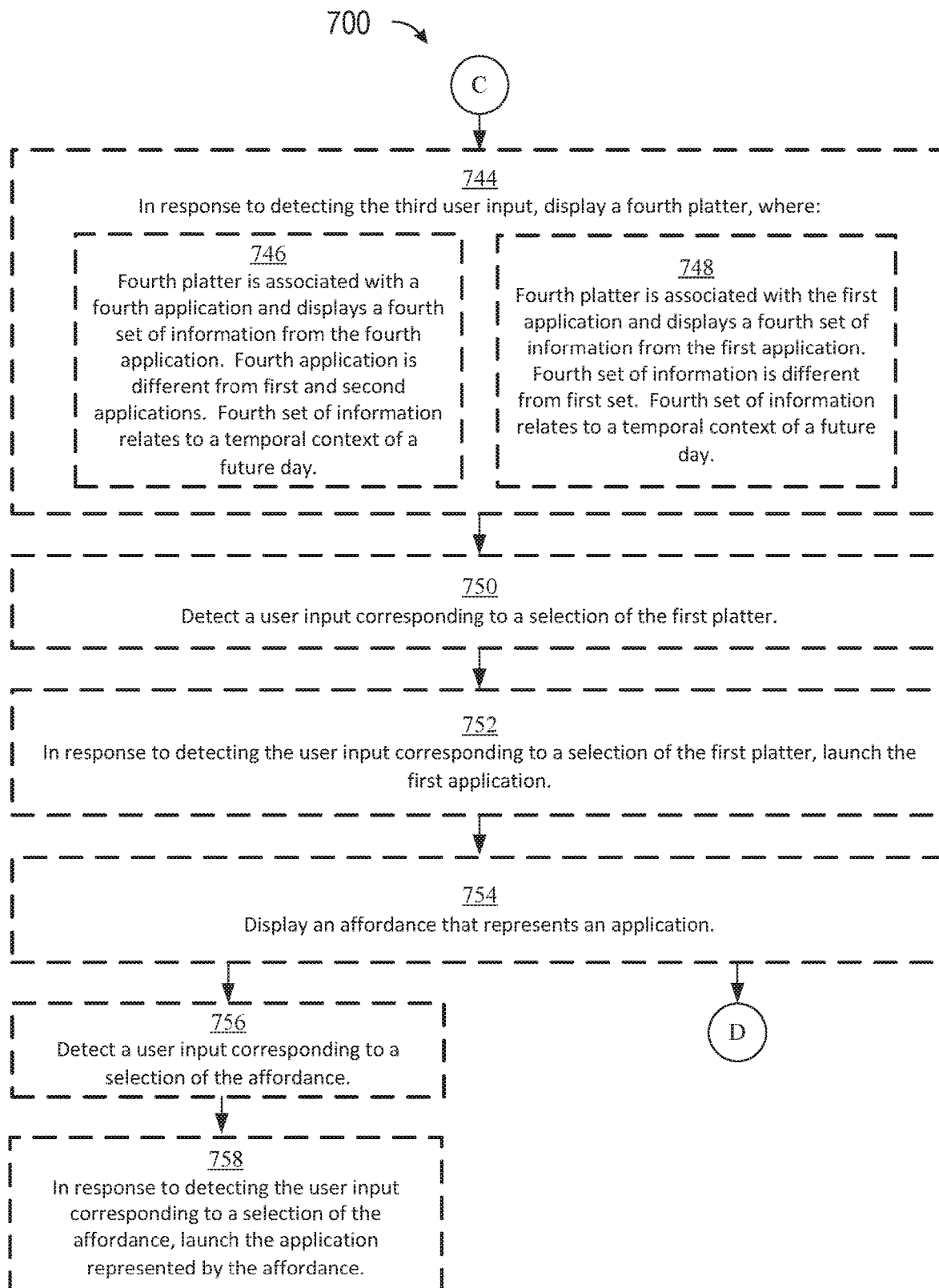

In FIG. 7D, at block 744, the device optionally displays a fourth platter on the display in response to detecting the third user input. In some embodiments, as shown in block 746, the fourth platter is associated with a fourth application and displays a fourth set of information obtained from the fourth application, and the fourth application is different from the first and the second applications. In some embodiments, as shown in block 748, the fourth platter is associated with the first application and displays a fourth set of information obtained from the first application, and the first and the fourth sets of information are different. The fourth set of information relates to a temporal context of a future day (e.g., tomorrow), such as the sets of information shown by platters 624 and 626 in FIG. 6G.

At block 750, the device optionally detects a user input corresponding to a selection of the first platter. For example, in some embodiments, detecting the user input comprises detecting a contact on the touch-sensitive display at (e.g., on or near) the displayed first platter (see tap 662a in FIG. 6O).

At block 752, the device optionally launches the first application in response to detecting the user input corresponding to a selection of the first platter. In some embodiments, launching the first application comprises ceasing to display the first user interface screen and displaying a second user interface screen corresponding to the application (see FIG. 6P).

At block 754, the device optionally displays an affordance that represents an application (see complication 614 in FIG. 6Q). In some embodiments, the affordance is displayed at a position different from the first and the second positions on the display. In some embodiments, the affordance represents an application that is different from the first and the second applications. In some embodiments, the affordance represents the first or the second application. In some embodiments, the affordance comprises a set of information obtained from the application it represents. In some embodiments, the set of information is updated in accordance with data (e.g., updated data) obtained from the application it represents. In some embodiments, the affordance is displayed in the same position on the display before and after updating the set of information.

At block 756, the device optionally detects a user input corresponding to a selection of the affordance (e.g., a tap on or near the displayed affordance, such as tap 662b in FIG. 6Q).

At block 758, the device optionally launches the application represented by the affordance in response to detecting the user input corresponding to a selection of the affordance. In some embodiments, launching the application comprises ceasing to display the first user interface screen and displaying a second user interface screen corresponding to the application (see FIG. 6R).

Figure 7E:
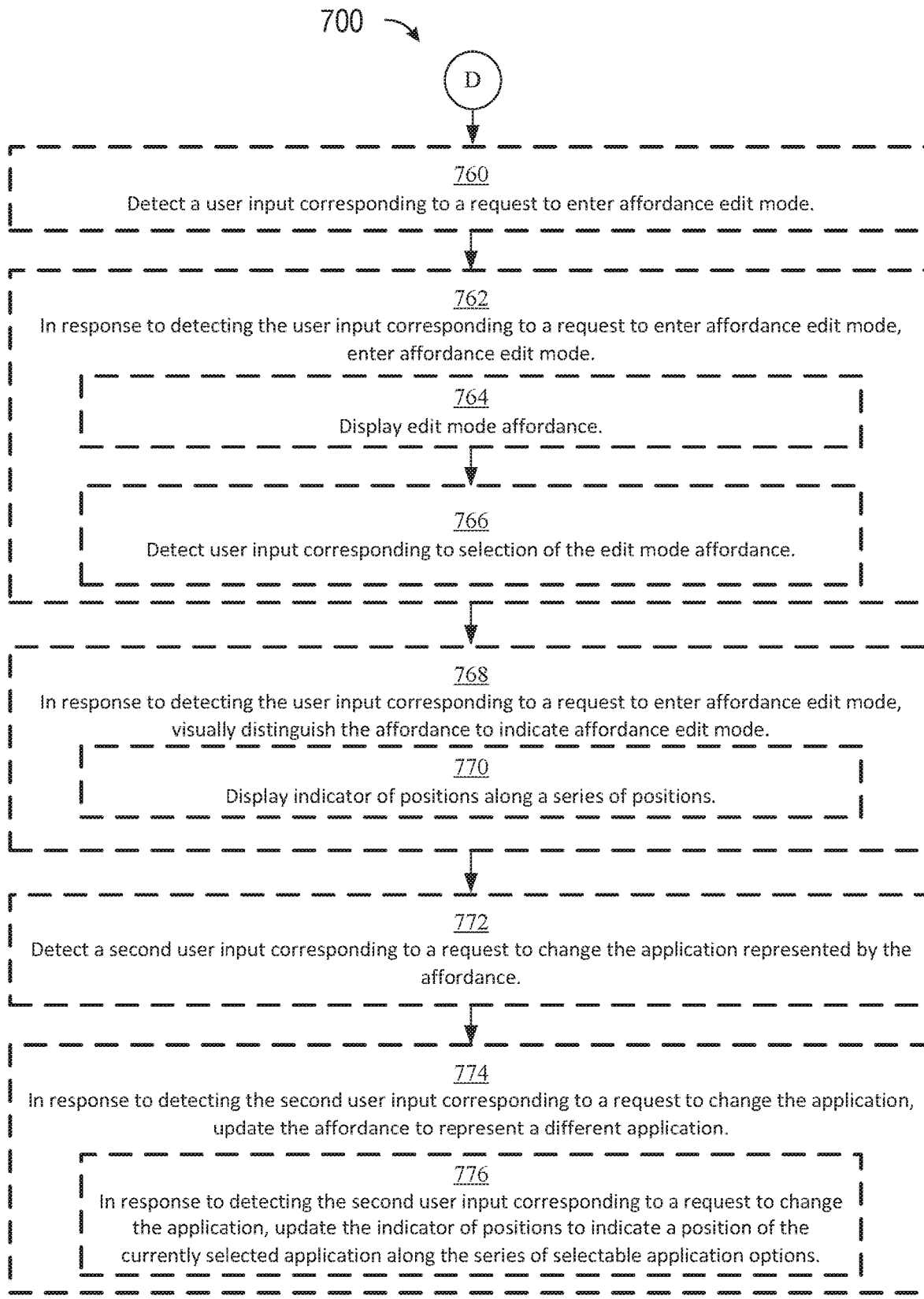

In FIG. 7E, at block 760, the device optionally detects a user input corresponding to a request to enter an affordance edit mode of the electronic device, e.g., before launching the application. In some embodiments, the user input is a press having a duration longer than a predetermined duration (e.g., a "long press" input). In some embodiments, the device determines whether the detected press has a duration longer than a predetermined duration and, in accordance with a determination that the detected press has a duration longer than the predetermined duration, enters the affordance edit mode. In some embodiments, the user input is a contact having a characteristic intensity above an intensity threshold. In some embodiments, the device determines whether the detected contact has a characteristic intensity above a predetermined duration and, in accordance with a determination that the detected press has a characteristic intensity above the predetermined duration, enters the affordance edit mode.

At block 762, the device optionally enters an affordance edit mode in response to detecting the user input corresponding to a request to enter an affordance edit mode. In some embodiments, as shown at block 764, entering the affordance edit mode comprises displaying an edit mode affordance on the touch-sensitive display (e.g., affordance 672 in FIG. 6T) and, as shown at block 766, detecting a user input corresponding to a selection of the edit mode affordance (e.g., tap 674 in FIG. 6T).

At block 768, the device optionally visually distinguishes the affordance to indicate the affordance edit mode in response to detecting the user input corresponding to a request to enter an affordance edit mode. For example, the device can display an outline around the affordance, animate an outline around the affordance, animate the affordance (e.g., to flash or expand and contact) change a color of the affordance, and/or display an additional indicator to visually distinguish the affordance (see outline 676a and indicator 676b in FIG. 6U). Visually distinguishing the affordance to indicate edit mode provides improved feedback to the user both that the device has entered a different mode of functionality (for example, tapping the affordance can lead to launch of the corresponding application during a mode other than edit mode but select the affordance for editing during edit mode) and that the distinguished affordance is the aspect of the interface currently selected for editing. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, as shown at block 770, visually distinguishing the affordance to indicate the affordance edit mode further comprises displaying an indicator of position along a series of positions, the indicator indicating a first position along the series (e.g., scroll indicator 680a in FIG. 6U).

At block 772, the device optionally detects a second user input corresponding to a request to change the application represented by the affordance. For example, in some embodiments, detecting the second user input comprises detecting a rotation of a rotatable input mechanism (e.g., scroll 682 received by rotatable input mechanism 610a in FIG. 6U).

At block 774, the device optionally updates the affordance to represent a different application in response to detecting the second user input corresponding to a request to change the application represented by the affordance (see affordance 784 and indicator 676b in FIG. 6V). In some embodiments, as shown at block 776, the device updates the indicator of position to indicate a second position along the series, where the indicator of position along a series of positions indicates a position of a currently selected option for the application represented by the affordance along a series of selectable options for the application represented by the affordance (see scroll indicator 680b in FIG. 6V).

It should be understood that the particular order in which the operations in FIGS. 7A-7E have been described is merely exemplary and is not intended to indicate that the described order is the only order in which the operations could be performed. One of ordinary skill in the art would recognize various ways to reorder the operations described herein.

Note that details of the processes described above with respect to process 700 (e.g., FIGS. 7A-7E) are also applicable in an analogous manner to the methods described elsewhere in this application. For example, other methods described in this application may include one or more of the characteristics of process 700. For example, one or more of the steps of process 700 can be combined with one or more of the steps of process 800, as described below. For brevity, these details are not repeated below.

FIGS. 8A-8G show a flow diagram illustrating process 800 for providing context-specific user interfaces. In some embodiments, process 800 can be performed at an electronic device with a touch-sensitive display, one or more processors, and memory, such as device 100 (FIG. 1A), 300 (FIG. 3), 500 (FIGS. 5A-5H), or 600 (FIGS. 6A-6V). Some operations in process 800 can be combined, the order of some operations may be changed, and some operations can be omitted.

In FIG. 8A, at block 802, the device displays at a first time a user interface screen comprising a current time indicator, a first platter at a first position (e.g., on the display), and an affordance at a second position (e.g., on the display). The current time indicator reflects the first time of the current day (e.g., indicator 604 in FIG. 6K). As shown in block 804, the first platter is associated with a first application and displays a first set of information obtained from the first application (see, e.g., platter 606 in FIG. 6K, which is associated with a weather application and displays the time and a description of a predicted change in weather or inclement weather conditions). As shown in block 806, the first set of information relates to a first temporal context of the current day (e.g., the time of the predicted change in weather or inclement weather conditions). As shown in block 808, the affordance represents an application (e.g., affordance 614 in FIG. 6K, which represents a personal assistant application). In some embodiments, the affordance comprises a set of information obtained from the application it represents. In some embodiments, the set of information is updated in accordance with data (e.g., updated data) obtained from the application it represents. In some embodiments, the affordance is displayed in the same position on the display before and after updating the set of information.

At block 810, the device detects a first user input corresponding to a request to scroll the first user interface screen. In some embodiments, the first user input comprises a rotation of a rotatable input mechanism (e.g., scroll 658a received at rotatable input mechanism 610a shown in FIG. 6K). In some embodiments, the first user input comprises a swipe on a touch-sensitive display.

At block 812, in response to detecting the first user input, the device maintains display of the affordance at the second position (cf. affordance 614 in FIG. 6K and FIG. 6L).

Figure 8B:
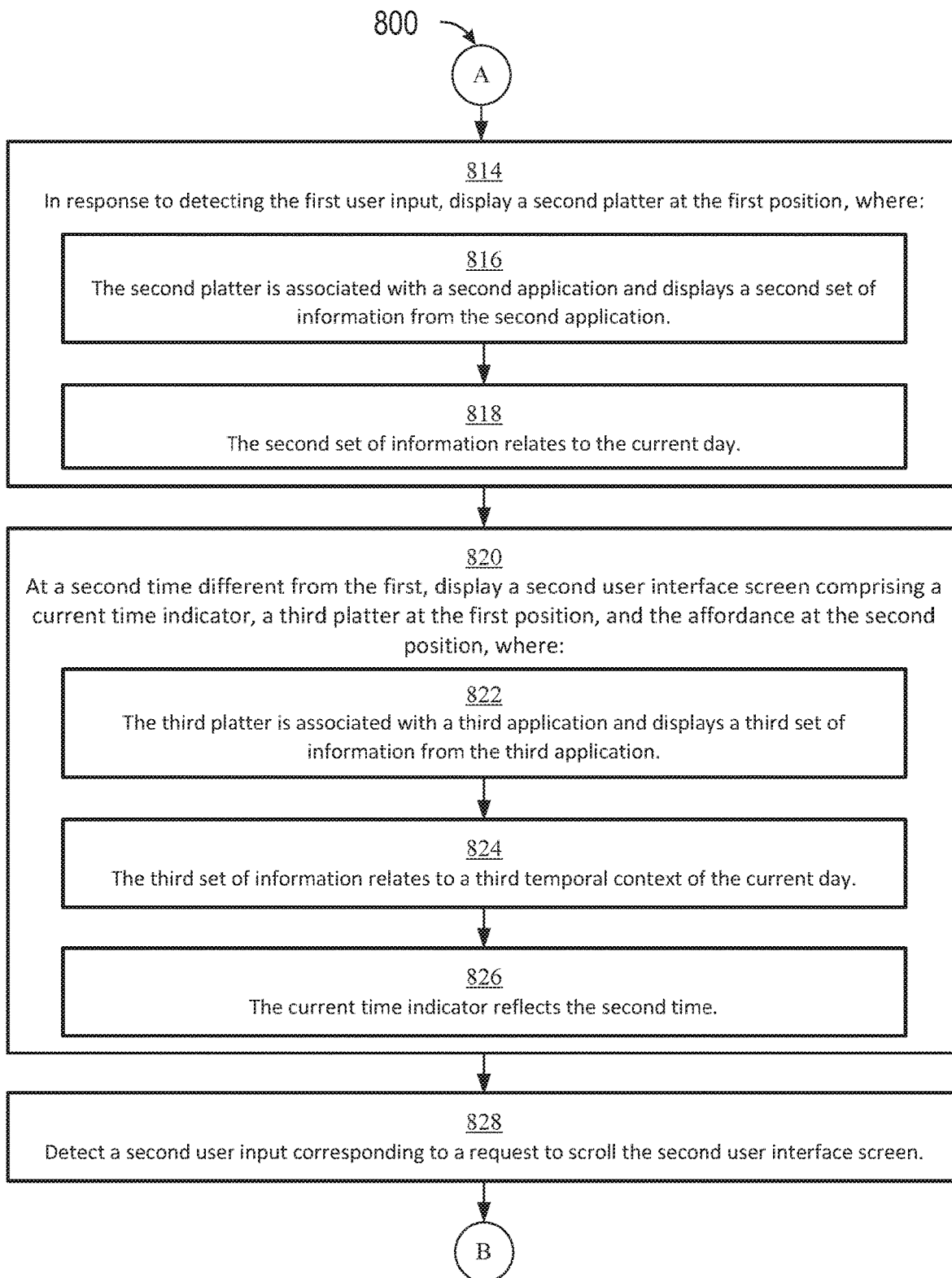

In FIG. 8B, at block 814, in response to detecting the first user input, the device displays a second platter at the first position. In some embodiments, as shown in block 816, the second platter is associated with a second application (e.g., platter 660 associated with a weather application as shown in FIG. 6L) and displays a second set of information obtained from the second application (e.g., weather conditions and/or high and low temperatures forecasted for the current day, as shown in platter 660 in FIG. 6L). In some embodiments, the first and the second applications are the same. In some embodiments, the first and the second applications are different. In some embodiments, as shown in block 818, the second set of information relates to the current day (e.g., to a temporal context of the current day broader than the first temporal context).

At block 820, the device displays at a second time (e.g., a different time of day than the first time), a second user interface screen comprising the current time indicator, a third platter at the first position on the display (e.g., 620 in FIG. 6M), and the affordance at the second position on the display (e.g., 614 in FIG. 6M). As shown in block 822, the third platter is associated with a third application (e.g., a navigation application, as shown in FIG. 6M) and displays a third set of information obtained from the third application (e.g., time of a predicted change in traffic, such as traffic along the user's route home). As shown in block 824, the third set of information relates to a third temporal context of the current day. As shown in block 826, the current time indicator reflects the second time of the current day (e.g., indicator 604 in FIG. 6M). In some embodiments, the first and the third applications are the same. In some embodiments, the first and the third applications are different. Displaying sets of information obtained from different applications, some of which change throughout the day (e.g., based on temporal context) and some of which are constant throughout the day, provides the user with relevant application data (and optionally affordances for launching applications) from a variety of applications without necessitating the display of multiple, dedicated application widgets (each dedicated to, and showing information obtained from, a single application). Providing additional control options without cluttering the user interface with additional displayed controls (e.g., dedicated application widgets) enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 828, the device detects a second user input corresponding to a request to scroll the second user interface screen. In some embodiments, the second user input comprises a rotation of a rotatable input mechanism (e.g., scroll 658b received at rotatable input mechanism 610a shown in FIG. 6M). In some embodiments, the second user input comprises a swipe on a touch-sensitive display.

Figure 8C:
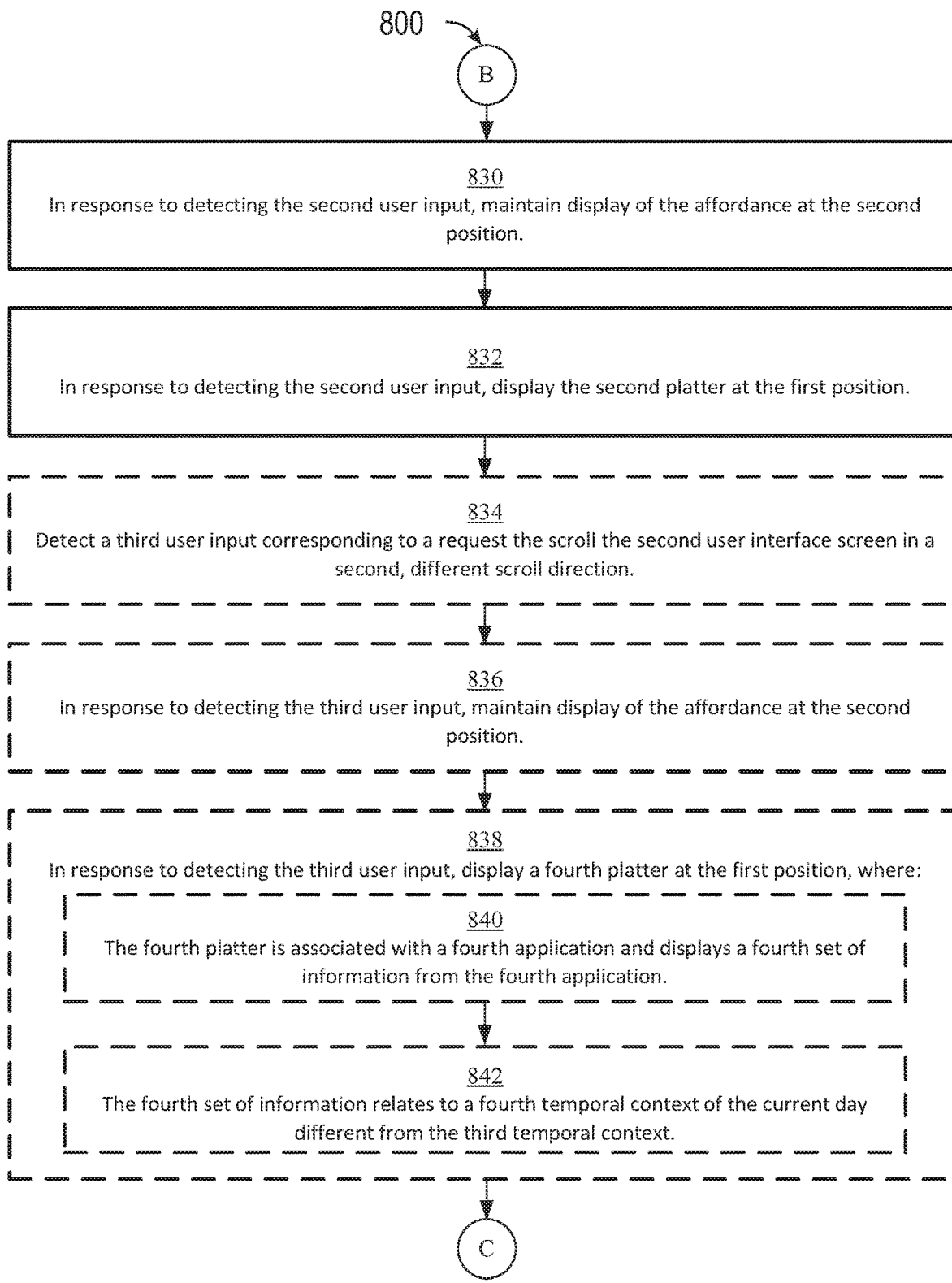

In FIG. 8C, at block 830, in response to detecting the second user input, the device maintains display of the affordance at the second position (cf. affordance 614 in FIG. 6M and FIG. 6N).

At block 832, in response to detecting the second user input, the device displays the second platter at the first position (e.g., platter 660 in FIG. 6N).

At block 834, the device optionally detects a third user input corresponding to a request to scroll the second user interface screen in a second scroll direction different from the first scroll direction. In some embodiments, the third user input comprises a rotation of a rotatable input mechanism (e.g., scroll 616a received at rotatable input mechanism 610a shown in FIG. 6B, which is in an opposite direction as compared to scroll 658a). In some embodiments, the third user input comprises a swipe on a touch-sensitive display (e.g., in an opposite swipe direction).

At block 836, the device optionally maintains display of the affordance at the second position in response to detecting the third user input.

At block 838, the device optionally displays a fourth platter at the first position on the display in response to detecting the third user input. As shown in block 840, the fourth platter is associated with a fourth application and displays a fourth set of information obtained from the fourth application. In some embodiments, the first and the fourth applications are the same. In some embodiments, the first and the fourth applications are different. As shown in block 842, the fourth set of information relates to a fourth temporal context of the current day, and the fourth temporal context is different from the third temporal context. In some embodiments, the fourth temporal context is later than the third temporal context in the current day.

Figure 8D:
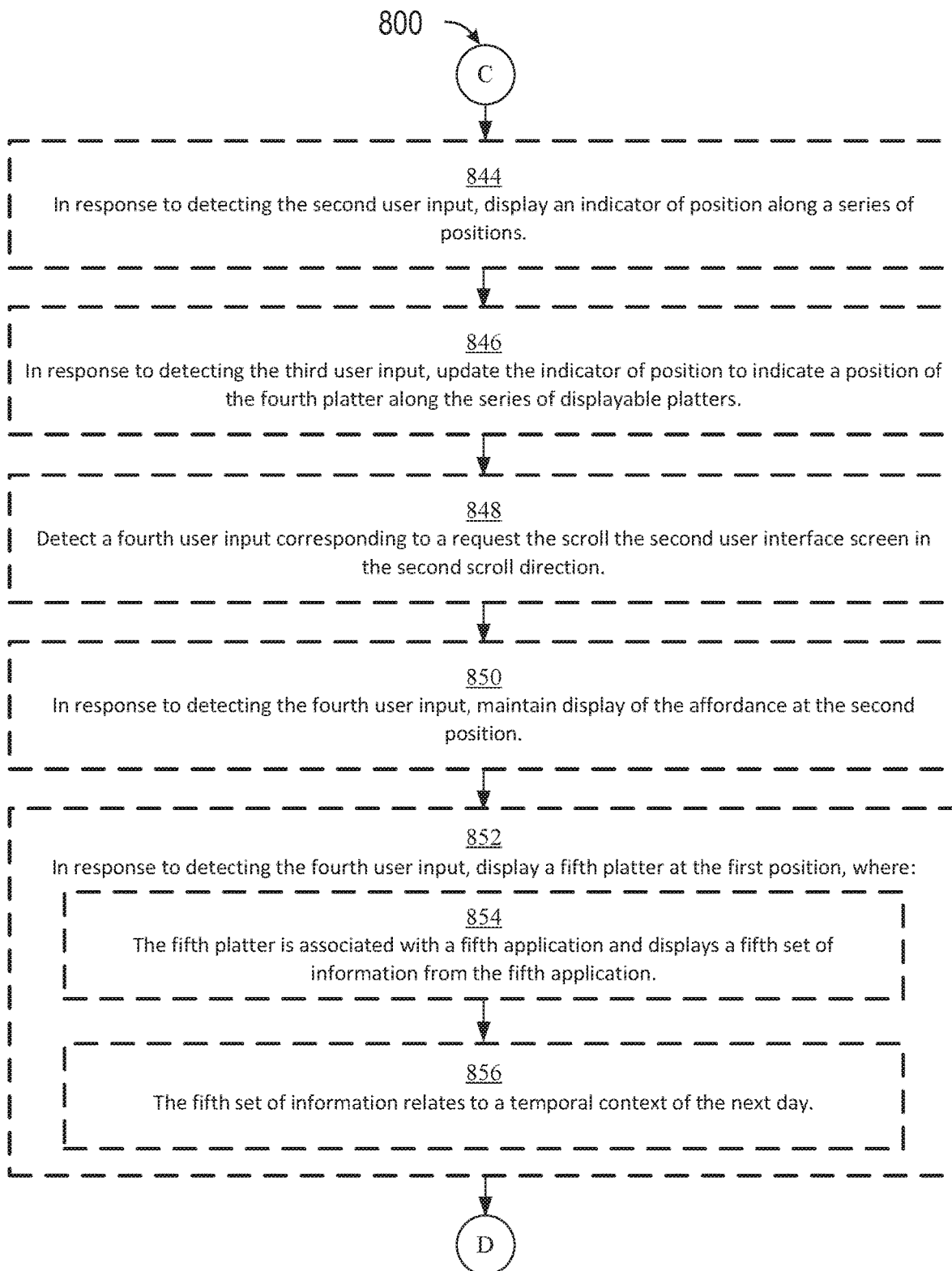

In FIG. 8D, at block 844, the device optionally displays on the display an indicator of position along a series of positions in response to detecting the second user input. The indicator of position along a series of positions indicates a position of the second platter along a series of displayable platters (e.g., scroll indicator 618b in FIG. 6N).

At block 846, the device optionally updates the indicator of position to indicate a position of the fourth platter along the series of displayable platters in response to detecting the third user input. Displaying an updating scroll indicator that indicates a position of a currently displayed platter along a series of displayable platters provides feedback to the user that the received user input (e.g., scroll 616a) controls selection of the displayed platter(s) while helping the user to navigate through the entire series of platter options (as well as indicating to the user that additional platters are displayable). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 848, the device optionally detects a fourth user input corresponding to a request to scroll the second user interface screen in the second scroll direction (e.g., scrolls 616d and 616e in FIGS. 6E and 6F).

At block 850, the device optionally maintains display of the affordance at the second position in response to detecting the fourth user input.

At block 852, the device optionally displays a fifth platter at the first position on the display in response to detecting the fourth user input (e.g., platter 624 in FIG. 6F). As shown in block 854, the fifth platter is associated with a fifth application and displays a fifth set of information obtained from the fifth application. In some embodiments, the first and the fifth applications are the same. In some embodiments, the first and the fifth applications are different. As shown in block 856, the fifth set of information relates to a temporal context of the next day (e.g., a number of calendar events, as shown in platter 624 in FIG. 6G, or tomorrow's predicted weather, as shown in platter 626 in FIG. 6G).

Figure 8E:
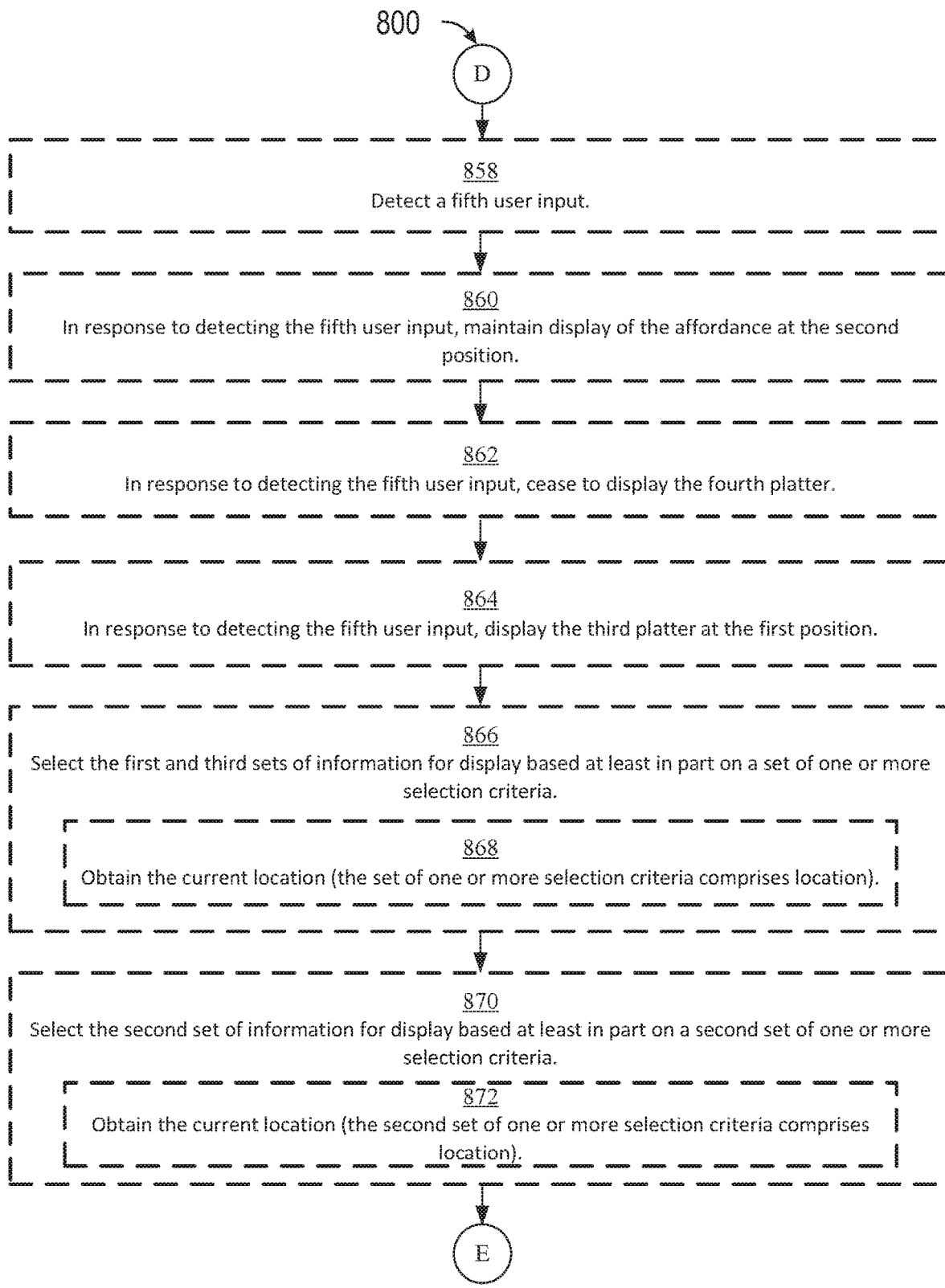

In FIG. 8E, at block 858, the device optionally detects a fifth user input. In some embodiments, the fifth user input comprises a contact on the touch-sensitive display (e.g., tap 628 in FIG. 6G). In some embodiments, the fifth user input comprises a rotation of a rotatable input mechanism.

At block 860, the device optionally maintains display of the affordance at the second position in response to detecting the fifth user input.

At block 862, the device optionally ceases to display the fourth platter in response to detecting the fifth user input.

At block 864, the device optionally displays the third platter at the first position in response to detecting the fifth user input.

At block 866, the first and the third sets of information are selected for display based at least in part on a set of one or more selection criteria. For example, as described in reference to FIG. 6J, the set of one or more selection criteria can comprise a temporal context of the current day (e.g., the time of a calendar event shown in platter 606 or the showtime associated with a movie ticket shown in platter 650 in FIG. 6J). In some embodiments, the set of one or more selection criteria can comprise a temporal context of the current day and one or more selection criteria selected from: location (e.g., the photo represented in platter 648 in FIG. 6J), the application from which the first or the third set of information is obtained (e.g., surfacing traffic conditions from a navigation application to the user at the time of the user's commute home, as shown in platter 638 in FIG. 6J), a number of calendar events scheduled for the current day (e.g., surfacing a breathe reminder to the user after consecutive calendar events, as shown in platter 636 in FIG. 6J), time until the next scheduled calendar event (e.g., surfacing an activity reminder to the user when the user has time for a workout before the next scheduled calendar event, as shown in platter 632 in FIG. 6J), and one or more previous user inputs (e.g., surfacing a platter associated with a home application at a time when the user has previously launched the home application, as shown in platter 654 in FIG. 6J). Optionally, as shown in block 868, if the set of one or more selection criteria comprises proximity to the current location of the electronic device (e.g., the photo shown in platter 648, or the reminder to leave work when the device detects that it is near the user's designated workplace shown in platter 638 in FIG. 6J), the device obtains its current location from a location sensor associated with the electronic device (e.g., GPS sensor 532 of device 600, or GPS module 135 of device 100 paired or coupled via wireless communication with device 600). Using, via the device, the set of one or more selection criteria to automatically generate and display a platter provides information to the user that is relevant to the current time (e.g., providing the user with a workout or breathe reminder when their schedule allows, as determined in accordance with data from the calendar application) without requiring a user input (e.g., to set such a reminder in advance). Performing operations when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Using selection criteria further allows the device to display different platters at different times of day from a variety of applications without necessitating the display of multiple, dedicated application widgets (each dedicated to, and showing information obtained from, a single application). Providing additional control options without cluttering the user interface with additional displayed controls (e.g., dedicated application widgets) enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 870, the device optionally selects the second set of information for display based at least in part on a second set of one or more selection criteria. For example, the second set of selection criteria can include one or more selection criteria selected from: location and the application from which the second set of information is obtained. In some embodiments, the second set of one or more selection criteria does not comprise a temporal context of the current day. In some embodiments, the second set of information relates to a majority of time within the current day (e.g., the weather conditions and high/low temperatures shown in platter 660 in FIGS. 6L and 6N). In some embodiments, the second set of information relates to a temporal context of the current day that is broader than the first and the third temporal contexts (e.g., the weather conditions and high/low temperatures shown in platter 660 in FIG. 6L, as compared to the weather alert shown in platter 606 in FIG. 6K). Optionally, as shown in block 872, if the second set of one or more selection criteria comprises proximity to the current location of the electronic device, the device obtains its current location from a location sensor associated with the electronic device (e.g., GPS sensor 532 of device 600, or GPS module 135 of device 100 paired or coupled via wireless communication with device 600).

Figure 8F:
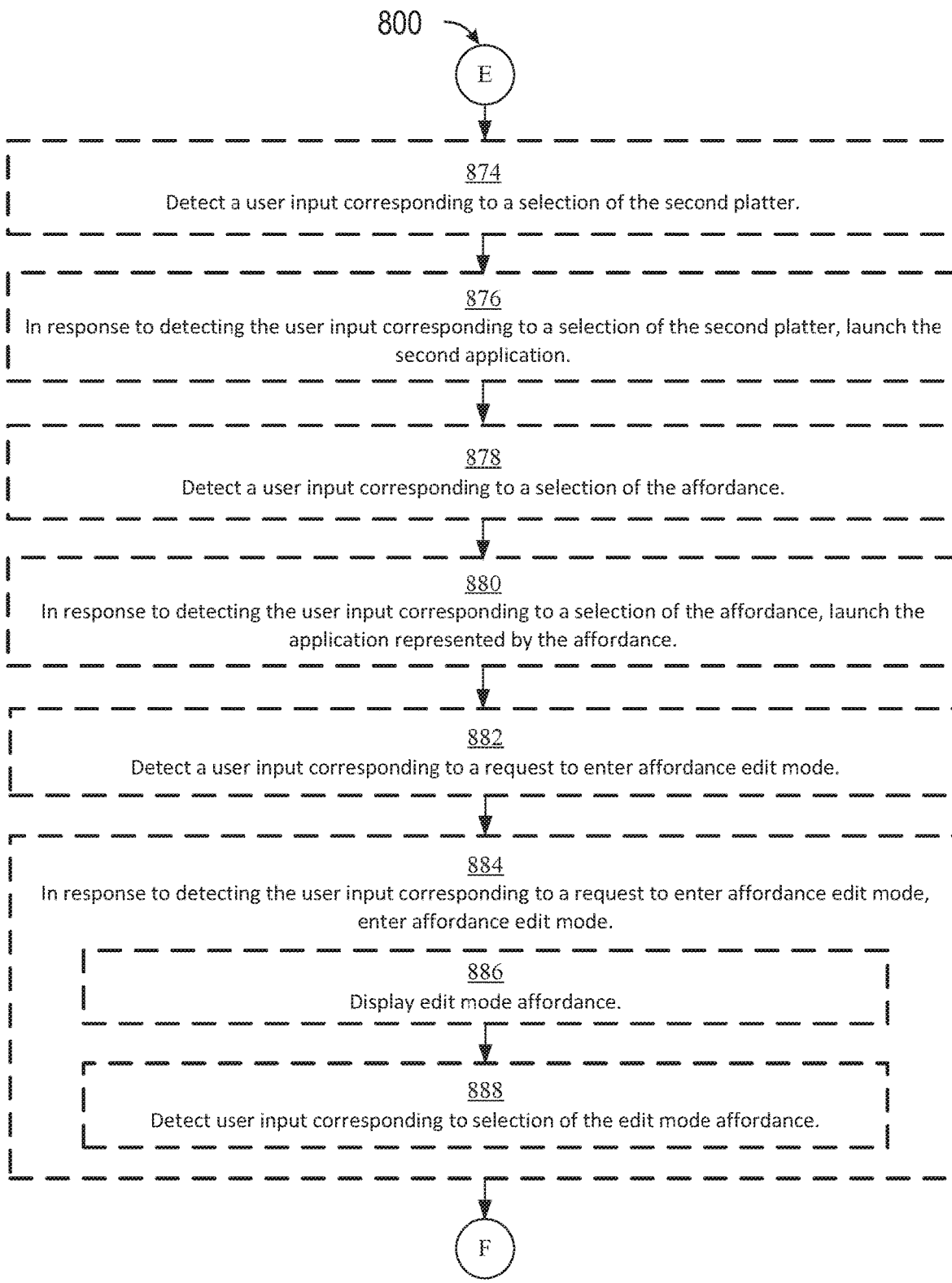

In FIG. 8F, at block 874, the device optionally detects a user input corresponding to a selection of the second platter. For example, detecting the user input can comprise detecting a contact at (e.g., on or near) the displayed second platter, such as tap 662a on platter 606 in FIG. 6O.

At block 876, the device optionally launches the second application in response to detecting the user input corresponding to a selection of the second platter. In some embodiments, launching the second application comprises ceasing to display the first or second user interface screen and displaying a third user interface screen corresponding to the second application (see FIG. 6P).

At block 878, the device optionally detects a user input corresponding to a selection of the affordance. For example, detecting the user input can comprise detecting a contact at (e.g., on or near) the displayed affordance, such as tap 662b on complication 614 in FIG. 6Q.

At block 880, the device optionally launches the second application in response to detecting the user input corresponding to a selection of the affordance. In some embodiments, launching the application comprises ceasing to display the first or second user interface screen and displaying a fourth user interface screen corresponding to the application (see FIG. 6R).

At block 882, the device optionally detects a user input corresponding to a request to enter an affordance edit mode. In some embodiments, the user input is a press having a duration longer than a predetermined duration (e.g., a "long press" input). In some embodiments, the device determines whether the detected press has a duration longer than a predetermined duration and, in accordance with a determination that the detected press has a duration longer than the predetermined duration, enters the affordance edit mode. In some embodiments, the user input is a contact having a characteristic intensity above an intensity threshold. In some embodiments, the device determines whether the detected contact has a characteristic intensity above a predetermined duration and, in accordance with a determination that the detected press has a characteristic intensity above the predetermined duration, enters the affordance edit mode.

At block 884, the device optionally enters an affordance edit mode in response to detecting the user input corresponding to a request to enter an affordance edit mode. In some embodiments, as shown at block 886, entering the affordance edit mode comprises displaying an edit mode affordance on the touch-sensitive display (e.g., affordance 672 in FIG. 6T) and, as shown at block 888, detecting a user input corresponding to a selection of the edit mode affordance (e.g., tap 674 in FIG. 6T).

Figure 8G:
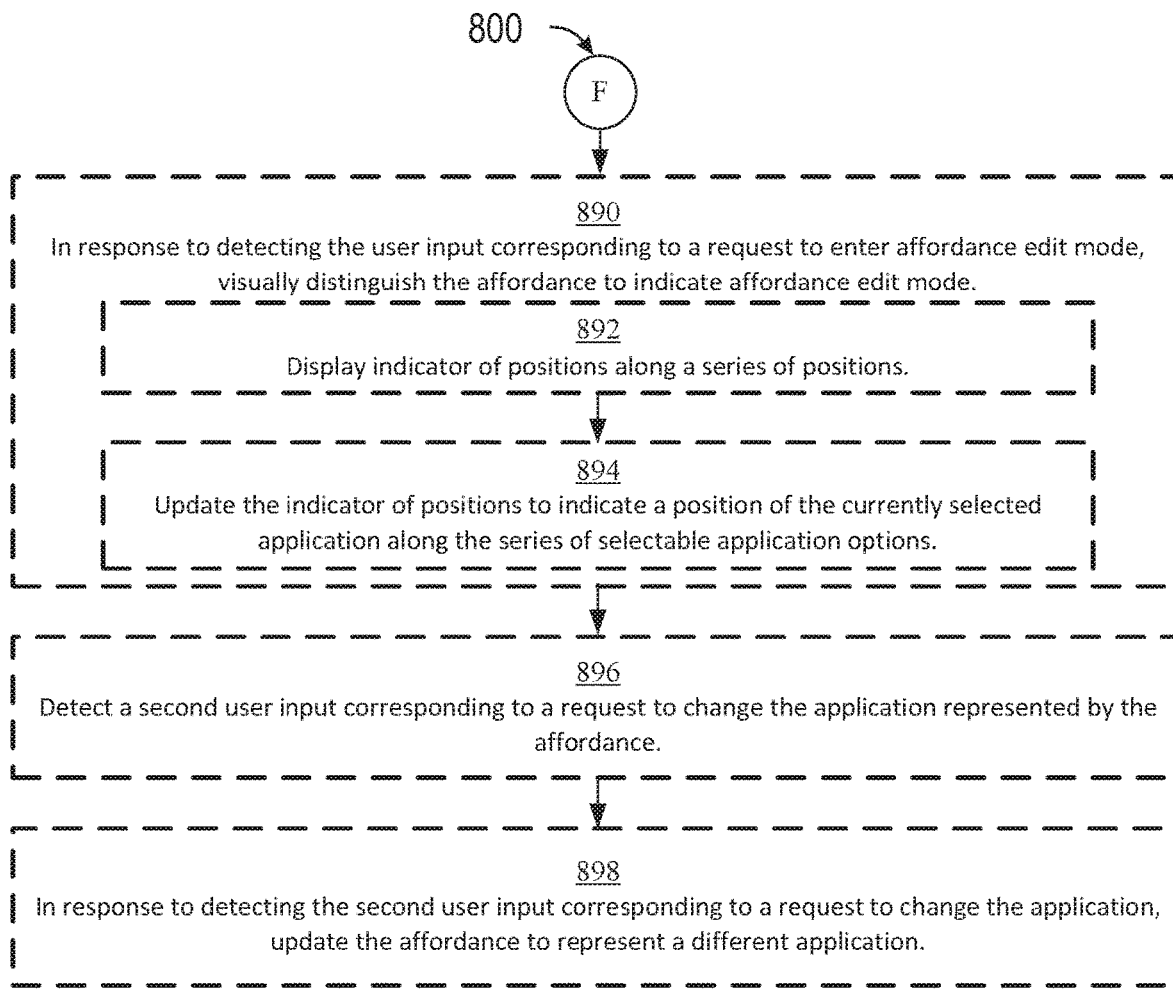

In FIG. 8G, at block 890, the device optionally visually distinguishes the affordance to indicate the affordance edit mode in response to detecting the user input corresponding to a request to enter an affordance edit mode. For example, the device can display an outline around the affordance, animate an outline around the affordance, animate the affordance (e.g., to flash or expand and contact) change a color of the affordance, and/or display an additional indicator to visually distinguish the affordance (see outline 676a and indicator 676b in FIG. 6U). Visually distinguishing the affordance to indicate edit mode provides improved feedback to the user both that the device has entered a different mode of functionality (for example, tapping the affordance can lead to launch of the corresponding application under normal functioning but select the affordance for editing during edit mode) and that the distinguished affordance is the aspect of the interface currently selected for editing. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, as shown at block 892, visually distinguishing the affordance to indicate the affordance edit mode further comprises displaying an indicator of position along a series of positions, the indicator indicating a first position along the series (e.g., scroll indicator 680a in FIG. 6U). In some embodiments, as shown at block 894, the device updates the indicator of position to indicate a position of a currently selected option for the application represented by the affordance along a series of selectable options for the application represented by the affordance (see scroll indicator 680b in FIG. 6V).

At block 896, the device optionally detects a second user input corresponding to a request to change the application represented by the affordance. For example, in some embodiments, detecting the second user input comprises detecting a rotation of a rotatable input mechanism (e.g., scroll 682 received by rotatable input mechanism 610a in FIG. 6U).

At block 898, the device optionally updates the affordance to represent a different application in response to detecting the second user input corresponding to a request to change the application represented by the affordance (see affordance 784 and indicator 676b in FIG. 6V).

Note that details of the processes described above with respect to process 800 (e.g., FIGS. 8A-8G) are also applicable in an analogous manner to the methods described elsewhere in this application. For example, other methods described in this application may include one or more of the characteristics of process 800. For example, one or more of the steps of process 800 can be combined with one or more of the steps of process 700, as described above. For brevity, these details are not repeated below.

FIGS. 9A-9L show exemplary context-specific user interfaces that may be operated on device 900. Device 900 may be device 100, 300, or 500 in some embodiments. The electronic device has a display 902 (e.g., 504). In some embodiments, display 902 is a touch-sensitive display. In some embodiments, device 900 includes rotatable input mechanism 910 (e.g., 506) and/or input mechanism or button (e.g., 508).

Figure 9A:
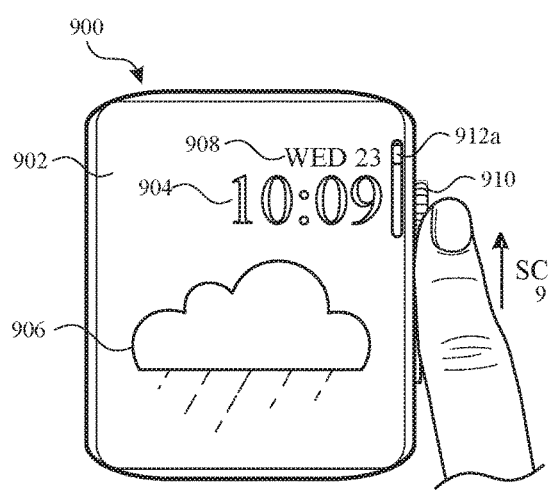
FIGS. 9A-9L illustrate exemplary context-specific user interfaces.

In FIG. 9A, device 900 displays a context-specific user interface on display 902. This exemplary context-specific user interface includes current time indicator 904 (e.g., a digital clock). Indicator 904 can optionally include a variety of features or aspects that are independently editable or configurable by the user. Also included is complication 908, which is associated with a calendar application and displays a set of information from the calendar application (e.g., day of the week and the current date).

The user interface screen illustrated in FIG. 9A also includes a non-textual, graphical depiction 906 of a set of information obtained from an application. In this example, depiction 906 depicts a set of information obtained from a weather application: weather conditions (e.g., rain) related to a first temporal context of the current day. For example, the temporal context can be the time of a predicted change in weather conditions or time of predicted inclement weather conditions. Non-textual, graphical depictions can include without limitation emojis, symbols, and/or cartoons. In some embodiments, a non-textual, graphical depiction is displayed as a wallpaper or background on the user interface screen.

To view additional graphical depictions of application information, the user rotates rotatable input mechanism 910 (e.g., with scroll 914a). In response to detecting scroll 914a, the device displays scroll indicator 912a, which indicates the position of depiction 906 along a series of displayable graphical depictions.

Figure 9B:
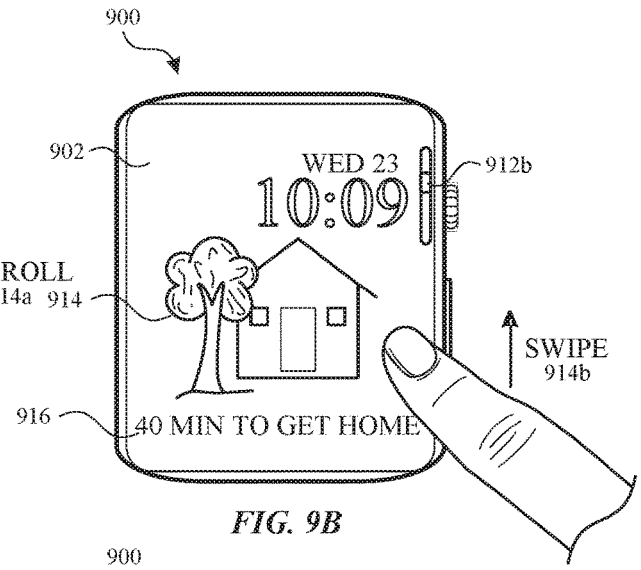

In response to detecting scroll 914a, the device displays the screen shown in FIG. 9B. On this screen, the device displays a second non-textual, graphical depiction 914 of a set of information obtained from a different application. In this example, depiction 914 depicts a set of information obtained from a navigation application: a reminder to leave for home (e.g., based on estimated driving time from work to home) related to a second temporal context of the current day. For example, the second temporal context can be the time of day associated with the user's commute home (e.g., a predicted time of day, or a time of day associated with one or more previous user inputs indicative of commuting home). Scroll indicator 912b is also updated to indicate the position of depiction 914 along the series of displayable graphical depictions. Text 916 is also displayed and provides a textual description related to depiction 914.

The user can also swipe the touch-sensitive display to scroll the user interface screen. For example, in response to detecting swipe 914b, device 900 displays the user interface screen shown in FIG. 9C. This screen includes a third non-textual, graphical depiction 918 of a set of information obtained from a different application. In this example, depiction 918 depicts a set of information obtained from a calendar application: a calendar event related to a third temporal context of the current day. For example, the third temporal context can be the time of the scheduled calendar event (e.g., a date for coffee). Scroll indicator 912c is also updated to indicate the position of depiction 918 along the series of displayable graphical depictions. Text 920 is also displayed and provides a textual description related to depiction 918.

In some embodiments, device 900 can receive data representing text content from a depicted set of information and generate the depiction to depict the text content based on the received data. For example, device 900 can receive data related to the text content of the calendar event (e.g., "meet Ben for coffee") and generate depiction 918 using a cartoon coffee cup based on, or in accordance with, the received data. This increases the user interactability of the device, thereby improving the man-machine interface.

In some embodiments, depictions 906, 914, and 918 depict sets of information related to increasingly later temporal contexts of the current day (e.g., moving forward in time). In order to scroll backwards in time, the user rotates 910 in the opposite direction (e.g., scroll 914c). In response to detecting scroll 914c, device 900 displays the screen shown in FIG. 9D. This screen includes depiction 914, and scroll indicator 912b has been updated to reflect the corresponding position of depiction 914 along the series.

Any of depictions 906, 914, and 918 can also serve as affordances to launch the corresponding application. As shown in FIG. 9E, the user can contact displayed depiction 906 (e.g., via tap 922). In response to detecting tap 922, device 900 displays a user interface screen from the weather application (FIG. 9F). This allows the user to view additional information from the weather application.

Displayed complications can also serve as affordances to launch the corresponding application. As shown in FIG. 9G, the user can contact displayed complication 908 (e.g., via tap 924). In response to detecting tap 924, device 900 displays a user interface screen from the calendar application (FIG. 9H). This allows the user to view additional information from the calendar application, such as the time(s) of one or more upcoming calendar event(s).

The user may wish to change the application associated with a displayed complication (or change the set of information from the application displayed by the complication). The user presses display 902 with press 926 (FIG. 9I). In some embodiments, press 926 is a press having a duration longer than a predetermined duration (e.g., a "long press" input), or a press having a characteristic intensity above a predetermined intensity threshold.

Figure 9C:
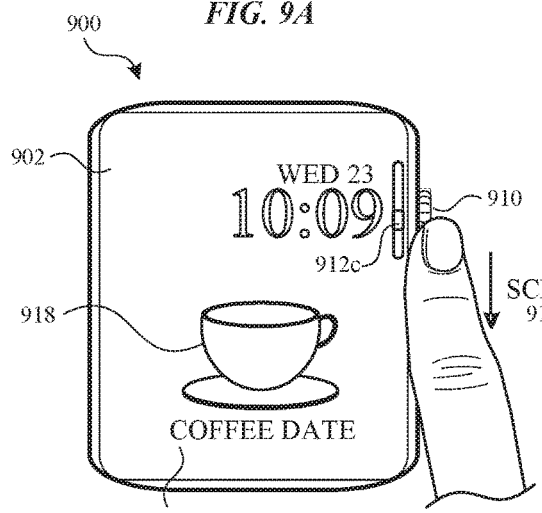
Figure 9D:
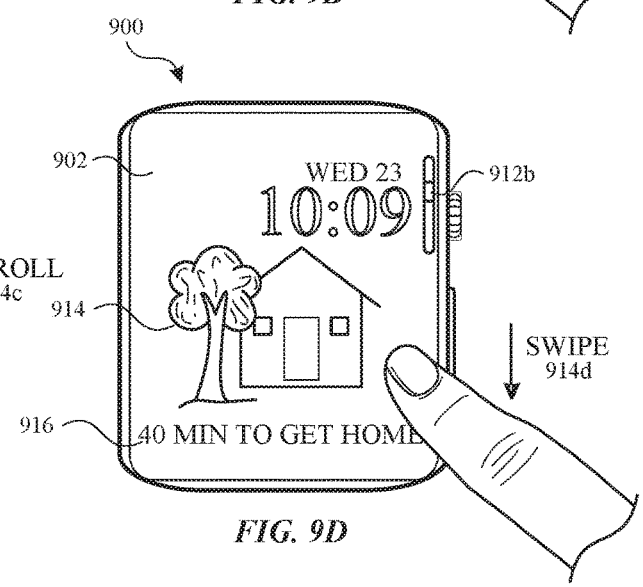
Figure 9E:
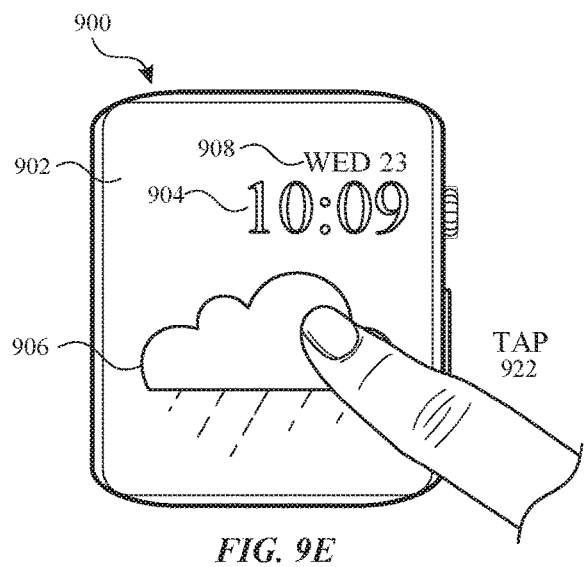
Figure 9F:
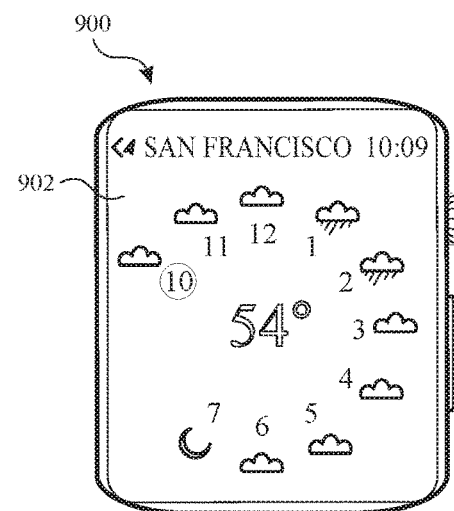
Figure 9G:
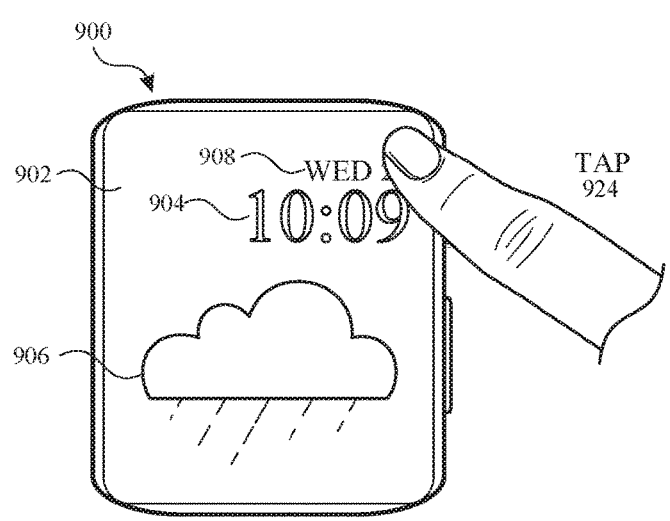
Figure 9H:
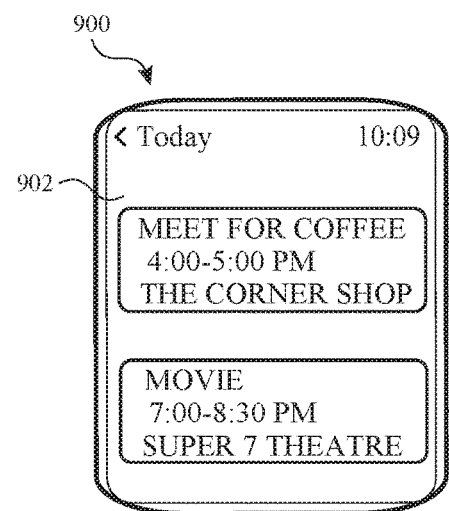
Figure 9I:
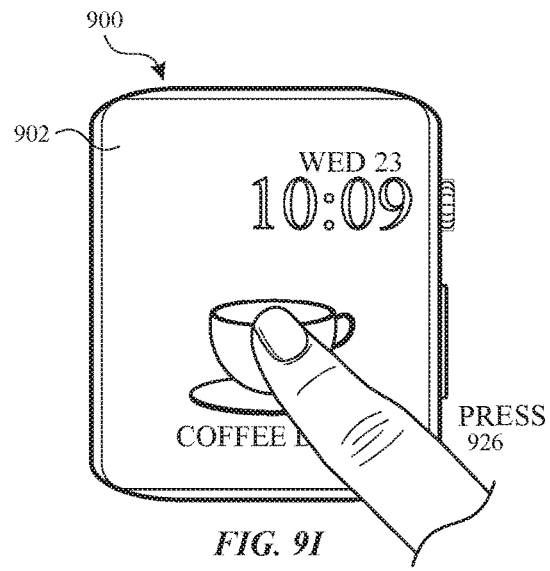
Figure 9J:
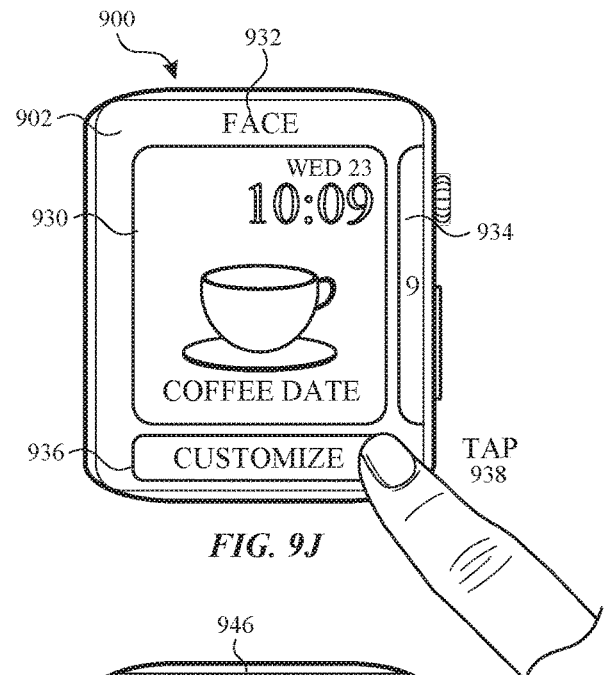

In response to detecting press 926, device 900 visually distinguishes the user interface screen to indicate edit mode (FIG. 9J). Device 900 alerts to the user that it has entered into the selection mode by displaying smaller representation 930 of the user interface screen, name 932 corresponding to a name of the type of context-specific user interface currently selected, partial view 934 of an adjacent, stored context-specific user interface (which the user could select by swiping to view the full interface and tapping to select it), and edit affordance 936. In order to edit the user interface, the user contacts edit affordance 936 via tap 938.

Figure 9K:
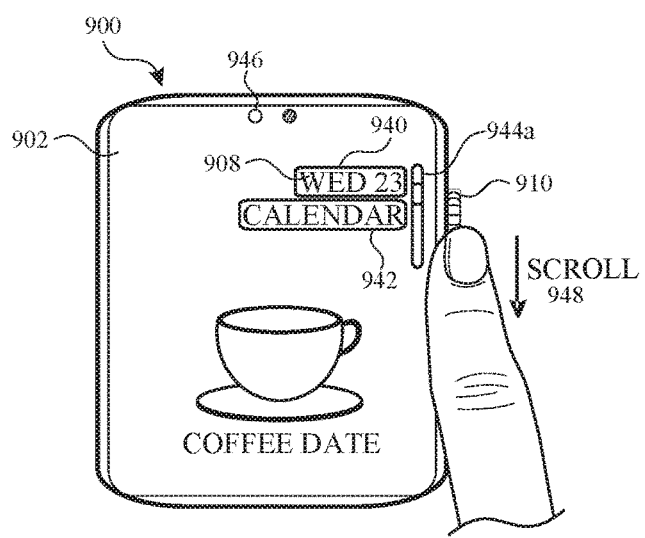

In response to detecting tap 938, the device enters edit mode and visually distinguishes one or more aspects of the user interface for editing (FIG. 9K). In this example, complication 908 is selected for editing. Device 900 informs the user that complication 908 is selected for editing by visually distinguishing complication 908 via displaying outline 940 around complication 908 and indicator 942, which indicates the application represented by the complication (in this example, indicating the calendar application). Device 900 also displays scroll indicator 944a, which informs the user that additional applications can be selected by scrolling and indicates the position of the calendar application along the series of displayable application options. Device 900 also displays paging affordance 946, which indicates that two options for editing different aspects of the user interface can be selected (e.g., by swiping). In this example, the options include the application represented by complication 908 and one or more colors associated with the user interface (e.g., one or more colors of the current time indicator and/or displayed depictions).

Figure 9L:
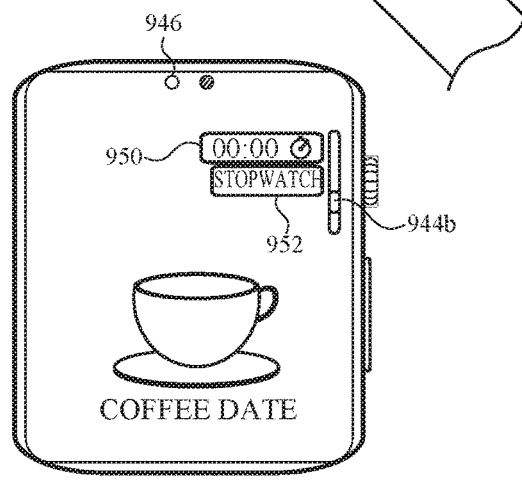

In response to detecting scroll 948 (a rotation of 910), device 900 replaces complication 908 with complication 950, which represents a stopwatch application (FIG. 9L). In addition, indicator 952 is updated to indicate the stopwatch application, and scroll indicator 944b is updated to reflect the position of the stopwatch application along the series of displayable application options. In some embodiments, in response to detecting one or more additional inputs, device 900 displays a user interface screen based on the display 902 shown in FIG. 9L (e.g., a depression of 910 followed by a tap on the displayed user interface in selection mode). In some embodiments, device 900 stores the edited user interface in memory (e.g., in memory 518 and/or memory 102 of device 100 paired or coupled via wireless communication with device 900). In some embodiments, the edited user interface screen can be subsequently selected in selection mode, e.g., as described in International Patent Application Serial No. PCT/US2015/034607, titled "Context-Specific User Interfaces," filed Jun. 7, 2015, published as WIPO Publication No. WO/2016/022205 (see, e.g., display 1322 in FIG. 13).

Figure 10A:
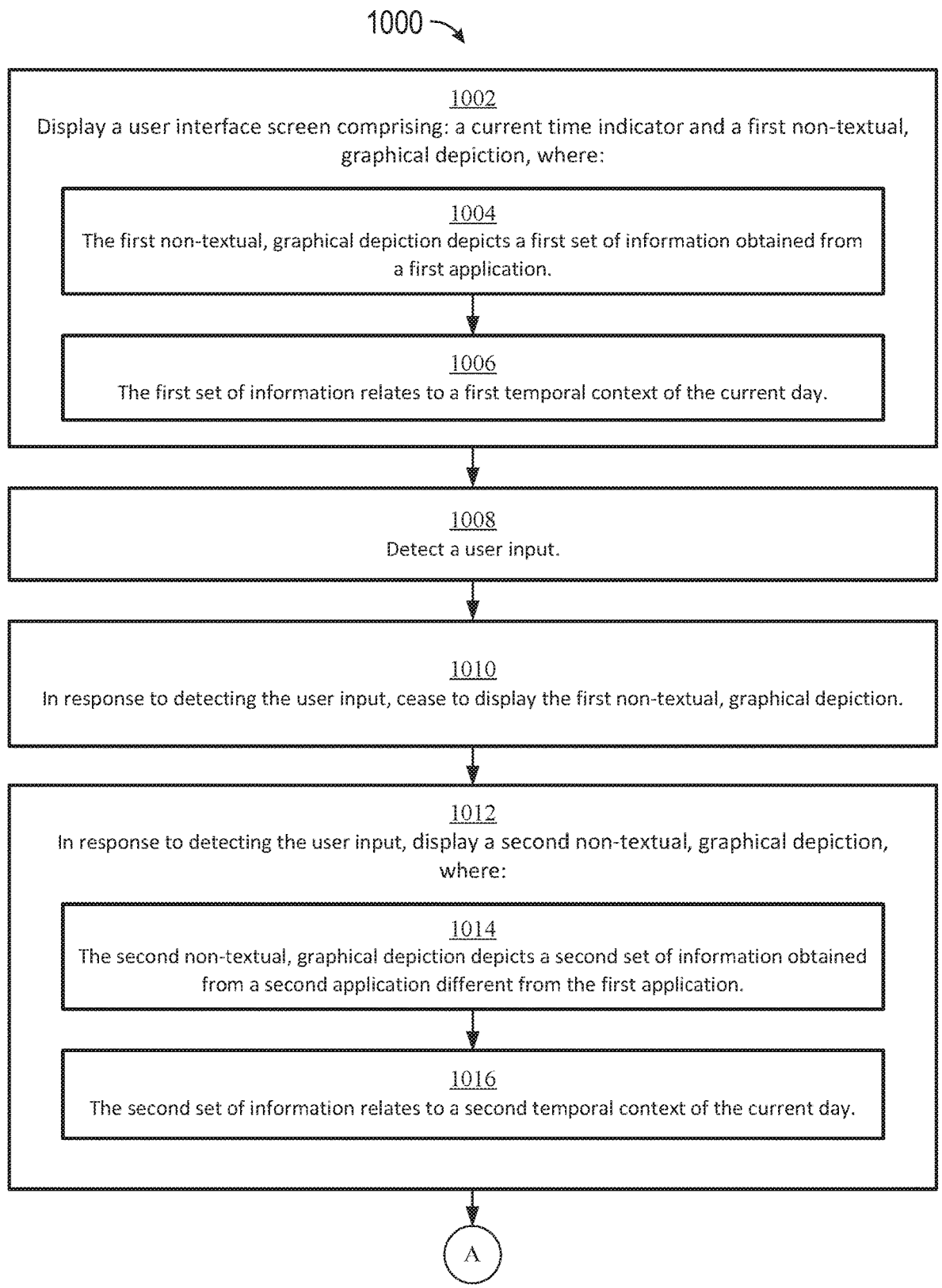
FIGS. 10A-10C illustrate a flow diagram depicting a process for providing context-specific user interfaces in accordance with some embodiments.
Figure 10B:
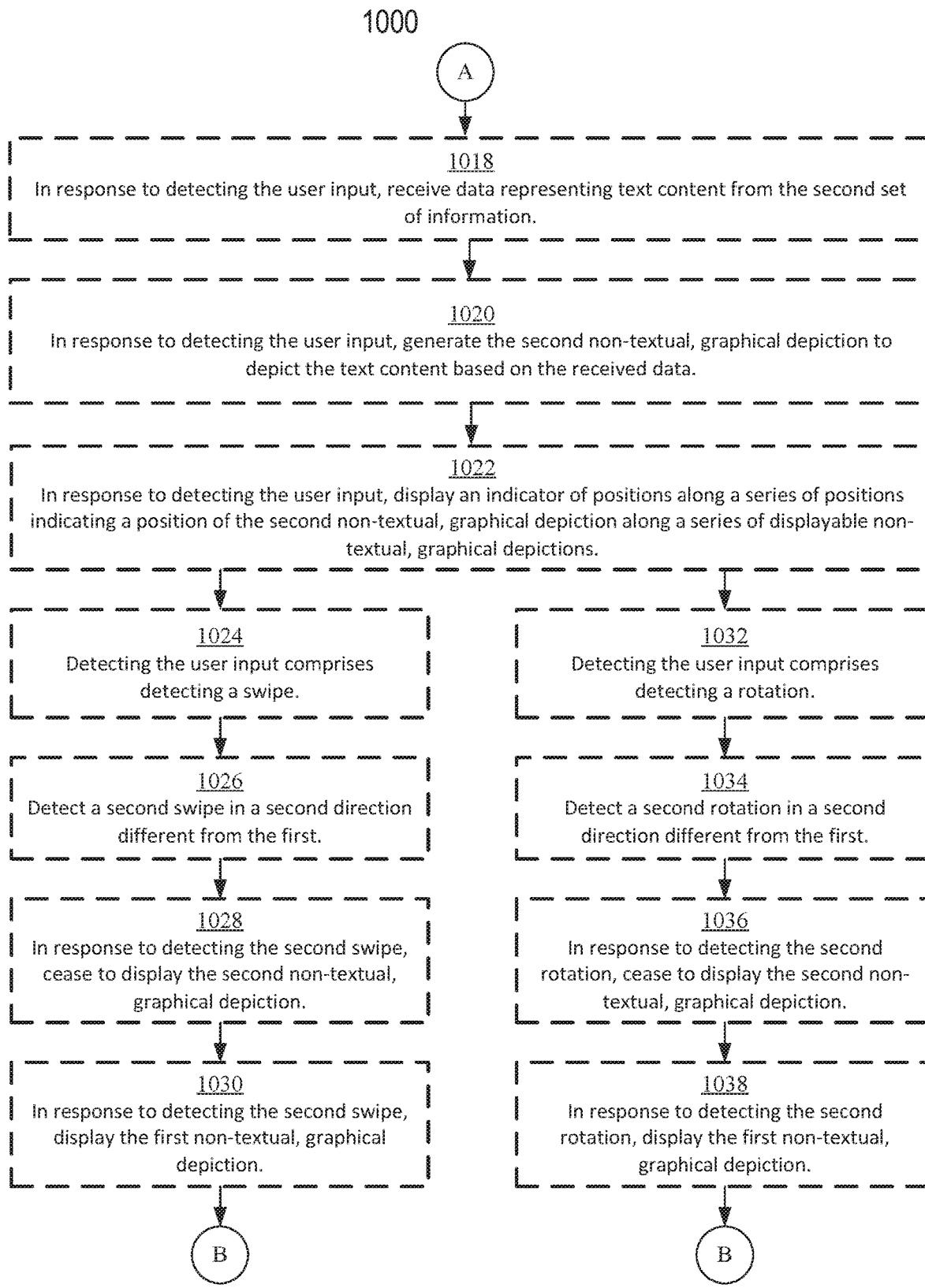
Figure 10C:
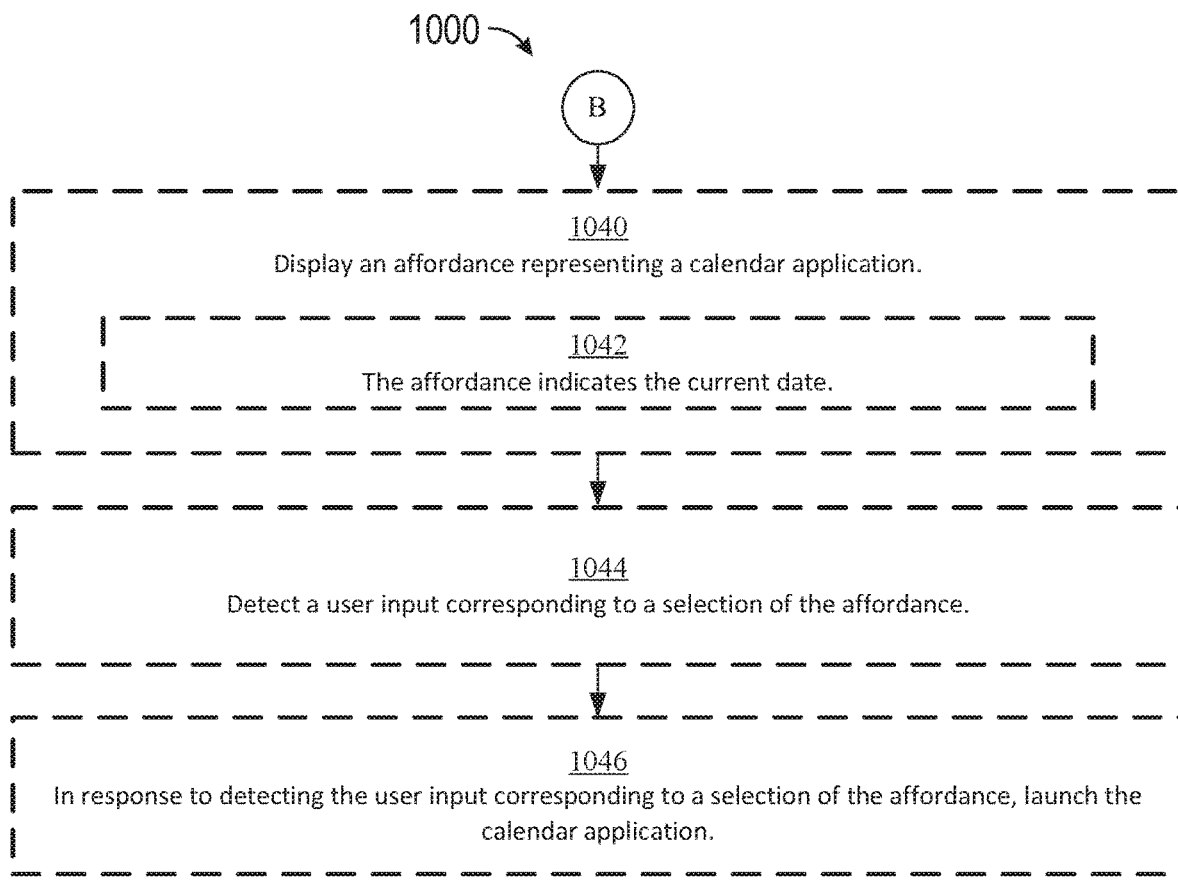

FIGS. 10A-10C show a flow diagram illustrating process 1000 for providing context-specific user interfaces. In some embodiments, process 1000 can be performed at an electronic device with a touch-sensitive display, one or more processors, and memory, such as device 100 (FIG. 1A), 300 (FIG. 3), 500 (FIGS. 5A-5H), or 900 (FIGS. 9A-9L). Some operations in process 1000 can be combined, the order of some operations may be changed, and some operations can be omitted.

In FIG. 10A, at block 1002, the device displays a user interface screen comprising a current time indicator (e.g., 904 in FIG. 9A) and a first non-textual, graphical depiction (e.g., 906 in FIG. 9A). As shown at block 1004, the first non-textual, graphical depiction depicts a first set of information obtained from a first application, e.g., a calendar event, user photo, change in weather conditions, breathe or activity reminder, and so forth (additional sets of information are described supra). As shown at block 1006, the first set of information relates to a first temporal context of the current day. For example, depiction 906 depicts forecasted weather conditions obtained from a weather application related to an upcoming time of the current day.

At block 1008, the device detects a user input. In some embodiments, the user input comprises a rotation of a rotatable input mechanism (e.g., scroll 914a received at rotatable input mechanism 910 shown in FIG. 9A). In some embodiments, the first user input comprises a swipe on a touch-sensitive display (e.g., swipe 914b on display 902 shown in FIG. 9B).

At block 1010, in response to detecting the user input, the device ceases to display the first non-textual, graphical depiction.

At block 1012, in response to detecting the user input, the device displays a second non-textual, graphical depiction (see depiction 914 in FIG. 9B). As shown at block 1014, the second non-textual, graphical depiction depicts a second set of information obtained from a second application. As shown at block 1016, the second set of information relates to a second temporal context of the current day. For example, depiction 914 depicts forecasted traffic conditions obtained from a navigation application related to the user's upcoming commute home. In some embodiments, the first and the second applications are the same. In some embodiments, the first and the second applications are different. In some embodiments, the first and the second non-textual, graphical depictions are displayed as wallpapers or backgrounds on the user interface screen. In some embodiments, the first and/or second set(s) of information are selected by the device for display based on one or more selection criteria, as described supra. Displaying sets of information obtained from different applications, but relating to time(s) in the current day, provides the user with relevant application data (and optionally affordances for launching applications) from a variety of applications without necessitating the display of multiple, dedicated application widgets (each dedicated to, and showing information obtained from, a single application). Providing additional control options without cluttering the user interface with additional displayed controls (e.g., dedicated application widgets) enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In FIG. 10B, at block 1018, the device optionally receives data representing text content from the second set of information in response to detecting the user input (e.g., before displaying the second non-textual, graphical depiction). For example, text content can comprise one or more keywords.

At block 1020, in response to detecting the user input, the device optionally generates the second non-textual, graphical depiction to depict the text content based on the received data (e.g., a cup of coffee to depict a "coffee" keyword, as shown by depiction 918 in FIG. 9C). Thus, the device automatically generates a graphical depiction of text content related to application data (e.g., a calendar event) and surfaces the depiction to the user at a relevant time of day (e.g., based on one or more selection criteria, as described supra) without requiring the user to select the application data (e.g., select a keyword from a calendar event) or when to display it. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1022, in response to detecting the user input, the device optionally displays an indicator of position along a series of positions (e.g., scroll indicators 912a-912c in FIGS. 9A-9D). The indicator of position along a series of positions indicates a position of the second non-textual, graphical depiction along a series of displayable non-textual, graphical depictions. Displaying an updating scroll indicator that indicates a position of a currently displayed depiction along a series of displayable depictions provides feedback to the user that the received user input (e.g., scroll 914a in FIG. 9A, scroll 914c in FIG. 9C, or swipe 914b in FIG. 9B) controls display of depictions that include application information while helping the user to navigate through the entire series of depictions (as well as indicating to the user that additional depictions are displayable). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1024, detecting the user input comprises detecting a swipe (e.g., on a touch-sensitive display) in a first swipe direction. See swipe 914b on display 902 shown in FIG. 9B.

At block 1026, the device optionally detects a second swipe in a second direction different from the first swipe direction.

At block 1028, in response to detecting the second swipe, the device optionally ceases to display the second non-textual, graphical depiction.

At block 1030, in response to detecting the second swipe, the device optionally displays the first non-textual, graphical depiction on the display.

At block 1032, detecting the user input comprises detecting a rotation of a rotatable input mechanism in a first direction of rotation (e.g., scroll 914a received at rotatable input mechanism 910 shown in FIG. 9A).

At block 1034, the device optionally detects a second rotation in a second direction different from the first direction of rotation.

At block 1036, in response to detecting the second rotation, the device optionally ceases to display the second non-textual, graphical depiction.

At block 1038, in response to detecting the second rotation, the device optionally displays the first non-textual, graphical depiction on the display.

In FIG. 10C, at block 1040, the device optionally displays an affordance representing a calendar application (e.g., complication 908 in FIG. 9G). In some embodiments, as shown at block 1042, the affordance indicates the current date.

At block 1044, the device optionally detects a user input corresponding to a selection of the affordance (e.g., tap 924 on complication 908 in FIG. 9G).

At block 1046, in response to detecting the user input corresponding to a selection of the affordance, the device launches the calendar application (see FIG. 9H). In some embodiments, launching the calendar application comprises ceasing to display the user interface screen and displaying a second user interface screen corresponding to the calendar application.

Note that details of the processes described above with respect to process 1000 (e.g., FIGS. 10A-10C) are also applicable in an analogous manner to the methods described elsewhere in this application. For example, other methods described in this application may include one or more of the characteristics of process 1000. For example, one or more of the steps of process 1000 can be combined with one or more of the steps of processes 700 or 800, as described above. For brevity, these details are not repeated below.

Turning now to FIG. 11A, users may wish to generate new images for display on a portable multifunction device, e.g., to provide the user different experiences as the display is viewed multiple times a day. This keeps the user interested and engaged with the electronic device. Tying the generation of these new images to the time of day provides improved techniques for timekeeping and further enhances the timekeeping functionality of the device.

Figure 11C:
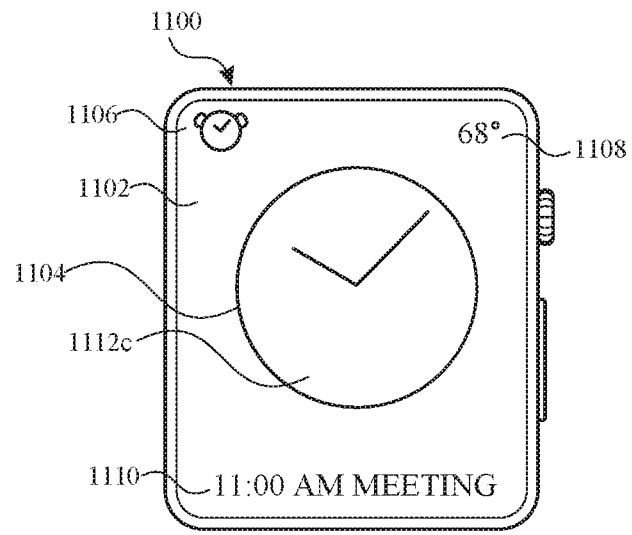
FIGS. 11A-11N illustrate exemplary context-specific user interfaces.
Figure 11C:
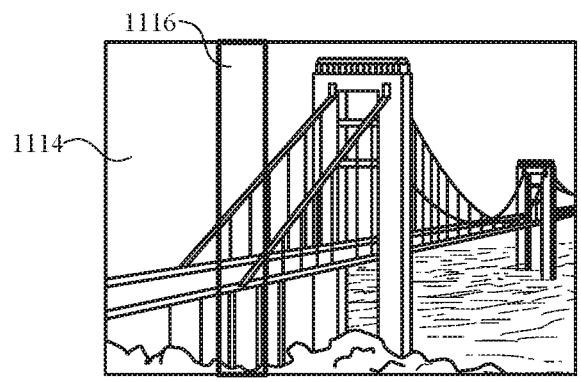
Figure 11C:
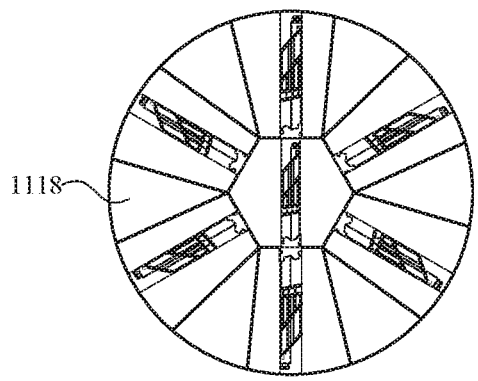
Figure 11D:
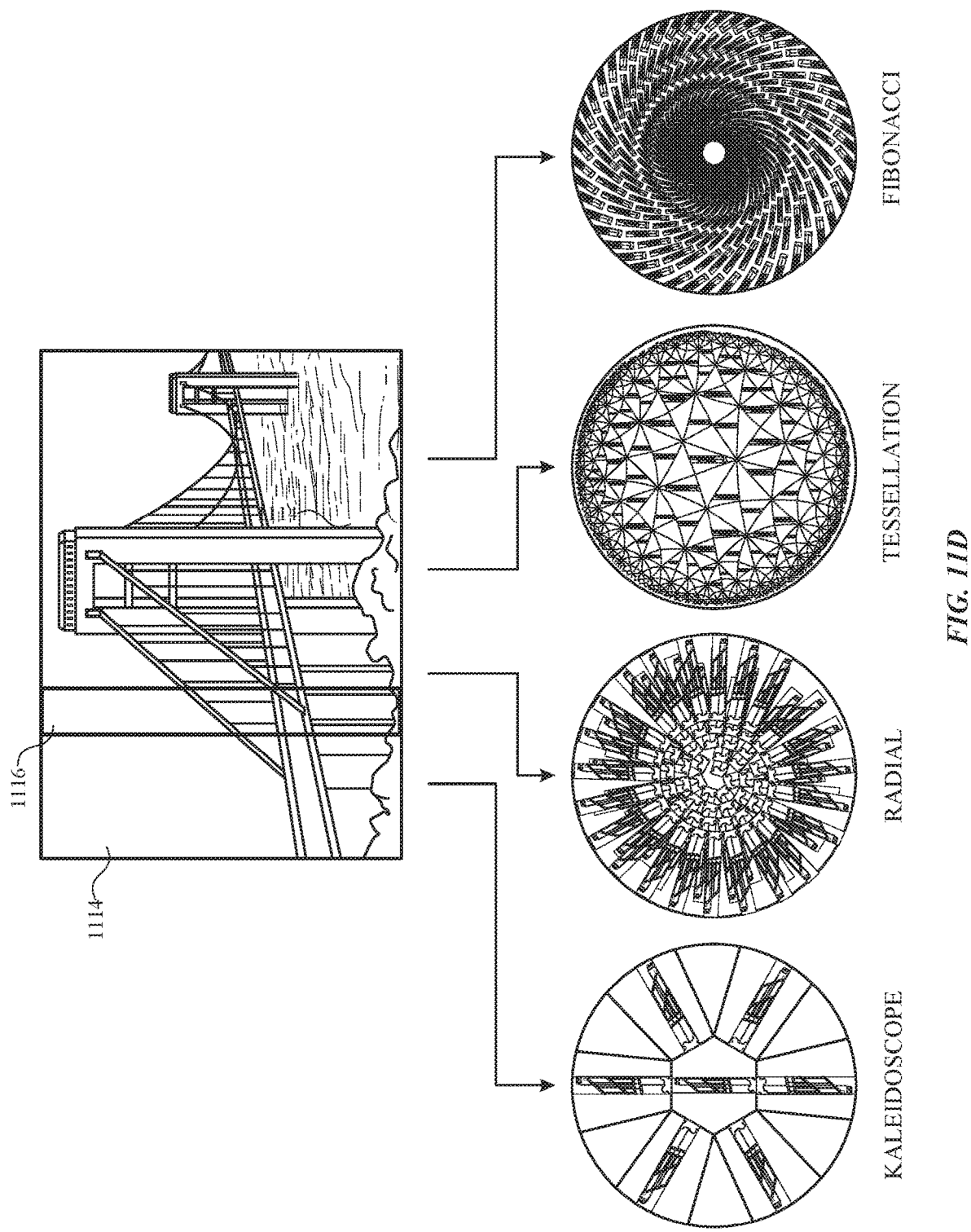
Figure 11E:
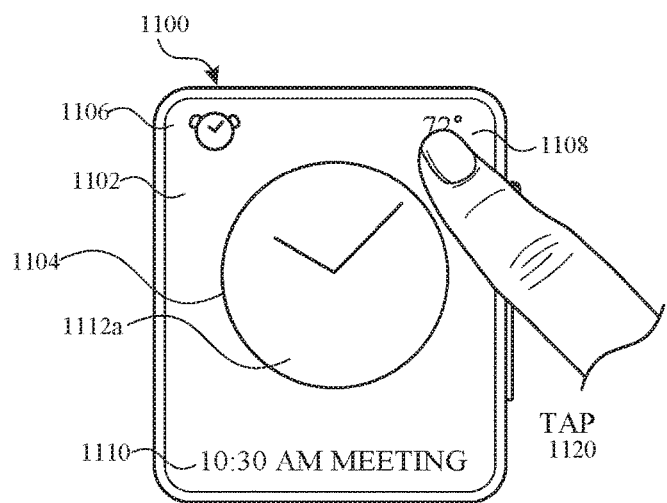
Figure 11F:
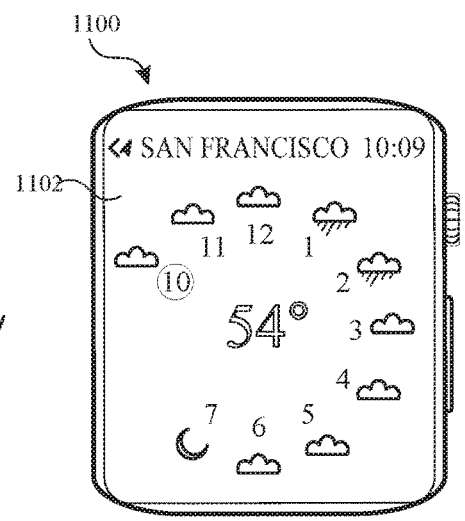
Figure 11G:
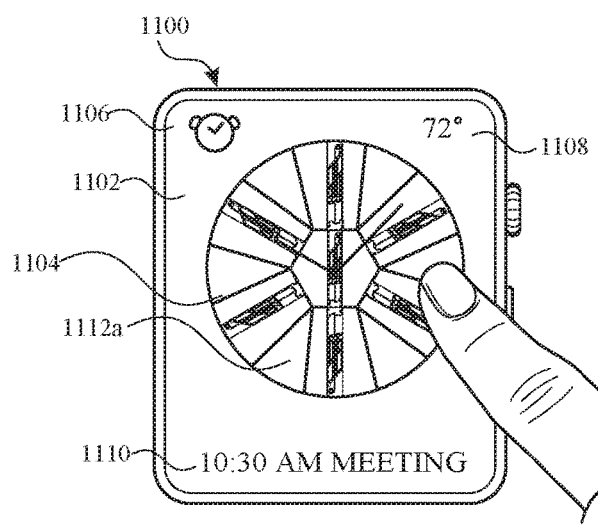
Figure 11H:
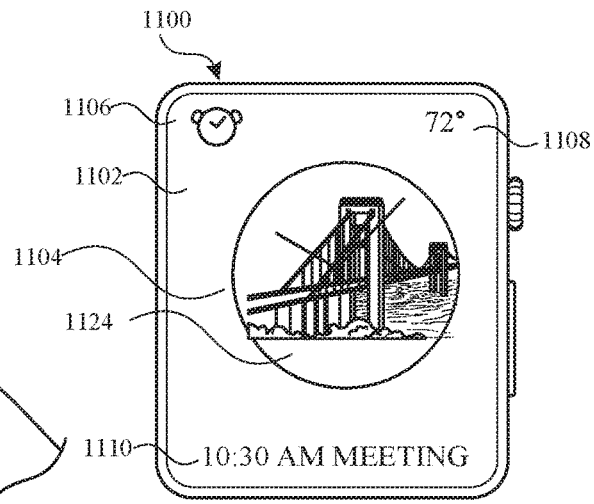
Figure 11I:
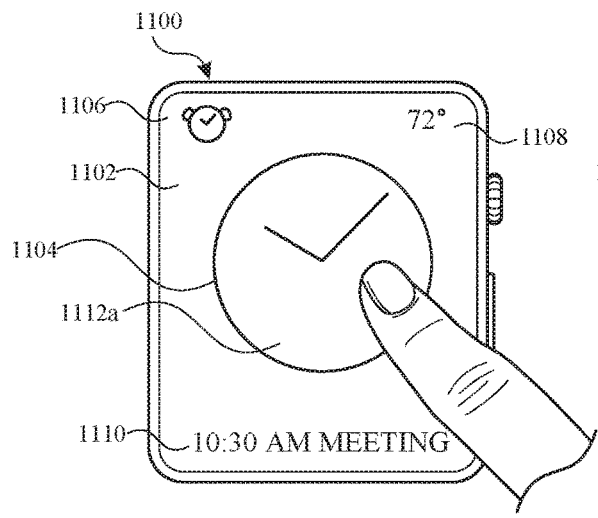
Figure 11J:
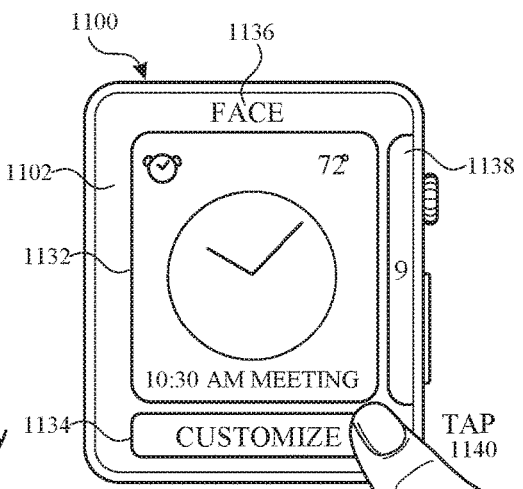
Figure 11K:
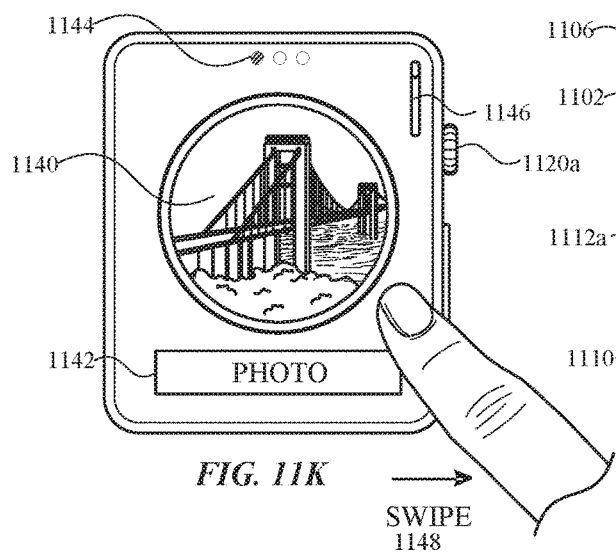
Figure 11L:
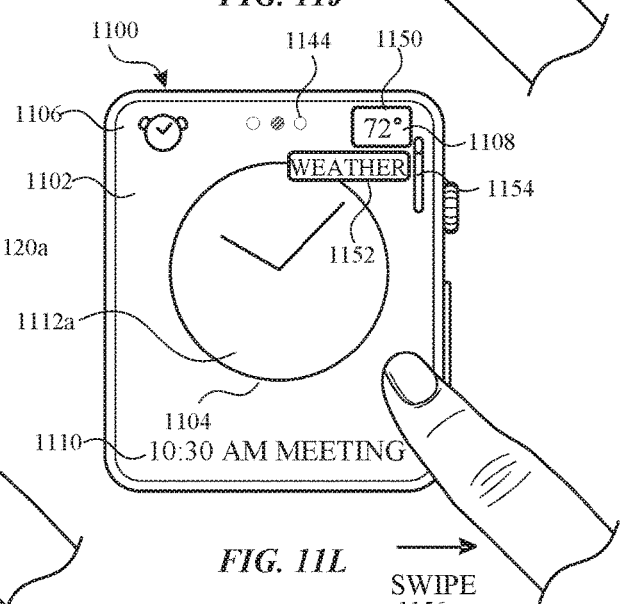
Figure 11M:
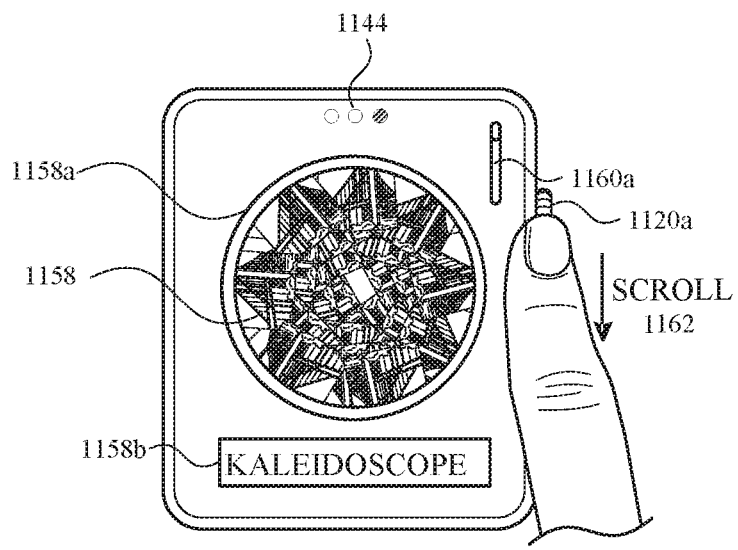
Figure 11N:
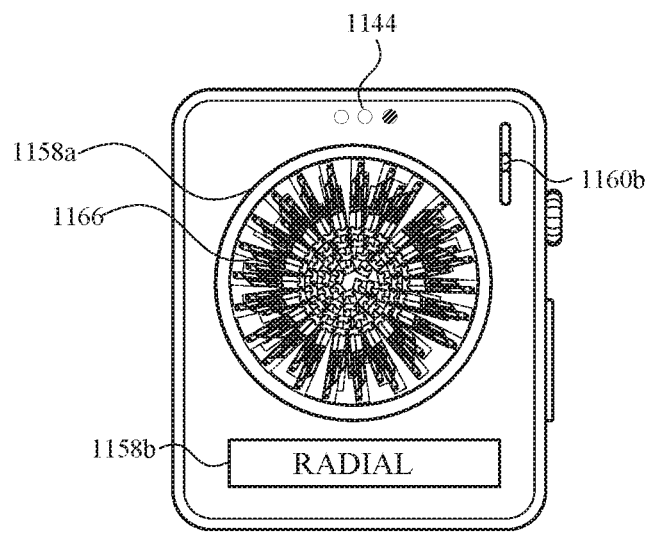

FIGS. 11A-11N show exemplary context-specific user interfaces that may be operated on device 1100. Device 1100 may be device 100, 300, or 500 in some embodiments. The electronic device has a display 1102 (e.g., 504). In some embodiments, display 1102 is a touch-sensitive display. In some embodiments, device 1100 includes a rotatable input mechanism 1120a (e.g., 506) and/or input mechanism or button 1120b (e.g., 508).

FIG. 11A (top) illustrates an exemplary context-specific user interface displayed on display 1102 of device 1100. This user interface screen includes current time indicator 1104 (in this example, an analog clock with an hour hand, minute hand, and optional seconds hand). Also displayed in association with 1104 are three complications 1106, 1108, and 1110. These three complications are each associated with an application (an alarm, weather, and calendar application, respectively). In some embodiments, one or more of these complications displays a set of information obtained from the corresponding application. For example, complication 1108 displays a current temperature obtained from the weather application, and complication 1110 displays the time of an upcoming calendar event and a text descriptor. In some embodiments, complication 1110 occupies more space on display 1102 and optionally displays more information from the corresponding application (e.g., an increased number of characters or increased image size), as compared to complications 1106 and 1108. This provides the user with multiple levels of detail for displaying application information. Complication 1106 graphically represents the alarm application without displaying a set of information from the alarm application (textual representations could also be used).

Also displayed on this user interface screen is background 1112a. In some embodiments, background 1112a is displayed as a wallpaper on display 1102. In some embodiments, background 1112a is displayed as the clock face of analog clock 1104.

Background 1112a displays a kaleidoscope-style composite image 1118 (FIG. 11A, bottom) created from image 1114 (FIG. 11A, middle). Device 1100 creates composite image 1118 by selecting portion 1116 of image 1114 and reflecting portion 1116 across a plurality of axes of reflection. For example, device 1100 can display 12 facets of portion 1116 mirrored 6 times, or any other combination of number of axes of reflection and number of facets to generate a suitable image.

FIG. 11A shows composite image 1118 displayed as background 1112a on display 1102 at 10:09. Later, when the user activates the display (e.g., as described infra) at 12:25, multiple aspects of display 1102 are updated (FIG. 11B). Current time indicator 1104 is updated to reflect the current time. In some embodiments, the set(s) of information displayed by one or more complication(s) are updated, e.g., in accordance with data from the corresponding application. In this example, complication 1108 is updated to display the current temperature, and complication 1110 is updated to display the time of an upcoming calendar event and a text descriptor. Complication 1106 is not updated.

Background 1112b is also updated. Device 1100 creates composite image 1124 by selection portion 1122 of image 1114 and reflecting portion 1122 across a plurality of axes of reflection (in some embodiments, the same axes of reflection used to generate composite image 1118). Thus, device 1100 can select different portions of the same image at different times of day, thereby increasing the variety of its displayed background.

In some embodiments, the selection of the image portion is based on time of day. This concept is illustrated in FIG. 11C. Like FIG. 11A, display 1102 in FIG. 11C (top) shows a user interface screen with current time indicator 1104 and complications 1106, 1108, and 1110. Analog clock 1104 indicates that the current time is the same time as shown in FIG. 11A, e.g., on a different day. Complication 1108 has been updated to indicate the current temperature, and complication 1110 has been updated to indicate the time of an upcoming calendar event and a text descriptor. Complication 1106 is not updated.

Background 1112c in FIG. 11C is the same as background 1112a in FIG. 11A. For example, background 1112c is created by device 1100 by selecting portion 1116 of image 1114 and reflecting portion 1116 across the same plurality of axes of reflection. Thus, the selection and/or reflection of an image portion can be determined based on time of day.

In some embodiments, device 1100 can select a portion (e.g., portion 1116) of an image (e.g., image 1114) based on a set of one or more criteria. In some embodiments, device 1100 can associate a score (e.g., an "interestingness score")

with a plurality of portions of an image (e.g., 1114). For example, device 1100 can divide an image into a plurality of portions (e.g., a grid) and associate a score with each portion of the plurality. In some embodiments, the score is based on one or more of the following scoring criteria: luminance, average luminance, derivative of luminance, and chroma value. In some embodiments, device 1100 selects a portion based on its score (e.g., it selects a portion having a score above a predetermined threshold). This is advantageous, e.g., because some image portions may be incompatible with reflection (e.g., an image portion having a single color or black/white hue would not be amendable to reflection and composite image generation).

In some embodiments, device 1100 can apply a selection path through the image to select image portions based on time of day. For example, the selection path can be a deterministic path guiding portion selection that repeats at a regular interval, such as every 12 or every 24 hours. Thus, a user can perceive the time of day based on which portion of the image is selected and displayed as a kaleidoscope. In some embodiments, the selection path comprises two or more image portions having a selection score above a predetermined threshold (e.g., as described above). In some embodiments, device 1100 detects a user input (e.g., a rotation of a rotatable input mechanism), and in response to detecting the user input, the device selects a second image portion along the selection path for reflection and composite image generation. In some embodiments, the user can select an image portion, e.g., by providing a user input corresponding to a selection of an image portion.

Device 1100 can apply a variety of axes of reflection to an image portion, thereby generating kaleidoscope-type composite images in a variety of patterns. Exemplary patterns based on portion 1116 of image 1114 are shown in FIG. 11D. In some embodiments, the axes of reflection create a kaleidoscope pattern, e.g., by applying multiple axes of reflection to create a set of reflected facets. In some embodiments, the axes of reflection create a radial pattern, e.g., by taking a slice of the image and rotating the slice in a circle to create a plurality of axes of reflection. In some embodiments, the axes of reflection create a tessellated pattern, e.g., by tiling the background with a series of reflected image portions. Various types of tessellations are known and are well known in the work of the artist M. C. Escher; see, e.g., repeated triangles to generate a sphere (e.g., a Schwarz triangle), or tiling in a hyperbolic plane (e.g., a Poincaré disk). In some embodiments, the axes of reflection create a pattern based on the Fibonacci sequence, e.g., by repeating reflected image portions in numbers of spirals according to the Fibonacci sequence (such as the number of seed spirals on a sunflower).

This context-specific user interface allows the user to launch an application by selecting the corresponding complication. For example, the user contacts complication 1108 (e.g., via tap 1120) in FIG. 11E. In response to detecting tap 1120, device 1100 updates display 1102 to show a user interface from the corresponding weather application (FIG. 11F).

The user may wish to view the original image, e.g., to identify the portion selected for composite image generation. The user contacts background 1112*a* (e.g., via tap 1122) in FIG. 11G. In response to detecting tap 1122, the device displays image 1114, e.g., as background 1124.

The user may wish to edit the application represented by complication 1108 and/or other aspects of the user interface, such as colors (e.g., a color of a seconds hand of 1104), density of displayed information (e.g., hour markings of 1104, or lack thereof), and so forth. Additional descriptions of editing and/or selecting context-specific user interfaces and sub-components thereof may be found in International Patent Application Serial No. PCT/US2015/034607, titled "Context-Specific User Interfaces," filed Jun. 7, 2015, published as WIPO Publication No. WO/2016/022205, which is incorporated by reference herein in its entirety.

In FIG. 11I, the user accesses an edit mode of device 1100 through press 1130, which in some embodiments can be a press having a duration longer than a predetermined duration (e.g., a "long press" input) or a contact having a characteristic intensity above an intensity threshold. In this example, in response to detecting press 1130, device 1100 enters a context-specific user interface selection mode and visually distinguishes the user interface screen to indicate the selection mode (FIG. 11J). Device 1100 alerts to the user that it has entered into the selection mode by displaying smaller representation 1132 of the user interface screen, name 1136 corresponding to a name of the type of context-specific user interface currently selected, partial view 1138 of an adjacent, stored context-specific user interface (which the user could select by swiping to view the full interface and tapping to select it), and edit affordance 1134. In order to edit the user interface, the user contacts edit affordance 1134 via tap 1140.

In response to detecting tap 1140, the device enters edit mode and visually distinguishes one or more aspects of the user interface for editing (FIG. 11K). In this example, background 1140 is selected for editing (e.g., selecting a photo from which the portion is selected). Device 1100 informs the user that background 1140 is selected for editing by visually distinguishing background 1140 via displaying an outline around background 1140 and indicator 1142, which indicates that the source photo for background 1140 is editable. Device 1100 also displays scroll indicator 1146, which informs the user that additional photos can be selected by scrolling and indicates the position of the photo along the series of displayable photo-based backgrounds. Device 1100 also displays paging affordance 1144, which indicates that three options for editing different aspects of the user interface can be selected (e.g., by swiping). In this example, the options include the photo from which background 1140 is selected, the application associated with various complications, and the type of pattern used to generate the composite image.

To edit the photo, the user can rotate 1120*a*. To edit a different aspect of the interface, the user swipes display 1102 via swipe 1148. In response to detecting swipe 1148, the device indicates complication 1108 for editing (FIG. 11L). Device 1100 informs the user that complication 1108 is selected for editing by visually distinguishing complication 1108 via displaying outline 1150 around complication 1108 and indicator 1152, which indicates the application represented by the complication (in this example, indicating the weather application). Device 1100 also displays scroll indicator 1154, which informs the user that additional applications can be selected by scrolling and indicates the position of the weather application along the series of displayable application options. Further in response to detecting swipe 1148, device 1100 updates paging affordance 1144 to reflect the position of complication editing in the series of editable aspects.

To select the pattern used to generate the composite image, the user swipes display 1102 via swipe 1156. In response to detecting swipe 1156, the device displays the screen shown in FIG. 11M. In FIG. 11M, the composite image 1158 on which the background is based is visually indicated via displaying outline 1158*a* around composite image 1158 and indicator 1158*b*, which indicates that the pattern (e.g., of axes of reflection) used to generate the composite image 1158 for background 1140 is editable. Device 1100 also displays scroll indicator 1160*a*, which informs the user that patterns can be selected by scrolling and indicates the position of the pattern along the series of selectable patterns. Further in response to detecting swipe 1156, device 1100 updates paging affordance 1144 to reflect the position of pattern editing in the series of editable aspects.

To change the pattern, the user rotates 1120*a* via scroll 1162. In response to detecting scroll 1162, device 1100 generates composite image 1166 using the same image portion as 1158, but applying a different pattern of axes of reflection (FIG. 11N). Indicator 1158*b* is also updated to reflect the pattern of axes of reflection. Scroll indicator 1160*b* is also updated to indicate the position of the radial pattern along the series of selectable pattern options. In some embodiments, the user can then exit edit mode and display the edited user interface screen. In some embodiments, upon exiting edit mode, the device saves the edited user interface screen in memory, e.g., such that it can be subsequently selected in selection mode, e.g., as described in International Patent Application Serial No. PCT/US2015/034607, titled "Context-Specific User Interfaces," filed Jun. 7, 2015, published as WIPO Publication No. WO/2016/022205 (see, e.g., display 1322 in FIG. 13).

Figure 12:
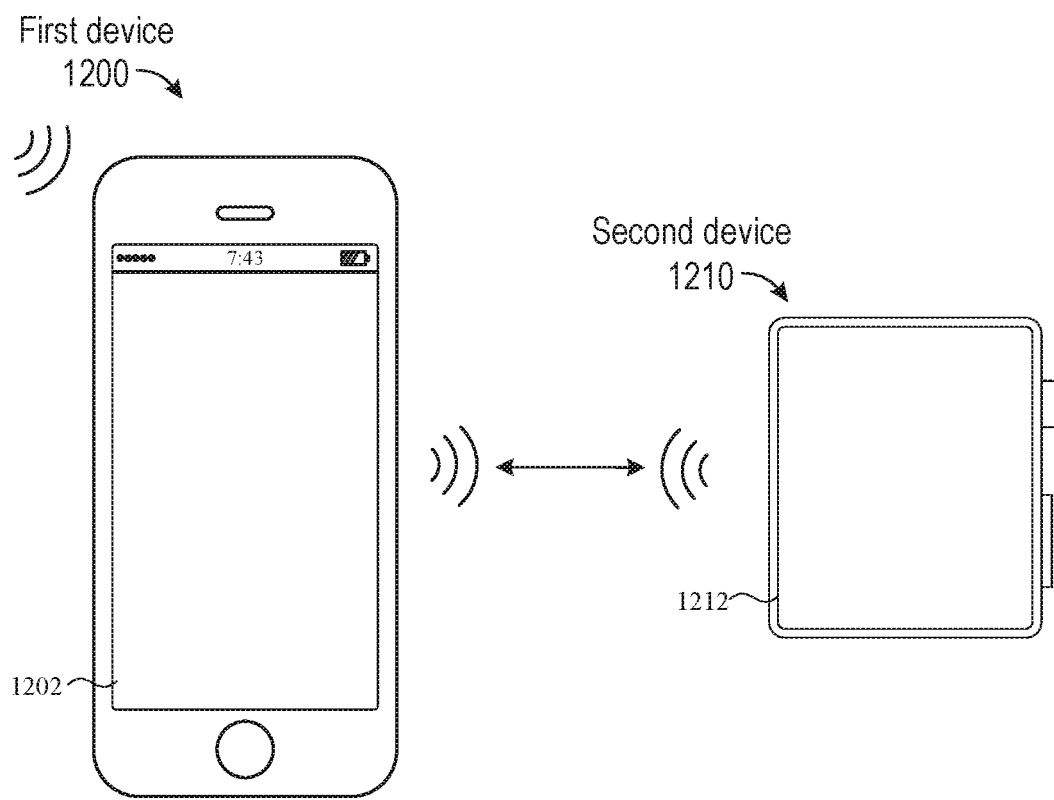
FIG. 12 illustrates exemplary personal electronic devices.

Turning now to FIG. 12, it may be advantageous to allow the user to use an electronic device (e.g., a first device) to configure a context-specific user interface for a different portable multifunction device (e.g., a second device). In some embodiments, the first device has a larger display than the second device, thereby making it easier for the user to see and/or provide touch gestures on the first device. The user may wish to configure a user interface for the second device while operating the first device without switching over to the second device.

FIG. 12 illustrates an exemplary first electronic device 1200 and an exemplary second electronic device 1210. In some embodiments, device 1200 may be one or more of devices 100 (FIG. 1A), 300 (FIG. 3), and/or 500 (FIG. 5A). For purposes of illustration, first device 1200 is a personal electronic device, similar to portable multifunction device 100 as depicted in FIG. 4A, with a touch-sensitive display 1202. In some embodiments, second device 1210 may be one or more of devices 100 (FIG. 1A), 300 (FIG. 3), and/or 500 (FIG. 5A). For purposes of illustration, external device 1210 is a personal electronic device, similar to device 500 as depicted in FIG. 5A, with a touch-sensitive display 1212, a rotatable input mechanism, and a button.

As depicted in FIG. 12, device 1200 is capable of receiving information over a wireless network. In some embodiments, device 1200 is coupled via wireless communication to device 1210. FIG. 12 also indicates that device 1200 is capable of operating in a paired relationship with external device 1210 to exchange data between the two devices. In a paired relationship, device 1200 and device 1210 are registered with one another and can perform two-way wireless communication. In some embodiments, wireless communication, for purposes of a paired relationship, occurs over a peer-to-peer wireless communication protocol such as Bluetooth and/or Bluetooth Low Energy (BTLE). In some embodiments, the wireless communication uses more than one wireless communication protocol. For example, WiFi may be used in addition to BTLE. In these embodiments, an initial communication between two devices may occur over a lower powered protocol, such as BTLE, even if the protocol yields a slower data transfer speed. Subsequent communications may occur over a secondary network that is relatively faster, such as WiFi. Additional exemplary techniques related to initiating and operating in a paired relationship are described in the following co-pending applications: International Patent Application Serial No. PCT/US2015/023699, titled "Companion Application for Activity Cooperation," filed Mar. 31, 2015 published as WIPO Publication No. WO/2015/0183403; U.S. patent application Ser. No. 14/474,466, titled "Predefined Wireless Pairing," filed Sep. 2, 2014, published as US PG Pub. No. 20150350865; International Patent Application Serial No. PCT/US2015/047507, titled "Reduced-size Configuration Interface," filed Aug. 28, 2015 published as WIPO Publication No. WO/2016/036603; and U.S. Provisional Patent Application titled "Reduced-size Configuration Interface," filed Mar. 8, 2015, naming Lawrence Y. Yang et al. as inventors. Referring to FIG. 12, a user may wish to configure a context specific user interface using device for display on device 1210 using device 1200.

Figure 13:
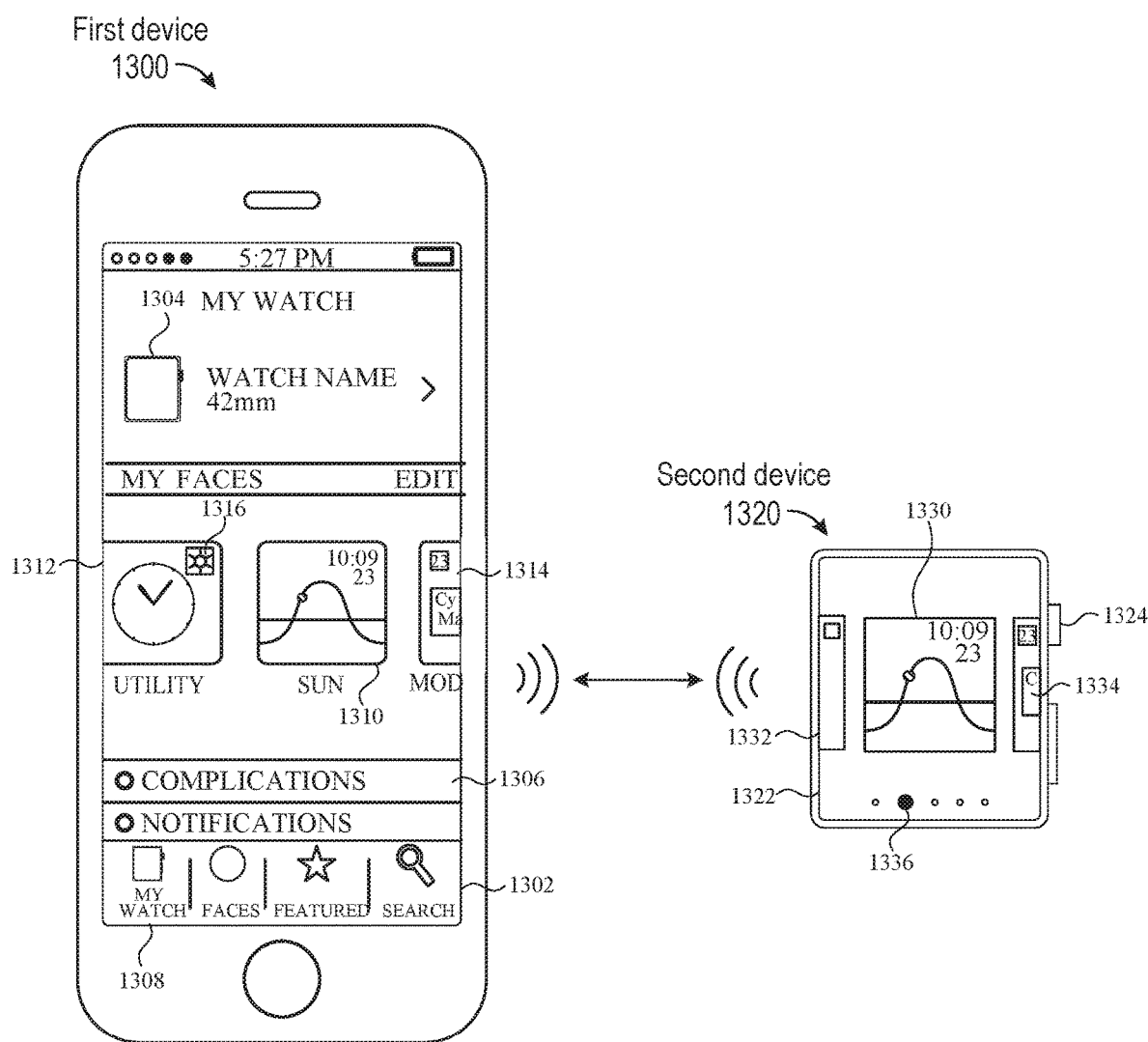
FIG. 13 illustrates exemplary context-specific user interfaces.

FIG. 13 illustrates exemplary electronic device 1300 and an exemplary electronic device 1320. In some embodiments, device 1300 may be one or more of devices 100 (FIG. 1A), 300 (FIG. 3), and/or 500 (FIG. 5A). For purposes of illustration, first device 1300 is a personal electronic device, similar to portable multifunction device 100 as depicted in FIG. 4A, with a touch-sensitive display 1302. In some embodiments, second device 1320 may be one or more of devices 100 (FIG. 1A), 300 (FIG. 3), and/or 500 (FIG. 5A). For purposes of illustration, external device 1320 is a personal electronic device, similar to device 500 as depicted in FIG. 5A, with a touch-sensitive display 1322 and a rotatable input mechanism 1324. Devices 1300 and 1320 are coupled via wireless communication. In some embodiments, devices 1300 and 1320 are in a paired relationship, e.g., as described in reference to FIG. 12.

Device 1320 has access to a library of context-specific user interfaces for display on display 1322. For example, the library can be stored in memory of device 1320, stored in memory of device 1300 and accessible to device 1320, and/or stored at an external server accessible to devices 1300 and 1320. In some embodiments, context-specific user interfaces are stored in the library as unique or complete assets. In some embodiments, the library stores context-specific user interfaces as configurations that are rendered for display by device 1320 (e.g., by rendering a set of graphical assets stored in memory according to the configuration, which specifies the particular graphical asset(s) used and their arrangement within the user interface).

FIG. 13 also illustrates a user interface, at device 1300, for selecting, reordering, and/or editing context-specific user interfaces from the stored library for display on device 1320. The user interface screen shown on display 1302 includes depiction 1304 of device 1320, which optionally includes a depiction of device name, size, and/or other device features. In some embodiments, depiction 1304 serves as an affordance that, when contacted by the user, displays additional information and/or functionality related to device 1320, such as options for pairing or de-pairing device 1320 with another electronic device. The user interface screen shown on display 1302 includes complications bar 1306. In some embodiments, complications bar 1306 allows the user to view a list of complications that can be configured for display as part of a context-specific user interface from the library, as well as optional affordances for selecting and/or editing particular complications. In some embodiments, the user scrolls on the depicted user interface screen (e.g., with a horizontal swipe) to view particular complication options. Screen 1302 further includes affordance 1308 for viewing one or more user interfaces from the library. In some embodiments, the user touches affordance 1308, and in response device 1300 displays the user interface illustrated on screen 1302.

Also shown on the user interface screen of display 1302 are preview images 1310, 1312, and 1314. Preview images 1310, 1312, and 1314 represent context-specific user interfaces from the library for display on device 1320. As represented by preview images 1310 and 1312, both corresponding user interfaces include a clock. In addition, the user interface represented by 1312 includes a complication, as described herein. In some embodiments, the preview image(s) are displayed with an associated text element indicating the type of watch face for the corresponding context-specific user interface (e.g., "sun" for the user interface represented by 1310, "utility" for the user interface represented by 1312, etc.). The user interface screens shown on displays 1302 and 1322 indicate to the user what user interfaces are stored in the library and the order or sequence of the user interfaces within the library.

In some embodiments, the preview image includes a representation of one or more complications of the user interface. For example, preview image 1312 includes representation 1316, which represents a complication of the user interface represented by 1312. In this example, representation 1316 represents a complication that displays an affordance representing a weather application. As discussed above, complications can obtain data and display information obtained from an associated application (optionally, the information is updated in accordance with updates to the data). In some embodiments, device 1300 obtains "live" data from the weather application and displays information updated according to updates to the data in representation 1316 (e.g., the sun depicted in 1316 indicates current weather conditions, representing live data obtained from the weather application). Advantageously, this allows the user to visualize how the user interface looks when displayed on device 1320 at the current time. In other embodiments, device 1300 displays a "placeholder" representation of application data. For example, the sun depicted in 1316 can be an icon or affordance that represents to the user the content of the live data that would be displayed in the complication. For example, the placeholder may be installed as part of the app and/or designated as part of a software development kit used to develop the application. Advantageously, this allows the user to understand the function of the complication within the user interface but does not require processor resources and/or communication bandwidth to obtain live data to generate the preview image.

Preview image 1314 is shown in partial view. This alerts the user to the fact that additional preview images representing the rest of the stored library are viewable in this interface, e.g., by scrolling. In some embodiments, the user swipes the display at one or more of preview images 1310, 1312, and 1314 (e.g., a horizontal swipe), and in response to detecting the swipe, device 1300 scrolls the displayed preview images to reveal one or more additional preview images representing user interfaces from the library.

In some embodiments, information in one or more preview images shown on display 1302 and/or 1322 is updated live, e.g., while the user is in face selection mode of device 1320 or viewing preview images at display 1302. For example, in some embodiments, a representation of a clock on one or more of 1310, 1312, 1314, 1330, 1332, and/or 1334 is rendered live, e.g., such that the preview image displays current time. In some embodiments, a representation of one or more complications on one or more of 1310, 1312, 1314, 1330, 1332, and/or 1334 is rendered live, e.g., such that the preview image displays current complication data (e.g., information from an application updated in accordance with updates to application data). In some embodiments, a representation of one or more complications on a currently centered preview image (e.g., displayed in complete view, such as 1310 or 1330) is rendered live, while a representation of one or more complications on a currently non-centered preview image (e.g., displayed in partial view, such as 1312, 1314, 1332 or 1334) is not rendered live (e.g., it displays placeholder data, or data obtained at a previous refresh, such as the last time the represented user interface was displayed, or the last time the preview image was centered on the display). In some embodiments, a representation of one or more complications on a currently centered preview image (e.g., displayed in complete view, such as 1310 or 1330) and representation(s) on preview images immediately adjacent to the currently centered preview image are rendered live (e.g., 1312, 1314, 1332 or 1334), while a representation of one or more complications on a preview image that is not currently centered and not adjacent to a currently centered preview image is not rendered live (e.g., it displays placeholder data, or data obtained at a previous refresh, such as the last time the represented user interface was displayed, or the last time the preview image was centered on the display). In some embodiments, a representation that is not rendered live may be rendered using data updated at a longer interval than a representation that is rendered live. In some embodiments, one or more elements or user interface objects represented in a preview image other than those representing a clock or a complication may be shown as a static element (e.g., not rendered according to updated data).

Figure 14A:
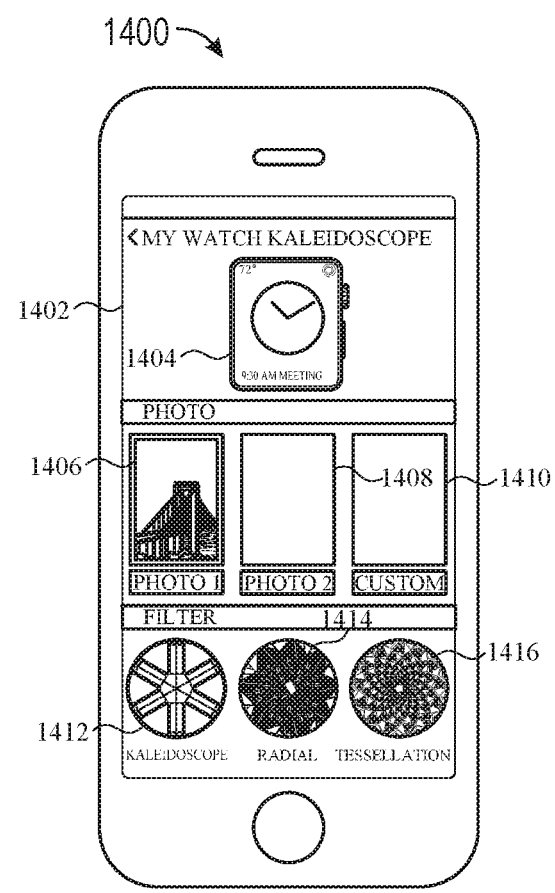

FIG. 14A illustrates exemplary electronic device 1400. In some embodiments, device 1400 may be one or more of devices 100 (FIG. 1A), 300 (FIG. 3), and/or 500 (FIG. 5A). For purposes of illustration, device 1400 is a personal electronic device, similar to portable multifunction device 100 as depicted in FIG. 4A, with a touch-sensitive display 1402. In some embodiments, device 1400 is in a paired relationship (e.g., as described in reference to FIG. 12) with a second device (e.g., 1210 or 1320), which may be one or more of devices 100 (FIG. 1A), 300 (FIG. 3), and/or 500 (FIG. 5A).

Display 1402 includes preview image 1404 of a context-specific user interface, similar to those described in FIGS. 11A-11N, for display on the second device. Also displayed are a number of editable aspects of the context-specific user interface. In this example, the user can edit the image used to create a composite image for the background, the applications and/or sets of information displayed by one or more complications, and the type of pattern (e.g., of axes of reflection) used to generate the composite image. Representations of selectable options for these editable aspects are also displayed. For example, representations 1406, 1408, and 1410 represent images that can be selected for composite image generation. In some embodiments, one or more of the images are system-designated or curated images. In some embodiments, one or more of the images are user-designated images, e.g., photos taken by the user. Representations 1412, 1414, and 1416 represent types of pattern (e.g., of axes of reflection) that can be used to generate a composite image-based background (e.g., as described supra).

FIGS. 14B & 14C illustrate selection of an option for pattern. A kaleidoscope pattern is currently selected for generation of a composite image displayed as background 1462a on display 1452 of device 1450 in FIG. 14B. Display 1452 also shows complications 1456, 1458, and 1460, and current time indicator 1454. The screen on display 1402 of device 1400 also informs the user of this currently selected option using representation 1404, which represents the user interface currently selected for display by device 1450.

In FIG. 14B, the user selects representation 1414, which represents a radial pattern (e.g., of axes of reflection). In this example, the user contacts representation 1414 displayed on display 1402 of device 1400 via tap 1420. In some embodiments, representation 1414 further comprises representations of one or more of complications 1456, 1458, and 1460, and current time indicator 1454.

In response to detecting tap 1420, device 1400 updates representation 1404 with a representation of a composite image generated using a radial pattern of reflection (FIG. 14C). In some embodiments, representation 1404 represents the same interface displayed by 1450. In some embodiments, representation 1404 represents an interface comprising a placeholder composite-image based background that represents the radial pattern to the user. This informs the user at device 1400 how the selected option will change the user interface screen displayed by device 1450. In some embodiments, representation 1404 further comprises representations of one or more of complications 1456, 1458, and 1460 (e.g., using live application data or placeholder data), and current time indicator 1454.

Further in response to detecting tap 1420 at device 1400, device 1450 updates background 1462b to generate a composite image using the radial pattern (e.g., of axes of reflection; FIG. 14C). Compared to background 1462a, background 1462b is based on the same image portion, but reflected across a different plurality of axes of reflection (e.g., in a radial pattern). For example, device 1400 can send instructions to device 1450 to generate a composite image using the radial pattern in response to detecting tap 1420.

Figures 14D, 14E:
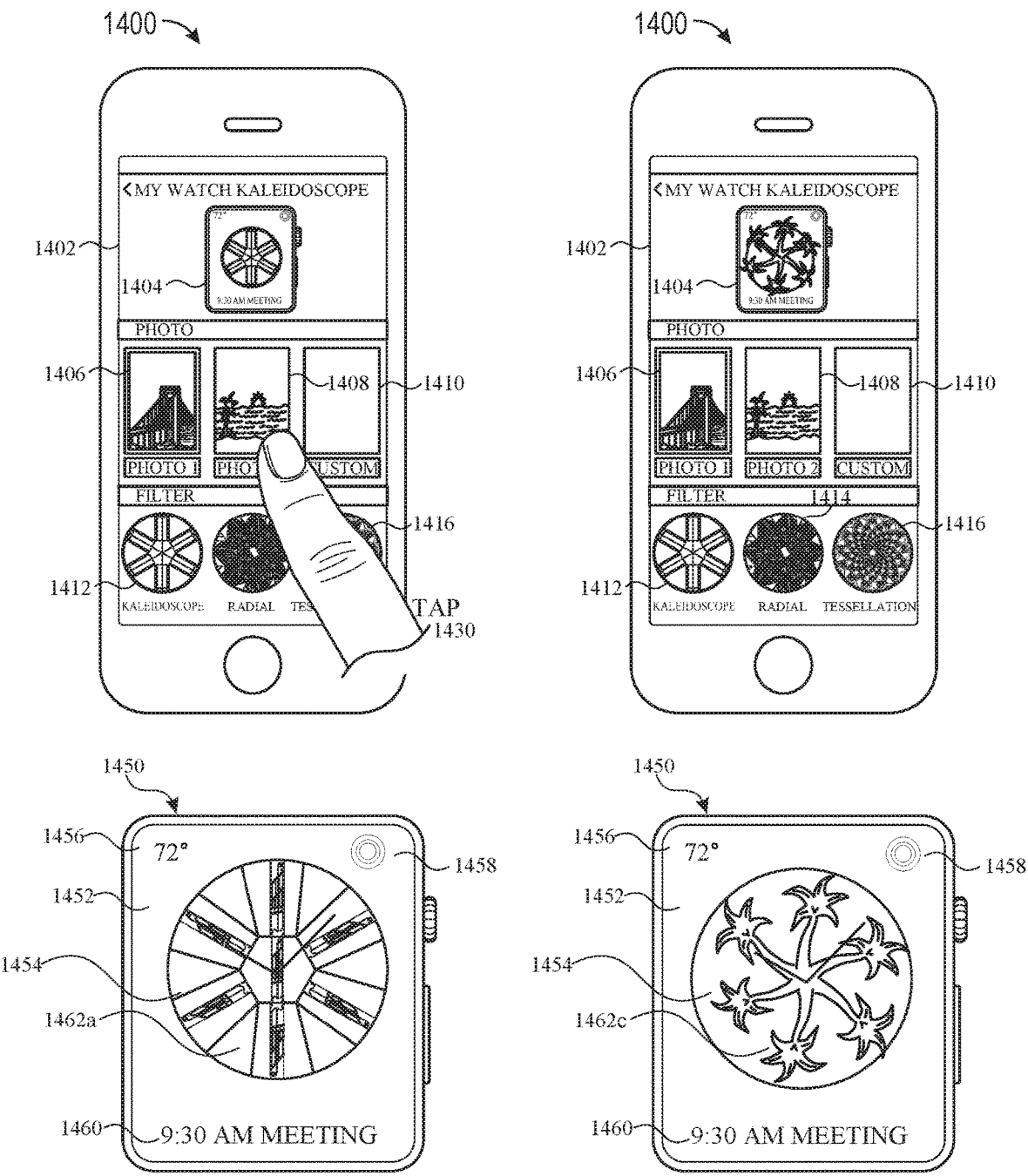

FIGS. 14D & 14E illustrate selection of an image for the background. A photo of a bridge is currently selected for generation of a composite image displayed as background 1462a on display 1452 of device 1450 in FIG. 14D. Display 1452 also shows complications 1456, 1458, and 1460, and current time indicator 1454. The screen on display 1402 of device 1400 also informs the user of this currently selected option using representation 1404, which represents the user interface currently selected for display by device 1450.

In FIG. 14D, the user selects representation 1408, which represents a different image of a beach. In this example, the user contacts representation 1408 displayed on display 1402 of device 1400 via tap 1430.

In response to detecting tap 1420, device 1400 updates representation 1404 with a representation of a composite image generated using a radial pattern of reflection (FIG. 14E). In some embodiments, representation 1404 represents the same interface displayed by 1450. In some embodiments, representation 1404 represents an interface comprising a placeholder composite-image based background that represents the radial pattern to the user. This informs the user at device 1400 how the selected option will change the user interface screen displayed by device 1450. In some embodiments, representation 1404 further comprises representations of one or more of complications 1456, 1458, and 1460 (e.g., using live application data or placeholder data), and current time indicator 1454.

Further in response to detecting tap 1430 at device 1400, device 1450 updates background 1462c to generate a composite image using the beach photo (FIG. 14E). Compared to background 1462a, background 1462c uses the same plurality of axes of reflection (e.g., in a kaleidoscope pattern), but applied to a different image portion (e.g., a portion of the beach photo instead of the bridge photo. For example, device 1400 can send instructions to device 1450 to generate a composite image using the beach photo in response to detecting tap 1430.

FIGS. 15A-15E show a flow diagram illustrating process 1500 for providing context-specific user interfaces. In some embodiments, steps of process 1500 can be performed at an electronic device with a touch-sensitive display, one or more processors, and memory, such as device 100 (FIG. 1A), 300 (FIG. 3), 500 (FIGS. 5A-5H), 1100 (FIGS. 11A-11N), 1400 (FIGS. 14A-14E), or 1450 (FIGS. 14A-14E). Some operations in process 1500 can be combined, the order of some operations may be changed, and some operations can be omitted.

Figure 15A:
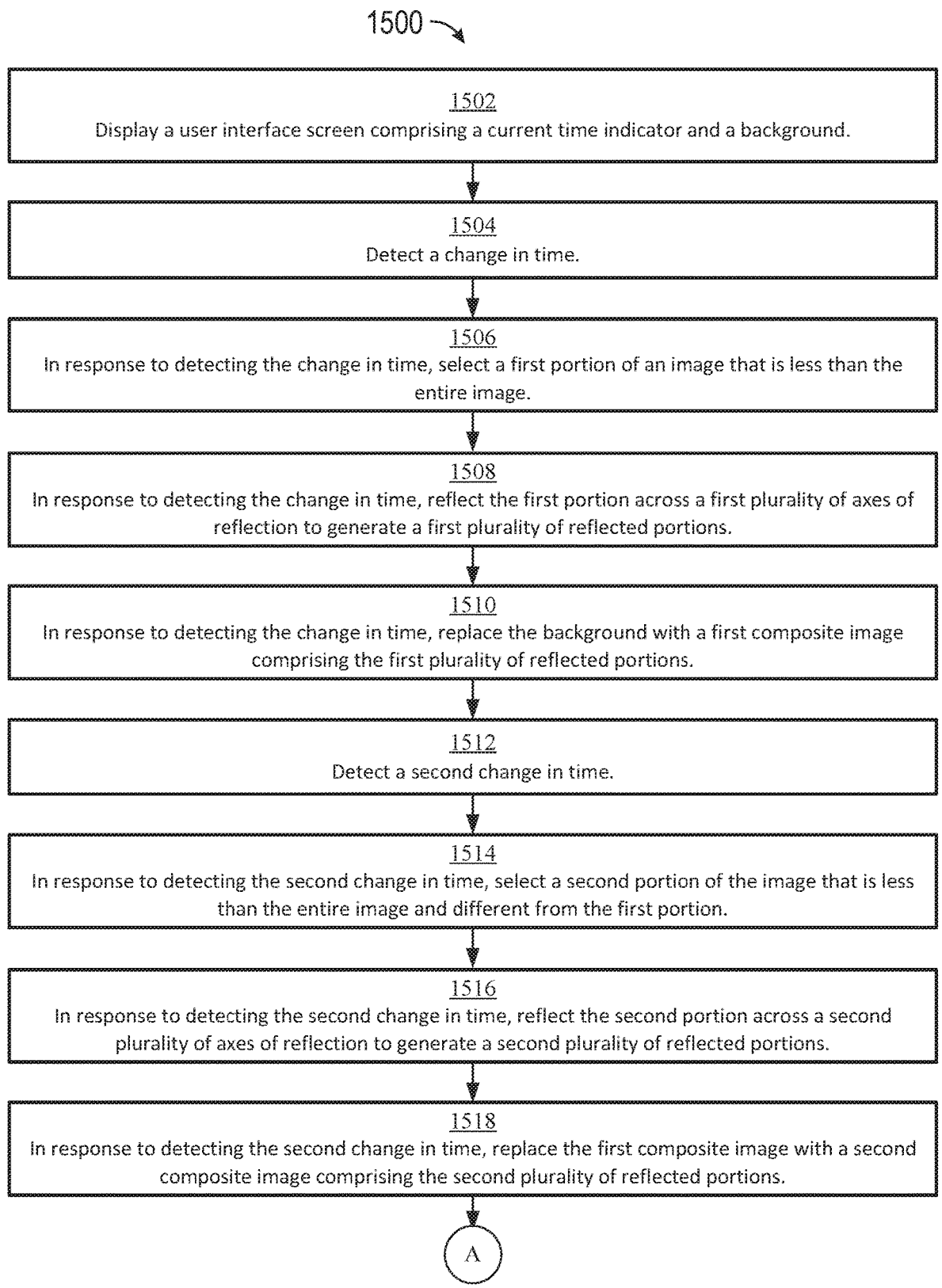
FIGS. 15A-15E illustrate a flow diagram depicting a process for providing context-specific user interfaces in accordance with some embodiments.

In FIG. 15A, at block 1502, the device displays a user interface screen comprising a current time indicator (e.g., indicator 1104 in FIG. 11A) and a background. In some embodiments, the current time indicator comprises an analog or digital clock.

At block 1504, the device detects a change in time.

At block 1506, in response to detecting the change in time, the device selects a first portion of an image (e.g., portion 1116 of image 1114 in FIG. 11A). In some embodiments, the first portion is less than the entire image. In some embodiments, the image is a system-designated or curated image. In some embodiments, the image is a user-designated image, such as a user photo (e.g., stored on the device, or on a device in wireless communication with the device). In some embodiments, the device automatically selects the first portion of the image (e.g., in the absence of a user input corresponding to a selection of the image portion). Automatically selecting the portion of the image using the device enhances the variety of backgrounds that can be displayed by the device without requiring the user to select a portion each time the image changes (e.g., numerous backgrounds can be displayed during a given day without the user having to select each time the background changes). Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1508, in response to detecting the change in time, the device reflects the first portion across a first plurality of axes of reflection to generate a first plurality of reflected portions. In some embodiments, the first plurality of axes of reflection is based on a pattern selected from kaleidoscope, radial reflection, Fibonacci sequence, and tessellation (see FIG. 11D).

At block 1510, in response to detecting the change in time, the device replaces the background with a first composite image comprising the first plurality of reflected portions (e.g., background 1118 in FIG. 11A).

At block 1512, the device detects a second change in time.

At block 1514, in response to detecting the second change in time, the device selects a second portion of the image (e.g., portion 1122 of image 1114 in FIG. 11B). In some embodiments, the second portion is less than the entire image. In some embodiments, the second portion is different from the first portion. In some embodiments, the image is a system-designated or curated image. In some embodiments, the image is a user-designated image, such as a user photo (e.g., stored on the device, or on a device in wireless communication with the device). In some embodiments, the device automatically selects the second portion of the image (e.g., in the absence of a user input corresponding to a selection of the image portion). Automatically selecting the portion of the image using the device enhances the variety of backgrounds that can be displayed by the device without requiring the user to select a portion each time the image changes (e.g., numerous backgrounds can be displayed during a given day without the user having to select each time the background changes). Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1516, in response to detecting the second change in time, the device reflects the second portion across a second plurality of axes of reflection to generate a second plurality of reflected portions. In some embodiments, the first plurality and the second plurality of axes of reflection are the same. In some embodiments, the second plurality of axes of reflection is based on a pattern selected from kaleidoscope, radial reflection, Fibonacci sequence, and tessellation (see FIG. 11D).

At block 1518, in response to detecting the second change in time, the device replaces the background with a second composite image comprising the second plurality of reflected portions (e.g., background 1124 in FIG. 11B).

Figure 15B:
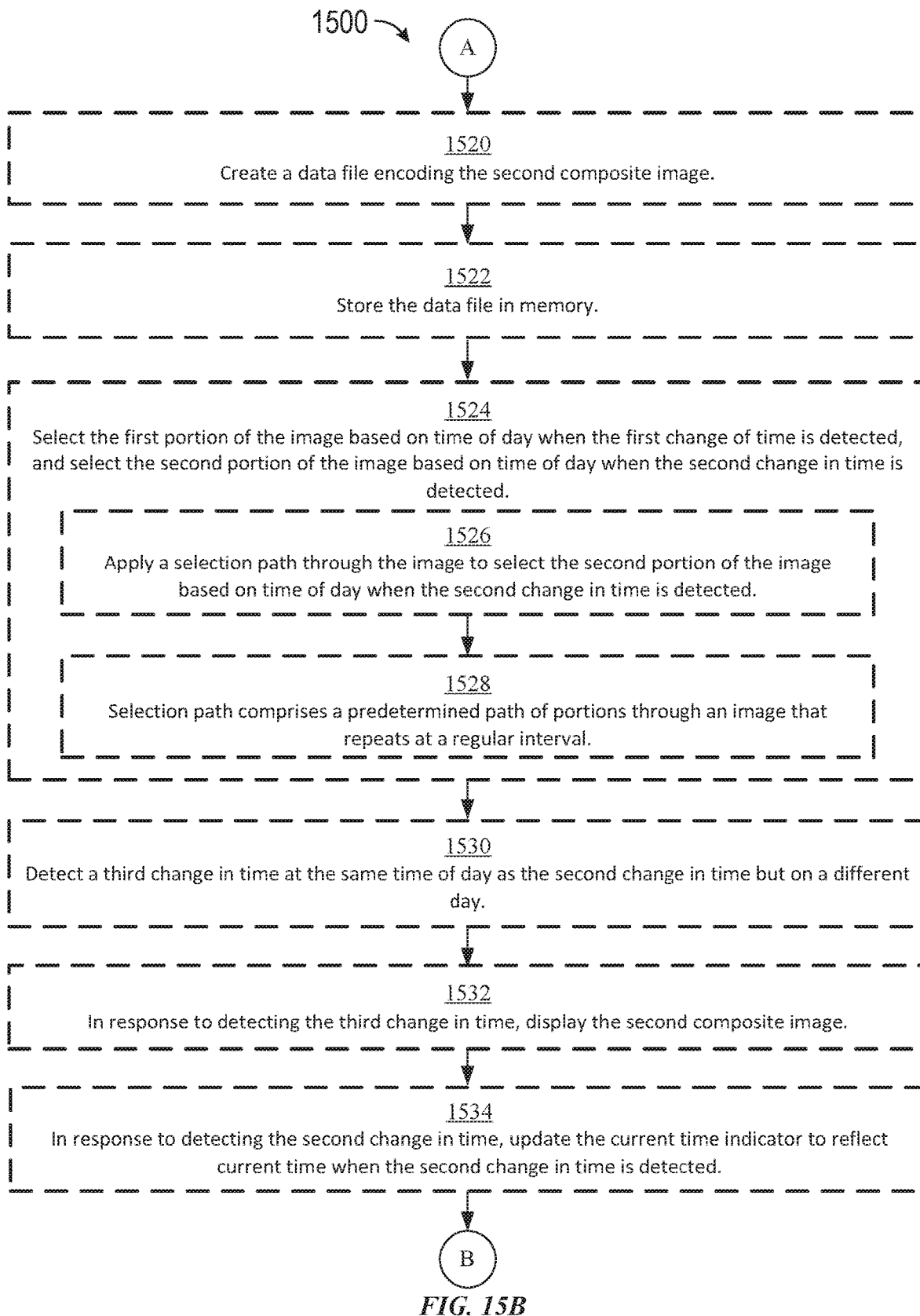

In FIG. 15B, at block 1520, the device optionally creates a data file encoding the second composite image. This allows the device to create and store new data files encoding images without requiring multiple user inputs, e.g., to select an image, select axes of reflection, and reflecting the image portions. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1522, the device optionally stores the data file in memory. In some embodiments, the data file is stored in memory of the device (e.g., device 1320 in FIG. 13). In some embodiments, the data file is stored in memory of a device in wireless communication with the device (e.g., device 1300 in FIG. 13).

At block 1524, the device optionally selects the first portion of the image based on time of day when the first change of time is detected, and the device optionally selects the second portion of the image based on time of day when the second change of time is detected. In some embodiments, as shown in block 1526, the device applies a selection path through the image (e.g., a deterministic path that selects image portions based on time of day) to select the second portion of the image based on time of day when the second change in time is detected. In some embodiments, as shown in block 1528, the selection path comprises a predetermined path of portions through an image that repeats at a regular interval (e.g., 12 or 24 hours). Thus, the device displays an image-based background that indicates the time of day (e.g., since the same portion is selected at the same time of day, or since the same portion is selected twice a day such as at 10:00 am and 10:00 pm), thereby providing additional feedback to the user indicative of the time of day. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1530, the device optionally detects a third change in time. In some embodiments, the third change in time is detected at the same time of day as the second change in time but on a different day.

At block 1532, the device optionally displays the second composite image in response to detecting the third change in time (e.g., background 1118 in FIG. 11C).

At block 1534, in response to detecting the second change in time, the device optionally updates the current time indicator to reflect current time when the second change in time is detected (e.g., indicator 1112b in FIG. 11B).

In some embodiments, the device is coupled via wireless communication to a second electronic device with a display, one or more processors, and memory. In some embodiments, the second electronic device is a personal electronic device, similar to portable multifunction device 100 as depicted in FIG. 4A, with a touch-sensitive display 1402. In some embodiments, the second electronic device is in a paired relationship (e.g., as described in reference to FIG. 12) with the device, which may be one or more of devices 100 (FIG. 1A), 300 (FIG. 3), and/or 500 (FIG. 5A).

Figure 15C:
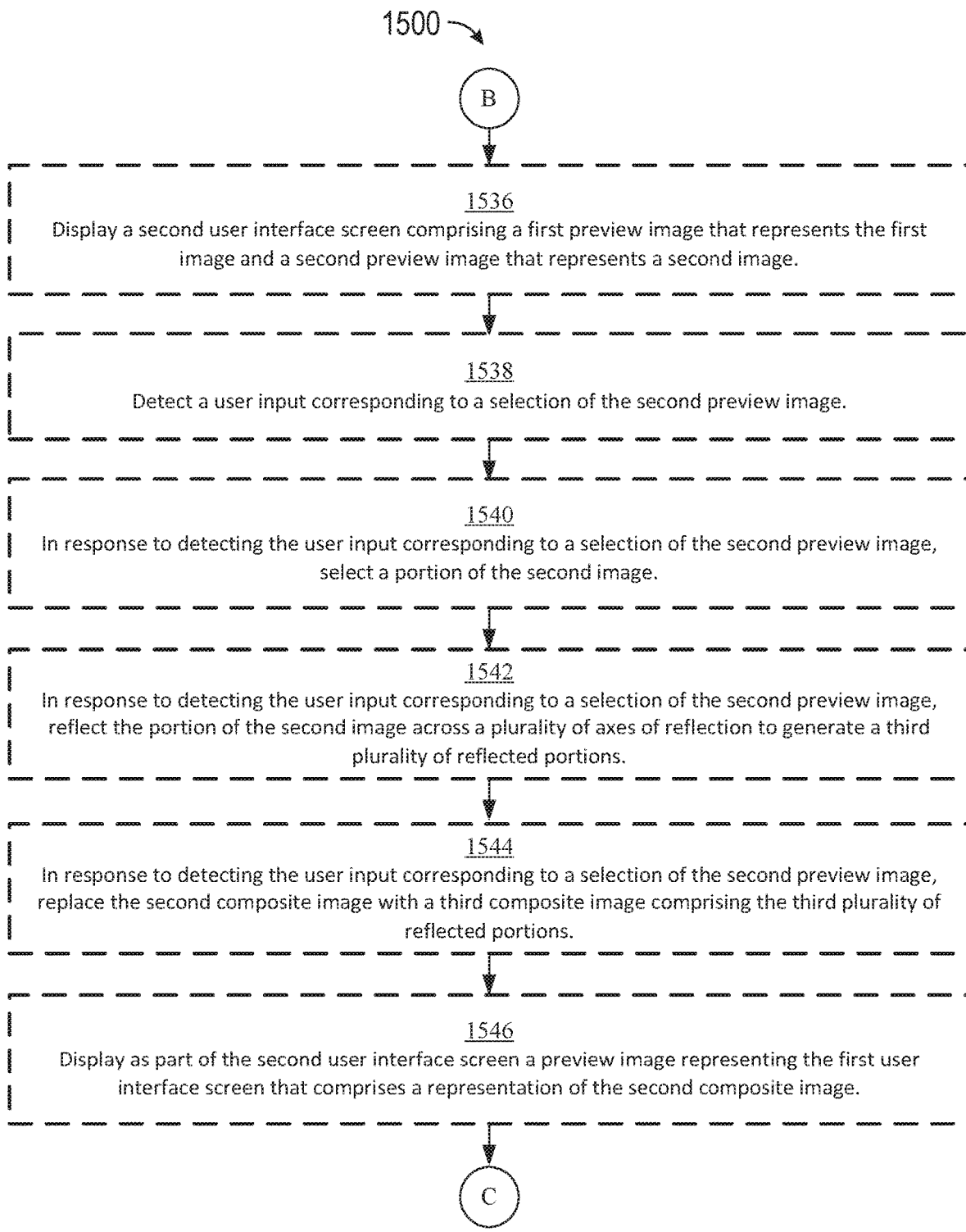

In FIG. 15C, at block 1536, the second electronic device optionally displays a second user interface screen with a first preview image that represents the first image and a second preview image that represents a second image (see, e.g., representations 1406 and 1408 on display 1402 in FIG. 14D). In some embodiments, this occurs after the first device replaces the first composite image with the second composite image.

At block 1538, the second electronic device optionally detects a user input corresponding to a selection of the second preview image. In some embodiments, detecting the user input corresponding to the selection of the second preview image comprises detecting a contact on the touch-sensitive display of the second electronic device at (e.g., on or near) the displayed second preview image (e.g., tap 1430 in FIG. 14D). In some embodiments, the second image is a user photo stored in the memory of the second electronic device. In some embodiments, detecting the user input corresponding to a selection of the second preview image comprises displaying a third user interface screen comprising a plurality of preview images (e.g., a user interface screen of image management module 144). In some embodiments, the plurality of preview images represents a plurality of user photos. In some embodiments, the plurality of preview images comprises the second preview image.

At block 1540, in response to detecting the user input corresponding to a selection of the second preview image, the first or second electronic device optionally selects a portion of the second image.

At block 1542, in response to detecting the user input corresponding to a selection of the second preview image, the first or second electronic device optionally reflects the portion of the second image across a plurality of axes of reflection to generate a third plurality of reflected portions. In some embodiments, the plurality of axes of reflection is the same as the second plurality of axes of reflection. In some embodiments, the plurality of axes of reflection is different from the second plurality of axes of reflection.

At block 1544, in response to detecting the user input corresponding to a selection of the second preview image, the first device optionally replaces the second composite image with a third composite image comprising the third plurality of reflected portions (see background 1462c on display 1452 in FIG. 14E). In some embodiments, in response to detecting the user input corresponding to a selection of the second preview image, the second electronic device sends data to the first device comprising instructions to replace the second composite image with a third composite image comprising the third plurality of reflected portions.

At block 1546, the second electronic device optionally displays (e.g., as part of the second user interface screen) a preview image representing the first user interface screen on the first electronic device (e.g., representation 1404 in FIG. 14D). In some embodiments, the preview image comprises a representation of the second composite image.

Figure 15D:
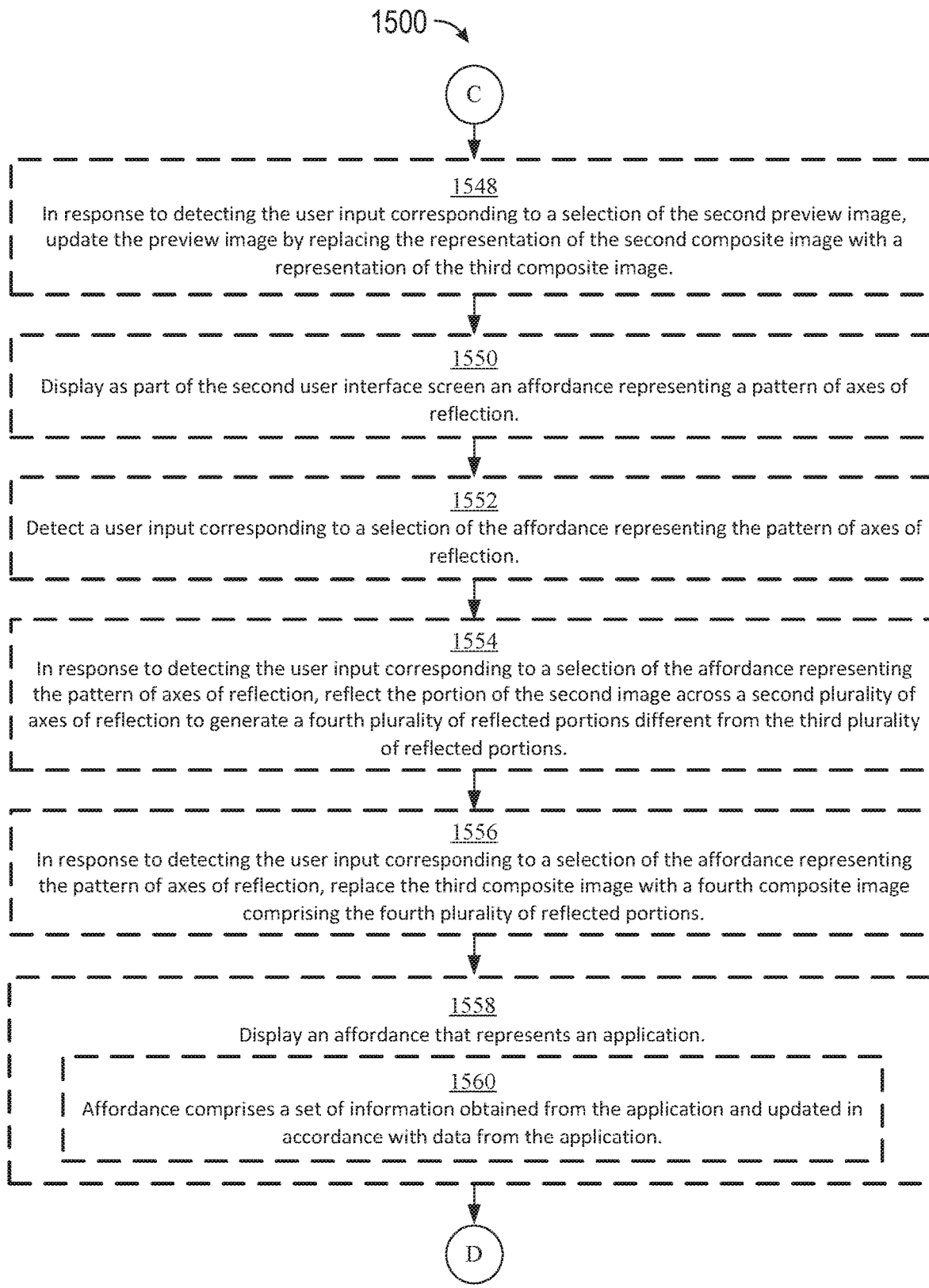

In FIG. 15D, at block 1548, the second electronic device optionally updates the preview image by replacing the representation of the second composite image with a representation of the third composite image (cf. representation 1404 in FIG. 14D and FIG. 14E) in response to detecting the user input corresponding to a selection of the second preview image.

At block 1550, the second electronic device optionally displays (e.g., as part of the second user interface screen) an affordance representing a pattern of axes of reflection (e.g., representations 1412, 1414, and 1416 on display 1402 in FIG. 14B).

At block 1552, the second electronic device optionally detects a user input corresponding to a selection of the affordance representing the pattern of axes of reflection (e.g., tap 1420 in FIG. 14B).

At block 1554, in response to detecting the user input corresponding to a selection of the affordance, the first or second electronic device optionally reflects the portion of the second image across a second plurality of axes of reflection to generate a fourth plurality of reflected portions. In some embodiments, the fourth plurality of reflected portions is different from the third plurality of reflected portions.

At block 1556, in response to detecting the user input corresponding to a selection of the affordance, the first device replaces the third composite image with a fourth composite image comprising the fourth plurality of reflected portions (e.g., background 1462b in FIG. 14C). In some embodiments, the second electronic device optionally updates the preview image by replacing the representation of the second composite image with a representation of the fourth composite image (cf. representation 1404 in FIG. 14B and FIG. 14C) in response to detecting the user input corresponding to a selection of the affordance. In some embodiments, in response to detecting the user input corresponding to a selection of the affordance, the second electronic device sends data to the first device comprising instructions to replace the third composite image with a fourth composite image comprising the fourth plurality of reflected portions.

At block 1558, the device optionally displays an affordance that represents an application (e.g., complication 1108 in FIG. 11E). As shown in block 1560, in some embodiments, the affordance comprises a set of information obtained from the application it represents.

Figure 15E:
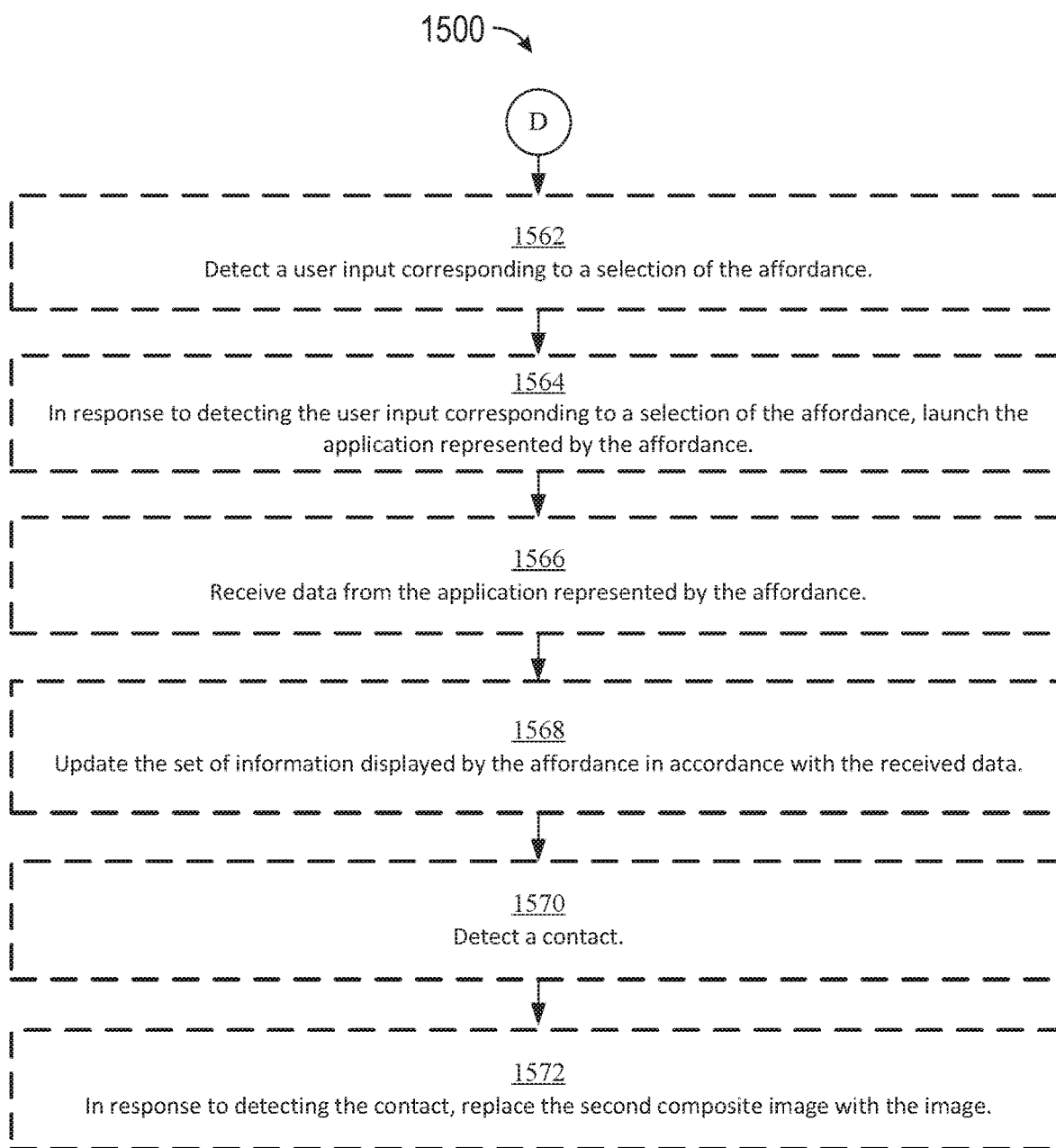

In FIG. 15E, at block 1562, the device optionally detects a user input corresponding to a selection of the affordance (e.g., tap 1120 in FIG. 11E).

At block 1564, the device optionally launches the application represented by the affordance in response to detecting the user input corresponding to a selection of the affordance (see FIG. 11F). In some embodiments, launching the application represented by the affordance comprises ceasing to display the first user interface screen and displaying a third user interface screen corresponding to the application represented by the affordance.

At block 1566, the device optionally receives data from the application represented by the affordance.

At block 1568, the device optionally updates the set of information displayed by the affordance in accordance with the received data (see complication 1108 in FIGS. 11A-11C, or complication 1110 in FIGS. 11A-11C). In some embodiments, the affordance is displayed in the same position on the display before and after updating the set of information. Thus, the affordance is able to display updated information from an application without requiring the user to launch the application to view the updated information. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1570, the device optionally detects a contact (e.g., on the touch sensitive display; see tap 1122 in FIG. 11G). In some embodiments, the contact is at the displayed second composite image.

At block 1572, the device optionally displays the image (e.g., by replacing the second composite image with the image; see image 1124 in FIG. 11H).

Note that details of the processes described above with respect to process 1500 (e.g., FIGS. 15A-15E) are also applicable in an analogous manner to the methods described elsewhere in this application. For example, other methods described in this application may include one or more of the characteristics of process 1500. For example, one or more of the steps of process 1500 can be combined with one or more of the steps of process 1600, as described below. For brevity, these details are not repeated below.

FIGS. 16A-16D show a flow diagram illustrating process 1600 for providing context-specific user interfaces. In some embodiments, process 1600 can be performed at an electronic device with a touch-sensitive display, one or more processors, and memory, such as device 100 (FIG. 1A), 300 (FIG. 3), 500 (FIGS. 5A-5H), or 1100 (FIGS. 11A-11N). Some operations in process 1600 can be combined, the order of some operations may be changed, and some operations can be omitted.

Figure 16A:
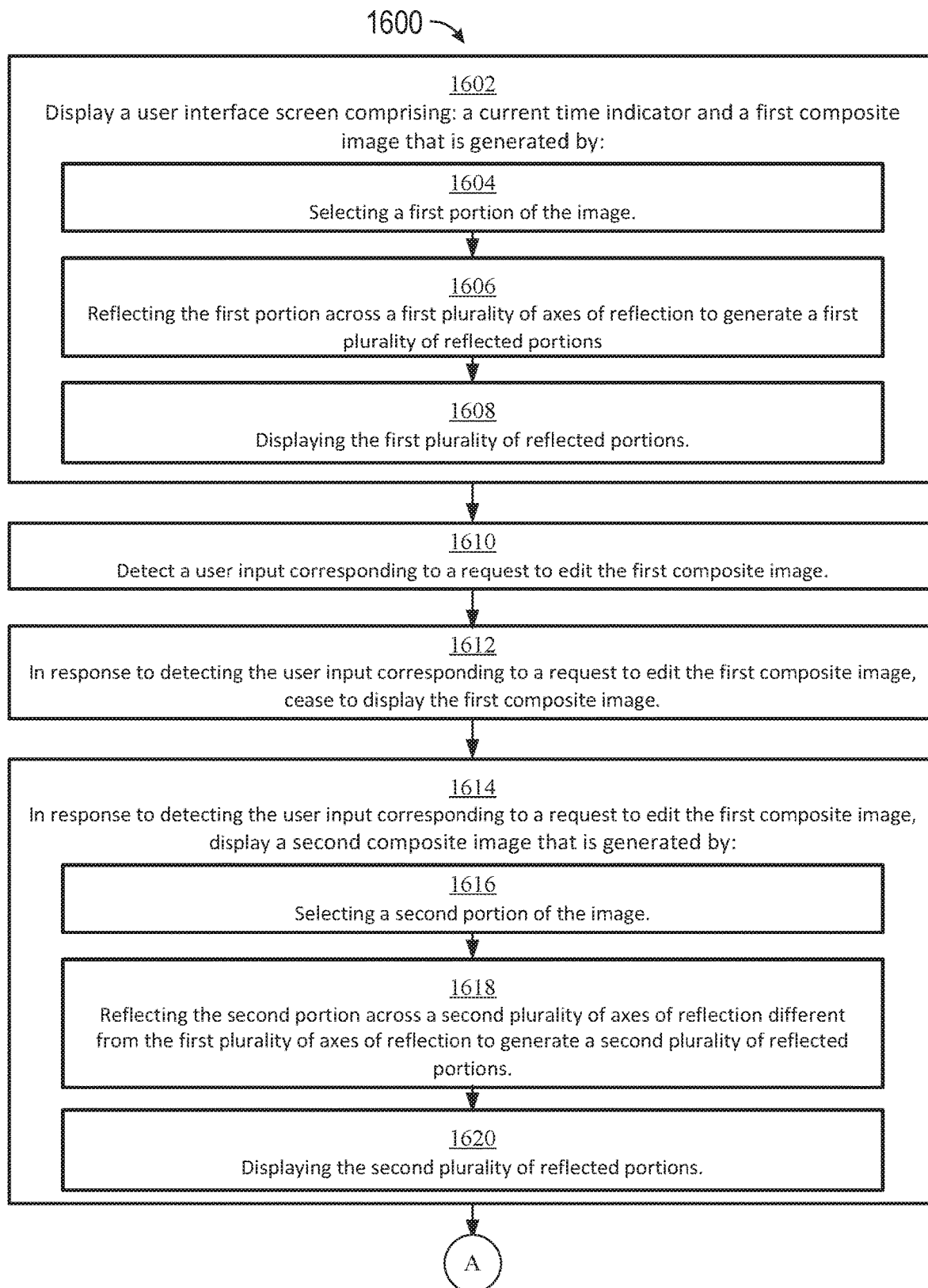
FIGS. 16A-16D illustrate a flow diagram depicting a process for providing context-specific user interfaces in accordance with some embodiments.

In FIG. 16A, at block 1602, the device optionally displays a user interface screen comprising a current time indicator (e.g., 1104 in FIG. 11A) and a first composite image (e.g., similar to 1158 in FIG. 11M). The image is created by the electronic device (e.g., automatically) by selecting a first portion of an image (block 1604), reflecting the first portion across a first plurality of axes of reflection to generate a first plurality of reflected portions (block 1606), and displaying the first plurality of reflected portions (block 1608).

At block 1610, the device detects a user input corresponding to a request to edit the first composite image.

At block 1612, in response to detecting the user input, the device ceases to display the first composite image.

At block 1614, in response to detecting the user input, the device displays a second composite image (e.g., similar to 1166 in FIG. 11N). The image is created by the electronic device (e.g., automatically) by selecting a second portion of the image (block 1616), reflecting the second portion across a second plurality of axes of reflection to generate a second plurality of reflected portions (block 1618), and displaying the second plurality of reflected portions (block 1620). In some embodiments, the first and the second plurality of axes of reflection are different (e.g., based on different patterns). Automatically selecting the portion of the image using the device enhances the variety of backgrounds that can be displayed by the device without requiring the user to select a portion each time the image changes. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Figure 16B:
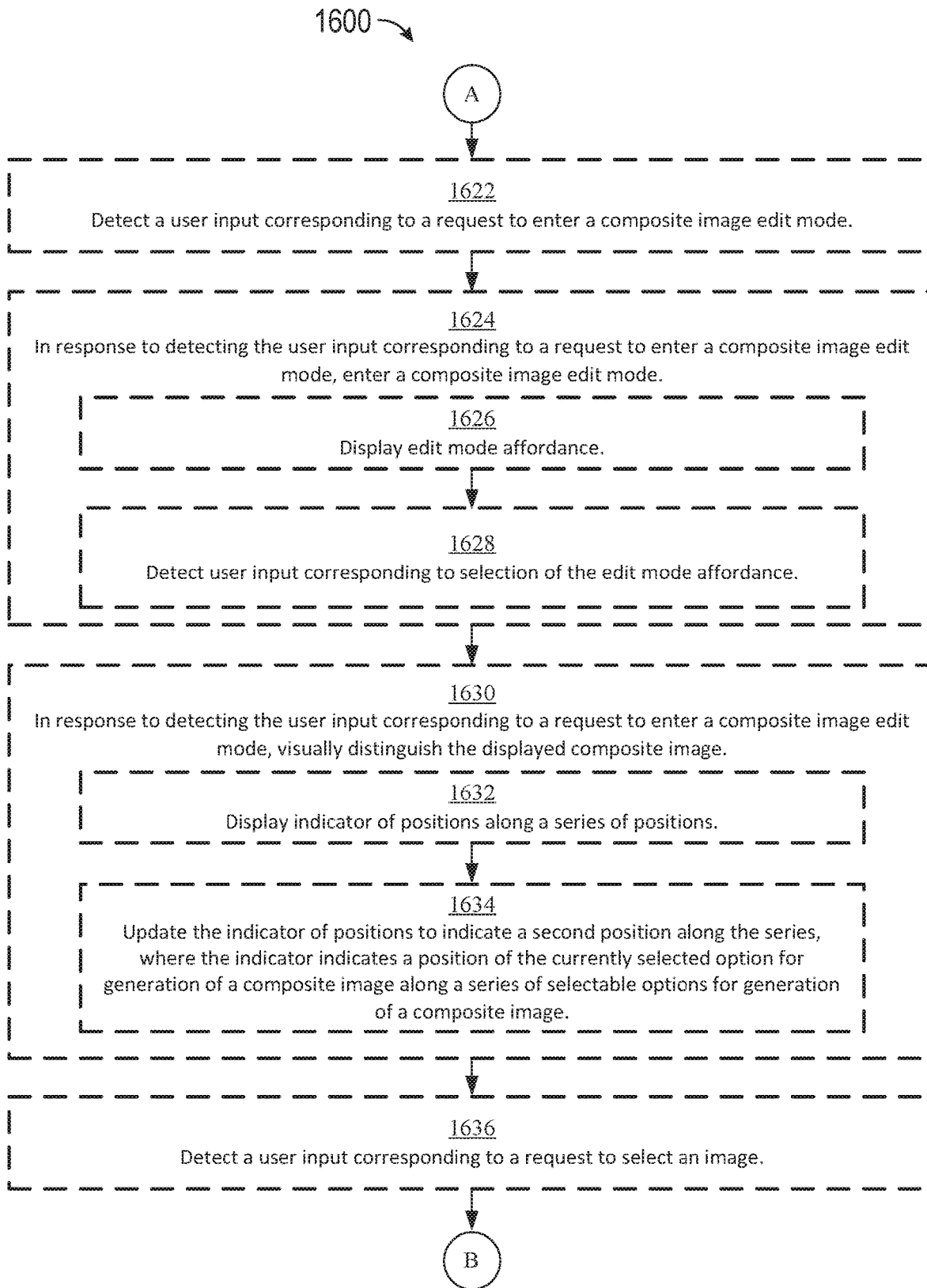

In FIG. 16B, at block 1622, the device optionally detects a user input corresponding to a request to enter a composite image edit mode of the electronic device (e.g., press 1130 in FIG. 11I). In some embodiments, the user input is a press having a duration longer than a predetermined duration (e.g., a "long press" input). In some embodiments, the device determines whether the detected press has a duration longer than a predetermined duration and, in accordance with a determination that the detected press has a duration longer than the predetermined duration, enters the affordance edit mode. In some embodiments, the user input is a contact having a characteristic intensity above an intensity threshold. In some embodiments, the device determines whether the detected contact has a characteristic intensity above a predetermined duration and, in accordance with a determination that the detected press has a characteristic intensity above the predetermined duration, enters the affordance edit mode.

At block 1624, the device optionally enters a composite image edit mode in response to detecting the user input corresponding to a request to enter composite image edit mode. In some embodiments, as shown at block 1626, entering the composite image edit mode comprises displaying an edit mode affordance on the touch-sensitive display (e.g., affordance 1134 in FIG. 11J) and, as shown at block 1628, detecting a user input corresponding to a selection of the edit mode affordance (e.g., tap 1140 in FIG. 11J).

At block 1630, the device optionally visually distinguishes the composite image to indicate the composite image edit mode in response to detecting the user input corresponding to a request to enter composite image edit mode. For example, the device can display an outline around the affordance, animate an outline around the affordance, animate the affordance (e.g., to flash or expand and contact) change a color of the affordance, and/or display an additional indicator to visually distinguish the affordance (see outline 1140 in FIG. 11K). Visually distinguishing the composite image to indicate edit mode provides improved feedback to the user both that the device has entered a different mode of functionality (for example, tapping the composite image can lead to display of the original image during a mode other than edit mode but select the composite image for editing during edit mode) and that the distinguished composite image is the aspect of the interface currently selected for editing. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, as shown at block 1632, visually distinguishing the composite image to indicate the composite image edit mode further comprises displaying an indicator of position along a series of positions, the indicator indicating a first position along the series (e.g., scroll indicator 1160*a* in FIG. 11M). In some embodiments, as shown at block 1634, the device updates the indicator of position to indicate a second position along the series, where the indicator of position along a series of positions indicates a position of a currently selected option for the composite image pattern along a series of selectable options for the composite image (see scroll indicator 1160*b* in FIG. 11N). Displaying an updating scroll indicator that indicates a position of a currently displayed composite image pattern along a series of selectable patterns provides feedback to the user that the received user input (e.g., scroll 1162 in FIG. 11M) controls selection of the composite image generation pattern while helping the user to navigate through the entire series of patterns (as well as indicating to the user that additional patterns are selectable). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1636, the device optionally detects a user input corresponding to a request to select an image (e.g., after visually distinguishing the displayed composite image to indicate an image selection mode). For example, in some embodiments, detecting the user input corresponding to a request to select an image comprises detecting a swipe on the display (e.g., swipe 1148 or 1156 in FIGS. 11K & 11L).

Figure 16C:
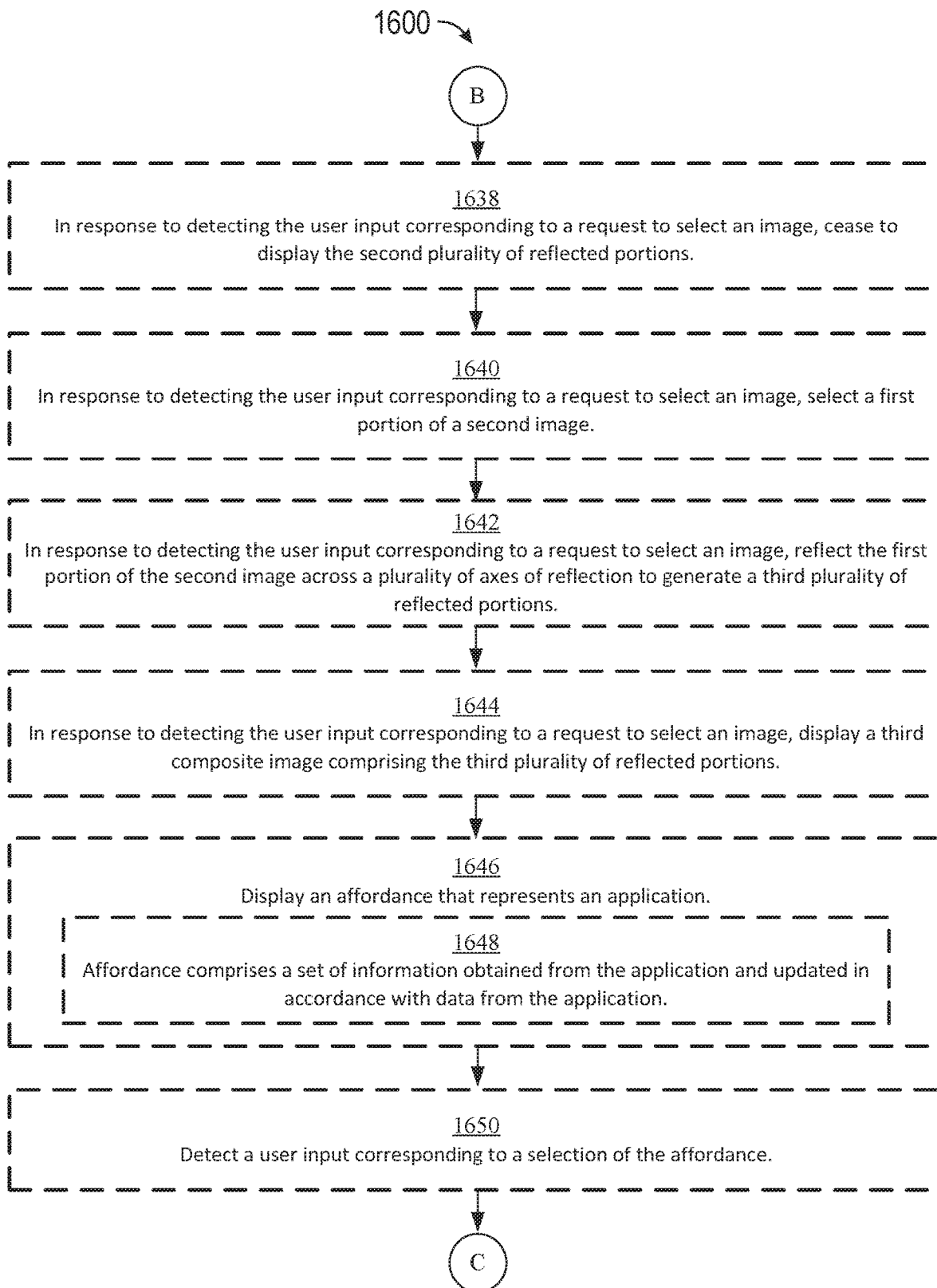

In FIG. 16C, at block 1638, the device optionally ceases to display the second plurality of reflected portions in response to detecting the user input corresponding to a request to select an image.

At block 1640, the device optionally selects a first portion of a second image different from the first image (e.g., automatically by the device) in response to detecting the user input corresponding to a request to select an image.

At block 1642, the device optionally reflects the first portion of the second image across a plurality of axes of reflection to generate a third plurality of reflected portions in response to detecting the user input corresponding to a request to select an image.

At block 1644, the device optionally displays a third composite image comprising the third plurality of reflected portions in response to detecting the user input corresponding to a request to select an image (e.g., background 1166 in FIG. 11N).

At block 1646, the device optionally displays an affordance that represents an application (e.g., complication 1108 in FIG. 11E). As shown in block 1648, in some embodiments, the affordance comprises a set of information obtained from the application it represents.

At block 1650, the device optionally detects a user input corresponding to a selection of the affordance (e.g., tap 1120 in FIG. 11E).

Figure 16D:
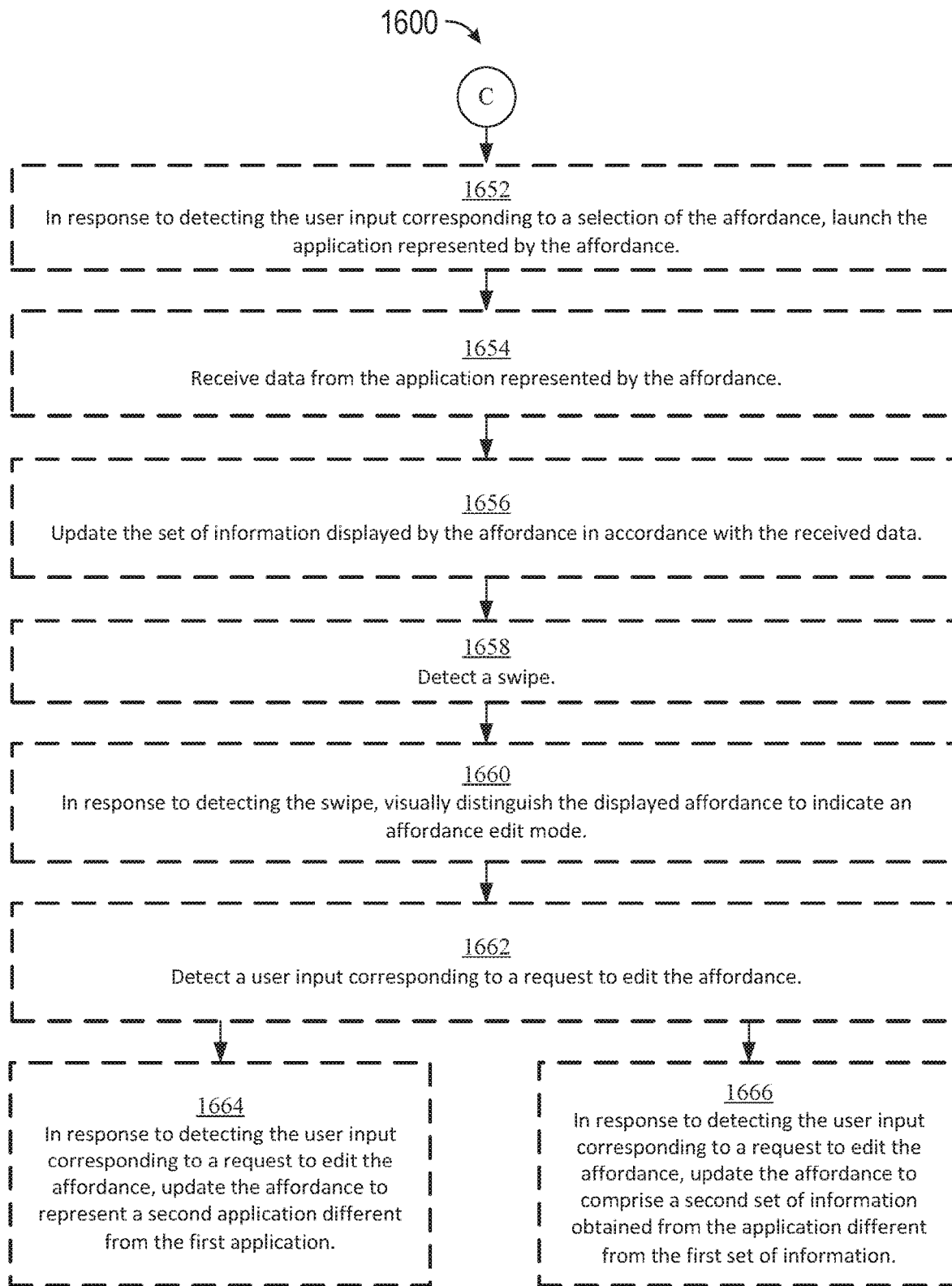

In FIG. 16D, at block 1652, the device optionally launches the application represented by the affordance. In some embodiments, launching the application comprises ceasing to display the first user interface screen and displaying a user interface screen corresponding to the application (see FIG. 11F).

At block 1654, the device optionally receives data from the application represented by the affordance.

At block 1656, the device optionally updates the set of information displayed by the affordance in accordance with the received data (cf. complication 1108 in FIGS. 11A-11C). In some embodiments, the affordance is displayed in the same position on the display before and after updating the set of information.

At block 1658, the device detects a swipe, e.g., after visually distinguishing the displayed composite image to indicate the composite image edit mode (e.g., swipe 1148 in FIG. 11K).

At block 1660, the device optionally visually distinguishes the displayed affordance to indicate an affordance edit mode. For example, the device can display an outline around the affordance, animate an outline around the affordance, animate the affordance (e.g., to flash or expand and contact) change a color of the affordance, and/or display an additional indicator to visually distinguish the affordance (see outline 1150 and indicator 1154 in FIG. 11L). Visually distinguishing the affordance to indicate edit mode provides improved feedback to the user both that the device has entered a different mode of functionality (for example, tapping the affordance can lead to launching the application during a mode other than edit mode but select the affordance for editing during edit mode) and that the distinguished affordance is the aspect of the interface currently selected for editing. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1662, the device optionally detects a user input corresponding to a request to edit the affordance (e.g., scroll 682 in FIG. 6U).

At block 1664, the device optionally updates the affordance to represent a second application in response to detecting the user input corresponding to a request to edit the affordance (e.g., complication 684 in FIG. 6V). In some embodiments, the affordance comprises a second set of information obtained from the second application. In some embodiments, the second set of information is updated in accordance with data from the second application. In some embodiments, the first and the second applications are different (e.g., personal assistant vs. remote application in FIGS. 6U-6V).

At block 1666, the device optionally updates the affordance to comprise a second set of information obtained from the application in response to detecting the user input corresponding to a request to edit the affordance. In some embodiments, the second set of information is updated in accordance with data from the application. In some embodiments, the first and the second sets of information are different. Thus, the user can edit the set of application information that is displayed from multiple options (e.g., multiple time zones from a world clock application, or multiple stock prices from a stocks application).

Note that details of the processes described above with respect to process 1600 (e.g., FIGS. 16A-16D) are also applicable in an analogous manner to the methods described elsewhere in this application. For example, other methods described in this application may include one or more of the characteristics of process 1600. For example, one or more of the steps of process 1600 can be combined with one or more of the steps of process 1500, as described above. For brevity, these details are not repeated below.

Figure 17A:
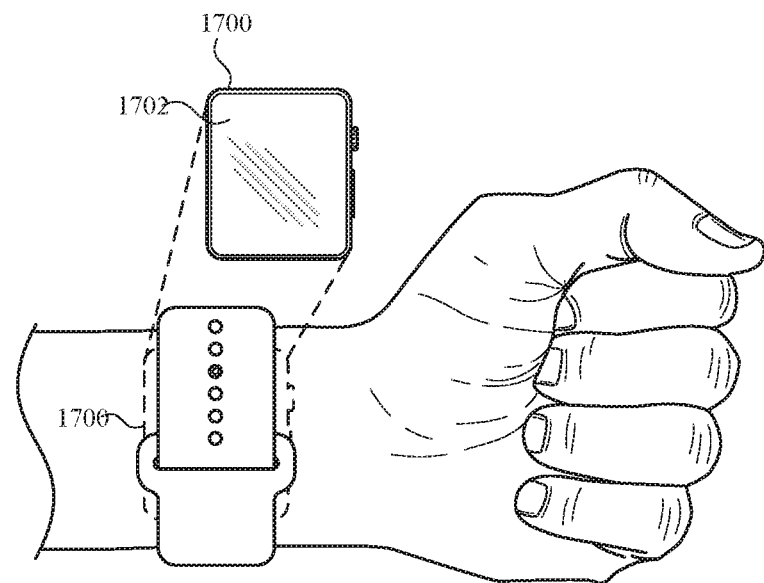
FIGS. 17A & 17B illustrate exemplary techniques for providing context-specific user interfaces.
Figure 17B:
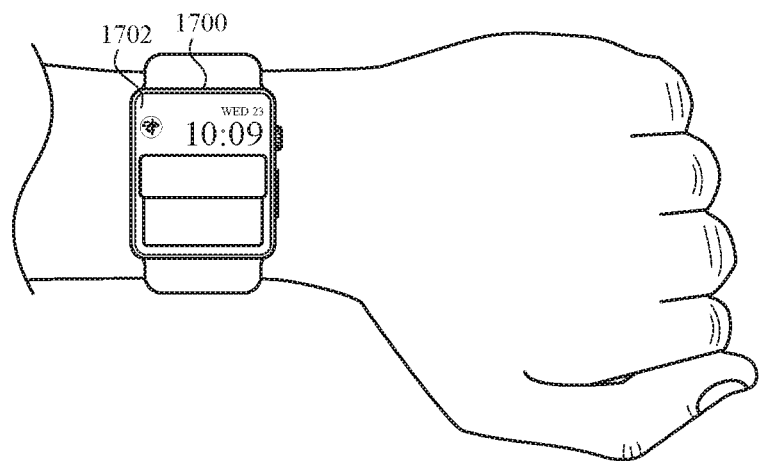

In any of the embodiments described herein, the device (e.g., 500, 600, 900, 1100, 1210, 1320, and/or 1450) can be a portable or reduced-size multifunction device (e.g., a smart watch electronic device) with one or more attachment mechanisms. FIGS. 17A & 17B show exemplary device 1700. Device 1700 may be device 100, 300, 500, 600, 900, 1100, 1210, 1320, or 1450 in some embodiments. The electronic device has a display 1702 (e.g., 504). In some embodiments, display 1702 is a touch-sensitive display. In some embodiments, device 1700 includes a rotatable input mechanism and/or input mechanism or button.

FIGS. 17A & 17B illustrate that device 1700 can detect a user movement of the device and, in response to detecting the user movement, display a user interface screen (e.g., described herein). In some embodiments, the user movement can be a raising and/or rotation of the user's wrist, or other movement indicative of the user raising the display into viewing position. These movements could be detected, for example, by using an accelerometer (e.g., 534), a gyroscope (e.g., 536), a motion sensor (e.g., 538), and/or a combination thereof. In any of the context-dependent faces described herein, a movement of the device may be a user input that activates the display.

In FIG. 17A, the display of device 1700 is powered off. In FIG. 17B, in response to detecting a raising and/or rotation of the user's wrist, device 1700 powers on the display and displays a user interface screen. For any of the user interface screens described above, the display can be powered off prior to displaying the user interface screen, and the device can power on the display and display the user interface screen in response to detecting the a user movement of the device.

Figure 18:
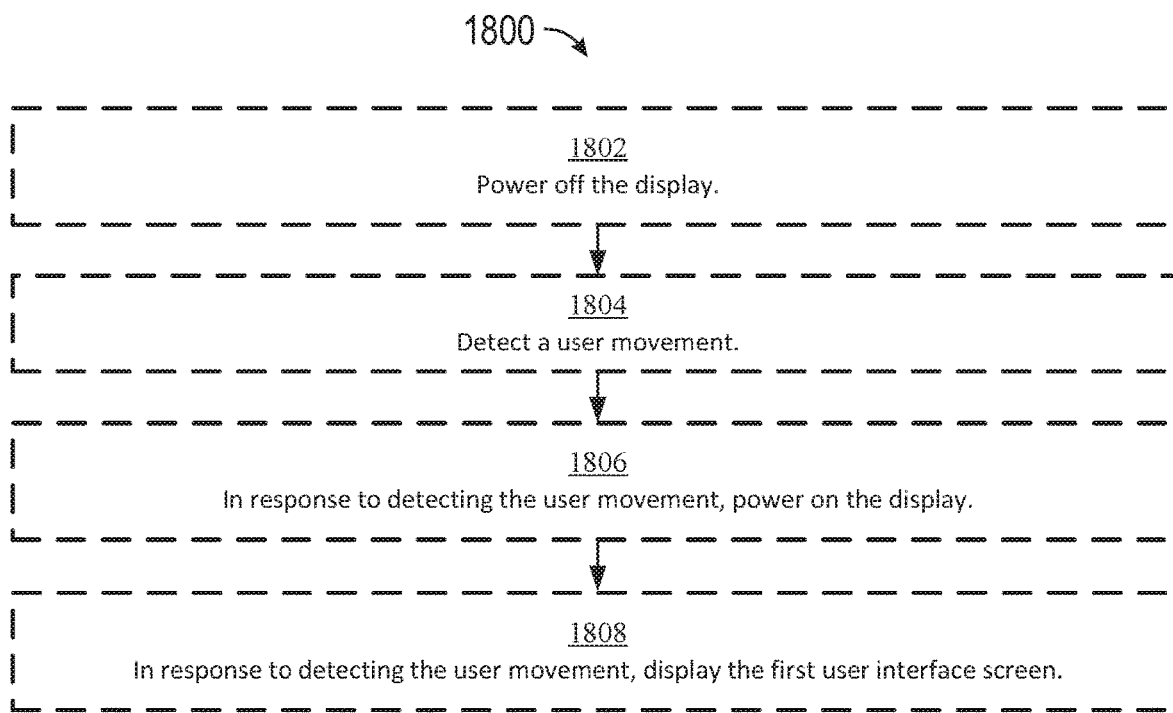
FIG. 18 illustrates a flow diagram depicting a process for providing context-specific user interfaces in accordance with some embodiments.

FIG. 18 shows a flow diagram illustrating process 1800 for displaying context-specific user interfaces. In some embodiments, process 1800 can be performed at an electronic device with a touch-sensitive display, one or more processors, and memory, such as device 100 (FIG. 1A), 300 (FIG. 3), 500 (FIGS. 5A-5H), 600 (FIGS. 6A-6V), 900 (FIGS. 9A-9L), 1100 (FIGS. 11A-11N), 1450 (FIGS. 14B-14E), or 1900 (FIGS. 19A-19F). Some operations in process 1800 can be combined, the order of some operations may be changed, and some operations can be omitted.

In FIG. 18, at block 1802, the device powers off the display (e.g., display 1702 in FIG. 17A).

At block 1804, device 1700 detects a user movement of the device (e.g., raising and/or rotation of the wrist; cf. FIGS. 17A & 17B).

At block 1806, the device powers on the display in response to detecting the user movement of the device (e.g., display 1702 in FIG. 17B).

At block 1808, the device displays a user interface screen (e.g., as described above) in response to detecting the user movement of the device (e.g., display 1702 in FIG. 17B). Thus, the device can display a user interface screen automatically when the user raises the device into viewing position, rather than requiring an additional user input to power on the display when the user is viewing it. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to process 1800 (e.g., FIG. 18) are also applicable in an analogous manner to the methods described elsewhere in this application. For example, other methods described in this application may include one or more of the characteristics of process 1800. For example, one or more steps of process 1800 can occur prior to block 702 of process 700, block 802 of process 800, block 1002 of process 1000, block 1502 of process 1500, or block 1602 of process 1600, as described above. For brevity, these details are not repeated below.

Figure 19A:
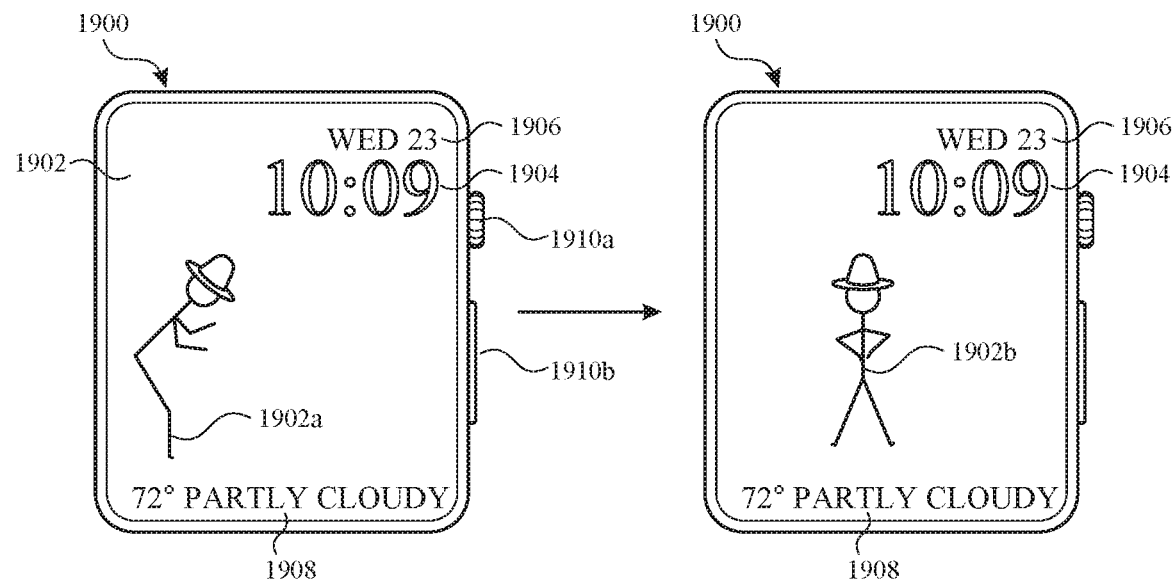
FIGS. 19A-19F illustrate exemplary context-specific user interfaces.

Turning now to FIG. 19A, a user may wish for character-based user interface objects with a more natural and lifelike appearance and/or increased interactability with the user. Further, a user may wish for the character-based user interface object to act in a more dynamic manner, to interact with the user, and/or to provide event-related information to a user. Described below are context-specific user interfaces with increased interactability. Any of the techniques described below can be combined with the techniques described in International Patent Application Serial No. PCT/US2015/034604, titled "Context-Specific User Interfaces," filed Jun. 7, 2015, published as WIPO Publication No. WO/2016/022203, e.g., in reference to character user interface objects. The features described herein allow a character user interface object to appear more natural and lifelike by adopting a wider range of natural motions while indicating a time. A user may wish to view representations of other events by the character user interface object. Allowing the character user interface object to react to external stimuli or internal system events portrays a more interactive character, thus depicting a closer representation of a personality. The enhanced interactivity of the character further improves the user's interactions with the device by providing additional notification that an event has occurred, the occurrence of which may not have been as apparent otherwise. A character user interface object may serve to supply notifications, reminders, and/or other information a user may wish to access from a personal electronic device, but the use of a character provides an interactive personality that the device may use to supply these items. Further, making the character responsive to internal system events (e.g., calendar events and the like) means the character is not strictly limited to responding to external user input. Put another way, the character appears to have a more lifelike personality because it responds to events not directly prompted by the immediate actions of the user.

FIGS. 19A-19F show exemplary context-specific user interfaces that may be operated on device 1900. Device 1900 may be device 100, 300, or 500 in some embodiments. The electronic device has a display 1902 (e.g., 504). In some embodiments, display 1902 is a touch-sensitive display. In some embodiments, device 1100 includes a rotatable input mechanism 1910*a* (e.g., 506) and/or input mechanism or button 1910*b* (e.g., 508).

In FIG. 19A, device 1900 displays a user interface screen that includes complications 1904, 1906, and 1908, current time indicator 1904, and character user interface object 1902*a*. A character user interface object can include any representation of a character, for example a human or anthropomorphized character. In some embodiments, a character can be a cartoon figure. In some embodiments, one or more sounds corresponding to the character user interface object (e.g., speech or sound associated with the character) are played (e.g., using a speaker).

In FIG. 19A, device 1900 animates character user interface object 1902*a*/1902*b* to walk from off-screen onto the middle of display 1902 and stop. In some embodiments, the animation is displayed in response to detecting a user input, e.g., powering on the device or detecting a user movement of device 1900.

Figure 19B:
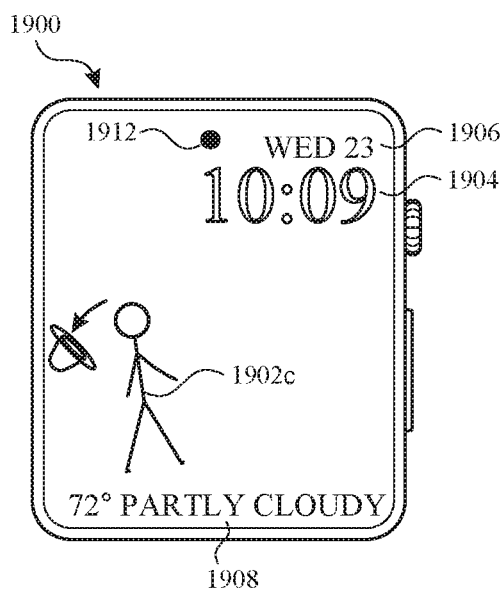

In FIG. 19B, device 1900 animates character user interface object 1902*c* to react to a displayed user interface object. In this example, character user interface object 1902*c* reacts to the display of notifications dot 1912, which indicates to the user that one or more notifications (e.g., unread notifications) have been received, such as a missed call, email, voicemail, text message, and the like. In some embodiments, character user interface object 1902*c* is animated to interact with one or more displayed user interface objects such as a complication (e.g., 1904, 1906, or 1908, such as by climbing on or tripping over the displayed text).

Figure 19C:
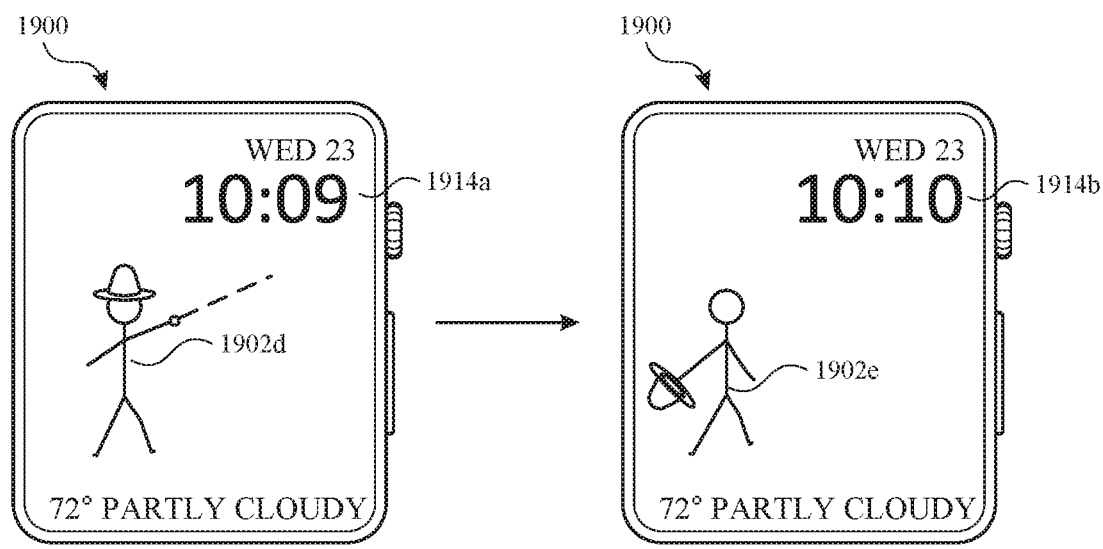
Figure 19D:
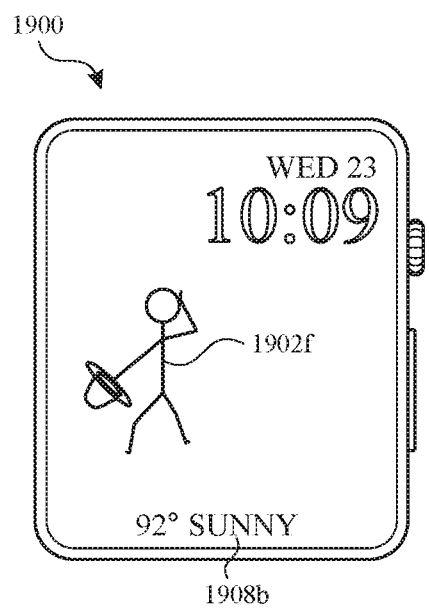

In some embodiments, character user interface object 1902*c* is animated to interact with the current time indicator (FIG. 19C). In FIG. 19C, character user interface object 1902*d* points at indicator 1914*a*, e.g., at a change in time. After the animation, indicator 1914*b* is updated, e.g., as if changed by or reacting to character user interface object 1902*d*.

In other embodiments, character user interface object 1902*e* reacts to time indicator 1914*b*, e.g., by removing his hat. For example, character user interface object 1902*e* can react to a certain time of day (e.g., not an even hour or half-hour) or certain date, e.g., a time or date of significance to the character (e.g., an "Easter egg"). This increases user interactions with the device, e.g., by promoting the user to interact with the device at different times to discover an "Easter egg." In some embodiments, device 1900 detects a user touch gesture (e.g., tap) on display 1902), and in response to detecting the touch gesture, device 1900 animates the character user interface object to react to the touch.

In some embodiments, character user interface object 1902*f* reacts to the displayed information of a complication. For example, in FIG. 19D, character user interface object 1902*f* takes off his hat and swipes his brow because the current weather conditions are warm (as indicated by the information displayed by complication 1908*b*). This reinforces the information displayed by the complication (e.g., as obtained from the corresponding application).

Figure 19E:
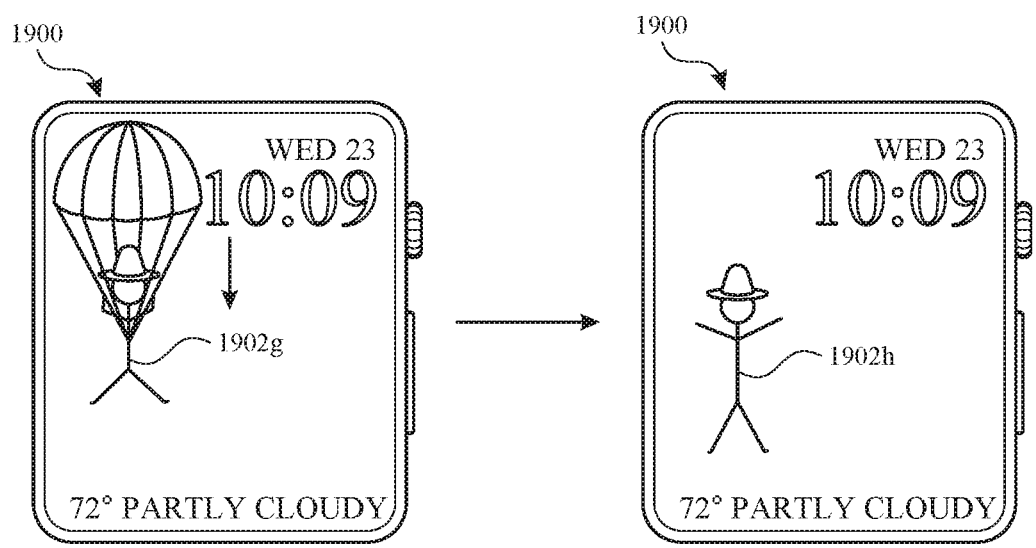

In some embodiments, multiple animated sequences for the character user interface object can be displayed. For example, one animated sequence is shown in FIG. 19A. In FIG. 19E, device 1900 animates character user interface object 1902*g*/1902*h* to parachute on-screen onto the middle of display 1902 and stop. In some embodiments, the animation is displayed in response to detecting a user input, e.g., powering on the device or detecting a user movement of device 1900. In some embodiments, one or more animated sequences for the character user interface object can be displayed in response to detecting a user interaction, such as a touch gesture on the display.

In some embodiments, multiple character user interface objects can be selected for display at device 1900. The user may wish to select a different character user interface object.

Any of the editing and selection techniques described herein or in International Patent Application Serial No. PCT/US2015/034607, titled "Context-Specific User Interfaces," filed Jun. 7, 2015, published as WIPO Publication No. WO/2016/022205, can be used.

Figure 19F:
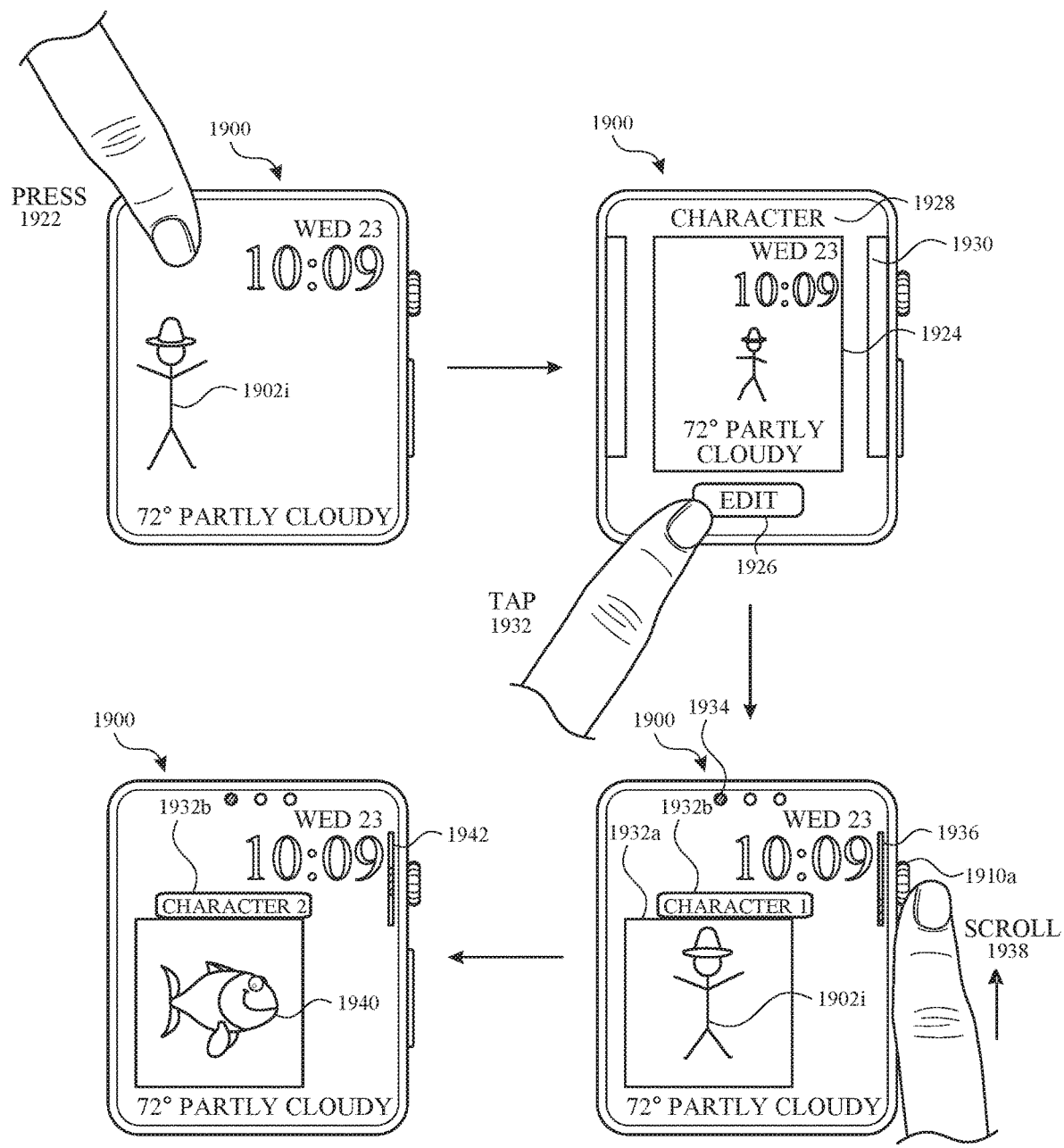

In FIG. 19F, the user accesses an edit mode of device 1900 through press 1922, which in some embodiments can be a press having a duration longer than a predetermined duration (e.g., a "long press" input) or a contact having a characteristic intensity above an intensity threshold. In this example, in response to detecting press 1922, device 1900 enters a context-specific user interface selection mode and visually distinguishes the user interface screen to indicate the selection mode. Device 1900 alerts to the user that it has entered into the selection mode by displaying smaller representation 1924 of the user interface screen, name 1928 corresponding to a name of the type of context-specific user interface currently selected, partial view 1930 of an adjacent, stored context-specific user interface (which the user could select by swiping to view the full interface and tapping to select it), and edit affordance 1926. In order to edit the character user interface object, the user contacts edit affordance 1926 via tap 1932.

In response to detecting tap 1932, the device enters edit mode and visually distinguishes one or more aspects of the user interface for editing. In this example, character user interface object 1902*i* is selected for editing (e.g., selecting a character). Device 1900 informs the user that user interface object 1902*i* is selected for editing by visually distinguishing user interface object 1902*i* via displaying outline 1932*a* around user interface object 1902*i* and indicator 1932*b*, which indicates that the character is editable. Device 1900 also displays scroll indicator 1936, which informs the user that additional characters can be selected by scrolling and indicates the position of the character along the series of displayable characters. Device 1900 also displays paging affordance 1934, which indicates that three options for editing different aspects of the user interface can be selected (e.g., by swiping). In this example, the options include the character, the application associated with various complications, and one or more colors (e.g., a color associated with the character user interface object and/or an additional display element).

To edit a different aspect of the interface, the user swipes display 1902, e.g., via swipe. To change the character, the user rotates 1910*a* via scroll 1938. In response to detecting scroll 1938, device 1900 ceases to display 1902*i* and displays character user interface object 1940 (FIG. 19F). Indicator 1932*b* is also updated to reflect the character. Scroll indicator 1942 is also updated to indicate the position of the new character along the series of selectable characters. In some embodiments, the user can then exit edit mode and display the edited user interface screen. In some embodiments, upon exiting edit mode, the device saves the edited user interface screen in memory, e.g., such that it can be subsequently selected in selection mode, e.g., as described in International Patent Application Serial No. PCT/US2015/034607, titled "Context-Specific User Interfaces," filed Jun. 7, 2015, published as WIPO Publication No. WO/2016/022205 (see, e.g., display 1322 in FIG. 13).

In any of the embodiments described herein, or any of the embodiments described in International Patent Application Serial No. PCT/US2015/034604, titled "Context-Specific User Interfaces," filed Jun. 7, 2015, published as WIPO Publication No. WO/2016/022203, a context-specific user interface displays one or more colors indicative of wireless communication functionality. For example, a context-specific user interface can include a color only for devices capable of long term evolution (LTE) wireless communication. In some embodiments, a context-specific user interface displays one or more user interface objects that indicate wireless connectivity status. For example, one or more dots can be displayed, where a larger number of dots indicates higher signal strength. In some embodiments, a color of the one or more dots indicates the type of wireless communication that the device is currently using (e.g., one color for LTE and another color for WiFi). In some embodiments, the one or more dots can be an affordance that the user can select (e.g., by tapping). In response to detecting the user selection (e.g., tap), the device displays a user interface screen for changing a wireless communication setting (e.g., turning off/on LTE or WiFi).

The foregoing description, for purpose of explanation, has been described with reference to specific embodiments. However, the illustrative discussions above are not intended to be exhaustive or to limit the scope of the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:

1. An electronic device, comprising:
a display;
one or more processors; and
memory storing one or more programs configured to be executed by the one or more processors, the one or more programs including instructions for:
   displaying on the display a user interface screen comprising:
      a current time indicator; and
      a first platter at a first position on the display, wherein the first platter is associated with a first application and displays a first set of information obtained from the first application, wherein the first set of information relates to a first temporal context of the current day;
   detecting a first user input; and
   in response to detecting the first user input, scrolling a plurality of platters through the first position on the display, the plurality of platters including:
      a second platter, wherein the second platter is associated with a second application and displays a first set of information obtained from the second application for a first future temporal context that is after a current time and the first future temporal context is a temporal context of the current day;
      a third platter, wherein the third platter is associated with the second application and displays a second set of information obtained from the second application for a second future temporal context that is after the first future temporal context, wherein the second set of information obtained from the second application is different from the first set of information obtained from the second application and the second future temporal context is a temporal context of the current day; and a fourth platter, wherein the fourth platter is associated with the second application and displays a third set of information obtained from the second application for multiple temporal contexts that are after the second future temporal context that includes a plurality of events, wherein there is a respective quantity of events in the plurality of events, wherein the third set of information obtained from the second application is different from the first set of information obtained from the second application and the second set of information obtained from the second application, wherein the multiple temporal contexts are associated with a day after the current day and displaying the fourth platter includes concurrently displaying, in the fourth platter:

a numerical indicator indicating the respective quantity of events in the plurality of events associated with the day after the current day; and an indicator indicating a time of the first event scheduled for the day after the current day without indicating a time of other events in the plurality of events associated with the day after the current day.

2. The device of claim 1, wherein the second future temporal context is later in the current day than the first temporal context and the first future temporal context.

3. The device of claim 1, wherein scrolling the plurality of platters through the first position on the display includes displaying the second, third, and fourth platters at a first size at the first position on the display and a second size at a second position on the display, wherein the second size is different than the first size.

4. The device of claim 1, the one or more programs further including instructions for:
in response to detecting the first user input:
displaying on the display an indicator of position along a series of positions, wherein the indicator of position along a series of positions indicates a position of a series of displayable platters;
detecting a second user input; and
in response to detecting the second user input:
updating the indicator of position to indicate the position of the series of displayable platters.

5. The device of claim 1, wherein the display is a touch-sensitive display, and the one or more programs further include instructions for:
after displaying the second platter, detecting a contact on the touch-sensitive display; and
in response to detecting the contact:
ceasing to display the second platter; and
displaying the first platter at the first position on the display.

6. The device of claim 1, wherein the display is a touch-sensitive display, and wherein detecting the first user input comprises detecting a first swipe on the touch-sensitive display.

7. The device of claim 6, wherein the first swipe is in a first swipe direction on the touch-sensitive display, and the one or more programs further include instructions for:
after displaying the second platter, detecting a second swipe on the touch-sensitive display in a second swipe direction different from the first swipe direction; and
in response to detecting the second swipe:
ceasing to display the second platter; and
displaying the first platter at the first position on the display.

8. The device of claim 1, wherein the device further comprises a rotatable input mechanism, and wherein detecting the first user input comprises detecting a first rotation of the rotatable input mechanism.

9. The device of claim 8, wherein the first rotation of the rotatable input mechanism is in a first direction of rotation, and wherein the one or more programs further include instructions for:
detecting a second rotation of the rotatable input mechanism in a second direction of rotation different from the first direction of rotation; and
in response to detecting the second rotation:
ceasing to display the second platter; and
displaying the first platter at the first position on the display.

10. The device of claim 1, wherein the first and the second applications are different.

11. The device of claim 1, wherein the first and the second applications are the same.

12. The device of claim 1, the one or more programs further including instructions for:
displaying an affordance that represents an application, wherein the affordance is displayed at a position different from the first position on the display;
detecting a user input corresponding to a selection of the affordance; and
in response to detecting the user input corresponding to a selection of the affordance:
launching the application represented by the affordance.

13. A non-transitory computer-readable storage medium storing one or more programs configured to be executed by one or more processors of an electronic device with a display, the one or more programs including instructions for:
displaying on the display a user interface screen comprising:
a current time indicator; and
a first platter at a first position on the display, wherein the first platter is associated with a first application and displays a first set of information obtained from the first application, wherein the first set of information relates to a first temporal context of the current day;
detecting a first user input; and
in response to detecting the first user input, scrolling a plurality of platters through the first position on the display, the plurality of platters including:
a second platter, wherein the second platter is associated with a second application and displays a first set of information obtained from the second application for a first future temporal context that is after a current time and the first future temporal context is a temporal context of the current day;
a third platter, wherein the third platter is associated with the second application and displays a second set of information obtained from the second application for a second future temporal context that is after the first future temporal context, wherein the second set of information obtained from the second application is different from the first set of information obtained from the second application and the second future temporal context is a temporal context of the current day; and a fourth platter, wherein the fourth platter is associated with the second application and displays a third set of information obtained from the second application for multiple temporal contexts that are after the second future temporal context that includes a plurality of events, wherein there is a respective quantity of events in the plurality of events, wherein the third set of information obtained from the second application is different from the first set of information obtained from the second application and the second set of information obtained from the second application, wherein the multiple temporal contexts are associated with a day after the current day and displaying the fourth platter includes concurrently displaying, in the fourth platter:
- a numerical indicator indicating the respective quantity of events in the plurality of events associated with the day after the current day; and
- an indicator indicating a time of the first event scheduled for the day after the current day without indicating a time of other events in the plurality of events associated with the day after the current day.

14. A method, comprising:

at an electronic device with a display, one or more processors, and memory:
- displaying on the display a user interface screen comprising:
  - a current time indicator; and
  - a first platter at a first position on the display, wherein the first platter is associated with a first application and displays a first set of information obtained from the first application, wherein the first set of information relates to a first temporal context of the current day;
- detecting a first user input; and
- in response to detecting the first user input, scrolling a plurality of platters through the first position on the display, the plurality of platters including:
  - a second platter, wherein the second platter is associated with a second application and displays a first set of information obtained from the second application for a first future temporal context that is after a current time and the first future temporal context is a temporal context of the current day;
  - a third platter, wherein the third platter is associated with the second application and displays a second set of information obtained from the second application for a second future temporal context that is after the first future temporal context, wherein the second set of information obtained from the second application is different from the first set of information obtained from the second application and the second future temporal context is a temporal context of the current day; and
  - a fourth platter, wherein the fourth platter is associated with the second application and displays a third set of information obtained from the second application for multiple temporal contexts that are after the second future temporal context that includes a plurality of events, wherein there is a respective quantity of events in the plurality of events, wherein the third set of information obtained from the second application is different from the first set of information obtained from the second application and the second set of information obtained from the second application, wherein the multiple temporal contexts are associated with a day after the current day and displaying the fourth platter includes concurrently displaying, in the fourth platter:
    - a numerical indicator indicating the respective quantity of events in the plurality of events associated with the day after the current day; and
    - an indicator indicating a time of the first event scheduled for the day after the current day without indicating a time of other events in the plurality of events associated with the day after the current day.

15. The device of claim 1, wherein the third set of information obtained from the second application includes a summary of information obtained from the second application for the multiple temporal contexts.

16. The device of claim 1, wherein:
the first set of information obtained from the second application includes a first calendar event,
the second set of information obtained from the second application includes a second calendar event different from the first calendar event, and
the third set of information obtained from the second application includes a plurality of calendar events different than the first and second calendar events.

17. The device of claim 1, wherein the third set of information obtained from the second application includes information indicating a quantity of activity within the multiple temporal contexts.

18. The device of claim 1, wherein:
the first set of information obtained from the second application includes a first type of event,
the second set of information obtained from the second application includes the first type of event, and
the third set of information obtained from the second application includes the first type of event.

19. The non-transitory computer-readable storage medium of claim 13, wherein the second future temporal context is later in the current day than the first temporal context and the first future temporal context.

20. The non-transitory computer-readable storage medium of claim 13, wherein scrolling the plurality of platters through the first position on the display includes displaying the second, third, and fourth platters at a first size at the first position on the display and a second size at a second position on the display, wherein the second size is different than the first size.

21. The non-transitory computer-readable storage medium of claim 13, the one or more programs further including instructions for:
in response to detecting the first user input:
displaying on the display an indicator of position along a series of positions, wherein the indicator of position along a series of positions indicates a position of a series of displayable platters;
detecting a second user input; and
in response to detecting the second user input:
updating the indicator of position to indicate the position of the series of displayable platters.

22. The non-transitory computer-readable storage medium of claim 13, wherein the display is a touch-sensitive display, and the one or more programs further include instructions for:
after displaying the second platter, detecting a contact on the touch-sensitive display; and
in response to detecting the contact:

ceasing to display the second platter; and
displaying the first platter at the first position on the display.

23. The non-transitory computer-readable storage medium of claim 13, wherein the display is a touch-sensitive display, and wherein detecting the first user input comprises detecting a first swipe on the touch-sensitive display.

24. The non-transitory computer-readable storage medium of claim 23, wherein the first swipe is in a first swipe direction on the touch-sensitive display, and the one or more programs further include instructions for:
after displaying the second platter, detecting a second swipe on the touch-sensitive display in a second swipe direction different from the first swipe direction; and
in response to detecting the second swipe:
ceasing to display the second platter; and
displaying the first platter at the first position on the display.

25. The non-transitory computer-readable storage medium of claim 13, wherein the electronic device further comprises a rotatable input mechanism, and wherein detecting the first user input comprises detecting a first rotation of the rotatable input mechanism.

26. The non-transitory computer-readable storage medium of claim 25, wherein the first rotation of the rotatable input mechanism is in a first direction of rotation, and wherein the one or more programs further include instructions for:
detecting a second rotation of the rotatable input mechanism in a second direction of rotation different from the first direction of rotation; and
in response to detecting the second rotation:
ceasing to display the second platter; and
displaying the first platter at the first position on the display.

27. The non-transitory computer-readable storage medium of claim 13, wherein the first and the second applications are different.

28. The non-transitory computer-readable storage medium of claim 13, wherein the first and the second applications are the same.

29. The non-transitory computer-readable storage medium of claim 13, the one or more programs further including instructions for:
displaying an affordance that represents an application, wherein the affordance is displayed at a position different from the first position on the display;
detecting a user input corresponding to a selection of the affordance; and
in response to detecting the user input corresponding to a selection of the affordance:
launching the application represented by the affordance.

30. The non-transitory computer-readable storage medium of claim 13, wherein the third set of information obtained from the second application includes a summary of information obtained from the second application for the multiple temporal contexts.

31. The non-transitory computer-readable storage medium of claim 13, wherein:
the first set of information obtained from the second application includes a first calendar event,
the second set of information obtained from the second application includes a second calendar event different from the first calendar event, and
the third set of information obtained from the second application includes a plurality of calendar events different than the first and second calendar events.

32. The non-transitory computer-readable storage medium of claim 13, wherein the third set of information obtained from the second application includes information indicating a quantity of activity within the multiple temporal contexts.

33. The non-transitory computer-readable storage medium of claim 13, wherein:
the first set of information obtained from the second application includes a first type of event,
the second set of information obtained from the second application includes the first type of event, and
the third set of information obtained from the second application includes the first type of event.

34. The method of claim 14, wherein the second future temporal context is later in the current day than the first temporal context and the first future temporal context.

35. The method of claim 14, wherein scrolling the plurality of platters through the first position on the display includes displaying the second, third, and fourth platters at a first size at the first position on the display and a second size at a second position on the display, wherein the second size is different than the first size.

36. The method of claim 14, further comprising:
in response to detecting the first user input:
displaying on the display an indicator of position along a series of positions, wherein the indicator of position along a series of positions indicates a position of a series of displayable platters;
detecting a second user input; and
in response to detecting the second user input:
updating the indicator of position to indicate the position of the series of displayable platters.

37. The method of claim 14, wherein the display is a touch-sensitive display, the method further comprising:
after displaying the second platter, detecting a contact on the touch-sensitive display; and
in response to detecting the contact:
ceasing to display the second platter; and
displaying the first platter at the first position on the display.

38. The method of claim 14, wherein the display is a touch-sensitive display, and wherein detecting the first user input comprises detecting a first swipe on the touch-sensitive display.

39. The method of claim 38, wherein the first swipe is in a first swipe direction on the touch-sensitive display, the method further comprising:
after displaying the second platter, detecting a second swipe on the touch-sensitive display in a second swipe direction different from the first swipe direction; and
in response to detecting the second swipe:
ceasing to display the second platter; and
displaying the first platter at the first position on the display.

40. The method of claim 14, wherein the device further comprises a rotatable input mechanism, and wherein detecting the first user input comprises detecting a first rotation of the rotatable input mechanism.

41. The method of claim 40, wherein the first rotation of the rotatable input mechanism is in a first direction of rotation, the method further comprising:
detecting a second rotation of the rotatable input mechanism in a second direction of rotation different from the first direction of rotation; and in response to detecting the second rotation:
  ceasing to display the second platter; and
  displaying the first platter at the first position on the display.

42. The method of claim 14, wherein the first and the second applications are different.

43. The method of claim 14, wherein the first and the second applications are the same.

44. The method of claim 14, further comprising:
displaying an affordance that represents an application, wherein the affordance is displayed at a position different from the first position on the display;
detecting a user input corresponding to a selection of the affordance; and
in response to detecting the user input corresponding to a selection of the affordance:
  launching the application represented by the affordance.

45. The method of claim 14, wherein the third set of information obtained from the second application includes a summary of information obtained from the second application for the multiple temporal contexts.

46. The method of claim 14, wherein:
the first set of information obtained from the second application includes a first calendar event,
the second set of information obtained from the second application includes a second calendar event different from the first calendar event, and
the third set of information obtained from the second application includes a plurality of calendar events different than the first and second calendar events.

47. The method of claim 14, wherein the third set of information obtained from the second application includes information indicating a quantity of activity within the multiple temporal contexts.

48. The method of claim 14, wherein:
the first set of information obtained from the second application includes a first type of event,
the second set of information obtained from the second application includes the first type of event, and
the third set of information obtained from the second application includes the first type of event.

* * * * *